US012592099B2

(12) United States Patent
Mateer

(10) Patent No.: US 12,592,099 B2
(45) Date of Patent: Mar. 31, 2026

(54) SYSTEM AND METHOD FOR FRAUD PREVENTION USING SECURITY SCREENING IMAGE

(71) Applicant: Craig Mateer, Orlando, FL (US)

(72) Inventor: Craig Mateer, Orlando, FL (US)

( * ) Notice: Subject to any disclaimer, the term of this patent is extended or adjusted under 35 U.S.C. 154(b) by 0 days.

(21) Appl. No.: 18/913,077

(22) Filed: Oct. 11, 2024

(65) Prior Publication Data

US 2025/0037514 A1 Jan. 30, 2025

Related U.S. Application Data

(63) Continuation-in-part of application No. 18/514,195, filed on Nov. 20, 2023, which is a (Continued)

(51) Int. Cl.
*G06K 7/10* (2006.01)
*B42D 15/00* (2006.01)
(Continued)

(52) U.S. Cl.
CPC .......... *G07B 11/00* (2013.01); *B42D 15/0053* (2013.01); *G09F 3/207* (2013.01)

(58) Field of Classification Search
CPC .............. G06K 19/025; G06K 7/10445; G09F 2003/0254; G06T 2207/30112
(Continued)

(56) References Cited

U.S. PATENT DOCUMENTS 5,010,240 A 4/1991 Sheldon
5,401,944 A 3/1995 Bravman et al.
(Continued)

FOREIGN PATENT DOCUMENTS

CN 101661585 3/2010
CN 108108781 6/2018
(Continued)

OTHER PUBLICATIONS

Written Opinion of the International Searching Authority Issued Jan. 17, 2025 in International Application No. PCT/US2024/050962.
(Continued)

*Primary Examiner* — Paultep Savusdiphol
(74) *Attorney, Agent, or Firm* — Fox Rothschild LLP; Paul Marshall Ticer

(57) ABSTRACT

Provided is a system and method for fraud prevention using security screening images, the method including: linking a first unique baggage identifier to at least one of a second unique baggage identifier and a security screening image (SSI) of contents within a luggage item; based on receiving a message comprising a list of contents missing from the luggage item, retrieving the SSI of the contents; generating a list of contents in the SSI using a machine learning algorithm; comparing the list of contents missing from the luggage item with the list of contents in the SSI; based on identifying a match between at least one item on the list of contents missing from the luggage item and at least one item on the list of contents in the SSI, verifying a missing contents claim; and communicating a verification message.

27 Claims, 73 Drawing Sheets

Related U.S. Application Data continuation-in-part of application No. 18/197,840, filed on May 16, 2023, now Pat. No. 11,935,072, and a continuation-in-part of application No. 18/337,288, filed on Jun. 19, 2023, now Pat. No. 11,893,832, which is a continuation-in-part of application No. 18/332,377, filed on Jun. 9, 2023, now Pat. No. 11,900,732, which is a continuation of application No. 18/201,908, filed on May 25, 2023, now Pat. No. 11,881,057, which is a continuation of application No. 18/311,566, filed on May 3, 2023, now Pat. No. 11,948,404, which is a continuation of application No. 18/104,359, filed on Feb. 1, 2023, now Pat. No. 11,682,241, application No. 18/913,077 is a continuation-in-part of application No. PCT/US2024/013807, filed on Jan. 31, 2024, and a continuation-in-part of application No. 18/427,323, filed on Jan. 30, 2024, and a continuation-in-part of application No. 18/790,693, filed on Jul. 31, 2024, which is a continuation-in-part of application No. 18/665,494, filed on May 15, 2024, now Pat. No. 12,205,411, application No. 18/913,077 is a continuation-in-part of application No. PCT/US2024/029665, filed on May 16, 2024.

(60) Provisional application No. 63/640,006, filed on Apr. 29, 2024, provisional application No. 63/598,824, filed on Nov. 14, 2023, provisional application No. 63/543,667, filed on Oct. 11, 2023.

(51) Int. Cl.
*G07B 11/00* (2006.01)
*G09F 3/20* (2006.01)

(58) Field of Classification Search
USPC .......................................... 235/385, 492, 375
See application file for complete search history.

(56) References Cited

U.S. PATENT DOCUMENTS 5,793,639 A 8/1998 Yamazaki
5,854,477 A 12/1998 Kawaji et al.
5,920,053 A 7/1999 DeBrouse
6,108,636 A 8/2000 Yap et al.
6,111,506 A 8/2000 Yap et al.
6,158,658 A 12/2000 Barclay
6,624,752 B2 9/2003 Klitsgaard et al.
6,970,088 B2 * 11/2005 Kovach .............. G08B 13/2462 340/505
7,030,760 B1 4/2006 Brown
7,512,458 B2 3/2009 Mateer
7,830,254 B2 11/2010 Huey et al.
8,052,061 B2 11/2011 Warther
8,600,149 B2 12/2013 Song et al.
9,177,186 B1 11/2015 Rinehart et al.
9,659,336 B2 5/2017 Mateer
9,710,776 B1 7/2017 Lewandowski
10,042,078 B2 8/2018 Sarraiocco
10,186,329 B1 1/2019 Laborde
10,217,078 B1 2/2019 Klein
10,366,293 B1 7/2019 Faviero et al.
10,504,261 B2 12/2019 Cinnamon et al.
10,856,116 B1 12/2020 Klein
10,904,722 B2 1/2021 Klein
10,932,101 B2 2/2021 Klein
10,979,872 B2 4/2021 Klein
11,057,689 B1 7/2021 Klein
11,189,155 B2 11/2021 Malinofsky
11,348,040 B2 5/2022 Mateer
D966,243 S 10/2022 Klein
11,663,574 B2 5/2023 Martinez de Velasco Cortina et al.
11,682,241 B1 6/2023 Mateer
11,881,057 B1 1/2024 Mateer
2003/0093305 A1 5/2003 Davis et al.
2003/0120510 A1 6/2003 Panek
2003/0189094 A1 10/2003 Trabitz
2003/0225612 A1 12/2003 DeSimone et al.
2003/0233244 A1 12/2003 Kumhyr
2004/0035928 A1 2/2004 Anderson
2004/0098276 A1 5/2004 Blazey et al.
2004/0124982 A1 * 7/2004 Kovach .............. G08B 13/2417 340/572.1
2005/0051622 A1 3/2005 Mak
2005/0128304 A1 6/2005 Manasseh et al.
2005/0246224 A1 11/2005 McKanna et al.
2005/0248450 A1 11/2005 Zanovitch
2005/0251397 A1 11/2005 Zanovitch et al.
2005/0258231 A1 11/2005 Wiater
2006/0142001 A1 6/2006 Moisan et al.
2006/0145852 A1 7/2006 McElhannon et al.
2007/0115123 A1 5/2007 Roberts et al.
2007/0168467 A1 7/2007 Hu et al.
2007/0203765 A1 8/2007 Schoen et al.
2009/0276089 A1 11/2009 Bartholomew
2010/0078475 A1 4/2010 Lin et al.
2010/0096444 A1 4/2010 Cummings et al.
2010/0207780 A1 8/2010 Newton
2010/0211418 A1 * 8/2010 Mateer ................... G06Q 10/08 40/6
2011/0054952 A1 3/2011 Mateer
2011/0133904 A1 * 6/2011 Warther ................. G06K 19/14 340/10.5
2011/0231212 A1 9/2011 Hurley et al.
2012/0062367 A1 3/2012 Warther
2012/0263350 A1 10/2012 Delianski
2013/0034268 A1 2/2013 Perron
2013/0046711 A1 2/2013 Reiz
2013/0101172 A1 4/2013 Parikh et al.
2013/0182912 A1 7/2013 Mak
2013/0268449 A1 10/2013 Mateer
2013/0284800 A1 10/2013 Gillen et al.
2013/0285806 A1 10/2013 Yano
2013/0341389 A1 12/2013 Roderique et al.
2014/0219501 A1 8/2014 Zhang
2014/0278590 A1 9/2014 Abbassi
2014/0291405 A1 10/2014 Harkes
2014/0363057 A1 12/2014 Eckel et al.
2015/0088781 A1 3/2015 Gillen et al.
2015/0122893 A1 5/2015 Warther
2015/0197348 A1 7/2015 Song et al.
2015/0199804 A1 7/2015 Chen
2015/0205989 A1 7/2015 Motley et al.
2015/0371453 A1 12/2015 Gallo et al.
2016/0140487 A1 5/2016 Tibbs et al.
2016/0227897 A1 8/2016 Jobling
2016/0314429 A1 10/2016 Gillen et al.
2017/0004444 A1 1/2017 Krasko et al.
2017/0083768 A1 3/2017 Xu et al.
2017/0103513 A1 * 4/2017 Heilmann .............. G01V 5/224
2017/0132565 A1 5/2017 Beadles et al.
2017/0268891 A1 9/2017 Dyrnaes et al.
2017/0372105 A1 12/2017 Coxall
2018/0111699 A1 4/2018 Imseeh
2018/0121804 A1 5/2018 Mohamadi
2018/0173967 A1 6/2018 Chen et al.
2019/0026851 A1 1/2019 Mateer
2019/0147558 A1 5/2019 Cheikh et al.
2019/0362485 A1 11/2019 Piegay et al.
2020/0045547 A1 2/2020 Singh Atwal et al.
2020/0090532 A1 3/2020 Håkansson
2020/0387861 A1 12/2020 Sanglier et al.
2021/0035061 A1 2/2021 Pashov et al.
2021/0042561 A1 * 2/2021 Akira .................... G06T 7/0002
2021/0049436 A1 2/2021 Nalbant
2021/0133678 A1 5/2021 Bates et al.
2021/0192655 A1 6/2021 Longobardi et al.
2021/0201218 A1 7/2021 Guiol et al.
2021/0264445 A1 8/2021 Axelrod et al.

(56) References Cited

U.S. PATENT DOCUMENTS

| | | | |
|---|---|---|---|
| 2021/0342428 A1 | 11/2021 | Hiramoto et al. | |
| 2022/0058762 A1 | 2/2022 | Goddard et al. | |
| 2022/0082721 A1 | 3/2022 | Holifield et al. | |
| 2022/0292273 A1 | 9/2022 | Kusy et al. | |
| 2022/0292412 A1 | 9/2022 | Mateer | |
| 2022/0350872 A1 | 11/2022 | McManus et al. | |
| 2022/0358420 A1 | 11/2022 | Kobayashi et al. | |
| 2022/0381941 A1 | 12/2022 | Fortune et al. | |
| 2022/0398300 A1 | 12/2022 | Morgan et al. | |
| 2023/0031219 A1 | 2/2023 | Ezrahi | |
| 2023/0186509 A1 | 6/2023 | Ryan | |
| 2023/0300561 A1 | 9/2023 | Trippe-Smith et al. | |
| 2023/0334927 A1 | 10/2023 | Mori et al. | |
| 2023/0417946 A1* | 12/2023 | Christensen | G06T 7/70 |
| 2024/0257571 A1 | 8/2024 | Mateer | |
| 2024/0365115 A1 | 10/2024 | Lee et al. | |
| 2025/0252390 A1 | 8/2025 | Price et al. | |

FOREIGN PATENT DOCUMENTS

| | | |
|---|---|---|
| CN | 110962868 | 4/2020 |
| CN | 111461614 | 7/2020 |
| CN | 111506614 | 8/2020 |
| CN | 111552000 | 8/2020 |
| CN | 111882263 | 11/2020 |
| CN | 112810632 | 5/2021 |
| CN | 115131654 | 9/2022 |
| EP | 2369554 | 9/2011 |
| EP | 3002714 | 4/2016 |
| EP | 3046058 | 7/2016 |
| EP | 3046058 A1 | 7/2016 |
| EP | 3 113 090 | 1/2017 |
| EP | 3279700 | 2/2018 |
| EP | 3373252 | 9/2018 |
| EP | 3 709 239 | 9/2020 |
| EP | 3279700 B1 | 1/2021 |
| JP | 2014-186650 | 10/2014 |
| JP | 7009743 | 1/2022 |
| KR | 100798741 | 1/2008 |
| KR | 10-2009-0011133 | 2/2009 |
| KR | 10-2009-0110642 | 10/2009 |
| KR | 10-2013-0007125 | 1/2013 |
| KR | 10-2013-0095015 | 8/2013 |
| KR | 20150085388 | 7/2015 |
| KR | 10-1884575 | 8/2018 |
| KR | 10-2022-0030724 | 3/2022 |
| KR | 10-2451322 | 10/2022 |
| NL | 2008761 | 11/2012 |
| WO | 2003/083764 | 10/2003 |
| WO | 2006/082521 | 8/2006 |
| WO | 2010/067132 | 6/2010 |
| WO | 2011/093780 | 8/2011 |
| WO | 2013113003 | 8/2013 |
| WO | 2013/155068 | 10/2013 |
| WO | 2016166686 | 10/2016 |
| WO | 2017/082468 | 5/2017 |
| WO | 2020/128468 | 6/2020 |
| WO | 2020/252030 | 12/2020 |
| WO | 2021/090448 | 5/2021 |

OTHER PUBLICATIONS

International Search Report Issued Jan. 17, 2025 in International Application No. PCT/US2024/050962.
A. Schwaninger et al. "Single-View, Multi-View and 3D Imaging for Baggage Screening: What should be considered for effective training?" Aviation Security International, 2019, pp. 32-35 (4 pages total).
Paul Evans, "Three-dimensional X-ray Imaging for Security Screening" Security Journal, vol. 18, Issue 1, 2005, pp. 19-28 (11 Pages total).
"Type B Service Reference Manual," SITA, Jan. 2000, 113A-0100-bis, pp. 1-192 (192 pages total).
"Planning Guidelines and Design Standards for Checked Baggage Inspection Systems: Appendices," Transportation Security Administration, Version 8.0, Dec. 30, 2022, File 2600.3, pp. 1-287 (287 pages total).
"Planning Guidelines and Design Standards (PGDS) Version 8.0 for Checked Baggage Inspection Systems," Department of Homeland Security, Sep. 29, 2017, TSA25-04-03026 (2 pages total).
"Bar Coded Boarding Pass (BCBP) Implementation Guide," International Air Transport Association, Jun. 1, 2018, Seven Edition, pp. 1-57 (56 pages total).
"Guidelines on Passenger Name Record (PNR) Data," International Civil Aviation Organization, First Edition, 2010, Doc 9944 (28 pages total).
"DHS/CBP Procedures for Access, Correction or Rectification, and Redress for Passenger Name Records (PNR)," U. S. Department of Homeland Security, CBP Publication No. 1011-1219 (4 pages total).
"What is PNR: Passenger Name Record Explained in Details," AltexSoft (15 pages total).
Michael Strauss, "Travel Technology for Dummies: What Is a Booking Reference or PNR?," Travel Industry Blog, Apr. 11, 2017 (5 pages total).
"Management Summary on Passenger-related Information," International Civil Aviation Organization, (ICAO), the World Customs Organization (WCO), International Air Transport Association (IATA), Jul. 2017, Umbrella Document Version 2.0, pp. 1-10 (10 pages total).
"Planning Guidelines and Design Standards for Checked Baggage Inspection Systems," Transportation Security Administration, Version 8.0, Dec. 30, 2022, File 2600.3, pp. 1-323 (323 pages total).
IATA, "Baggage Tracking IATA Resolution 753/A4A Resolution 30.53 Implementation Guide,"Issue 3.0, Retrieved online from: <https://www.iata.org/contentassets/5316edd3aafb4866876e37883211cfc4/baggage_tracking_implementation_guide.pdf>.

* cited by examiner

500A

900A

1100

For Example:

2500

2600

2800

3200

3300

4200

SYSTEM AND METHOD FOR FRAUD PREVENTION USING SECURITY SCREENING IMAGE

CROSS-REFERENCE TO RELATED APPLICATIONS

This application claims the priority benefit of U.S. Provisional Patent Application No. 63/640,006, filed Apr. 29, 2024. This application also claims the priority benefit of U.S. Provisional Patent Application No. 63/543,667, filed Oct. 11, 2023. This application also claims the priority benefit of U.S. Provisional Patent Application No. 63/598,824, filed Nov. 14, 2023. This application also claims the priority benefit of U.S. Provisional Patent Application No. 65/298,716, filed Apr. 29, 2024. The disclosure of each of the aforementioned applications is hereby incorporated herein by reference in its entirety.

This application is also a continuation-in-part of, and claims the priority benefit of, U.S. patent application Ser. No. 18/514,015, filed Nov. 20, 2023, which is a continuation-in-part of U.S. patent application Ser. No. 18/197,840, filed May 16, 2023 and now issued as U.S. Pat. No. 11,935,072, and Ser. No. 18/337,288, filed Jun. 19, 2023 and now issued as U.S. Pat. No. 11,893,832. Additionally, U.S. patent application Ser. No. 18/337,288 is a continuation-in-part of and claims the priority benefit U.S. patent application Ser. No. 18/332,377, filed Jun. 9, 2023 and now issued as U.S. Pat. No. 11,900,732, which is a continuation of U.S. patent application Ser. No. 18/201,908, filed May 25, 2023 and now issued as U.S. Pat. No. 11,881,057, which is a continuation of U.S. patent application Ser. No. 18/311,566, filed May 3, 2023 and now issued as U.S. Pat. No. 11,948,404, which is a continuation of U.S. patent application Ser. No. 18/104,359, filed Feb. 1, 2023 and now issued as U.S. Pat. No. 11,682,241. The disclosure of each of the aforementioned applications is hereby incorporated herein by reference in its entirety.

This application is also a continuation-in-part of, and claims the priority benefit of, International Pat. App. No. PCT/US2024/013807, filed Jan. 31, 2024. This application is also a continuation-in-part of, and claims the priority benefit of, U.S. patent application Ser. No. 18/427,323, filed Jan. 30, 2024. This application is also a continuation-in-part of, and claims the priority benefit of, U.S. patent application Ser. No. 18/790,693, filed Jul. 31, 2024, which is a continuation-in-part of U.S. patent application Ser. No. 18/665,494, filed May 15, 2024. This application is also a continuation-in-part of, and claims the priority benefit of, International Pat. App. No. PCT/US2024/029665, filed May 16, 2024. The disclosure of each of the aforementioned applications is hereby incorporated herein by reference in its entirety.

BACKGROUND

1. Field

The disclosure relates generally to asset management. Specifically, the disclosure relates to systems and methods for extracting otherwise discarded data and repurpose it to reduce data entry.

2. Description of Related Art

Travel carriers generally provide a passenger with the ability to check in luggage packed with a passenger's personal items, with or without a luggage fee. The luggage is often weighed to determine whether additional luggage fees are required. Then, the luggage is tagged by the airline with a printed bag tag. Each travel carrier may have its own format for printing a bag tag at the travel carrier counter. This process consumes human resources of personnel working behind the counter to finalize a check-in of the passenger, print boarding passes, process luggage, and print and attach bag tags. Airline travel carriers have also invested in kiosk machines that allow passengers to print bag tags themselves to free up some time for the counter personnel. This can allow a passenger to print and attach the printed bag tag without using the human resources of the counter personnel.

According to the Federal Aviation Administration, the average number of daily passengers in Fiscal Year 2021 was approximately 1.6 million. In Fiscal Year 2019, the average of daily passengers was approximately 2.9 million. Some of these passengers are traveling on a return leg of a trip. Still further, some of the passengers traveling on a return leg are returning from a cruise or high-volume resort.

There have been many attempts to reduce the cost of baggage handling, and especially the baggage handling, traveler departure, and return flight check-in from high-volume lodging entities. To simplify baggage handling during transport, a passenger is provided the option to select services from a third-party vendor to pick-up the passenger and/or baggage and transport the baggage to the airport when needed. The baggage may be picked-up from any location, such as home, office, hotel, etc. and/or delivered to any location identified by the passenger, without the passenger needing to be present.

Another attempt at baggage handling includes cross-use of employees at lodging entities, such as a hotel. One of the biggest drawbacks of cross-use of employees is that these employees are otherwise unavailable for other tasks that may arise for passengers still enjoying the amenities of the lodging entity. Hiring more employees has become a challenge in recent years due to COVID-19. Moreover, employee costs have risen. In some venues, such as cruise ships, extra employees to handle additional tasks is not just cost prohibitive but reduces the revenue of the cruise by trading paying passengers for the cost of a hired employee. The ability to print bag tags and boarding passes takes up area in the cruise ship that can be used for passenger lodging or additional revenue opportunities.

Some baggage handling services issue a valet receipt or tag that is placed on the luggage. This process still requires the baggage to receive a printed IATA bag tag with a bag tag identifier to replace the valet receipt or tag. This process can be cost prohibitive in a competitive lodging enterprise competing for clientele. Overall, the baggage handling services require a passenger to order the service using a website or mobile application, enter various passenger information that may be entered incorrectly, and pay a fee. Passengers can be remotely checked in to their flights by providing in advance all the necessary flight information of a travel itinerary using the website or mobile application. While the process seems benign, data entry errors can occur which can be very costly coupled with the additional cost of baggage handling and temporary valet tickets. Most times after a passenger arrives at their destination, the bag tag is removed and discarded to make room for the bag tag on their return leg of travel.

An average ocean liner cruise ship has a capacity of approximately 3,000 passengers. Some larger cruise ships have a capacity of 5,400 passengers. Each passenger that will return home using an airline travel carrier must be checked in for their return flight. The cruise ship personnel will handle the prechecking process for a return flight and/or check-in of luggage bags as well as the number of luggage bags. However, the process consumes valuable limited human resources available on the cruise ship for disembarkation. There is a need for a system and process to address these challenges that are cost and time efficient, and easy to use by any passenger.

Thousands of passengers cross borders using airports everyday. Processing luggage items through the Customs authority of any of these countries can cause luggage items to be delayed for its next flight.

SUMMARY

According to an aspect of the disclosure, a method includes: obtaining, by at least one of at least one processor, baggage data generated from at least one networked scanning device of a baggage handling system, the baggage data including an International Air Transportation Association (IATA) license plate for a checked-in luggage item of a passenger being checked-in with an originating airline; retrieving from a secure database stored in a non-transitory secure memory device, by at least one of the at least one processor, a security screening image (SSI) representative of contents within the checked-in luggage item that is linked to the IATA license plate, wherein the SSI is generated by a security screening imaging machine in an originating country and based on technology standards of a first level governed by a first security authority of the originating country; converting, by at least one of the at least one processor, the SSI and the baggage data into SSI file sharing data of a structured data format for a security screening tool; transmitting, through a first network interface in communication with at least one of the at least one processor and a first communication network, the SSI file sharing data over the first communication network to a secure non-transitory memory system associated with a border crossing airport in a second country, wherein the SSI file sharing data is configured to be used by a second security authority to perform a security screening process on the checked-in luggage item using the security screening tool, and wherein the second security authority is different from the first security authority; receiving from the second security authority, through a second network interface in communication with at least one of the at least one processor and a second communication network, a first screening message associated with a result of the security screening process, wherein the result of the security screening process is based on the SSI file sharing data; and causing, by at least one of the at least one processor, the result of the security screening process included in the first screening message to be displayed by a display device in near real-time, wherein the result of the security screening process includes one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

The method may further include: based on the first screening message including the second result, communicating, by a third network interface in communication with at least one of the at least one processor and a third communication network, a second screening message to a baggage scanning system of an identified airline, wherein the second screening message is configured to cause the checked-in luggage item to be re-screened.

The method may further include: based on receiving the first screening message with the second result, obtaining, by at least one of the at least one processor, an IATA license plate for one or more additional checked-in luggage items of the passenger, wherein the communicating, by the third network interface in communication with at least one of the at least one processor and the third communication network, may include: communicating the IATA license plate for the one or more additional checked-in luggage items of the passenger in one or more additional second screening messages to the baggage scanning system of the identified airline, wherein the one or more additional second screening messages are configured to cause the one or more additional checked-in luggage items to be re-screened.

The SSI file sharing data may include at least one of a flight number, an airline code, a unique passenger identifier (UPID) required for communicating with countries, a passport document number, a passenger name, a passenger name record (PNR) locator, or a pseudo identifier (PID).

The converting the SSI and the baggage data into the SSI file sharing data may further include: generating, by at least one of the at least one processor, a message identifier number including a sequence of digits; and associating, by at least one of the at least one processor, the SSI file sharing data with the message identifier by configuring the SSI file sharing data to be accessed by the security screening tool.

The method may further include: analyzing, by at least one of the at least one processor, the SSI for at least one mode of travel different from the originating airline using a machine learning algorithm; determining, by at least one of the at least one processor and based on the analysis of the SSI, whether the contents within the checked-in luggage item are approved for travel on at least one vehicle of travel associated with the at least one mode of travel; and generating, by at least one of the at least one processor, a second screening message representative of a result of the determining whether the contents within the checked-in luggage item are cleared for travel on at least one vehicle of the at least one mode of travel.

The method may further include: causing, by at least one of the at least one processor, a printer device to print a marker including information representative of the result of the determining whether the contents within the checked-in luggage item are cleared for travel on at least one vehicle of the at least one mode of travel.

The method may further include: i) generating, by at least one of the at least one processor, at least one manifest listing a plurality of passengers, wherein each of the at least one manifest may include a passenger manifest data record having manifest data fields for each passenger listed therein; ii) monitoring, by a passenger matching and bag release system, at least one computer system associated with the second security authority, wherein the second security authority processes the plurality of passengers for border crossing at the border crossing airport; and iii) detecting, by the passenger matching and bag release system during the monitoring of the at least one computer system, a clearance processing event of a passenger record, created by the at least one computer system, by matching the passenger record with a respective passenger manifest data record.

The manifest data fields may include at least one of a unique passenger identifier of each respective passenger and a unique baggage identifier of each checked-in luggage item of each respective passenger, and the method may further include: iv) based on detecting the clearance processing event, communicating, through a third network interface in communication with the passenger matching and bag release system and a third communication network, a baggage release message to a baggage scanning system of an identified airline, a computing device of a baggage handler, or a baggage handling system; and v) repeating ii)-iv) for each of the plurality of passengers in the at least one manifest.

The method may further include: determining, by at least one of the at least one processor, whether a missing link exists between the IATA license plate and the SSI.

The obtaining the baggage data generated from the at least one networked scanning device of the baggage handling system may include, based on determining that the missing link exists: obtaining, by at least one of the at least one processor, the baggage data including a pseudo identifier (PID) for the checked-in luggage item of the passenger generated by the baggage handling system; and extrapolating, by at least one of the at least one processor, from the baggage data, the IATA license plate for the checked-in luggage item of the passenger based on the PID.

The at least one networked scanning device of the baggage handling system may include an optical scanning device, a near field communication device, or an imaging device.

According to an aspect of the disclosure, a system includes: at least one memory storing one or more instructions; and at least one processor configured to execute the one or more instructions, wherein the one or more instructions, when executed by the at least one processor cause the system to: obtain baggage data generated from at least one networked scanning device of a baggage handling system, the baggage data including an International Air Transportation Association (IATA) license plate for a checked-in luggage item of a passenger being checked-in with an originating airline, retrieve, from a secure database stored in a non-transitory secure memory device, a security screening image (SSI) representative of contents within the checked-in luggage item that is linked to the IATA license plate, wherein the SSI is generated by a security screening imaging machine in an originating country and based on technology standards of a first level governed by a first security authority of the originating country, convert the SSI and the baggage data into SSI file sharing data of a structured data format for a security screening tool, transmit, through a first network interface of the system in communication with at least one of the at least one processor and a first communication network, the SSI file sharing data over the first communication network to a secure non-transitory memory system associated with a border crossing airport in a second country, wherein the SSI file sharing data is configured to be used by a second security authority to perform a security screening process on the checked-in luggage item using the security screening tool, and wherein the second security authority is different from the first security authority, receive from the second security authority, through a second network interface of the system in communication with at least one of the at least one processor and a second communication network, a first screening message associated with a result of the security screening process, wherein the result of the security screening process is based on the SSI file sharing data, and cause the result of the security screening process included in the first screening message to be displayed by a display device in near real-time, wherein the result of the security screening process includes one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

The one or more instructions, when executed by the at least one processor, may cause the system to: based on the first screening message including the second result, communicate, by a third network interface of the system in communication with at least one of the at least one processor and a third communication network, a second screening message to a baggage scanning system of an identified airline, wherein the second screening message is configured to cause the checked-in luggage item to be re-screened.

The one or more instructions, when executed by the at least one processor, may cause the system to: based on receiving the first screening message with the second result, obtain an IATA license plate for one or more additional checked-in luggage items of the passenger, and communicate, through the third network interface in communication with at least one of the at least one processor and the third communication network, the IATA license plate for the one or more additional checked-in luggage items of the passenger in one or more additional second screening messages to the baggage scanning system of the identified airline, wherein the one or more additional second screening messages are configured to cause the one or more additional checked-in luggage items to be re-screened.

The SSI file sharing data may include at least one of a flight number, an airline code, a unique passenger identifier (UPID) required for communicating with countries, a passport document number, a passenger name, a passenger name record (PNR) locator, or a pseudo identifier (PID).

The one or more instructions, when executed by the at least one processor, may cause the system to: convert the SSI and the baggage data into the SSI file sharing data by generating a message identifier number including a sequence of digits, and associating the SSI file sharing data with the message identifier by configuring the SSI file sharing data to be accessed by the security screening tool.

The one or more instructions, when executed by the at least one processor, may cause the system to: analyze the SSI for at least one mode of travel different from the originating airline using a machine learning algorithm, determine, based on the analysis of the SSI, whether the contents within the checked-in luggage item are approved for travel on at least one vehicle of travel associated with the at least one mode of travel, and generate a second screening message representative of a result of the determining whether the contents within the checked-in luggage item are cleared for travel on at least one vehicle of the at least one mode of travel.

The one or more instructions, when executed by the at least one processor, may cause the system to: cause a printer device to print a marker including information representative of the result of the determining whether the contents within the checked-in luggage item are cleared for travel on at least one vehicle of the at least one mode of travel.

The one or more instructions, when executed by the at least one processor, may cause the system to: i) generate at least one manifest listing a plurality of passengers, wherein each of the at least one manifest may include a passenger manifest data record having manifest data fields for each passenger listed therein; ii) monitor, by a passenger matching and bag release system, at least one computer system associated with the second security authority, wherein the second security authority processes the plurality of passengers for border crossing at the border crossing airport; and iii) detect, by the passenger matching and bag release system during the monitoring of the at least one computer system, a clearance processing event of a passenger record, created by the at least one computer system, by matching the passenger record with a respective passenger manifest data record.

The manifest data fields may include at least one of a unique passenger identifier of each respective passenger and a unique baggage identifier of each checked-in luggage item of each respective passenger, and the one or more instructions, when executed by the at least one processor, may cause the system to: iv) based on detecting the clearance processing event, communicate, through a third network interface in communication with the passenger matching and bag release system and a third communication network, a baggage release message to a baggage scanning system of an identified airline, a computing device of a baggage handler, or a baggage handling system, and v) repeating ii)-iv) for each of the plurality of passengers in the at least one manifest.

The one or more instructions, when executed by the at least one processor, may cause the system to: determine whether a missing link exists between the IATA license plate and the SSI.

The one or more instructions, when executed by the at least one processor, may cause the system to: based on determining that the missing link exists, obtain the baggage data generated from the at least one networked scanning device of the baggage handling system by: obtaining the baggage data including a pseudo identifier (PID) for the checked-in luggage item of the passenger generated by the baggage handling system, and extrapolating, from the baggage data, the IATA license plate for the checked-in luggage item of the passenger based on the PID.

The at least one networked scanning device of the baggage handling system may include an optical scanning device, a near field communication device, or an imaging device.

According to an aspect of the disclosure, a non-transitory computer readable medium has instructions stored therein, which when executed by at least one processor, cause the at least one processor to execute a method including: obtaining, by at least one of at least one processor, baggage data generated from at least one networked scanning device of a baggage handling system, the baggage data including an International Air Transportation Association (IATA) license plate for a checked-in luggage item of a passenger being checked-in with an originating airline; retrieving from a secure database stored in a non-transitory secure memory device, by at least one of the at least one processor, a security screening image (SSI) representative of contents within the checked-in luggage item that is linked to the IATA license plate, wherein the SSI is generated by a security screening imaging machine in an originating country and based on technology standards of a first level governed by a first security authority of the originating country; converting, by at least one of the at least one processor, the SSI and the baggage data into SSI file sharing data of a structured data format for a security screening tool; transmitting, through a first network interface in communication with at least one of the at least one processor and a first communication network, the SSI file sharing data over the first communication network to a secure non-transitory memory system associated with a border crossing airport in a second country, wherein the SSI file sharing data is configured to be used by a second security authority to perform a security screening process on the checked-in luggage item using the security screening tool, and wherein the second security authority is different from the first security authority; receiving from the second security authority, through a second network interface in communication with at least one of the at least one processor and a second communication network, a first screening message associated with a result of the security screening process, wherein the result of the security screening process is based on the SSI file sharing data; and causing, by at least one of the at least one processor, the result of the security screening process included in the first screening message to be displayed by a display device in near real-time, wherein the result of the security screening process includes one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

With regard to the non-transitory computer readable medium, the method executed by the at least one processor may include: based on the first screening message including the second result, communicating, by a third network interface in communication with at least one of the at least one processor and a third communication network, a second screening message to a baggage scanning system of an identified airline, wherein the second screening message is configured to cause the checked-in luggage item to be re-screened.

With regard to the non-transitory computer readable medium, the method executed by the at least one processor may include: based on receiving the first screening message with the second result, obtaining, by at least one of the at least one processor, an IATA license plate for one or more additional checked-in luggage items of the passenger, wherein the communicating, by the third network interface in communication with at least one of the at least one processor and the third communication network, may include: communicating the IATA license plate for the one or more additional checked-in luggage items of the passenger in one or more additional second screening messages to the baggage scanning system of the identified airline, wherein the one or more additional second screening messages are configured to cause the one or more additional checked-in luggage items to be re-screened.

The SSI file sharing data may include at least one of a flight number, an airline code, a unique passenger identifier (UPID) required for communicating with countries, a passport document number, a passenger name, a passenger name record (PNR) locator, or a pseudo identifier (PID).

The converting the SSI and the baggage data into the SSI file sharing data may further include: generating, by at least one of the at least one processor, a message identifier number including a sequence of digits; and associating, by at least one of the at least one processor, the SSI file sharing data with the message identifier by configuring the SSI file sharing data to be accessed by the security screening tool.

With regard to the non-transitory computer readable medium, the method executed by the at least one processor may include: analyzing, by at least one of the at least one processor, the SSI for at least one mode of travel different from the originating airline using a machine learning algorithm; determining, by at least one of the at least one processor and based on the analysis of the SSI, whether the contents within the checked-in luggage item are approved for travel on at least one vehicle of travel associated with the at least one mode of travel; and generating, by at least one of the at least one processor, a second screening message representative of a result of the determining whether the contents within the checked-in luggage item are cleared for travel on at least one vehicle of the at least one mode of travel.

With regard to the non-transitory computer readable medium, the method executed by the at least one processor may include: causing, by at least one of the at least one processor, a printer device to print a marker including information representative of the result of the determining whether the contents within the checked-in luggage item are cleared for travel on at least one vehicle of the at least one mode of travel.

With regard to the non-transitory computer readable medium, the method executed by the at least one processor may include: i) generating, by at least one of the at least one processor, at least one manifest listing a plurality of passengers, wherein each of the at least one manifest may include a passenger manifest data record having manifest data fields for each passenger listed therein; ii) monitoring, by a passenger matching and bag release system, at least one computer system associated with the second security authority, wherein the second security authority processes the plurality of passengers for border crossing at the border crossing airport; and iii) detecting, by the passenger matching and bag release system during the monitoring of the at least one computer system, a clearance processing event of a passenger record, created by the at least one computer system, by matching the passenger record with a respective passenger manifest data record.

The manifest data fields may include at least one of a unique passenger identifier of each respective passenger and a unique baggage identifier of each checked-in luggage item of each respective passenger, and with regard to the non-transitory computer readable medium, the method executed by the at least one processor may include: iv) based on detecting the clearance processing event, communicating, through a third network interface in communication with the passenger matching and bag release system and a third communication network, a baggage release message to a baggage scanning system of an identified airline, a computing device of a baggage handler, or a baggage handling system; and v) repeating ii)-iv) for each of the plurality of passengers in the at least one manifest.

With regard to the non-transitory computer readable medium, the method executed by the at least one processor may include: determining, by at least one of the at least one processor, whether a missing link exists between the IATA license plate and the SSI.

The obtaining the baggage data generated from the at least one networked scanning device of the baggage handling system may include, based on determining that the missing link exists: obtaining, by at least one of the at least one processor, the baggage data including a pseudo identifier (PID) for the checked-in luggage item of the passenger generated by the baggage handling system; and extrapolating, by at least one of the at least one processor, from the baggage data, the IATA license plate for the checked-in luggage item of the passenger based on the PID.

The at least one networked scanning device of the baggage handling system may include an optical scanning device, a near field communication device, or an imaging device.

According to an aspect of the disclosure, a method includes: obtaining, by at least one of at least one processor, from an electronic International Air Transportation Association (IATA) data message having a message format, passenger data including a unique passenger identifier (UPID) linked to a passenger checked-in with an originating airline and a unique baggage identifier for a checked-in luggage item of the passenger, wherein the IATA data message identifies a flight with passengers that will disembark or transfer at a border crossing airport; depersonalizing the passenger data by replacing personal identifying information of the passenger with a computer generated identifier; retrieving from a secure database stored in a non-transitory secure memory device, by at least one of the at least one processor, a security screening image (SSI) representative of contents within the checked-in luggage item, wherein the SSI is generated by a security screening imaging machine in an originating country and based on technology standards of a first level governed by a first security authority of the originating country; converting, by at least one of the at least one processor, the SSI and at least a portion of the passenger data, into SSI file sharing data of a structured data format for a security screening tool; transmitting, through a first network interface in communication with at least one of the at least one processor and a first communication network, the SSI file sharing data over the first communication network to a secure non-transitory memory system associated with the border crossing airport in a second country, wherein SSI file sharing data is configured to be used by a second security authority to perform a security screening process on the checked-in luggage item using the security screening tool, and wherein the second security authority is different from the first security authority; receiving from the second security authority, through a second network interface in communication with at least one of the at least one processor and a second communication network, a first screening message associated with a result of the security screening process, wherein the security screening process is based on the SSI file sharing data; and causing, by at least one of the at least one processor, the result of the security screening process included in the first screening message to be displayed by a display device in near real time, wherein the result of the security screening process includes one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

The method may further include: based on the first screening message including the second result, communicating, by a third network interface in communication with at least one of the at least one processor and a third communication network, a second screening message to a baggage scanning system of an identified airline, wherein the second screening message is configured to cause the checked-in luggage item to be re-screened.

The unique baggage identifier may include an IATA license plate, and the method may further include: obtaining, by at least one of the at least one processor, an IATA license plate for one or more additional checked-in luggage items of the passenger, wherein the communicating, through the third network interface in communication with at least one of the at least one processor and the third communication network, includes: communicating the IATA license plate for the one or more additional checked-in luggage items of the passenger in one or more additional second screening messages to the baggage scanning system of the identified airline, wherein the one or more additional second screening messages are configured to cause the one or more additional checked-in luggage items to be re-screened.

The UPID may be required for communicating with security screening authorities in countries other than the originating country, and the SSI file sharing data may include at least one of a flight number, an airline code, a passport document number, a passenger name, a passenger name record (PNR) locator, or a pseudo identifier (PID).

The converting the SSI and the at least a portion of the passenger data into the SSI file sharing data may further include: generating, by at least one of the at least one processor, a message identifier number including a sequence of digits; and associating, by at least one of the at least one processor, the SSI file sharing data with the message identifier by configuring the SSI file sharing data to be accessed by the security screening tool.

The method may further include: analyzing, by at least one of the at least one processor, the SSI for at least one mode of travel different from the originating airline using a machine learning algorithm; determining by at least one of the at least one processor and based on the analysis of the SSI, whether the contents within the checked-in luggage item are approved for travel on at least one vehicle of travel associated with the at least one mode of travel; and generating, by at least one of the at least one processor, a second screening message representative of a result of the determining whether the contents within the checked-in luggage item are cleared for travel on at least one vehicle of the at least one mode of travel.

The method may further include: causing, by at least one of the at least one processor, a printer device to print a marker including information representative of the result of the determining whether the contents within the checked-in luggage item are cleared for travel on the at least one vehicle of the at least one mode of travel.

The method may further include: i) generating, by at least one of the at least one processor, at least one manifest listing a plurality of passengers from the IATA data message, wherein each of the at least one manifest may include a passenger manifest data record having manifest data fields for each passenger listed therein; ii) monitoring, by a passenger matching and bag release system, processing data from at least one computer system associated with the second security authority, wherein the second security authority processes the plurality of passengers for border crossing at the border crossing airport; and iii) detecting, by the passenger matching and bag release system during the monitoring of the at least one computer system, a clearance processing event of a passenger record, created by the at least one computer system, by matching the passenger record with a respective passenger manifest data record.

The manifest data fields may include at least one of a UPID of each respective passenger and a unique baggage identifier of each checked-in luggage item of each respective passenger; and the method may further include: iv) based on detecting the clearance processing event, communicating, through a third network interface in communication with the passenger matching and bag release system and a third communication network, a baggage release message to a baggage scanning system of an identified airline, a computing device of a baggage handler, or a baggage handling system; and v) repeating ii)-iv) for each of the plurality of passengers in the at least one manifest.

The unique baggage identifier may include an IATA license plate assigned by a Departure Control System associated with the originating airline, and the method may further include: determining, by at least one of the at least one processor, whether a missing link exists between the IATA license plate and the SSI.

The method may further include: based on determining the missing link exists, obtaining, by at least one of the at least one processor, baggage data from a baggage handling system, wherein the baggage data may include a pseudo identifier (PID) for the checked-in luggage item of the passenger generated by the baggage handling system; and extrapolating, by at least one of the at least one processor, from the baggage data, the IATA license plate for the checked-in luggage item of the passenger based on the PID.

The IATA data message may include one of a passenger final sales message, a passenger reconcile message, or a passenger name list message.

According to an aspect of the disclosure, a system includes: at least one memory storing one or more instructions; and at least one processor configured to execute the one or more instructions, wherein the one or more instructions, when executed by the at least one processor cause the system to: obtain, from an electronic International Air Transportation Association (IATA) data message having a message format, passenger data including a unique passenger identifier (UPID) linked to a passenger checked-in with an originating airline and a unique baggage identifier for a checked-in luggage item of the passenger, wherein the IATA data message identifies a flight with passengers that will disembark or transfer at a border crossing airport, depersonalize the passenger data by replacing personal identifying information of the passenger with a computer generated identifier, retrieve, from a secure database stored in a non-transitory secure memory device, a security screening image (SSI) representative of contents within the checked-in luggage item, wherein the SSI is generated by a security screening imaging machine in an originating country and based on technology standards of a first level governed by a first security authority of the originating country, convert the SSI and at least a portion of the passenger data into SSI file sharing data of a structured data format for a security screening tool, transmit, through a first network interface of the system in communication with at least one of the at least one processor and a first communication network, the SSI file sharing data over the first communication network to a secure non-transitory memory system associated with the border crossing airport in a second country, wherein SSI file sharing data is configured to be used by a second security authority to perform a security screening process on the checked-in luggage item using the security screening tool, and wherein the second security authority is different from the first security authority, receive from the second security authority, through a second network interface of the system in communication with at least one of the at least one processor and a second communication network, a first screening message associated with a result of the security screening process, wherein the security screening process is based on the SSI file sharing data, and cause the result of the security screening process included in the first screening message to be displayed by a display device in near real time, wherein the result of the security screening process may include one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

The one or more instructions, when executed by the at least one processor, may cause the system to: based on the first screening message including the second result, communicate, by a third network interface of the system in communication with at least one of the at least one processor and a third communication network, a second screening message to a baggage scanning system of an identified airline, wherein the second screening message is configured to cause the checked-in luggage item to be re-screened.

The unique baggage identifier may include an IATA license plate, and the one or more instructions, when executed by the at least one processor, may cause the system to: obtain an IATA license plate for one or more additional checked-in luggage items of the passenger, and communicate, through the third network interface in communication with at least one of the at least one processor and the third communication network, the IATA license plate for the one or more additional checked-in luggage items of the passenger in one or more additional second screening messages to the baggage scanning system of the identified airline, wherein the one or more additional second screening messages are configured to cause the one or more additional checked-in luggage items to be re-screened.

The UPID may be required for communicating with security screening authorities in countries other than the originating country, and the SSI file sharing data may include at least one of a flight number, an airline code, a passport document number, a passenger name, a passenger name record (PNR) locator, or a pseudo identifier (PID).

The one or more instructions, when executed by the at least one processor, may cause the system to convert the SSI and the at least a portion of the passenger data into the SSI file sharing data by: generating a message identifier number including a sequence of digits, and associating the SSI file sharing data with the message identifier by configuring the SSI file sharing data to be accessed by the security screening tool.

The one or more instructions, when executed by the at least one processor, may cause the system to: analyze the SSI for at least one mode of travel different from the originating airline using a machine learning algorithm, determine, based on the analysis of the SSI, whether the contents within the checked-in luggage item are approved for travel on at least one vehicle of travel associated with the at least one mode of travel, and generate a second screening message representative of a result of the determining whether the contents within the checked-in luggage item are cleared for travel on at least one vehicle of the at least one mode of travel.

The one or more instructions, when executed by the at least one processor, may cause the system to: cause a printer device to print a marker including information representative of the result of the determining whether the contents within the checked-in luggage item are cleared for travel on the at least one vehicle of the at least one mode of travel.

The one or more instructions, when executed by the at least one processor, may cause the system to: i) generate at least one manifest listing a plurality of passengers from the IATA data message, wherein each of the at least one manifest may include a passenger manifest data record having manifest data fields for each passenger listed therein, ii) monitor processing data from at least one computer system associated with the second security authority, wherein the second security authority processes the plurality of passengers for border crossing at the border crossing airport, and iii) detect, by the passenger matching and bag release system during the monitoring of the at least one computer system, a clearance processing event of a passenger record, created by the at least one computer system, by matching the passenger record with a respective passenger manifest data record.

The manifest data fields may include at least one of a UPID of each respective passenger and a unique baggage identifier of each checked-in luggage item of each respective passenger; and the one or more instructions, when executed by the at least one processor, may cause the system to: iv) based on detecting the clearance processing event, communicate, through a third network interface of the system in communication with the passenger matching and bag release system and a third communication network, a baggage release message to a baggage scanning system of an identified airline, a computing device of a baggage handler, or a baggage handling system, and v) repeating ii)-iv) for each of the plurality of passengers in the at least one manifest.

The unique baggage identifier may include an IATA license plate assigned by a Departure Control System associated with the originating airline, and wherein the one or more instructions, when executed by the at least one processor cause the system to: determine whether a missing link exists between the IATA license plate and the SSI.

The one or more instructions, when executed by the at least one processor, may cause the system to: based on determining the missing link exists, obtain baggage data from a baggage handling system, wherein the baggage data may include a pseudo identifier (PID) for the checked-in luggage item of the passenger generated by the baggage handling system, and extrapolate, from the baggage data, the IATA license plate for the checked-in luggage item of the passenger based on the PID.

The IATA data message may include one of a passenger final sales message, a passenger reconcile message, or a passenger name list message.

According to an aspect of the disclosure, a non-transitory computer readable medium has instructions stored therein, which when executed by at least one processor, cause the at least one processor to execute a method including: obtaining, by at least one of at least one processor, from an electronic International Air Transportation Association (IATA) data message having a message format, passenger data including a unique passenger identifier (UPID) linked to a passenger checked-in with an originating airline and a unique baggage identifier for a checked-in luggage item of the passenger, wherein the IATA data message identifies a flight with passengers that will disembark or transfer at a border crossing airport; depersonalizing the passenger data by replacing personal identifying information of the passenger with a computer generated identifier; retrieving from a secure database stored in a non-transitory secure memory device, by at least one of the at least one processor, a security screening image (SSI) representative of contents within the checked-in luggage item, wherein the SSI is generated by a security screening imaging machine in an originating country and based on technology standards of a first level governed by a first security authority of the originating country; converting, by at least one of the at least one processor, the SSI and at least a portion of the passenger data, into SSI file sharing data of a structured data format for a security screening tool; transmitting, through a first network interface in communication with at least one of the at least one processor and a first communication network, the SSI file sharing data over the first communication network to a secure non-transitory memory system associated with the border crossing airport in a second country, wherein SSI file sharing data is configured to be used by a second security authority to perform a security screening process on the checked-in luggage item using the security screening tool, and wherein the second security authority is different from the first security authority; receiving from the second security authority, through a second network interface in communication with at least one of the at least one processor and a second communication network, a first screening message associated with a result of the security screening process, wherein the security screening process is based on the SSI file sharing data; and causing, by at least one of the at least one processor, the result of the security screening process included in the first screening message to be displayed by a display device in near real time, wherein the result of the security screening process may include one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

With regard to the non-transitory computer readable medium, the method executed by the at least one processor may include: based on the first screening message including the second result, communicating, by a third network interface in communication with at least one of the at least one processor and a third communication network, a second screening message to a baggage scanning system of an identified airline, wherein the second screening message is configured to cause the checked-in luggage item to be re-screened.

The unique baggage identifier may include an IATA license plate, and with regard to the non-transitory computer readable medium the method executed by the at least one process may include: obtaining, by at least one of the at least one processor, an IATA license plate for one or more additional checked-in luggage items of the passenger, and the communicating, through the third network interface in communication with at least one of the at least one processor and the third communication network, may include: communicating the IATA license plate for the one or more additional checked-in luggage items of the passenger in one or more additional second screening messages to the baggage scanning system of the identified airline, wherein the one or more additional second screening messages are configured to cause the one or more additional checked-in luggage items to be re-screened.

The UPID may be required for communicating with security screening authorities in countries other than the originating country, and the SSI file sharing data may include at least one of a flight number, an airline code, a passport document number, a passenger name, a passenger name record (PNR) locator, or a pseudo identifier (PID).

With regard to the non-transitory computer readable medium the method executed by the at least one processor, the converting the SSI and the at least a portion of the passenger data into the SSI file sharing data may further include: generating, by at least one of the at least one processor, a message identifier number including a sequence of digits; and associating, by at least one of the at least one processor, the SSI file sharing data with the message identifier by configuring the SSI file sharing data to be accessed by the security screening tool.

With regard to the non-transitory computer readable medium, the method executed by the at least one processor may include: analyzing, by at least one of the at least one processor, the SSI for at least one mode of travel different from the originating airline using a machine learning algorithm; determining by at least one of the at least one processor and based on the analysis of the SSI, whether the contents within the checked-in luggage item are approved for travel on at least one vehicle of travel associated with the at least one mode of travel; and generating, by at least one of the at least one processor, a second screening message representative of a result of the determining whether the contents within the checked-in luggage item are cleared for travel on at least one vehicle of the at least one mode of travel.

With regard to the non-transitory computer readable medium, the method executed by the at least one processor may include: causing, by at least one of the at least one processor, a printer device to print a marker including information representative of the result of the determining whether the contents within the checked-in luggage item are cleared for travel on the at least one vehicle of the at least one mode of travel.

With regard to the non-transitory computer readable medium, the method executed by the at least one processor may include: i) generating, by at least one of the at least one processor, at least one manifest listing a plurality of passengers from the IATA data message, wherein each of the at least one manifest may include a passenger manifest data record having manifest data fields for each passenger listed therein; ii) monitoring, by a passenger matching and bag release system, processing data from at least one computer system associated with the second security authority, wherein the second security authority processes the plurality of passengers for border crossing at the border crossing airport; and iii) detecting, by the passenger matching and bag release system during the monitoring of the at least one computer system, a clearance processing event of a passenger record, created by the at least one computer system, by matching the passenger record with a respective passenger manifest data record.

The manifest data fields may include at least one of a UPID of each respective passenger and a unique baggage identifier of each checked-in luggage item of each respective passenger; and with regard to the non-transitory computer readable medium, the method executed by the at least one processor may include: iv) based on detecting the clearance processing event, communicating, through a third network interface in communication with the passenger matching and bag release system and a third communication network, a baggage release message to a baggage scanning system of an identified airline, a computing device of a baggage handler, or a baggage handling system; and v) repeating ii)-iv) for each of the plurality of passengers in the at least one manifest.

The unique baggage identifier may include an IATA license plate assigned by a Departure Control System associated with the originating airline, and with regard to the non-transitory computer readable medium, the method executed by the at least one processor may include: determining, by at least one of the at least one processor, whether a missing link exists between the IATA license plate and the SSI.

With regard to the non-transitory computer readable medium, the method executed by the at least one processor may include: based on determining the missing link exists, obtaining, by at least one of the at least one processor, baggage data from a baggage handling system, wherein the baggage data may include a pseudo identifier (PID) for the checked-in luggage item of the passenger generated by the baggage handling system; and extrapolating, by at least one of the at least one processor, from the baggage data, the IATA license plate for the checked-in luggage item of the passenger based on the PID.

The IATA data message may include one of a passenger final sales message, a passenger reconcile message, or a passenger name list message.

According to an aspect of the disclosure, a method includes: obtaining, by at least one of at least one processor, from an electronic International Air Transportation Association (IATA) data message having a first message format or an electronic passenger list information message (PLIM) having a second message format, passenger data including a passenger name record (PNR) locator linked to a passenger, a passenger name of the passenger, and a unique baggage identifier for a checked-in luggage item of the passenger, wherein the passenger is check-in with an originating airline, and wherein the IATA data message or the electronic PLIM identify a flight carrying passengers that will disembark or transfer at a border crossing airport; retrieving from a secure database stored in a non-transitory secure memory device, by at least one of the at least one processor, a security screening image (SSI) representative of contents within the checked-in luggage item, wherein the SSI is generated by a security screening imaging machine in an originating country and based on technology standards of a first level governed by a first security authority of the originating country; converting, by at least one of the at least one processor, the SSI and at least a portion of the passenger data, into SSI file sharing data of a structured data format for a security screening tool; transmitting, through a first network interface in communication with at least one of the at least one processor and a first communication network, the SSI file sharing data over the first communication network to a secure non-transitory memory system associated with the border crossing airport in a second country, wherein SSI file sharing data is configured to be used by a second security authority to perform a security screening process on the checked-in luggage item using the security screening tool, and wherein the second security authority is different from the first security authority; receiving from the second security authority, through a second network interface in communication with at least one of the at least one processor and a second communication network, a first screening message associated with a result of the security screening process, wherein the security screening process is based on the SSI file sharing data; and causing, by at least one of the at least one processor, the result of the security screening process included in the first screening message to be displayed by a display device in near real time, wherein the result of the security screening process may include one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

The method may further include: based on the first screening message including the second result, communicating, by a third network interface in communication with at least one of the at least one processor and a third communication network, a second screening message to a baggage scanning system of an identified airline, wherein the second screening message is configured to cause the checked-in luggage item to be re-screened.

The unique baggage identifier may include an IATA license plate, and the method may further include: obtaining, by at least one of the at least one processor, an IATA license plate for one or more additional checked-in luggage items of the passenger, and wherein the communicating, by the third network interface in communication with at least one of the at least one processor and the third communication network, may include: communicating the IATA license plate for the one or more additional checked-in luggage items of the passenger in one or more additional second screening messages to the baggage scanning system of the identified airline, wherein the one or more additional second screening messages are configured to cause the one or more additional checked-in luggage items to be re-screened.

The SSI file sharing data may include at least one of a flight number, an airline code, a passport document number, a passenger name, a passenger name record (PNR) locator, or a pseudo identifier (PID).

The method may further include: analyzing, by at least one of the at least one processor, the SSI for at least one mode of travel different from the originating airline using a machine learning algorithm; determining by at least one of the at least one processor and based on the analysis of the SSI, whether the contents within the checked-in luggage item are approved for travel on at least one vehicle of travel associated with the at least one mode of travel; and generating, by at least one of the at least one processor, a second screening message representative of a result of the determining whether the contents within the checked-in luggage item are cleared for travel on at least one vehicle of the at least one mode of travel.

The method may further include: causing, by at least one of the at least one processor, a printer device to print a marker including information representative of the result of the determining whether the contents within the checked-in luggage item are cleared for travel on the at least one vehicle of the at least one mode of travel.

The method may further include: i) generating, by at least one of the at least one processor, at least one manifest listing a plurality of passengers, wherein each of the at least one manifest may include a passenger manifest data record having manifest data fields for each passenger listed therein; ii) monitoring, by a passenger matching and bag release system, processing data from at least one computer system associated with the second security authority, wherein the second security authority processes the plurality of passengers for border crossing at the border crossing airport; and iii) detecting, by the passenger matching and bag release system during the monitoring of the at least one computer system, a clearance processing event of a passenger record, created by the at least one computer system, by matching the passenger record with a respective passenger manifest data record.

The manifest data fields may include at least one of a unique passenger identifier (UPID) of each respective passenger, the PNR locator and the passenger name of each respective passenger, and a unique baggage identifier of each checked-in luggage item of each respective passenger, and the method may further include: iv) based on detecting the clearance processing event, communicating, through a third network interface in communication with the passenger matching and bag release system and a third communication network, a baggage release message to a baggage scanning system of an identified airline, a computing device of a baggage handler, or a baggage handling system; and v) repeating ii)-iv) for each of the plurality of passengers in the at least one manifest.

The unique baggage identifier may include an IATA license plate assigned by a Departure Control System associated with the originating airline, and the method may further include: determining, by at least one of the at least one processor, whether a missing link exists between the IATA license plate and the SSI.

The method may further include: based on determining the missing link exists, obtaining, by at least one of the at least one processor, baggage data from a baggage handling system, wherein the baggage data may include a pseudo identifier (PID) for the checked-in luggage item of the passenger generated by the baggage handling system; and extrapolating, by at least one of the at least one processor, from the baggage data, the IATA license plate for the checked-in luggage item of the passenger based on the PID.

The IATA data message may include one of a passenger final sales message, a passenger reconcile message, a passenger name list message, a baggage source message, a baggage transfer message, or a baggage processed message, and the electronic PLIM may include one of a passenger final sales message, a passenger reconcile message, a passenger name list message, an advance passenger information (API) message, a passenger list message, or a PNRgov message.

According to an aspect of the disclosure, a system includes: at least one memory storing one or more instructions; and at least one processor configured to execute the one or more instructions, wherein the one or more instructions, when executed by the at least one processor, cause the system to: obtain, from an electronic International Air Transportation Association (IATA) data message having a first message format or an electronic passenger list information message (PLIM) having a second message format, passenger data including a passenger name record (PNR) locator linked to a passenger, a passenger name of the passenger, and a unique baggage identifier for a checked-in luggage item of the passenger, wherein the passenger is check-in with an originating airline, and wherein the IATA data message or the electronic PLIM identify a flight carrying passengers that will disembark or transfer at a border crossing airport, retrieve, from a secure database stored in a non-transitory secure memory device, a security screening image (SSI) representative of contents within the checked-in luggage item, wherein the SSI is generated by a security screening imaging machine in an originating country and based on technology standards of a first level governed by a first security authority of the originating country, convert the SSI and at least a portion of the passenger data into SSI file sharing data of a structured data format for a security screening tool, transmit, through a first network interface of the system in communication with at least one of the at least one processor and a first communication network, the SSI file sharing data over the first communication network to a secure non-transitory memory system associated with the border crossing airport in a second country, wherein SSI file sharing data is configured to be used by a second security authority to perform a security screening process on the checked-in luggage item using the security screening tool, and wherein the second security authority is different from the first security authority; receive from the second security authority, through a second network interface of the system in communication with at least one of the at least one processor and a second communication network, a first screening message associated with a result of the security screening process, wherein the security screening process is based on the SSI file sharing data, and cause the result of the security screening process included in the first screening message to be displayed by a display device in near real time, wherein the result of the security screening process includes one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

The one or more instructions, when executed by the at least one processor, may cause the system to: based on the first screening message including the second result, communicate, through a third network interface of the system in communication with at least one of the at least one processor and a third communication network, a second screening message to a baggage scanning system of an identified airline, wherein the second screening message is configured to cause the checked-in luggage item to be re-screened.

The unique baggage identifier may include an IATA license plate, and the one or more instructions, when executed by the at least one processor, may cause the system to: obtain an IATA license plate for one or more additional checked-in luggage items of the passenger, and communicate, through the third network interface in communication with at least one of the at least one processor and the third communication network, the IATA license plate for the one or more additional checked-in luggage items of the passenger in one or more additional second screening messages to the baggage scanning system of the identified airline, wherein the one or more additional second screening messages are configured to cause the one or more additional checked-in luggage items to be re-screened.

The SSI file sharing data may include at least one of a flight number, an airline code, a passport document number, a passenger name, a passenger name record (PNR) locator, or a pseudo identifier (PID).

The one or more instructions, when executed by the at least one processor, may cause the system to: analyze the SSI for at least one mode of travel different from the originating airline using a machine learning algorithm, determine, based on the analysis of the SSI, whether the contents within the checked-in luggage item are approved for travel on at least one vehicle of travel associated with the at least one mode of travel, and generate a second screening message representative of a result of the determining whether the contents within the checked-in luggage item are cleared for travel on at least one vehicle of the at least one mode of travel.

The one or more instructions, when executed by the at least one processor, cause the system to: cause a printer device to print a marker including information representative of the result of the determining whether the contents within the checked-in luggage item are cleared for travel on the at least one vehicle of the at least one mode of travel.

The one or more instructions, when executed by the at least one processor, may cause the system to: i) generate at least one manifest listing a plurality of passengers, wherein each of the at least one manifest may include a passenger manifest data record having manifest data fields for each passenger listed therein; ii) monitor, by a passenger matching and bag release system, processing data from at least one computer system associated with the second security authority, wherein the second security authority processes the plurality of passengers for border crossing at the border crossing airport; and iii) detect, by the passenger matching and bag release system during the monitoring of the at least one computer system, a clearance processing event of a passenger record, created by the at least one computer system, by matching the passenger record with a respective passenger manifest data record.

The manifest data fields may include at least one of a unique passenger identifier (UPID) of each respective passenger, the PNR locator and the passenger name of each respective passenger, and a unique baggage identifier of each checked-in luggage item of each respective passenger, and the one or more instructions, when executed by the at least one processor, may cause the system to: iv) based on detecting the clearance processing event, communicate, through a third network interface of the system in communication with the passenger matching and bag release system and a third communication network, a baggage release message to a baggage scanning system of an identified airline, a computing device of a baggage handler, or a baggage handling system, and v) repeat ii)-iv) for each of the plurality of passengers in the at least one manifest.

The unique baggage identifier may include an IATA license plate assigned by a Departure Control System associated with the originating airline, and the one or more instructions, when executed by the at least one processor, may cause the system to: determine whether a missing link exists between the IATA license plate and the SSI.

The one or more instructions, when executed by the at least one processor, may cause the system to: based on determining the missing link exists, obtain baggage data from a baggage handling system, wherein the baggage data may include a pseudo identifier (PID) for the checked-in luggage item of the passenger generated by the baggage handling system, and extrapolate from the baggage data the IATA license plate for the checked-in luggage item of the passenger based on the PID.

The IATA data message may include one of a passenger final sales message, a passenger reconcile message, a passenger name list message, a baggage source message, a baggage transfer message, or a baggage processed message, and the electronic PLIM may include one of a passenger final sales message, a passenger reconcile message, a passenger name list message, an advance passenger information (API) message, a passenger list message, or a PNRgov message.

According to an aspect of the disclosure, a non-transitory computer readable medium has instructions stored therein, which when executed by at least one processor, cause the at least one processor to execute a method including: obtaining, by at least one of at least one processor, from an electronic International Air Transportation Association (IATA) data message having a first message format or an electronic passenger list information message (PLIM) having a second message format, passenger data including a passenger name record (PNR) locator linked to a passenger, a passenger name of the passenger, and a unique baggage identifier for a checked-in luggage item of the passenger, wherein the passenger is check-in with an originating airline, and wherein the IATA data message or the electronic PLIM identify a flight carrying passengers that will disembark or transfer at a border crossing airport; retrieving from a secure database stored in a non-transitory secure memory device, by at least one of the at least one processor, a security screening image (SSI) representative of contents within the checked-in luggage item, wherein the SSI is generated by a security screening imaging machine in an originating country and based on technology standards of a first level governed by a first security authority of the originating country; converting, by at least one of the at least one processor, the SSI and at least a portion of the passenger data, into SSI file sharing data of a structured data format for a security screening tool; transmitting, through a first network interface in communication with at least one of the at least one processor and a first communication network, the SSI file sharing data over the first communication network to a secure non-transitory memory system associated with the border crossing airport in a second country, wherein SSI file sharing data is configured to be used by a second security authority to perform a security screening process on the checked-in luggage item using the security screening tool, and wherein the second security authority is different from the first security authority; receiving from the second security authority, through a second network interface in communication with at least one of the at least one processor and a second communication network, a first screening message associated with a result of the security screening process, wherein the security screening process is based on the SSI file sharing data; and causing, by at least one of the at least one processor, the result of the security screening process included in the first screening message to be displayed by a display device in near real time, wherein the result of the security screening process may include one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

With regard to the non-transitory computer readable medium, the method executed by the at least one processor may include: based on the first screening message including the second result, communicating, by a third network interface in communication with at least one of the at least one processor and a third communication network, a second screening message to a baggage scanning system of an identified airline, wherein the second screening message is configured to cause the checked-in luggage item to be re-screened.

The unique baggage identifier may include an IATA license plate, and with regard to the non-transitory computer readable medium, the method executed by the at least one processor may include: obtaining, by at least one of the at least one processor, an IATA license plate for one or more additional checked-in luggage items of the passenger, and wherein the communicating, by the third network interface in communication with at least one of the at least one processor and the third communication network, may include: communicating the IATA license plate for the one or more additional checked-in luggage items of the passenger in one or more additional second screening messages to the baggage scanning system of the identified airline, wherein the one or more additional second screening messages are configured to cause the one or more additional checked-in luggage items to be re-screened.

The SSI file sharing data may include at least one of a flight number, an airline code, a passport document number, a passenger name, a passenger name record (PNR) locator, or a pseudo identifier (PID).

With regard to the non-transitory computer readable medium, the method executed by the at least one processor may include: analyzing, by at least one of the at least one processor, the SSI for at least one mode of travel different from the originating airline using a machine learning algorithm; determining by at least one of the at least one processor and based on the analysis of the SSI, whether the contents within the checked-in luggage item are approved for travel on at least one vehicle of travel associated with the at least one mode of travel; and generating, by at least one of the at least one processor, a second screening message representative of a result of the determining whether the contents within the checked-in luggage item are cleared for travel on at least one vehicle of the at least one mode of travel.

With regard to the non-transitory computer readable medium, the method executed by the at least one processor may include: causing, by at least one of the at least one processor, a printer device to print a marker including information representative of the result of the determining whether the contents within the checked-in luggage item are cleared for travel on the at least one vehicle of the at least one mode of travel.

With regard to the non-transitory computer readable medium, the method executed by the at least one processor may include: i) generating, by at least one of the at least one processor, at least one manifest listing a plurality of passengers, wherein each of the at least one manifest may include a passenger manifest data record having manifest data fields for each passenger listed therein; ii) monitoring, by a passenger matching and bag release system, processing data from at least one computer system associated with the second security authority, wherein the second security authority processes the plurality of passengers for border crossing at the border crossing airport; and iii) detecting, by the passenger matching and bag release system during the monitoring of the at least one computer system, a clearance processing event of a passenger record, created by the at least one computer system, by matching the passenger record with a respective passenger manifest data record.

The manifest data fields may include at least one of a unique passenger identifier (UPID) of each respective passenger, the PNR locator and the passenger name of each respective passenger, and a unique baggage identifier of each checked-in luggage item of each respective passenger, and with regard to the non-transitory computer readable medium, the method executed by the at least one processor may include: iv) based on detecting the clearance processing event, communicating, through a third network interface in communication with the passenger matching and bag release system and a third communication network, a baggage release message to a baggage scanning system of an identified airline, a computing device of a baggage handler, or a baggage handling system; and v) repeating ii)-iv) for each of the plurality of passengers in the at least one manifest.

The unique baggage identifier may include an IATA license plate assigned by a Departure Control System associated with the originating airline, and with regard to the non-transitory computer readable medium, the method executed by the at least one processor may include: determining, by at least one of the at least one processor, whether a missing link exists between the IATA license plate and the SSI.

With regard to the non-transitory computer readable medium, the method executed by the at least one processor may include: based on determining the missing link exists, obtaining, by at least one of the at least one processor, baggage data from a baggage handling system, wherein the baggage data may include a pseudo identifier (PID) for the checked-in luggage item of the passenger generated by the baggage handling system; and extrapolating, by at least one of the at least one processor, from the baggage data, the IATA license plate for the checked-in luggage item of the passenger based on the PID.

The IATA data message may include one of a passenger final sales message, a passenger reconcile message, a passenger name list message, a baggage source message, a baggage transfer message, or a baggage processed message, and the electronic PLIM may include one of a passenger final sales message, a passenger reconcile message, a passenger name list message, an advance passenger information (API) message, a passenger list message, or a PNRgov message.

According to an aspect of the disclosure, a method includes: obtaining, by at least one of at least one processor, from an electronic passenger list information message (PLIM) having a message format, passenger data for a plurality of passengers, the passenger data including a unique passenger identifier (UPID) assigned by a Departure Control System (DCS) of an originating airline for each of the plurality of passengers, and the electronic PLIM identifying a flight with the plurality of passengers that will disembark or transfer at a border crossing airport; for each passenger of the plurality of passengers: depersonalizing the passenger data by replacing personal identifying information of each of the passenger with a computer generated identifier; retrieving from a secure database stored in a non-transitory secure memory device, by at least one of the at least one processor, a security screening image (SSI) representative of contents within a checked-in luggage item of the passenger, wherein the SSI is generated by a security screening imaging machine in an originating country and based on technology standards of a first level governed by a first security authority of the originating country; converting, by at least one of the at least one processor, the SSI and the UPID into SSI file sharing data of a structured data format for a security screening tool; transmitting, through a first network interface in communication with at least one of the at least one processor and a first communication network, the SSI file sharing data over the first communication network to a secure non-transitory memory system associated with the border crossing airport in a second country, wherein SSI file sharing data is configured to be used by a second security authority to perform a security screening process on the checked-in luggage item using the security screening tool, and wherein the second security authority is different from the first security authority; receiving from the second security authority, through a second network interface in communication with at least one of the at least one processor and a second communication network, a first screening message associated with a result of the security screening process, wherein the security screening process is based on the SSI file sharing data; and causing, by at least one of the at least one processor, the result of the security screening process included in the first screening message to be displayed by a display device in near real time, wherein the result of the security screening process includes one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

The method may further include, for each passenger of the plurality of passengers: based on the first screening message including the second result, communicating, by a third network interface in communication with at least one of the at least one processor and a third communication network, a second screening message to a baggage scanning system of an identified airline, wherein the second screening message is configured to cause the checked-in luggage item to be re-screened.

The method may further include, for each passenger of the plurality of passengers: obtaining, by at least one of the at least one processor, an International Air Transportation Association (IATA) license plate for each checked-in luggage item of the passenger, and the communicating, through the third network interface in communication with at least one of the at least one processor and the third communication network, may include: communicating the IATA license plate for each checked-in luggage item of the passenger in at least one second screening message to the baggage scanning system of the identified airline, wherein the at least one second screening message is configured to cause each of the checked-in luggage items to be re-screened.

The UPID may be required for communicating with security screening authorities in countries other than the originating country, and the SSI file sharing data may include at least one of a flight number, an airline code, a passport document number, a passenger name, a passenger name record (PNR) locator, an International Air Transportation Association (IATA) license plate, or a pseudo identifier (PID).

The converting the SSI and the UPID into the SSI file sharing data may further include: generating, by at least one of the at least one processor, a message identifier number including a sequence of digits; and associating, by at least one of the at least one processor, the SSI file sharing data with the message identifier number by configuring the SSI file sharing data to be accessed by the security screening tool.

The method may further include, for each passenger of the plurality of passengers: analyzing, by at least one of the at least one processor, the SSI for at least one mode of travel different from the originating airline using a machine learning algorithm; determining by at least one of the at least one processor and based on the analysis of the SSI, whether the contents within the checked-in luggage item are approved for travel on at least one vehicle of travel associated with the at least one mode of travel; and generating, by at least one of the at least one processor, a second screening message representative of a result of the determining whether the contents within the checked-in luggage item are cleared for travel on at least one vehicle of the at least one mode of travel.

The method may further include, for each passenger of the plurality of passengers: causing, by at least one of the at least one processor, a printer device to print a marker including information representative of the result of the determining whether the contents within the checked-in luggage item are cleared for travel on the at least one vehicle of the at least one mode of travel.

The method may further include: i) generating, by at least one of the at least one processor, at least one manifest listing the plurality of passengers in the electronic PLIM, wherein each of the at least one manifest may include a passenger manifest data record for each passenger having manifest data fields listed therein; ii) monitoring, by a passenger matching and bag release system, processing data from at least one computer system associated with the second security authority, wherein the second security authority processes the plurality of passengers for border crossing at the border crossing airport; and iii) detecting, by the passenger matching and bag release system during the monitoring of the at least one computer system, a clearance processing event of a passenger record, created by the at least one computer system, by matching the passenger record with a respective passenger manifest data record.

The manifest data fields may respectively include at least one of the UPID of the respective passengers of the plurality of passengers and a unique baggage identifier of each checked-in luggage item of the respective passengers of the plurality of passengers, and the method may further include: iv) based on detecting the clearance processing event, communicating, through a third network interface in communication with the passenger matching and bag release system and a third communication network, a baggage release message to a baggage scanning system of an identified airline, a computing device of a baggage handler, or a baggage handling system; and v) repeating ii)-iv) for each of the plurality of passengers in the at least one manifest.

The passenger data may further include an IATA license plate assigned by the DCS associated with the originating airline, the SSI may be retrieved using the IATA license plate, and the method may further include, for each passenger of the plurality of passengers: determining, by at least one of the at least one processor, whether a missing link exists between the IATA license plate and the SSI.

The method may further include, for each passenger of the plurality of passengers: based on determining the missing link exists, obtaining, by at least one of the at least one processor, baggage data including a pseudo identifier (PID) for the checked-in luggage item of the passenger generated by a baggage handling system; and extrapolating, by at least one of the at least one processor, from the baggage data, the IATA license plate for the checked-in luggage item of the passenger based on the PID.

The electronic PLIM may include one of a passenger final sales message, a passenger reconcile message, a passenger name list message, an advance passenger information (API) message, a passenger list message, or a PNRgov message.

According to an aspect of the disclosure, a system includes: at least one memory storing one or more instructions; and at least one processor configured to execute the one or more instructions, wherein the one or more instructions, when executed by the at least one processor cause the system to: obtain, from an electronic passenger list information message (PLIM) having a message format, passenger data for a plurality of passengers, the passenger data including a unique passenger identifier (UPID) assigned by a Departure Control System (DCS) of an originating airline for each of the plurality of passengers, and the electronic PLIM identifying a flight with the plurality of passengers that will disembark or transfer at a border crossing airport, for each passenger of the plurality of passengers: depersonalize the passenger data by replacing personal identifying information of each of the passenger with a computer generated identifier, retrieve, from a secure database stored in a non-transitory secure memory device, a security screening image (SSI) representative of contents within a checked-in luggage item of the passenger, wherein the SSI is generated by a security screening imaging machine in an originating country and based on technology standards of a first level governed by a first security authority of the originating country, convert the SSI and the UPID into SSI file sharing data of a structured data format for a security screening tool, transmit, through a first network interface of the system in communication with at least one of the at least one processor and a first communication network, the SSI file sharing data over the first communication network to a secure non-transitory memory system associated with the border crossing airport in a second country, wherein SSI file sharing data is configured to be used by a second security authority to perform a security screening process on the checked-in luggage item using the security screening tool, and wherein the second security authority is different from the first security authority, receive from the second security authority, through a second network interface of the system in communication with at least one of the at least one processor and a second communication network, a first screening message associated with a result of the security screening process, wherein the security screening process is based on the SSI file sharing data; and cause the result of the security screening process included in the first screening message to be displayed by a display device in near real time, wherein the result of the security screening process includes one of: a first result representative of cleared security screening by the second security authority, or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

The one or more instructions, when executed by the at least one processor, may cause the system to, for each passenger of the plurality of passengers: based on the first screening message including the second result, communicate, through a third network interface of the system in communication with at least one of the at least one processor and a third communication network, a second screening message to a baggage scanning system of an identified airline, wherein the second screening message is configured to cause the checked-in luggage item to be re-screened.

The one or more instructions, when executed by the at least one processor, may cause the system to, for each passenger of the plurality of passengers: obtain an International Air Transportation Association (IATA) license plate for each checked-in luggage item of the passenger, and communicate, through the third network interface in communication with at least one of the at least one processor and the third communication network, the IATA license plate for each checked-in luggage item of the passenger in at least one second screening message to the baggage scanning system of the identified airline, wherein the at least one second screening message is configured to cause each of the checked-in luggage items to be re-screened.

The UPID may required for communicating with security screening authorities in countries other than the originating country, and the SSI file sharing data may include at least one of a flight number, an airline code, a passport document number, a passenger name, a passenger name record (PNR) locator, an International Air Transportation Association (IATA) license plate, or a pseudo identifier (PID).

The one or more instructions, when executed by the at least one processor, may cause the system to convert the SSI and the at least a portion of the passenger data into the SSI file sharing data by: generating a message identifier number including a sequence of digits, and associating the SSI file sharing data with the message identifier number by configuring the SSI file sharing data to be accessed by the security screening tool.

The one or more instructions, when executed by the at least one processor, may cause the system to, for each passenger of the plurality of passengers: analyze the SSI for at least one mode of travel different from the originating airline using a machine learning algorithm, determine, based on the analysis of the SSI, whether the contents within the checked-in luggage item are approved for travel on at least one vehicle of travel associated with the at least one mode of travel, and generate a second screening message representative of a result of the determining whether the contents within the checked-in luggage item are cleared for travel on at least one vehicle of the at least one mode of travel.

The one or more instructions, when executed by the at least one processor, may cause the system to, for each passenger of the plurality of passengers: cause a printer device to print a marker including information representative of the result of the determining whether the contents within the checked-in luggage item are cleared for travel on the at least one vehicle of the at least one mode of travel.

The one or more instructions, when executed by the at least one processor, may cause the system to: i) generate at least one manifest listing the plurality of passengers in the electronic PLIM, wherein each of the at least one manifest may include a passenger manifest data record for each passenger having manifest data fields listed therein, ii) monitor, by a passenger matching and bag release system, processing data from at least one computer system associated with the second security authority, wherein the second security authority processes the plurality of passengers for border crossing at the border crossing airport, and iii) detect, by the passenger matching and bag release system during the monitoring of the at least one computer system, a clearance processing event of a passenger record, created by the at least one computer system, by matching the passenger record with a respective passenger manifest data record.

The manifest data fields may respectively include at least one of the UPID of the respective passengers of the plurality of passengers and a unique baggage identifier of each checked-in luggage item of the respective passengers of the plurality of passengers, and the one or more instructions, when executed by the at least one processor, may cause the system to: iv) based on detecting the clearance processing event, communicate, through a third network interface of the system in communication with the passenger matching and bag release system and a third communication network, a baggage release message to a baggage scanning system of an identified airline, a computing device of a baggage handler, or a baggage handling system, and v) repeat ii)-iv) for each of the plurality of passengers in the at least one manifest.

The passenger data may further include an IATA license plate assigned by the DCS associated with the originating airline, the SSI may be retrieved using the IATA license plate, and the one or more instructions, when executed by the at least one processor, may cause the system to, for each passenger of the plurality of passengers: determine whether a missing link exists between the IATA license plate and the SSI.

The one or more instructions, when executed by the at least one processor, may cause the system to, for each passenger of the plurality of passengers: based on determining the missing link exists, obtain baggage data including a pseudo identifier (PID) for the checked-in luggage item of the passenger generated by a baggage handling system, and extrapolate from the baggage data the IATA license plate for the checked-in luggage item of the passenger based on the PID.

The electronic PLIM may include one of a passenger final sales message, a passenger reconcile message, a passenger name list message, an advance passenger information (API) message, a passenger list message, or a PNRgov message.

According to an aspect of the disclosure, a non-transitory computer readable medium has instructions stored therein, which when executed by at least one processor cause the at least one processor to execute a method including: obtaining, by at least one of at least one processor, from an electronic passenger list information message (PLIM) having a message format, passenger data for a plurality of passengers, the passenger data including a unique passenger identifier (UPID) assigned by a Departure Control System (DCS) of an originating airline for each of the plurality of passengers, and the electronic PLIM identifying a flight with the plurality of passengers that will disembark or transfer at a border crossing airport; for each passenger of the plurality of passengers: depersonalizing the passenger data by replacing personal identifying information of each of the passenger with a computer generated identifier; retrieving from a secure database stored in a non-transitory secure memory device, by at least one of the at least one processor, a security screening image (SSI) representative of contents within a checked-in luggage item of the passenger, wherein the SSI is generated by a security screening imaging machine in an originating country and based on technology standards of a first level governed by a first security authority of the originating country; converting, by at least one of the at least one processor, the SSI and the UPID into SSI file sharing data of a structured data format for a security screening tool; transmitting, through a first network interface in communication with at least one of the at least one processor and a first communication network, the SSI file sharing data over the first communication network to a secure non-transitory memory system associated with the border crossing airport in a second country, wherein SSI file sharing data is configured to be used by a second security authority to perform a security screening process on the checked-in luggage item using the security screening tool, and wherein the second security authority is different from the first security authority; receiving from the second security authority, through a second network interface in communication with at least one of the at least one processor and a second communication network, a first screening message associated with a result of the security screening process, wherein the security screening process is based on the SSI file sharing data; and causing, by at least one of the at least one processor, the result of the security screening process included in the first screening message to be displayed by a display device in near real time, wherein the result of the security screening process may include one of: a first result representative of cleared security screening by the second security authority; or a second result representative of failed security screening by the second security authority, wherein one or more of the passenger or the checked-in luggage item that failed the security screening are flagged for further security inspection before being permitted to leave the border crossing airport or to transfer to a flight departing the border crossing airport.

With regard to the non-transitory computer readable medium, the method executed by the at least one processor may include, for each passenger of the plurality of passengers: based on the first screening message including the second result, communicating, by a third network interface in communication with at least one of the at least one processor and a third communication network, a second screening message to a baggage scanning system of an identified airline, wherein the second screening message is configured to cause the checked-in luggage item to be re-screened.

With regard to the non-transitory computer readable medium, the method executed by the at least one processor may include, for each passenger of the plurality of passengers: obtaining, by at least one of the at least one processor, an International Air Transportation Association (IATA) license plate for each checked-in luggage item of the passenger, wherein the communicating, through the third network interface in communication with at least one of the at least one processor and the third communication network, may include: communicating the IATA license plate for each checked-in luggage item of the passenger in at least one second screening message to the baggage scanning system of the identified airline, wherein the at least one second screening message is configured to cause each of the checked-in luggage items to be re-screened.

The UPID may be required for communicating with security screening authorities in countries other than the originating country, and the SSI file sharing data may include at least one of a flight number, an airline code, a passport document number, a passenger name, a passenger name record (PNR) locator, an International Air Transportation Association (IATA) license plate, or a pseudo identifier (PID).

With regard to the non-transitory computer readable medium, the method executed by the at least one processor may include, the converting the SSI and the UPID into the SSI file sharing data may further include: generating, by at least one of the at least one processor, a message identifier number including a sequence of digits; and associating, by at least one of the at least one processor, the SSI file sharing data with the message identifier number by configuring the SSI file sharing data to be accessed by the security screening tool.

With regard to the non-transitory computer readable medium, the method executed by the at least one processor may include, for each passenger of the plurality of passengers: analyzing, by at least one of the at least one processor, the SSI for at least one mode of travel different from the originating airline using a machine learning algorithm; determining by at least one of the at least one processor and based on the analysis of the SSI, whether the contents within the checked-in luggage item are approved for travel on at least one vehicle of travel associated with the at least one mode of travel; and generating, by at least one of the at least one processor, a second screening message representative of a result of the determining whether the contents within the checked-in luggage item are cleared for travel on at least one vehicle of the at least one mode of travel.

With regard to the non-transitory computer readable medium, the method executed by the at least one processor may include, for each passenger of the plurality of passengers: causing, by at least one of the at least one processor, a printer device to print a marker including information representative of the result of the determining whether the contents within the checked-in luggage item are cleared for travel on the at least one vehicle of the at least one mode of travel.

With regard to the non-transitory computer readable medium, the method executed by the at least one processor may include: i) generating, by at least one of the at least one processor, at least one manifest listing the plurality of passengers in the electronic PLIM, wherein each of the at least one manifest may include a passenger manifest data record for each passenger having manifest data fields listed therein; ii) monitoring, by a passenger matching and bag release system, processing data from at least one computer system associated with the second security authority, wherein the second security authority processes the plurality of passengers for border crossing at the border crossing airport; and iii) detecting, by the passenger matching and bag release system during the monitoring of the at least one computer system, a clearance processing event of a passenger record, created by the at least one computer system, by matching the passenger record with a respective passenger manifest data record.

The manifest data fields may respectively include at least one of the UPID of the respective passengers of the plurality of passengers and a unique baggage identifier of each checked-in luggage item of the respective passengers of the plurality of passengers, and with regard to the non-transitory computer readable medium, the method executed by the at least one processor may include: iv) based on detecting the clearance processing event, communicating, through a third network interface in communication with the passenger matching and bag release system and a third communication network, a baggage release message to a baggage scanning system of an identified airline, a computing device of a baggage handler, or a baggage handling system; and v) repeating ii)-iv) for each of the plurality of passengers in the at least one manifest.

The passenger data may further include an IATA license plate assigned by the DCS associated with the originating airline, the SSI may be retrieved using the IATA license plate, and with regard to the non-transitory computer readable medium, the method executed by the at least one processor may include, for each passenger of the plurality of passengers: determining, by at least one of the at least one processor, whether a missing link exists between the IATA license plate and the SSI.

With regard to the non-transitory computer readable medium, the method executed by the at least one processor may include, for each passenger of the plurality of passengers: based on determining the missing link exists, obtaining, by at least one of the at least one processor, baggage data including a pseudo identifier (PID) for the checked-in luggage item of the passenger generated by a baggage handling system; and extrapolating, by at least one of the at least one processor, from the baggage data, the IATA license plate for the checked-in luggage item of the passenger based on the PID.

The electronic PLIM may include one of a passenger final sales message, a passenger reconcile message, a passenger name list message, an advance passenger information (API) message, a passenger list message, or a PNRgov message.

According to an aspect of the disclosure, a method includes: a) generating, by at least one of at least one processor, at least one manifest listing a plurality of passengers, wherein each of the at least one manifest includes a passenger manifest data record having manifest data fields for each passenger listed therein; b) monitoring, by a passenger matching and bag release system, at least one computer system associated with a security authority, wherein the security authority processes the plurality of passengers for border crossing at a border crossing airport; c) detecting, in near real time by the passenger matching and bag release system, a clearance processing event of a passenger record of a respective passenger among the plurality of passengers created by the at least one computer system associated with the security authority, by matching the passenger record with a respective passenger manifest data record; and d) based on detecting the clearance processing event, communicating, through a network interface coupled to the passenger matching and bag release system and a communication network, a baggage release message to a baggage scanning system of an identified airline, a computing device of a baggage handler or a baggage handling system, wherein the baggage release message is configured to cause a held checked-in luggage item associated with the respective passenger to be released.

The method may further include, prior to a): c) obtaining, by at least one of the at least one processor, from an electronic passenger list information message (PLIM) having a message format, passenger data for the plurality of passengers, the passenger data including a unique passenger identifier (UPID) assigned by a Departure Control System (DCS) of an originating airline for each of the plurality of passengers, wherein the electronic PLIM identifies a flight carrying the plurality of passengers that will border cross at the border crossing airport; and f) depersonalizing the passenger data by replacing personal identifying information with a computer generated identifier.

The method may further include, prior to c): receiving, through a second network interface coupled to at least one of the at least one processor and a second communication network, the electronic PLIM from the DCS or from a computer messaging system associated with the originating airline.

The manifest data fields may include at least one of the UPID of the respective passenger and a baggage tag identifier of each checked-in luggage item of the respective passenger, and the method may further include: g) repeating b)-d) for each of the plurality of passengers listed in the at least one manifest.

Operation e) may further include: obtaining, by at least one of the at least one processor, a baggage tag identifier for each checked-in luggage item of each of the plurality of passengers, and wherein the communicating, through the network interface coupled to the passenger matching and bag release system and the communication network, may include: communicating the baggage tag identifier for each checked-in luggage item of the passenger in at least one baggage release message to the baggage scanning system of the identified airline or to the baggage handling system, wherein the at least one baggage release message is configured to cause the baggage scanning system of the identified airline to release each check-in luggage item to be transferred to another flight or to cause the baggage handling system to release each checked-in luggage item to a carousel to leave the border crossing airport.

The electronic PLIM may include one of a passenger final sales message, a passenger reconcile message, a passenger name list message, an advance passenger information (API) message, a passenger list message, or a PNRgov message.

The method may further include, prior to a): c) obtaining, by at least one of the at least one processor, from an electronic passenger list information message (PLIM) having a message format, passenger data for the plurality of passengers, wherein the electronic PLIM identifies a vehicle associated with a mode of travel carrying the plurality of passengers that will border cross at a border crossing port.

The method may further include: g) repeating b)-d) for each of the plurality of passengers listed in the at least one manifest.

The vehicle may be a cruise ship.

The method may further include: determining, by at least one of the at least one processor, each checked-in luggage item identified in the baggage release message that is associated with corresponding return flight information for a return flight with a designated air carrier; and processing, by at least one of the at least one processor, each checked-in luggage item associated with the corresponding return flight information, after each such checked-in luggage item is released.

The method may further include: determining, by at least one of the at least one processor, each checked-in luggage item identified in the baggage release message that is associated with corresponding luggage item handling instructions for at least one vehicle of travel; and processing, by at least one of the at least one processor, each checked-in luggage item associated with the corresponding luggage item handling instructions for the at least one vehicle of travel according to the corresponding luggage item handling instructions, after each such checked-in luggage item is released.

According to an aspect of the disclosure, a system includes: at least one memory storing one or more instructions; and at least one processor configured to execute the one or more instructions, wherein the one or more instructions, when executed by the at least one processor, cause the system to: a) generate at least one manifest listing a plurality of passengers, wherein each of the at least one manifest includes a passenger manifest data record having manifest data fields for each passenger listed therein, b) monitor, by a passenger matching and bag release system, at least one computer system associated with a security authority, wherein the security authority processes the plurality of passengers for border crossing at a border crossing airport, c) detect, in near real time by the passenger matching and bag release system, a clearance processing event of a passenger record of a respective passenger among the plurality of passengers created by the at least one computer system associated with the security authority, by matching the passenger record with a respective passenger manifest data record, and d) based on detecting the clearance processing event, communicate, through a network interface of the system coupled to the passenger matching and bag release system and a communication network, a baggage release message to a baggage scanning system of an identified airline, a computing device of a baggage handler or a baggage handling system, wherein the baggage release message is configured to cause a held checked-in luggage item associated with the respective passenger to be released.

The one or more instructions, when executed by the at least one processor, may cause the system to, prior to a): e) obtain, from an electronic passenger list information message (PLIM) having a message format, passenger data for the plurality of passengers, the passenger data including a unique passenger identifier (UPID) assigned by a Departure Control System (DCS) of an originating airline for each of the plurality of passengers, wherein the electronic PLIM identifies a flight carrying the plurality of passengers that will border cross at the border crossing airport, and f) depersonalize the passenger data by replacing personal identifying information with a computer generated identifier.

The one or more instructions, when executed by the at least one processor, may cause the system to, prior to c): receive, through a second network interface of the system coupled to at least one of the at least one processor and a second communication network, the electronic PLIM from the DCS or from a computer messaging system associated with the originating airline.

The manifest data fields may include at least one of the UPID of the respective passenger and a baggage tag identifier of each checked-in luggage item of the respective passenger, and the one or more instructions, when executed by the at least one processor, may cause the system to: g) repeat b)-d) for each of the plurality of passengers listed in the at least one manifest.

The one or more instructions, when executed by the at least one processor, may cause the system to: obtain a baggage tag identifier for each checked-in luggage item of each of the plurality of passengers, and communicate, through the network interface coupled to the passenger matching and bag release system and the communication network, the baggage tag identifier for each checked-in luggage item of the passenger in at least one baggage release message to the baggage scanning system of the identified airline or to the baggage handling system, wherein the at least one baggage release message is configured to cause the baggage scanning system of the identified airline to release each check-in luggage item to be transferred to another flight or to cause the baggage handling system to release each checked-in luggage item to a carousel to leave the border crossing airport.

The electronic PLIM may include one of a passenger final sales message, a passenger reconcile message, a passenger name list message, an advance passenger information (API) message, a passenger list message, or a PNRgov message.

The one or more instructions, when executed by the at least one processor, may cause the system to, prior to a): c) obtain, from an electronic passenger list information message (PLIM) having a message format, passenger data for the plurality of passengers, wherein the electronic PLIM identifies a vehicle associated with a mode of travel carrying the plurality of passengers that will border cross at a border crossing port.

The one or more instructions, when executed by the at least one processor, may cause the system to: g) repeat b)-d) for each of the plurality of passengers listed in the at least one manifest.

The vehicle may be a cruise ship.

The one or more instructions, when executed by the at least one processor, may cause the system to: determine each checked-in luggage item identified in the baggage release message that is associated with corresponding return flight information for a return flight with a designated air carrier, and process each checked-in luggage item associated with the corresponding return flight information, after each such checked-in luggage item is released.

The one or more instructions, when executed by the at least one processor, may cause the system to: determine each checked-in luggage item identified in the baggage release message that is associated with corresponding luggage item handling instructions for at least one vehicle of travel, and process each checked-in luggage item associated with the corresponding luggage item handling instructions for the at least one vehicle of travel according to the corresponding luggage item handling instructions, after each such checked-in luggage item is released.

According to an aspect of the disclosure, a non-transitory computer readable medium has instructions stored therein, which when executed by at least one processor, cause the at least one processor to execute a method including: a) generating, by at least one of at least one processor, at least one manifest listing a plurality of passengers, wherein each of the at least one manifest includes a passenger manifest data record having manifest data fields for each passenger listed therein; b) monitoring, by a passenger matching and bag release system, at least one computer system associated with a security authority, wherein the security authority processes the plurality of passengers for border crossing at a border crossing airport; c) detecting, in near real time by the passenger matching and bag release system, a clearance processing event of a passenger record of a respective passenger among the plurality of passengers created by the at least one computer system associated with the security authority, by matching the passenger record with a respective passenger manifest data record; and d) based on detecting the clearance processing event, communicating, through a network interface coupled to the passenger matching and bag release system and a communication network, a baggage release message to a baggage scanning system of an identified airline, a computing device of a baggage handler or a baggage handling system, wherein the baggage release message is configured to cause a held checked-in luggage item associated with the respective passenger to be released.

With regard to the non-transitory computer readable medium, the method executed by the at least one processor may include, prior to a): c) obtaining, by at least one of the at least one processor, from an electronic passenger list information message (PLIM) having a message format, passenger data for the plurality of passengers, the passenger data including a unique passenger identifier (UPID) assigned by a Departure Control System (DCS) of an originating airline for each of the plurality of passengers, wherein the electronic PLIM identifies a flight carrying the plurality of passengers that will border cross at the border crossing airport; and f) depersonalizing the passenger data by replacing personal identifying information with a computer generated identifier.

With regard to the non-transitory computer readable medium, the method executed by the at least one processor may include, prior to e): receiving, through a second network interface coupled to at least one of the at least one processor and a second communication network, the electronic PLIM from the DCS or from a computer messaging system associated with the originating airline.

The manifest data fields may include at least one of the UPID of the respective passenger and a baggage tag identifier of each checked-in luggage item of the respective passenger, and with regard to the non-transitory computer readable medium, the method executed by the at least one processor may include: g) repeating b)-d) for each of the plurality of passengers listed in the at least one manifest.

With regard to the non-transitory computer readable medium, c) may further include: obtaining, by at least one of the at least one processor, a baggage tag identifier for each checked-in luggage item of each of the plurality of passengers, wherein the communicating, through the network interface coupled to the passenger matching and bag release system and the communication network, may include: communicating the baggage tag identifier for each checked-in luggage item of the passenger in at least one baggage release message to the baggage scanning system of the identified airline or to the baggage handling system, wherein the at least one baggage release message is configured to cause the baggage scanning system of the identified airline to release each check-in luggage item to be transferred to another flight or to cause the baggage handling system to release each checked-in luggage item to a carousel to leave the border crossing airport.

The electronic PLIM may include one of a passenger final sales message, a passenger reconcile message, a passenger name list message, an advance passenger information (API) message, a passenger list message, or a PNRgov message.

With regard to the non-transitory computer readable medium, the method executed by the at least one processor may include, prior to a): c) obtaining, by at least one of the at least one processor, from an electronic passenger list information message (PLIM) having a message format, passenger data for the plurality of passengers, wherein the electronic PLIM identifies a vehicle associated with a mode of travel carrying the plurality of passengers that will border cross at a border crossing port.

With regard to the non-transitory computer readable medium, the method executed by the at least one processor may include: g) repeating b)-d) for each of the plurality of passengers listed in the at least one manifest.

The vehicle may be a cruise ship.

With regard to the non-transitory computer readable medium, the method executed by the at least one processor may include: determining, by at least one of the at least one processor, each checked-in luggage item identified in the baggage release message that is associated with corresponding return flight information for a return flight with a designated air carrier; and processing, by at least one of the at least one processor, each checked-in luggage item associated with the corresponding return flight information, after each such checked-in luggage item is released.

With regard to the non-transitory computer readable medium, the method executed by the at least one processor may include: determining, by at least one of the at least one processor, each checked-in luggage item identified in the baggage release message that is associated with corresponding luggage item handling instructions for at least one vehicle of travel; and processing, by at least one of the at least one processor, each checked-in luggage item associated with the corresponding luggage item handling instructions for the at least one vehicle of travel according to the corresponding luggage item handling instructions, after each such checked-in luggage item is released.

According to an aspect of the disclosure, a method includes: a) generating, by at least one of at least one processor, a security luggage item manifest listing a plurality of checked-in luggage items terminating or transferring at a border crossing airport associated with a flight, wherein each of the plurality of checked-in luggage items includes a scannable bag tag affixed thereto, and wherein the security luggage item manifest includes a first unique baggage identifier for the scannable bag tags affixed to the plurality of checked-in luggage items; b) determining, by at least one of the at least one processor, whether a secure database is missing a link between the first unique baggage identifier for a respective checked-in luggage item listed in the security luggage item manifest and a second unique baggage identifier assigned by a baggage handling system to retrieve a security screening image (SSI) of the respective checked-in luggage item, wherein the SSI of the respective checked-in luggage item is stored in the secure database, wherein the secure database is stored in a non-transitory memory device, and wherein the SSI is representative of contents within a volume of space of the respective checked-in luggage item; c) based on determining that the secure database is missing the link between the first unique baggage identifier for the respective luggage item and the second unique baggage identifier for the respective checked-in luggage item, extrapolating, by at least one of the at least one processor, the first unique baggage identifier for the respective luggage item based on the second unique baggage identifier for the respective luggage item; d) retrieving from the secure database, by at least one of the at least one processor, the SSI linked to the extrapolated first unique baggage identifier of the respective checked-in luggage item, wherein the SSI is generated by a security screening imaging machine in an originating country and based on technology standards of a first level governed by a first security authority of the originating country; c) converting, by at least one of the at least one processor, the extrapolated first unique baggage identifier and the retrieved SSI, into SSI file sharing data of a structured data format for a security screening tool; f) transmitting, through a network interface in communication with at least one of the at least one processor and a communication network, the SSI file sharing data over the communication network to a secure non-transitory memory system associated with the border crossing airport, wherein the SSI file sharing data is configured to be used by a second security authority to perform a security screening process on the checked-in luggage item using the security screening tool, and wherein the second security authority is different from the first security authority; and g) repeating b)-f) for each checked-in luggage item of the plurality of checked-in luggage items.

The extrapolating, by at least one of the at least one processor, the first unique baggage identifier for the respective luggage item based on the second unique baggage identifier for the respective luggage item, may include: determining, by at least one of the at least one processor based on one or more log entries of the secure database, whether the first unique baggage identifier of the respective checked-in luggage item is part of a sequence of one or more bag tag numbers belonging to a single passenger in the security luggage item manifest; and based on determining that the first unique baggage identifier of the respective checked-in luggage item is part of the sequence of one or more bag tag numbers, finding the first unique baggage identifier of the respective checked-in luggage item from the one or more log entries.

The method may further include: updating, by at least one of the at least one processor, the secure database with the extrapolated first unique baggage identifier by associating the extrapolated first unique baggage identifier with the second unique baggage identifier and the SSI.

The extrapolating, by at least one of the at least one processor, the first unique baggage identifier of the respective checked-in luggage item based on the second unique baggage identifier of the respective checked-in luggage item, may include: accessing, by at least one of the at least one processor, a baggage data database associated with the baggage handling system to find one or more baggage identifier linked pairs (BILPs), wherein each of the one or more BILPs may include a linked pair of a first and a second unique baggage identifier; matching, by at least one of the at least one processor, the first unique baggage identifier of the respective checked-in luggage item with a corresponding first unique baggage identifier in a BILP of the one or more BILPs to recover the missing link; and updating, by the at least one of the at least one processor, the secure database with the recovered missing link.

The extrapolating, by at least one of the at least one processor, the first unique baggage identifier of the respective checked-in luggage item based on the second unique baggage identifier of the respective checked-in luggage item, may include: accessing, by at least one of the at least one processor, a baggage data database associated with the baggage handling system to find one or more baggage identifier linked pairs (BILPs), wherein each of the one or more BILPs may include a linked pair of a first and a second unique baggage identifier; obtaining, by at least one of the at least one processor, a first scan time of at least one network scanning device of the baggage handling system associated with the first unique baggage identifier of the respective checked-in luggage item associated, wherein the network scanning device is in proximity to the security screening machine capturing the SSI; identifying, by at least one of the at least one processor, a second scan time of the network scanning device associated with a first luggage item scanned by the baggage handling system immediately before the first scan time; identifying, by at least one of the at least one processor, a third scan time of the network scanning device associated a second luggage item scanned by the baggage handling system immediately after the first scan time; and verifying, by at least one of the at least one processor, log entries in the secure database relative to the first scan time of the checked-in luggage item, the second scan time of the first luggage item, and the third scan time of the second luggage item.

Each first unique baggage identifier may include an International Air Transportation Association (IATA) license plate assigned by a Departure Control System (DCS) and the second unique baggage identifier may include a pseudo identifier (PID) assigned by the baggage handling system.

The security luggage item manifest may further include a picture of the respective checked-in luggage item, wherein the secure database may include a picture of the respective checked-in luggage item linked to the second unique baggage identifier, and the extrapolating, by the at least one of the at least one processor, the first unique baggage identifier of the respective checked-in luggage item based on the second unique baggage identifier of the respective checked-in luggage item may include: matching the picture of the respective checked-in luggage item in the security luggage item manifest with the picture linked to the second unique baggage identifier of the respective checked-in luggage item to find the first unique baggage identifier of the respective checked-in luggage item.

According to an aspect of the disclosure, a system includes: at least one memory storing one or more instructions; and at least one processor configured to execute the one or more instructions, wherein the one or more instructions, when executed by the at least one processor, cause the system to: a) generate a security luggage item manifest listing a plurality of checked-in luggage items terminating or transferring at a border crossing airport associated with a flight, wherein each of the plurality of checked-in luggage items includes a scannable bag tag affixed thereto, and wherein the security luggage item manifest includes a first unique baggage identifier for the scannable bag tags affixed to the plurality of checked-in luggage items, b) determine whether a secure database is missing a link between the first unique baggage identifier for a respective checked-in luggage item listed in the security luggage item manifest and a second unique baggage identifier assigned by a baggage handling system to retrieve a security screening image (SSI) of the respective checked-in luggage item, wherein the SSI of the respective checked-in luggage item is stored in the secure database, wherein the secure database is stored in a non-transitory memory device, and wherein the SSI is representative of contents within a volume of space of the respective checked-in luggage item, c) based on determining that the secure database is missing the link between the first unique baggage identifier for the respective luggage item and the second unique baggage identifier for the respective checked-in luggage item, extrapolate the first unique baggage identifier for the respective luggage item based on the second unique baggage identifier for the respective luggage item, d) retrieve, from the secure database, the SSI linked to the extrapolated first unique baggage identifier of the respective checked-in luggage item, wherein the SSI is generated by a security screening imaging machine in an originating country and based on technology standards of a first level governed by a first security authority of the originating country, c) convert the extrapolated first unique baggage identifier and the retrieved SSI into SSI file sharing data of a structured data format for a security screening tool, f) transmit, through a network interface of the system in communication with at least one of the at least one processor and a communication network, the SSI file sharing data over the communication network to a secure non-transitory memory system associated with the border crossing airport, wherein the SSI file sharing data is configured to be used by a second security authority to perform a security screening process on the checked-in luggage item using the security screening tool, and wherein the second security authority is different from the first security authority, and g) repeat b)-f) for each checked-in luggage item of the plurality of checked-in luggage items.

The one or more instructions, when executed by the at least one processor, may cause the system to: extrapolate the first unique baggage identifier for the respective luggage item based on the second unique baggage identifier for the respective luggage item by determining, based on one or more log entries of the secure database, whether the first unique baggage identifier of the respective checked-in luggage item is part of a sequence of one or more bag tag numbers belonging to a single passenger in the security luggage item manifest, and based on determining that the first unique baggage identifier of the respective checked-in luggage item is part of the sequence of one or more bag tag numbers, find the first unique baggage identifier of the respective checked-in luggage item from the one or more log entries.

The one or more instructions, when executed by the at least one processor, may cause the system to: update the secure database with the extrapolated first unique baggage identifier by associating the extrapolated first unique baggage identifier with the second unique baggage identifier and the SSI.

The one or more instructions, when executed by the at least one processor, may cause the system to: extrapolate the first unique baggage identifier of the respective checked-in luggage item based on the second unique baggage identifier of the respective checked-in luggage item by: accessing a baggage data database associated with the baggage handling system to find one or more baggage identifier linked pairs (BILPs), wherein each of the one or more BILPs may include a linked pair of a first and a second unique baggage identifier, matching the first unique baggage identifier of the respective checked-in luggage item with a corresponding first unique baggage identifier in a BILP of the one or more BILPs to recover the missing link, and updating the secure database with the recovered missing link.

The one or more instructions, when executed by the at least one processor, may cause the system to: extrapolate the first unique baggage identifier of the respective checked-in luggage item based on the second unique baggage identifier of the respective checked-in luggage item by: accessing a baggage data database associated with the baggage handling system to find one or more baggage identifier linked pairs (BILPs), wherein each of the one or more BILPs may include a linked pair of a first and a second unique baggage identifier, obtaining a first scan time of at least one network scanning device of the baggage handling system associated with the first unique baggage identifier of the respective checked-in luggage item associated, wherein the network scanning device is in proximity to the security screening machine capturing the SSI, identifying a second scan time of the network scanning device associated with a first luggage item scanned by the baggage handling system immediately before the first scan time, identifying a third scan time of the network scanning device associated a second luggage item scanned by the baggage handling system immediately after the first scan time, and verifying log entries in the secure database relative to the first scan time of the checked-in luggage item, the second scan time of the first luggage item, and the third scan time of the second luggage item.

Each first unique baggage identifier may include an International Air Transportation Association (IATA) license plate assigned by a Departure Control System (DCS) and the second unique baggage identifier may include a pseudo identifier (PID) assigned by the baggage handling system.

The security luggage item manifest may further include a picture of the respective checked-in luggage item, the secure database may include a picture of the respective checked-in luggage item linked to the second unique baggage identifier, and the one or more instructions, when executed by the at least one processor, may cause the system to extrapolate the first unique baggage identifier of the respective checked-in luggage item based on the second unique baggage identifier of the respective checked-in luggage item by matching the picture of the respective checked-in luggage item in the security luggage item manifest with the picture linked to the second unique baggage identifier of the respective checked-in luggage item to find the first unique baggage identifier of the respective checked-in luggage item.

According to an aspect of the disclosure, a non-transitory computer readable medium has instructions stored therein, which when executed by at least one processor, cause the at least one processor to execute a method including: a) generating, by at least one of at least one processor, a security luggage item manifest listing a plurality of checked-in luggage items terminating or transferring at a border crossing airport associated with a flight, wherein each of the plurality of checked-in luggage items includes a scannable bag tag affixed thereto, and wherein the security luggage item manifest includes a first unique baggage identifier for the scannable bag tags affixed to the plurality of checked-in luggage items; b) determining, by at least one of the at least one processor, whether a secure database is missing a link between the first unique baggage identifier for a respective checked-in luggage item listed in the security luggage item manifest and a second unique baggage identifier assigned by a baggage handling system to retrieve a security screening image (SSI) of the respective checked-in luggage item, wherein the SSI of the respective checked-in luggage item is stored in the secure database, wherein the secure database is stored in a non-transitory memory device, and wherein the SSI is representative of contents within a volume of space of the respective checked-in luggage item; c) based on determining that the secure database is missing the link between the first unique baggage identifier for the respective luggage item and the second unique baggage identifier for the respective checked-in luggage item, extrapolating, by at least one of the at least one processor, the first unique baggage identifier for the respective luggage item based on the second unique baggage identifier for the respective luggage item; d) retrieving from the secure database, by at least one of the at least one processor, the SSI linked to the extrapolated first unique baggage identifier of the respective checked-in luggage item, wherein the SSI is generated by a security screening imaging machine in an originating country and based on technology standards of a first level governed by a first security authority of the originating country; c) converting, by at least one of the at least one processor, the extrapolated first unique baggage identifier and the retrieved SSI, into SSI file sharing data of a structured data format for a security screening tool; f) transmitting, through a network interface in communication with at least one of the at least one processor and a communication network, the SSI file sharing data over the communication network to a secure non-transitory memory system associated with the border crossing airport, wherein the SSI file sharing data is configured to be used by a second security authority to perform a security screening process on the checked-in luggage item using the security screening tool, and wherein the second security authority is different from the first security authority; and g) repeating b)-f) for each checked-in luggage item of the plurality of checked-in luggage items.

With regard to the non-transitory computer readable medium, the extrapolating, by at least one of the at least one processor, the first unique baggage identifier for the respective luggage item based on the second unique baggage identifier for the respective luggage item, may include: determining, by at least one of the at least one processor based on one or more log entries of the secure database, whether the first unique baggage identifier of the respective checked-in luggage item is part of a sequence of one or more bag tag numbers belonging to a single passenger in the security luggage item manifest; and based on determining that the first unique baggage identifier of the respective checked-in luggage item is part of the sequence of one or more bag tag numbers, finding the first unique baggage identifier of the respective checked-in luggage item from the one or more log entries.

With regard to the non-transitory computer readable medium, the method executed by the at least one processor may include: updating, by at least one of the at least one processor, the secure database with the extrapolated first unique baggage identifier by associating the extrapolated first unique baggage identifier with the second unique baggage identifier and the SSI.

With regard to the non-transitory computer readable medium, the extrapolating, by at least one of the at least one processor, the first unique baggage identifier of the respective checked-in luggage item based on the second unique baggage identifier of the respective checked-in luggage item, may include: accessing, by at least one of the at least one processor, a baggage data database associated with the baggage handling system to find one or more baggage identifier linked pairs (BILPs), wherein each of the one or more BILPs may include a linked pair of a first and a second unique baggage identifier; matching, by at least one of the at least one processor, the first unique baggage identifier of the respective checked-in luggage item with a corresponding first unique baggage identifier in a BILP of the one or more BILPs to recover the missing link; and updating, by the at least one of the at least one processor, the secure database with the recovered missing link.

With regard to the non-transitory computer readable medium, the extrapolating, by at least one of the at least one processor, the first unique baggage identifier of the respective checked-in luggage item based on the second unique baggage identifier of the respective checked-in luggage item, may include: accessing, by at least one of the at least one processor, a baggage data database associated with the baggage handling system to find one or more baggage identifier linked pairs (BILPs), wherein each of the one or more BILPs may include a linked pair of a first and a second unique baggage identifier; obtaining, by at least one of the at least one processor, a first scan time of at least one network scanning device of the baggage handling system associated with the first unique baggage identifier of the respective checked-in luggage item associated, wherein the network scanning device is in proximity to the security screening machine capturing the SSI; identifying, by at least one of the at least one processor, a second scan time of the network scanning device associated with a first luggage item scanned by the baggage handling system immediately before the first scan time; identifying, by at least one of the at least one processor, a third scan time of the network scanning device associated a second luggage item scanned by the baggage handling system immediately after the first scan time; and verifying, by at least one of the at least one processor, log entries in the secure database relative to the first scan time of the checked-in luggage item, the second scan time of the first luggage item, and the third scan time of the second luggage item.

Each first unique baggage identifier may include an International Air Transportation Association (IATA) license plate assigned by a Departure Control System (DCS) and the second unique baggage identifier may include a pseudo identifier (PID) assigned by the baggage handling system.

The security luggage item manifest may further include a picture of the respective checked-in luggage item, the secure database may include a picture of the respective checked-in luggage item linked to the second unique baggage identifier, and with regard to the non-transitory computer readable medium, the extrapolating, by the at least one of the at least one processor, the first unique baggage identifier of the respective checked-in luggage item based on the second unique baggage identifier of the respective checked-in luggage item may include: matching the picture of the respective checked-in luggage item in the security luggage item manifest with the picture linked to the second unique baggage identifier of the respective checked-in luggage item to find the first unique baggage identifier of the respective checked-in luggage item.

According to an aspect of the disclosure, a method includes: linking, by at least one of at least one processor, a first unique baggage identifier to at least one of a second unique baggage identifier and a security screening image (SSI) of contents within a luggage item; based on receiving a message including a list of contents missing from the luggage item, through a network interface coupled to the at least one of the at least one processor and a communication network, retrieving the SSI of the contents; generating, by at least one of the at least one processor, a list of contents in the SSI using a machine learning algorithm; comparing, by at least one of the at least one processor, the list of contents missing from the luggage item with the list of contents in the SSI; based on identifying a match between at least one item on the list of contents missing from the luggage item and at least one item on the list of contents in the SSI, verifying, by at least one of the at least one processor, a missing contents claim; and communicating a verification message through a second network interface coupled to at least one of the at least one processor and a second communication network.

The method may further include: storing in a secure database, the first unique baggage identifier and at least one of the second unique baggage identifier and the SSI.

The message may further include the first unique baggage identifier, and the first unique baggage identifier may include an identifier originally printed on a bag tag affixed to the luggage item.

The method may further include: based on determining, by at least one of the at least one processor, that the at least one item on the list of contents missing from the luggage item do not match any of the at least one item on the list of contents in the SSI, communicating a failed verification message through the second network interface coupled to at least one of the at least one processor and the second communication network.

The method may further include: determining, by at least one of the at least one processor, a missing first unique baggage identifier; and extrapolating, by at least one of the at least one processor, the missing first unique baggage identifier, based on stored links between the first unique baggage identifier and the at least one of the second unique baggage identifier, and the security screening image (SSI) of contents within the luggage item and the picture.

The method may further include: capturing, by an imaging device, a picture of the luggage item, wherein the linking, by at least one of the at least one processor, the first unique baggage identifier further includes linking, by at least one of the at least one processor, the first unique baggage identifier, to at least one of the picture of the luggage item, the second unique baggage identifier, and the security screening image (SSI) of contents within the luggage item.

The imaging device may be located in a security zone where the SSI is captured, may be located at a location of a scanning device of a baggage handling system, or may be integrated in a communication device of a passenger.

The method may further include: retrieving, by at least one of the at least one processor, time stamping generated by a baggage handling system (BHS) associated with the luggage item traveling through the BHS to a security screening machine capturing the SSI; determining, by at least one of the at least one processor, a time of travel from entering the BHS to exiting the security screening machine; and determining, by at least one of the at least one processor, a delay of a traversal of the luggage item through the BHS based on the time of travel.

The method may further include: based on identifying, by at least one of the at least one processor, the delay of the traversal of the luggage item through the BHS, communicating a non-verifiable message through the second network interface coupled to at least one of the at least one processor and the second communication network.

According to an aspect of the disclosure, a system includes: at least one memory storing one or more instructions; and at least one processor configured to execute the one or more instructions, wherein the one or more instructions, when executed by the at least one processor cause the system to: link a first unique baggage identifier to at least one of a second unique baggage identifier and a security screening image (SSI) of contents within a luggage item, based on receiving a message including a list of contents missing from the luggage item, through a network interface of the system coupled to the at least one of the at least one processor and a communication network, retrieve the SSI of the contents, generate a list of contents in the SSI using a machine learning algorithm, compare the list of contents missing from the luggage item with the list of contents in the SSI, based on identifying a match between at least one item on the list of contents missing from the luggage item and at least one item on the list of contents in the SSI, verify a missing contents claim, and communicate a verification message through a second network interface of the system coupled to at least one of the at least one processor and a second communication network.

The one or more instructions, when executed by the at least one processor, may cause the system to: store, in a secure database, the first unique baggage identifier and at least one of the second unique baggage identifier and the SSI.

The message may further include the first unique baggage identifier, and the first unique baggage identifier may include an identifier originally printed on a bag tag affixed to the luggage item.

The one or more instructions, when executed by the at least one processor, may cause the system to: based on determining that the at least one item on the list of contents missing from the luggage item do not match any of the at least one item on the list of contents in the SSI, communicate a failed verification message through the second network interface of the system coupled to at least one of the at least one processor and the second communication network.

The one or more instructions, when executed by the at least one processor, may cause the system to: determine a missing first unique baggage identifier, and extrapolate the missing first unique baggage identifier based on stored links between the first unique baggage identifier and the at least one of the second unique baggage identifier, and the security screening image (SSI) of contents within the luggage item and the picture.

The one or more instructions, when executed by the at least one processor, may cause the system to: cause an imaging device to capture a picture of the luggage item, and link the first unique baggage identifier by linking the first unique baggage identifier to at least one of the picture of the luggage item, the second unique baggage identifier, and the security screening image (SSI) of contents within the luggage item.

The imaging device may be located in a security zone where the SSI is captured, may be located at a location of a scanning device of a baggage handling system, or may be integrated in a communication device of a passenger.

The one or more instructions, when executed by the at least one processor, may cause the system to: retrieve time stamping generated by a baggage handling system (BHS) associated with the luggage item traveling through the BHS to a security screening machine capturing the SSI, determine a time of travel from entering the BHS to exiting the security screening machine, and determine a delay of a traversal of the luggage item through the BHS based on the time of travel.

The one or more instructions, when executed by the at least one processor, may cause the system to: based on identifying the delay of the traversal of the luggage item through the BHS, communicate a non-verifiable message through the second network interface of the system coupled to at least one of the at least one processor and the second communication network.

According to an aspect of the disclosure, a non-transitory computer readable medium has instructions stored therein, which when executed by at least one processor cause the at least one processor to execute a method including: linking, by at least one of at least one processor, a first unique baggage identifier to at least one of a second unique baggage identifier and a security screening image (SSI) of contents within a luggage item; based on receiving a message including a list of contents missing from the luggage item, through a network interface coupled to the at least one of the at least one processor and a communication network, retrieving the SSI of the contents; generating, by at least one of the at least one processor, a list of contents in the SSI using a machine learning algorithm; comparing, by at least one of the at least one processor, the list of contents missing from the luggage item with the list of contents in the SSI; based on identifying a match between at least one item on the list of contents missing from the luggage item and at least one item on the list of contents in the SSI, verifying, by at least one of the at least one processor, a missing contents claim; and communicating a verification message through a second network interface coupled to at least one of the at least one processor and a second communication network.

With regard to the non-transitory computer readable medium, the method executed by the at least one processor may include: storing in a secure database, the first unique baggage identifier and at least one of the second unique baggage identifier and the SSI.

The message may further include the first unique baggage identifier, and the first unique baggage identifier may include an identifier originally printed on a bag tag affixed to the luggage item.

With regard to the non-transitory computer readable medium, the method executed by the at least one processor may include: based on determining, by at least one of the at least one processor, that the at least one item on the list of contents missing from the luggage item do not match any of the at least one item on the list of contents in the SSI, communicating a failed verification message through the second network interface coupled to at least one of the at least one processor and the second communication network.

With regard to the non-transitory computer readable medium, the method executed by the at least one processor may include: determining, by at least one of the at least one processor, a missing first unique baggage identifier; and extrapolating, by at least one of the at least one processor, the missing first unique baggage identifier, based on stored links between the first unique baggage identifier and the at least one of the second unique baggage identifier, and the security screening image (SSI) of contents within the luggage item and the picture.

With regard to the non-transitory computer readable medium, the method executed by the at least one processor may include: capturing, by an imaging device, a picture of the luggage item, wherein the linking, by at least one of the at least one processor, the first unique baggage identifier may further include linking, by at least one of the at least one processor, the first unique baggage identifier, to at least one of the picture of the luggage item, the second unique baggage identifier, and the security screening image (SSI) of contents within the luggage item.

The imaging device may be located in a security zone where the SSI is captured, may be located at a location of a scanning device of a baggage handling system, or may be integrated in a communication device of a passenger.

With regard to the non-transitory computer readable medium, the method executed by the at least one processor may include: retrieving, by at least one of the at least one processor, time stamping generated by a baggage handling system (BHS) associated with the luggage item traveling through the BHS to a security screening machine capturing the SSI; determining, by at least one of the at least one processor, a time of travel from entering the BHS to exiting the security screening machine; and determining, by at least one of the at least one processor, a delay of a traversal of the luggage item through the BHS based on the time of travel.

With regard to the non-transitory computer readable medium, the method executed by the at least one processor may include: based on identifying, by at least one of the at least one processor, the delay of the traversal of the luggage item through the BHS, communicating a non-verifiable message through the second network interface coupled to at least one of the at least one processor and the second communication network.

According to an aspect of the disclosure, a method includes: capturing, by at least one imaging device, a picture of a checked-in luggage item; generating, by at least one of at least one processor, a checked-in luggage item link by linking a first unique baggage identifier to at least one of the picture of the checked-in luggage item, a second unique baggage identifier, a passenger name of a passenger, a universal passenger identifier, and a security screening image (SSI) of contents within the checked-in luggage item; repeating, by at least one of the at least one processor, the capturing and the generating for each of a plurality of checked-in luggage items; generating, by at least one of the at least one processor, a first database including the checked-in luggage item link for each of the plurality of check-in luggage items; based on receiving a message identifying a checked-in luggage item among the plurality of luggage items as a lost or delayed luggage item, retrieving, by at least one of the at least one processor, at least one of the picture of the lost or delayed luggage item or baggage handling system scanning data associated with the lost or delayed luggage item based on the check-in luggage item link associated with the lost or delayed luggage item and data in the message; locating, by at least one of the at least one processor, the lost or delayed luggage item based on a machine learning algorithm configured to process at least one of International Air Transportation Association (IATA) data messages or the picture of the lost or delayed luggage item; and communicating to an electronic communication device of the passenger, through a network interface coupled to at least one of the at least one processor and a communication network, a found luggage item message identifying a location of the lost or delayed luggage item.

The method may further include: time stamping, by the at least one imaging device, a time and a date the picture of the checked-in luggage item is captured.

The at least one imaging device may be located in a security zone where the SSI is captured, may be located at a scanning device location of a baggage handling system, or may be integrated in a communication device of a passenger.

The method may further include: storing, in a secure database, the picture of the checked-in luggage item, the first unique baggage identifier, the second unique baggage identifier, and the security screening image (SSI) of contents within the checked-in luggage item; receiving, by at least one of the at least one processor, a contents list from the passenger; generating, by at least one of the at least one processor, a list of the contents in the SSI using a machine learning algorithm; determining, by at least one of the at least one processor, a match between one or more items listed in the contents list from the passenger and the list of contents in the SSI; and based on determining one or more matches, validating, by at least one of the at least one processor, the passenger as an owner of the lost or delayed luggage item.

The message may include the first unique baggage identifier printed on a bag tag affixed to the luggage item, the passenger name of the passenger, or a picture of the lost or delayed luggage item provided by the passenger.

The locating, by at least one of the at least one processor, the lost or delayed luggage item further may include: extracting from the picture of the checked-in luggage item, by at least one of the at least one processor, features of the checked-in luggage item using a feature extraction machine learning algorithm; and locating the lost or delayed luggage item by matching the extracted features with extracted features in a current picture of a candidate luggage item.

The first unique baggage identifier may include an International Air Transportation Association (IATA) license plate, and the second unique baggage identifier may include a pseudo identifier generated by one of a baggage handling system or a security screening imaging machine capturing the SSI.

The method may further include: training a model, by least one of the at least one processor, with one or more reference indicators of one or more non-routine routed luggage items associated with one or more IATA data messages, wherein the locating the lost or delayed luggage item may further include: inputting, by least one of the at least one processor, into the model, data representative of information associated with a routine route; inputting, by least one of the at least one processor, into the model, data from one or more current baggage information messages related to transport of the checked-in luggage item to determine a current route; and outputting, by least one of the at least one processor, the current route, wherein the model uses the machine learning algorithm to detect that the checked-in luggage item is a non-routine routed luggage item based on a difference between the current route and the routine route being greater than a threshold, and wherein the method may further include generating, by least one of the at least one processor, the message identifying the checked-in luggage item as the lost or the delayed luggage item based on the checked-in luggage item being detected as the non-routine routed luggage item.

The method may further include: training a model, by least one of the at least one processor, with handling and processing data for each baggage handling system predicted to handle the checked-in luggage item; inputting, by least one of the at least one processor, into the model, data representative of actual handling and processing data of one or more scanning devices handling the checked-in luggage item in real time to determine a current route; and outputting, by least one of the at least one processor, the current route, wherein the model uses the machine learning algorithm to detect that the checked-in luggage item is a non-routine routed luggage item based on a difference between the current route and the routine route being greater than a threshold, and wherein the method may further include generating, by least one of the at least one processor, the message identifying the checked-in luggage item as the lost or the delayed luggage item based on the checked-in luggage item being detected as the non-routine routed luggage item.

The method may further include: determining, by at least one of the at least one processor, whether the one or more reference indicators represent a deviation in time or distance greater than a predetermined threshold between the routine route of the checked-in luggage item and the current route of the checked-in luggage item.

The method may further include: electronically communicating location data associated with the lost or delayed luggage item to the electronic communication device of the passenger, wherein the location data is updated based on locations associated with at least one of the one or more reference indicators, a location of an imaging device capturing the picture, or a machine address of a scanning machine associated with the baggage handling system on the current route.

According to an aspect of the disclosure, a system includes: at least one memory storing one or more instructions; and at least one processor configured to execute the one or more instructions, wherein the one or more instructions, when executed by the at least one processor cause the system to: capture, by at least one imaging device of the system, a picture of a checked-in luggage item, generate a checked-in luggage item link by linking a first unique baggage identifier to at least one of the picture of the checked-in luggage item, a second unique baggage identifier, a passenger name of a passenger, a universal passenger identifier, and a security screening image (SSI) of contents within the checked-in luggage item, repeat the capturing and the generating for each of a plurality of checked-in luggage items, generate a first database including the checked-in luggage item link for each of the plurality of check-in luggage items, based on receiving a message identifying a checked-in luggage item among the plurality of luggage items as a lost or delayed luggage item, retrieve at least one of the picture of the lost or delayed luggage item or baggage handling system scanning data associated with the lost or delayed luggage item based on the check-in luggage item link associated with the lost or delayed luggage item and data in the message, locate the lost or delayed luggage item based on a machine learning algorithm configured to process at least one of International Air Transportation Association (IATA) data messages or the picture of the lost or delayed luggage item, and communicate to an electronic communication device of the passenger, through a network interface of the system in communication with at least one of the at least one processor and a communication network, a found luggage item message identifying a location of the lost or delayed luggage item.

The one or more instructions, when executed by the at least one processor, may cause the system to: cause the at least one imaging device to stamp a time and a date the picture of the checked-in luggage item is captured.

The at least one imaging device may be located in a security zone where the SSI is captured, may be located at a scanning device location of a baggage handling system, or may be integrated in a communication device of a passenger.

The one or more instructions, when executed by the at least one processor, may cause the system to: store, in a secure database, the picture of the checked-in luggage item, the first unique baggage identifier, the second unique baggage identifier, and the security screening image (SSI) of contents within the checked-in luggage item, receive a contents list from the passenger, generate a list of the contents in the SSI using a machine learning algorithm, determine a match between one or more items listed in the contents list from the passenger and the list of contents in the SSI, and based on determining one or more matches, validate the passenger as an owner of the lost or delayed luggage item.

The message may include the first unique baggage identifier printed on a bag tag affixed to the luggage item, the passenger name of the passenger, or a picture of the lost or delayed luggage item provided by the passenger.

The one or more instructions, when executed by the at least one processor, may cause the system to locate the lost or delayed luggage item by: extracting from the picture of the checked-in luggage item features of the checked-in luggage item using a feature extraction machine learning algorithm, and locating the lost or delayed luggage item by matching the extracted features with extracted features in a current picture of a candidate luggage item.

The first unique baggage identifier may include an International Air Transportation Association (IATA) license plate, and the second unique baggage identifier may include a pseudo identifier generated by one of a baggage handling system or a security screening imaging machine capturing the SSI.

The one or more instructions, when executed by the at least one processor, may cause the system to: train a model with one or more reference indicators of one or more non-routine routed luggage items associated with one or more IATA data messages, locate the lost or delayed luggage item further by: inputting into the model, data representative of information associated with a routine route, inputting into the model, data from one or more current baggage information messages related to transport of the checked-in luggage item to determine a current route, and outputting the current route, wherein the model uses the machine learning algorithm to detect that the checked-in luggage item is a non-routine routed luggage item based on a difference between the current route and the routine route being greater than a threshold, and wherein the one or more instructions, when executed by the at least one processor cause the system to generate the message identifying the checked-in luggage item as the lost or the delayed luggage item based on the checked-in luggage item being detected as the non-routine routed luggage item.

The one or more instructions, when executed by the at least one processor, may cause the system to: train a model with handling and processing data for each baggage handling system predicted to handle the checked-in luggage item, input, into the model, data representative of actual handling and processing data of one or more scanning devices handling the checked-in luggage item in real time to determine a current route, and output the current route, wherein the model uses the machine learning algorithm to detect that the checked-in luggage item is a non-routine routed luggage item based on a difference between the current route and the routine route being greater than a threshold, and the one or more instructions, when executed by the at least one processor, may further cause the system to generate the message identifying the checked-in luggage item as the lost or the delayed luggage item based on the checked-in luggage item being detected as the non-routine routed luggage item.

The one or more instructions, when executed by the at least one processor, may cause the system to: determine whether the one or more reference indicators represent a deviation in time or distance greater than a predetermined threshold between the routine route of the checked-in luggage item and the current route of the checked-in luggage item.

The one or more instructions, when executed by the at least one processor, may cause the system to: electronically communicate location data associated with the lost or delayed luggage item to the electronic communication device of the passenger, wherein the location data is updated based on locations associated with at least one of the one or more reference indicators, a location of an imaging device capturing the picture, or a machine address of a scanning machine associated with the baggage handling system on the current route.

According to an aspect of the disclosure, a non-transitory computer readable medium has instructions stored therein, which when executed by at least one processor, cause the at least one processor to execute a method including: capturing, by at least one imaging device, a picture of a checked-in luggage item; generating, by at least one of at least one processor, a checked-in luggage item link by linking a first unique baggage identifier to at least one of the picture of the checked-in luggage item, a second unique baggage identifier, a passenger name of a passenger, a universal passenger identifier, and a security screening image (SSI) of contents within the checked-in luggage item; repeating, by at least one of the at least one processor, the capturing and the generating for each of a plurality of checked-in luggage items; generating, by at least one of the at least one processor, a first database including the checked-in luggage item link for each of the plurality of check-in luggage items; based on receiving a message identifying a checked-in luggage item among the plurality of luggage items as a lost or delayed luggage item, retrieving, by at least one of the at least one processor, at least one of the picture of the lost or delayed luggage item or baggage handling system scanning data associated with the lost or delayed luggage item based on the check-in luggage item link associated with the lost or delayed luggage item and data in the message; locating, by at least one of the at least one processor, the lost or delayed luggage item based on a machine learning algorithm configured to process at least one of International Air Transportation Association (IATA) data messages or the picture of the lost or delayed luggage item; and communicating to an electronic communication device of the passenger, through a network interface coupled to at least one of the at least one processor and a communication network, a found luggage item message identifying a location of the lost or delayed luggage item.

With regard to the non-transitory computer readable medium, the method executed by the at least one processor may include: time stamping, by the at least one imaging device, a time and a date the picture of the checked-in luggage item is captured.

The at least one imaging device may be located in a security zone where the SSI is captured, may be located at a scanning device location of a baggage handling system, or may be integrated in a communication device of a passenger.

With regard to the non-transitory computer readable medium, the method executed by the at least one processor may include: storing, in a secure database, the picture of the checked-in luggage item, the first unique baggage identifier, the second unique baggage identifier, and the security screening image (SSI) of contents within the checked-in luggage item; receiving, by at least one of the at least one processor, a contents list from the passenger; generating, by at least one of the at least one processor, a list of the contents in the SSI using a machine learning algorithm; determining, by at least one of the at least one processor, a match between one or more items listed in the contents list from the passenger and the list of contents in the SSI; and based on determining one or more matches, validating, by at least one of the at least one processor, the passenger as an owner of the lost or delayed luggage item.

The message may include the first unique baggage identifier printed on a bag tag affixed to the luggage item, the passenger name of the passenger, or a picture of the lost or delayed luggage item provided by the passenger.

With regard to the non-transitory computer readable medium, the locating, by at least one of the at least one processor, the lost or delayed luggage item may further include: extracting from the picture of the checked-in luggage item, by at least one of the at least one processor, features of the checked-in luggage item using a feature extraction machine learning algorithm; and locating the lost or delayed luggage item by matching the extracted features with extracted features in a current picture of a candidate luggage item.

The first unique baggage identifier may include an International Air Transportation Association (IATA) license plate, and the second unique baggage identifier may include a pseudo identifier generated by one of a baggage handling system or a security screening imaging machine capturing the SSI.

With regard to the non-transitory computer readable medium, the method executed by the at least one processor may include: training a model, by least one of the at least one processor, with one or more reference indicators of one or more non-routine routed luggage items associated with one or more IATA data messages, wherein the locating the lost or delayed luggage item may further include: inputting, by least one of the at least one processor, into the model, data representative of information associated with a routine route; inputting, by least one of the at least one processor, into the model, data from one or more current baggage information messages related to transport of the checked-in luggage item to determine a current route; and outputting, by least one of the at least one processor, the current route, wherein the model uses the machine learning algorithm to detect that the checked-in luggage item is a non-routine routed luggage item based on a difference between the current route and the routine route being greater than a threshold, and wherein the method may further include generating, by least one of the at least one processor, the message identifying the checked-in luggage item as the lost or the delayed luggage item based on the checked-in luggage item being detected as the non-routine routed luggage item.

With regard to the non-transitory computer readable medium, the method executed by the at least one processor may include: training a model, by least one of the at least one processor, with handling and processing data for each baggage handling system predicted to handle the checked-in luggage item; inputting, by least one of the at least one processor, into the model, data representative of actual handling and processing data of one or more scanning devices handling the checked-in luggage item in real time to determine a current route; and outputting, by least one of the at least one processor, the current route, wherein the model uses the machine learning algorithm to detect that the checked-in luggage item is a non-routine routed luggage item based on a difference between the current route and the routine route being greater than a threshold, and with regard to the non-transitory computer readable medium, the method executed by the at least one processor may further include generating, by least one of the at least one processor, the message identifying the checked-in luggage item as the lost or the delayed luggage item based on the checked-in luggage item being detected as the non-routine routed luggage item.

With regard to the non-transitory computer readable medium, the method executed by the at least one processor may include: determining, by at least one of the at least one processor, whether the one or more reference indicators represent a deviation in time or distance greater than a predetermined threshold between the routine route of the checked-in luggage item and the current route of the checked-in luggage item.

With regard to the non-transitory computer readable medium, the method executed by the at least one processor may include: electronically communicating location data associated with the lost or delayed luggage item to the electronic communication device of the passenger, wherein the location data is updated based on locations associated with at least one of the one or more reference indicators, a location of an imaging device capturing the picture, or a machine address of a scanning machine associated with the baggage handling system on the current route.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1A:
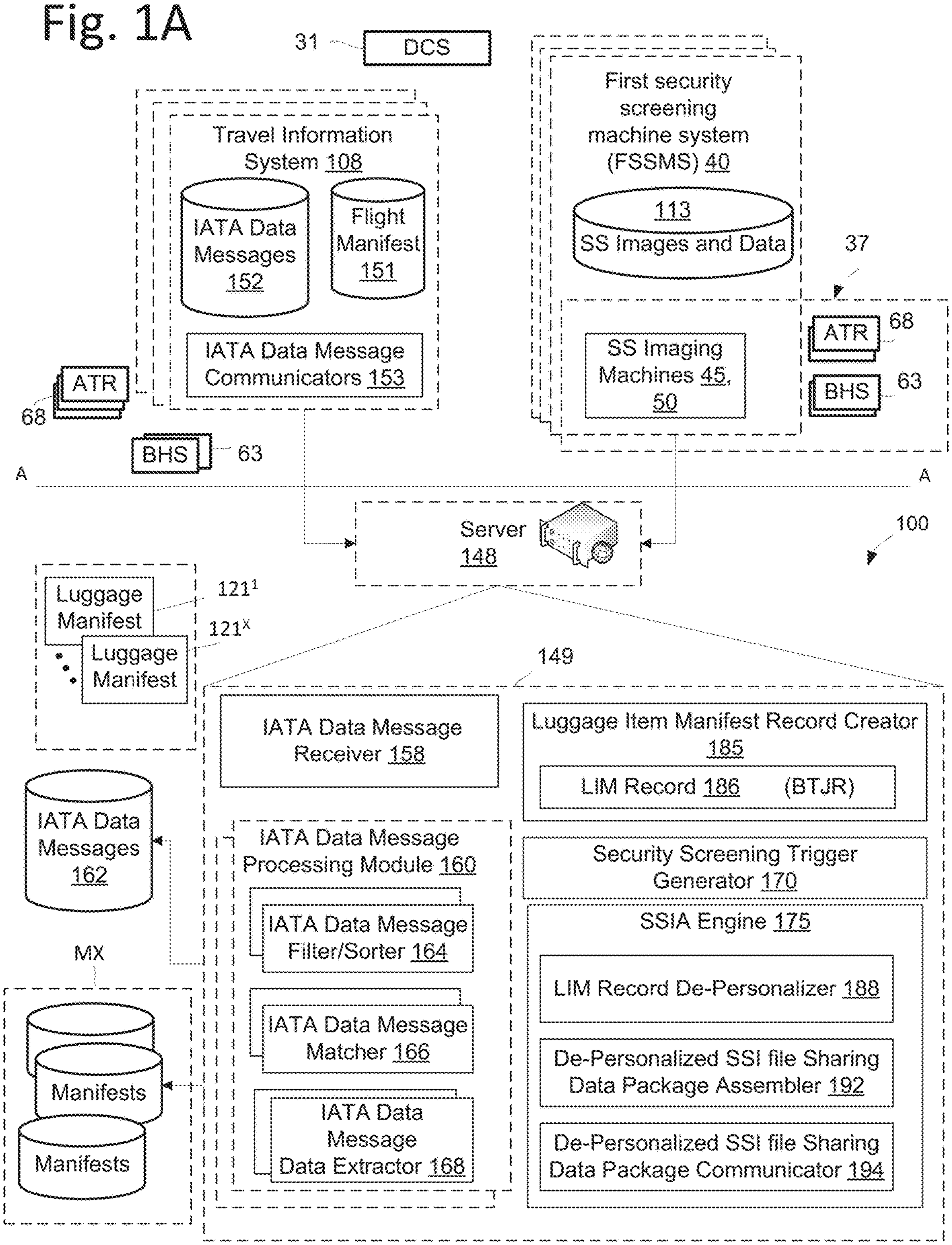
FIG. 1A illustrates a block diagram of a system for creating at least one de-personalized luggage manifest in accordance with an embodiment.

Embodiments are described herein with reference to the attached figures wherein like reference numerals are used throughout the figures to designate similar or equivalent elements. The figures are not drawn to scale, and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events of the methods, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

As used herein, the terms "first network interface," "second network interface," "third network interface," etc. may be the same network interface or a different network interface. In some embodiments, "first network interface," "second network interface," "third network interface," etc. may use the same port or a different port of a computing system, server or cloud computing system.

As used herein, the terms "first communication network," "second communications network," "third communications interface," etc. may be the same communications network or a different communications network. Some messages are sent to the Department of Homeland Security or other Government-designated Agency. Some messages may be sent via Teletext. the Internet or an Intranet Some message may be sent via an email platform. Some messages may be converted to a designated structured format for a security screening tool designated by a security screening authority.

Baggage Handling and Delivery

Providing a seamless and near error-free experience for the handling and transfer of luggage items while the passenger travels along a journey, allows the passenger to have an enjoyable and pleasant travel experience. While the passenger knows where they are going, the luggage item does not. The luggage item is physically handled and handed off from a passenger to an airline agent with a license plate attached, for example. From there the luggage item is transported through an airport infrastructure via baggage handling systems (BHS) 63 (FIG. 1A) to a security tracking zone 37 (FIG. 1A) (also referred to herein as a security screening zone).

A passenger, with a checked luggage item, arriving at an airport border crossing of a country (hereinafter referred to as a "border-crossing airport") may depart the airport of the border crossing along two different lanes. The first lane is a terminating lane such that the luggage item and passenger terminate the airport infrastructure. The second lane is a transfer lane such that the luggage item and passenger transfer to another air carrier to travel to a destination location within the territory of the border-crossing country or to another border-crossing country. In the instance of the transfer lane, the checked luggage item may require re-screening by a screening authority as required for aviation travel. For example, in the United States, the screening/rescreening authority is Transportation Security Administration (TSA). The need for re-screening will be discussed in more detail later.

The government agency that governs security screening of airlines is the TSA of the U.S. Department of Homeland Security (DHS). On the other hand, the screening process for cruise ships may be regulated by the Coast Guard or the Customs and Border Protection (CBP) of DHS. DHS may allow a cruise ship company to have additional rules provided the company meets minimum governmental regulations. The TSA may also regulate the screening of baggage on trains of the railway systems and bus carriers. Other countries may have similar regulations and authorities for aviation security screening and/or Customs authority.

Security Screening Integration

Other modes of travel (i.e., vehicles of travel) can use less stringent, different, or the same quality screening technology to screen luggage items boarding a train, bus carrier, or cruise ship or entering a lodging entity than screening required by TSA or other aviation screening authority to travel on an air carrier. The high-tech security screening images regulated by TSA or other aviation screening authority for travel by an air carrier can be used to reduce the number of screenings of luggage items by the other modes of travel when there is a direct connection from a passenger departing an air carrier (a first mode of travel) and starting their next leg of travel with a second mode of travel (i.e., second vehicle of travel) or screening such as by bus, train, cruise ship, another air carrier, lodging entity/resort or a government agency. These security screening images required by the TSA or other countries governing agency may be shared for analysis according to regulations associated with any of the other modes of travel or screening without diminishing the effectiveness of the screening process. To maintain the integrity of the travel mode analysis by way of imagery, the correspondingly tagged luggage items remain in trusted custody until custody is transferred to the next vehicle of travel (i.e., bus, train, cruise ship, a second air carrier, or lodging entity/resort) and/or next government agency for border entry.

Today, thousands of passengers fly daily from one country to another. One of the bottlenecks is the time to security screen arriving luggage items for travel on a departing aircraft and customs for entering a country through an airport. However, for transferring flights, the checked-in baggage has remained in trusted custody. Provided the security screening of the originating airport was at a security screening level of the second security screening authority, the embodiments herein may share security screening images, which may eliminate the need for re-screening through a security screening imaging machine provided the luggage item is in compliance with a country's security screening authority technology requirements.

The problems of the past can be solved by the methods and systems herein by using the IATA license plate number to obtain a generated PID and security screening images and data of the contents of the luggage item without the need for transferring or accessing other personal identifiable information (PII) associated with a passenger to expedite the processing of luggage items through Customs or a border-crossing security screening check point.

As used herein the expressions "modes of travel" and "modes of transportation" may be used interchangeably. As used herein the expressions "modes of travel" and "vehicles of travel" may be used interchangeably. However, "modes of travel" and "vehicles of travel" may also include lodging and resorts.

While the description herein describes the governmental regulating agencies in the United States, other countries, or groups of countries joined by treaties, may also provide regulations to be followed for transportation security that requires security screening of luggage items boarding a vehicle of travel, other destinations, or countries.

The processes and systems described herein employs parallel methodologies to acquire luggage identifiable information so that the license plate number can be acquired without a passenger input or input by other employees. The license plate number is used to acquire a pseudo identifier (PID) or primary ID that is used to de-personalize a luggage item manifest of checked in luggage items that may terminate an airport or transfer to another travel carrier (i.e., air carrier) or flight. The de-personalized luggage item manifest may provide access to de-personalized shared security screening images by a Customs authority for review and approval of the contents in the volume of space within the luggage item.

The processes and systems described herein for one way of travel also apply to the reverse direction of travel to bring a passenger home.

FIG. 1A illustrates a block diagram of a system 100 for creating at least one de-personalized luggage manifest $\mathbf{121}^1 \ldots \mathbf{121}^x$ may be triggered by an IATA data message in accordance with one or more embodiments. The IATA data message may include a Baggage Information Message (BIM) such as without limitation a terminating baggage source message, a transfer baggage source message, and a baggage transfer message. New BIM message may be generated that can be used to extract information described herein. The BIMs are described in more detail later. The IATA data message may include Departure Control System (DCS) passenger messages (DCS-PM) as will be described later. For example, the DCS-PM may include without limitation a passenger reconciliation list (PRL) or a passenger name list (PNL), for example. Since each airline and airport have discretion on how operations are performed in the United States and in other countries, the DCS-passenger messages may be communicated and/or generated by a cloud service system or a virtual computing system.

The IATA data message is a BIM message the includes an IATA license plate, a passenger name record (PNR) locator, and a passenger name. The DCS-PM may include an IATA license plate, a passenger name record (PNR) locator, and a passenger name. However, the DCS-PM may include a unique passenger identifier (UPID) that may be used to de-personalize data.

IATA data messages may be communicated in one or more formats. For example, the messages may be sent as B-Type messaging formats. However, the IATA data messages may be sent as a Type-A messaging format, X.25 messaging format, and United Nations/Electronic Data Interchange for Administration, Commerce and Transport (UN/EDIFACT) format to name a few.

In one or more embodiments, the system 100 may include a server 148. The system 100 may use parallel streams of data for creating at least one de-personalized luggage manifest $\mathbf{121}^1 \ldots \mathbf{121}^x$.

In one or more embodiments, the IATA license plate number may become a primary key or linking index key to locate the shared security screening images (SSI) and pseudo identifier (PID) in a database, as will be described in FIG. 2B.

The server 148 may include programming modules 149. The one or more programming modules 149 may include software, hardware, firmware, or a combination of software, hardware, and firmware.

BSM Generation

A Departure Control System (DCS) 31 controls various airlines operations including airport checking in baggage (i.e., luggage items), generating a passenger bag tag identifier (BTID), and data formats for printing of bag tags. The bag tags are formatted based on rules published by the International Air Transport Association (IATA) and include a 10-digit license plate number, for example. Typically, one or more IATA data messages, PLIM or baggage source message are created that include the license plate number and flight information.

The DCS 31 may initiate the process to create the data used for the printing of the originating hardcopy bag tag at the time the passenger checks in for a flight. This may occur in a check-in window. In some instances, the check-in window is 24 hours prior to the flight time. However, not all passengers check in early. Consequently, the arrival of the BSM at system 100 may vary.

For airlines travel carriers, the IATA bag tag includes a bag tag with a standardized sequence of numbers or barcode to both identify the luggage item and match the luggage item to a passenger. If a passenger does not board a flight, their luggage item although checked in may not be loaded on the aircraft. In some instances, the luggage item may be missing. In such an instance, the baggage handling system 63 produces a baggage information message as the luggage item is transported through the baggage handling system 63.

As should be understood, the BSM data may change as the results of ordinary operation of a travel carrier, changes by a passenger, and/or inclement weather, for example, after the BSM data is created. Thus, the original BSM created at the time of check-in may not be the same as the terminating BSM sent to the system 100. The IATA data message data may change as the luggage item moves through the airport infrastructure. Some IATA data messages may be generated by a baggage handling system 63 as the baggage handling system interacts with the luggage item. Some IATA data messages are generated by the DCS.

Airport IATA Data Messages

A travel information system 108 may generate IATA data messages 152 when a luggage item (i.e., passenger luggage 138 FIG. 1B) is checked in for a passenger. The travel information system 108 may include a flight manifest 151 stored in a database associated with a computer system of an airline carrier, for example. The passenger may have more than one luggage item to be checked in. The process is essentially duplicated for all luggage items being checked for the passenger.

By way of a non-limiting example, a IATA data message may be a Baggage Source Message (BSM) as will be described in more detail in relation to FIG. 14. A travel information system 108 or other computer system associated with an airline carrier may communicate a terminating/transferring BSM to or through a destination airport. The baggage handling systems 63 may generate other BIMs according to standard operating procedures for airport handling of baggage. While the disclosure herein describes terminating/transferring BSMs, any other terminating/transferring baggage source messages now or in the future with terminating/transferring codes and an IATA license plate may be used.

The airline carriers and baggage handling systems may generate and store one or more IATA data messages 152, such as BIMs. The BIMs 152 may include one or more of a baggage transfer message (BTM), baggage source message (BSM), baggage processed message (BPM), baggage unload message (BUM), baggage not seen message (BNS), baggage control message (BCM), baggage manifest message (BMM) and baggage request (BRQ). The bag tag number is part of the baggage messages. In one or more embodiments, the BIMs may include the passenger's name and PNR number. This allows other information to be accessed based on the bag tag number (i.e., the IATA license plate number).

The travel information system 108 may include a IATA data message communicator 153 configured to communicate one or more IATA data messages to and/or for reception by server 148. In one or more embodiments, the IATA data message 152 and the IATA message communicator 153 may be associated with a computer system or server system that is associated with an airline travel carrier or a BHS 63. The IATA data messages may include other messages that indicate the status of a luggage item. The IATA data messages may be retrieved by server 148 by upload or download operations.

The server 148 may include programming instructions, which when executed cause the reception of the IATA data messages, such as terminating BSMs, a transferring BSM, a BTM, by a IATA data message receiver 158 of the programming modules 149. The IATA data message receiver 158 may be a terminating/transfer IATA data receiver. The terminating/transfer IATA data message may be for the air carrier at an airport where the flight carrying the checked-in luggage item terminates at a final airport destination, as an example. At the final airport destination, the luggage item will leave the airport infrastructure. In one or more embodiments, the luggage item leaving the airport infrastructure may be traveling next on a second mode of travel. The terminating airport coding in a terminating BSM is described in relation to FIG. 14. The IATA data message receiver 158 may include programming instructions, which when executed cause the receiver to receive messages based on a baggage source indicator that denotes a terminating IATA data message.

Security Screening Assistant Trigger

The terminating IATA data message with a flight number match may be used to trigger a security screening integration assistant system 190 (FIG. 16) to expedite or bypass security screening of luggage items through the Customs authority and/or for the next vehicle of travel. In one or more embodiments, the security screening integration assistant system 190 may be used as a SS computer station 372.

The inventor has determined that the IATA license plate may be used as a linking key to airline information to build a de-personalized luggage item manifest record to provide de-personalize security screening image (SSI) file sharing data 306A, 306B for access to security images and data 113 or 113' (FIG. 2B-2C) previously captured by a security screening (SS) imaging machine 45, 50 used to clear the luggage item for boarding an air carrier in another country or to cross a border by exiting an airport in a border-crossing country the luggage item has arrived at by way of an air carrier. While the process is described in relation to air travel carriers, the processes can apply to other travel carriers.

After check-in and custody transfer, the luggage item, before being loaded into the cargo hold of an airplane, is sent through an automated conveyor system of a first security screening machine system (FSSMS) 40 in a security tracking zone 37. The initial screening process may be performed by large X-ray machines, as will be described in more detail in FIG. 16. These machines may be designed to detect a range of materials, including explosives and other contraband. Baggage may be screened using dual-energy X-ray systems that allow security personnel to differentiate between organic and inorganic materials based on their atomic number. This may help in identifying potentially dangerous substances. If the X-ray scan shows something suspicious, the bag may be diverted for further inspection. This usually involves a physical inspection by a trained security officer and may also involve the use of more advanced scanning technologies like CT (Computed Tomography) scanners (i.e., CT imaging machine 45, 50), which can provide a more detailed, 3D images of the bag's contents. In some cases, explosive trace detection (ETD) machines may also be used. These machines can detect traces of explosives on the outside of the bag or on the items inside the bag. In one or more embodiments, screening may swab the bag or item and then analyze the swab for any explosive residue.

The security tracking zone 37 may include at least one automatic tag reader (ATR) 68 to scan the originating hardcopy bag tag affixed to the luggage item or to receive a radio frequency identifier (RFID) from an RFID bag tag. The automatic tag reader 68 may include a laser scanner to scan a barcode of the license plate printed on the originating hardcopy bag tag. The automatic tag reader 68 may include a receiver to receive an RFID representative of the license plate number. Alternately, different types of automatic tag readers may be employed in the zone 37.

The security screening images (SSI) such as 3D images and data are stored in a non-transitory, tangible memory 113. As used herein, the SSI and data and the hardware for storying the SSI and data may both be referred to by the same reference numeral 113. The FSSMS 40 activities may be governed by rules and regulated of the TSA, such as in the United States, another governing agency of a country or another approved contractor. However, the contents within checked in luggage items may be different for luggage items brought onboard a cruise ship, allowed in a resort, or in some countries.

Each country may have different security screening rules.

Figure 16:
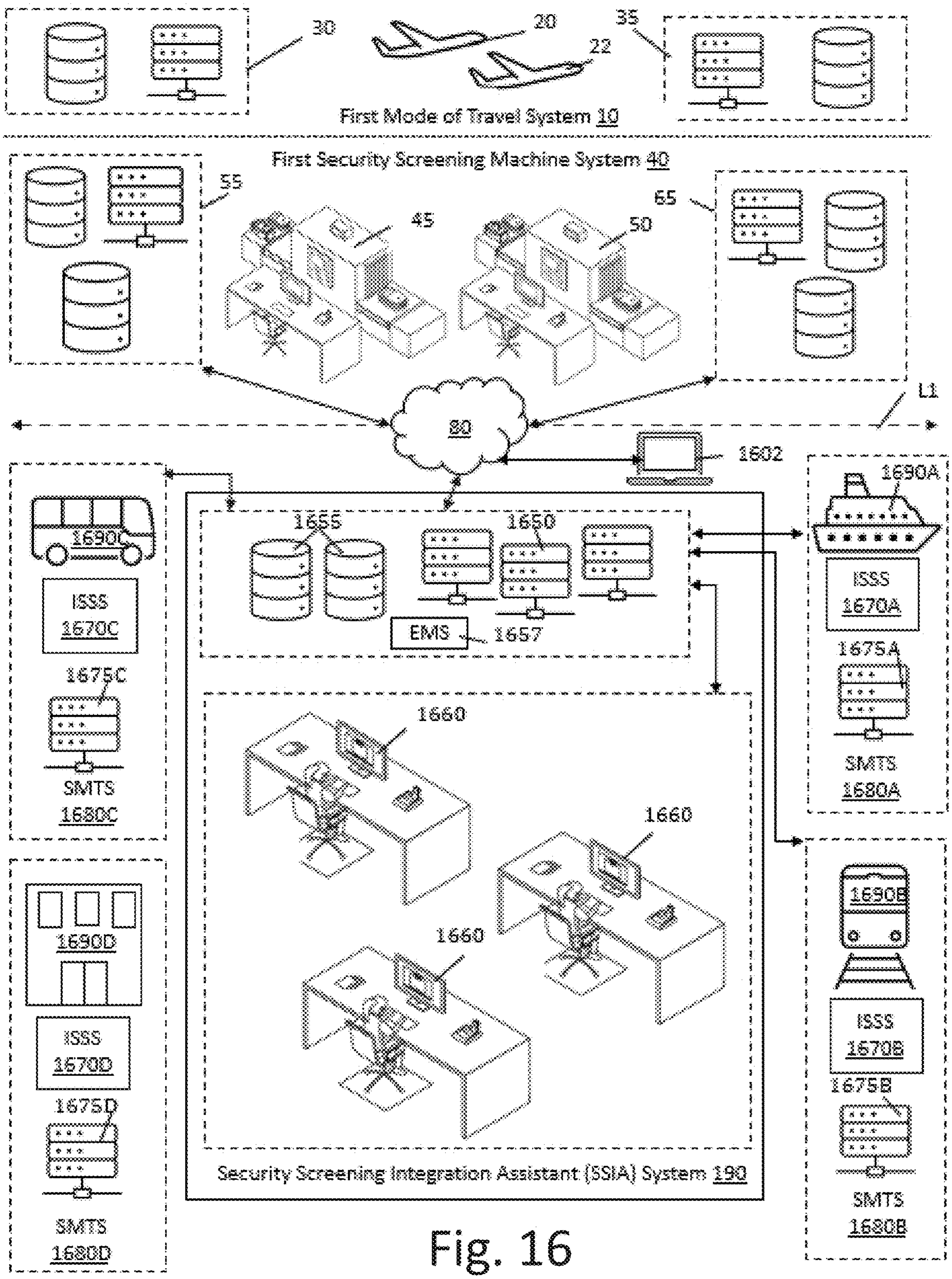
FIG. 16 illustrates a security screening integration assistant (SSIA) system in accordance with an embodiment.

By way of a non-limiting example, the security screening integration assistant (SSIA) system 190 is described in relation to FIG. 16 and may be used to assist in the bypass of the security screening performed independently by the cruise ship, train station, bus station, resort, or lodging entity, where the secure custody of a luggage item from a cargo hold of an air carrier may be transferred to a trusted custody handler to maintain security integrity of the luggage item for its next mode of travel. This may reduce the processing by the security screening lines at the cruise ship, train station, bus station, resort, or lodging entity. More importantly, reducing the processing of previously screened luggage items that have remained in trusted custody can limit the need to alter the algorithms for security screening to speed up processing lines or reduce the effectiveness of the security screening because of long lines that cause passengers to miss their connective flight or other travel journey arrangements to get through the Customs authority.

The programming modules 149 may include a security screening trigger generator 170. The security screening trigger generator 170 may have programming instructions which when executed may cause triggering of the security screening integration assistant (SSIA) engine 175 and/or a security screening integration assistant (SSIA) system 190 (FIG. 16). The trigger may identify those luggage items that need to go through security screening for the next vehicle of travel based on matches between a passenger in the manifest MX and a terminating BSM or IATA data message, for example. The security screening trigger generator 170 may generate a trigger to expedite the processing of the security screening image and data file from the FSSMS 40 of the originating air carrier, for example, before the luggage item is off-loaded from the air carrier cargo hold. This may save valuable machine resources by eliminating the need to unnecessarily reimage luggage items that have TSA quality images already with useful information for the next vehicle of travel. By way of a non-limiting example, security screening images from those countries with TSA screening quality imaging of the same level or higher may be used for luggage items entering a border-crossing airport of the United States. The process described herein for luggage items entering the United States may also apply to luggage items entering other countries using approved shared security screening imagery.

The security screening trigger generator 170 may have programming instructions which when executed may cause triggering of the security screening integration assistant (SSIA) engine 175 where the trigger may identify those luggage items that need to go through customs screening by a Customs authority when entering a country. The system 100 may be configured to build at least one de-personalized luggage manifest $\mathbf{121}^1 \ldots \mathbf{121}^x$ for a flight arriving at a border-crossing airport.

In an example, a de-personalized luggage manifest $\mathbf{121}^1 \ldots \mathbf{121}^x$ may include a list of de-personalized LIM records, PIDs and/or SSI file names linked to stored luggage item images of those luggage items terminating the airport infrastructure of a border-crossing airport. The list may be sent to a SS computer workstation of the Customs authority or other governmental authority.

In an example, a de-personalized luggage manifest $\mathbf{121}^1 \ldots \mathbf{121}^x$ may be for the Customs authority for those luggage items terminating the airport infrastructure of a border-crossing airport and include a notation for those luggage items that will be handled by a trusted custody to a second mode of travel to expedite or bypass security screening of the second mode of travel with the de-personalized shared image data.

As will be described in relation to FIG. 1C, a de-personalized luggage manifest $\mathbf{121}^1 \ldots \mathbf{121}^x$ may be for the Customs authority for those luggage items transferring to another air carrier at the border-crossing airport.

Airport Terminating IATA Data Message Processing

The system 100 may include non-transitory, tangible memory device 162 for storing the received IATA data messages (i.e., terminating BSM). The programming modules 149 may include a IATA data message receiver 158 and one or more IATA data message processing modules 160. Each received IATA data message may be processed by the one or more IATA data message processing modules 160. The IATA data message processing modules 160 may include programming instructions, which when executed cause a IATA data message sorter 164 to sort the IATA data messages to isolate the terminating BSM. The sorting may include sorting by one or more of terminating location or airport location code associated with a border-crossing airport, day, time of arrival, or travel carrier. This may set a resource schedule for handling the luggage volume so that the luggage item's travel journey experience is on schedule.

The IATA data message processing module 160 may include one or more message sorters 164. The message sorter 164 may include programming instructions, which when executed cause sorting of the IATA data message to find those IATA data messages with matching terminating airport codes associated with a border-crossing airport, and/or flight number, on any given day or hour, to build luggage manifests of luggage items of passenger's terminating at the terminating airport in a border-crossing country and using the system 100 for luggage handling and delivery, customs clearance and/or security clearance handling.

In one or more embodiments, the luggage item that is terminating at a border-crossing airport may be required to undergo a Customs screening. In another example, the luggage item that is terminating at an airport may be required to undergo a security screening for one of a lodging entity or another vehicle of travel.

Figure 14:
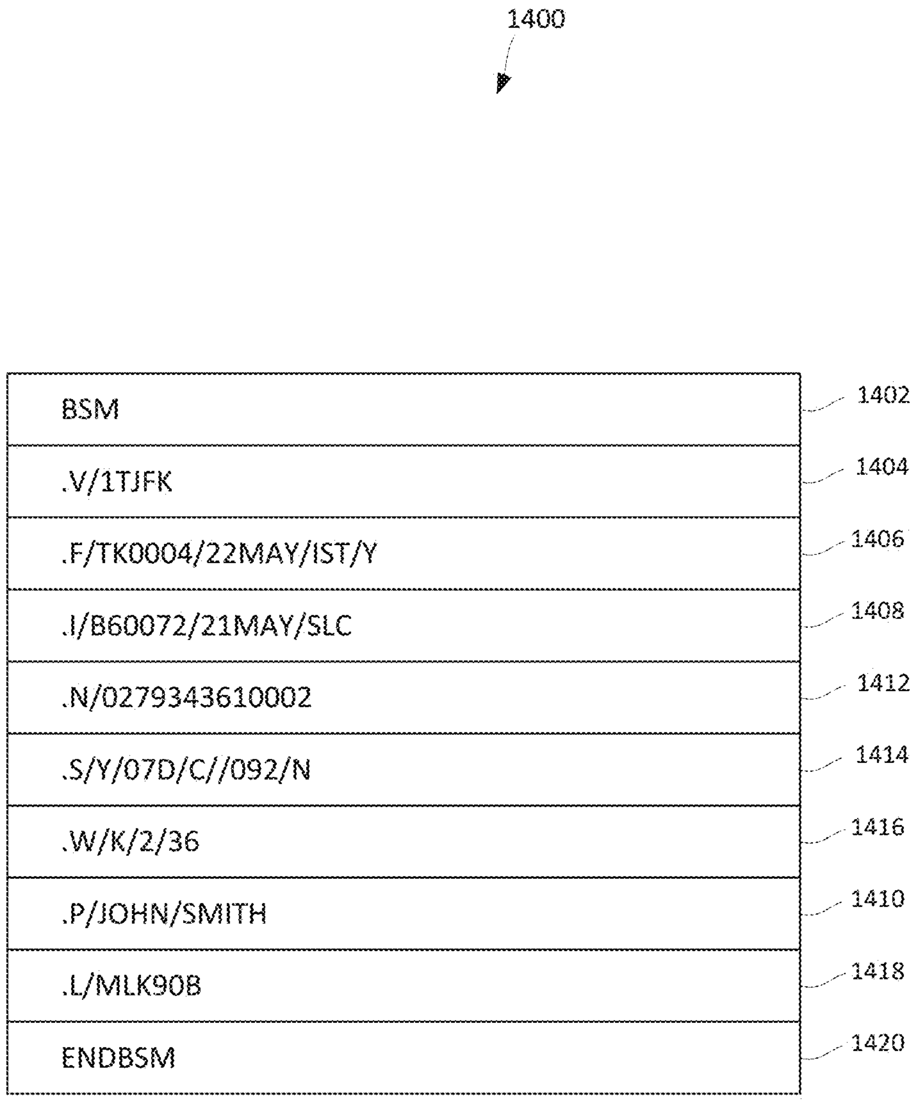
FIG. 14 illustrates a conventional baggage source message (BSM) for an airline carrier.

IATA data messages, such as BSMs, may include a baggage source indicator, as described in FIG. 14, that indicates a terminating BSM and non-terminating BSM. Non-terminating BSMs or IATA data messages may be one of local, transfer and remote, as described in relation to FIG. 14.

By way on a non-limiting example, system 100 may include the programming modules 149 that may include programming instructions, which when executed may be configured to receive IATA data messages from each airport and start the sorting and matching from the received IATA data messages according to the schedule of the airport and operating times. Some airports are border-crossing airports. Those airports which do not receive international flights may not require Customs screening.

In one or more embodiments, the matching by one or more IATA data message matchers 166 may include programming instructions, which when executed may cause matching, by the at least one processor, airline information and/or a flight number in a received BSM or IATA data message with the airline information and the flight number in a manifest MX for a second mode of travel different from the first mode of travel or flight manifest 151. The airline information may include an airport code. In some embodiments, the luggage item may be terminating from a first mode of travel to a second mode of travel. However, it may remain in trusted custody to bypass or expedite security screening by the second mode of travel as will be described in relation to FIGS. 10A-10B and 11A-11B.

In one or more embodiments, the matching by one or more IATA data message matchers 166 may include programming instructions, which when executed may cause matching, by the at least one processor, airline information and/or a flight number in a received terminating BSM or IATA data message with the airline information and the flight number in a flight manifest associated with the airline code of a flight number.

The system 100 may build de-personalized luggage manifests $\mathbf{121}^1 \ldots \mathbf{121}^x$ to handle the luggage items so that the luggage items can be virtually screened to clear the Customs authority, for example, while transferring certain information concealed.

The IATA data message processing module 160 may include programming instructions, which when executed cause one or more IATA data message data extractors 168 to extract luggage identifiable information (LII) from the IATA data message and provide the data to the luggage item manifest record creator 185. For example, extracted information may include the IATA license plate number. The luggage item manifest (LIM) record 186 may include an entry of the license plate number from the IATA data message.

In one or more embodiment, extracted information sent to the luggage item manifest record creator 185 may include the IATA license plate number, the passenger's name, and/or a passenger name record number. The luggage item manifest record creator 185 may include programming instructions which when executed causes a LIM record 186 to be populated with the IATA license plate number, the passenger's name, and/or a passenger name record number. By way of a non-limiting example, data from the LIM record 186 may be used to update data in a manifest MX of a second mode of travel.

The LIM record 186 as described later may be updated with location data from a scanning device, itinerary data, or reservation data. The LIM record 186 may include a tracking device identifier associated with the luggage item.

The security screening trigger generator 170 may include programming instructions which when executed interfaces with the luggage item manifest record creator 185 to generate a trigger for those luggage items requiring customs screening or security screening and trigger the SSIA engine 175.

Figure 2A:
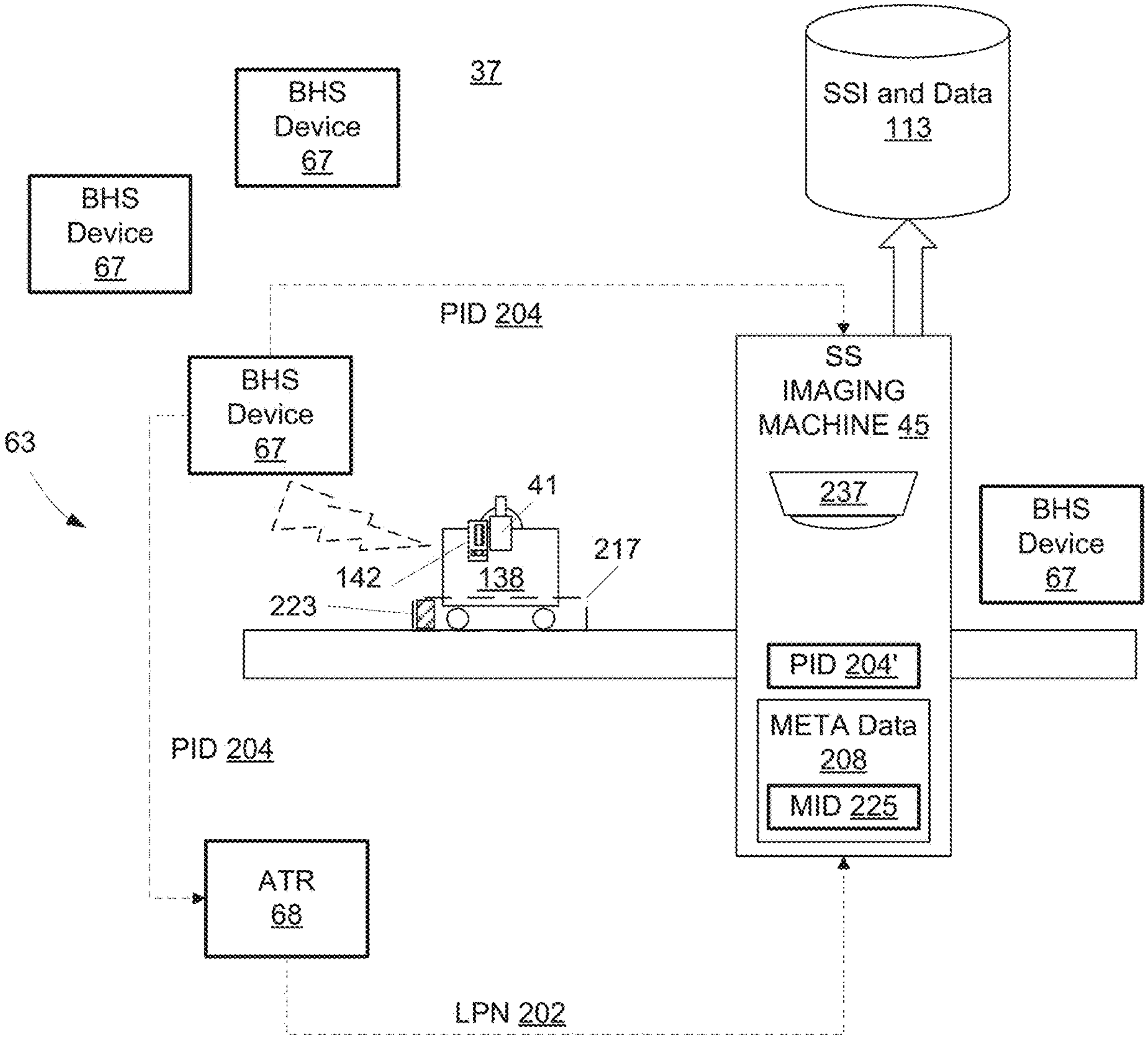
FIG. 2A illustrates a block diagram of a security tracking zone.
Figure 2B:
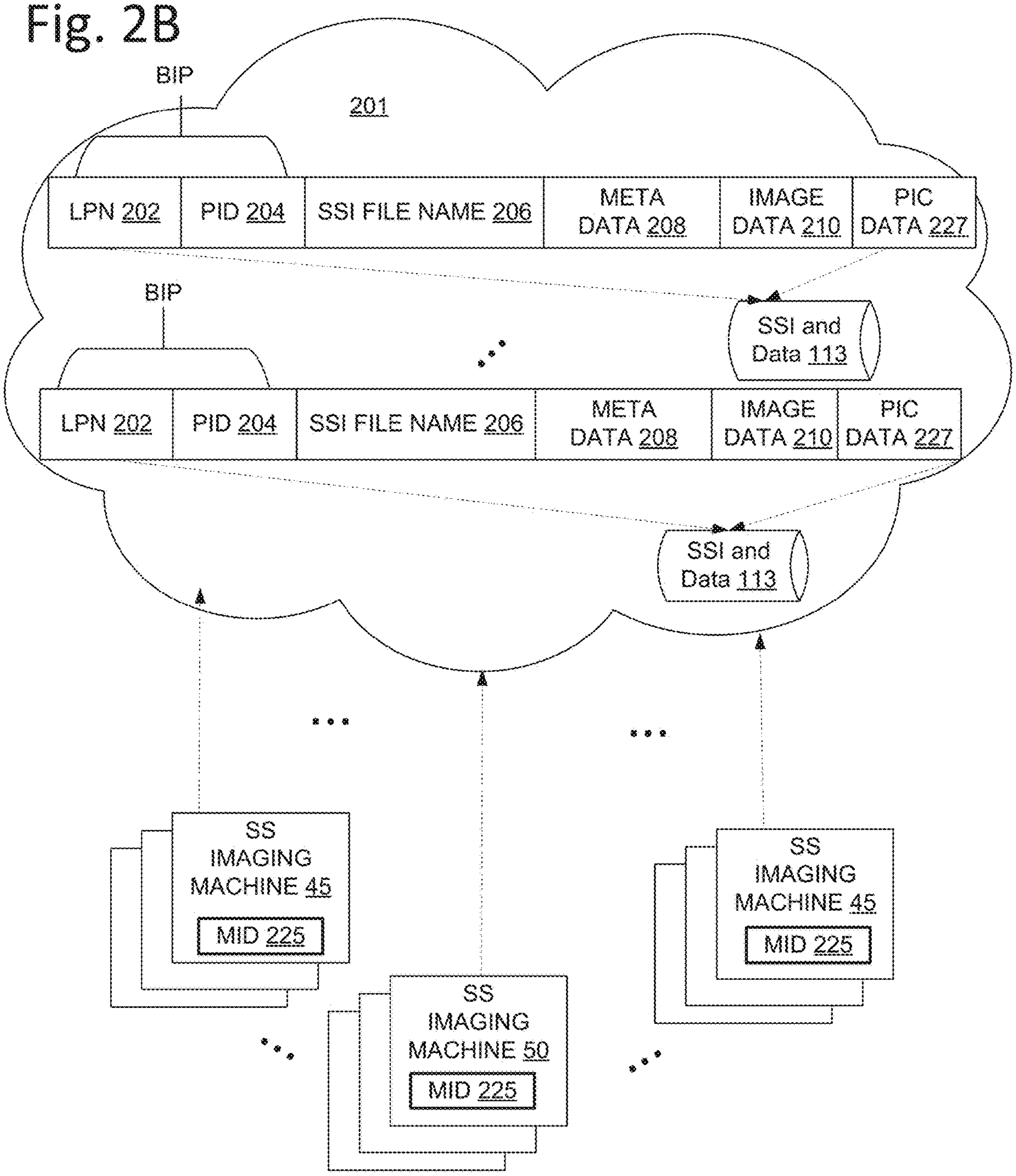
FIG. 2B illustrates a block diagram of a cloud data storage of the security screening image and data generated in the security tracking zone in accordance with an embodiment.

The luggage item manifest record creator 185 may include programming instructions, which when executed may cause at least one processor to query a database to locate the PID, as described in FIGS. 2A-2B, associated with the IATA license plate number for the flight number landing at a border-crossing airport. The luggage item manifest record 186 may include the PID 204 or 204' and the related luggage item's license plate number 202 (FIGS. 2A-2B). In one or more embodiments, the luggage item manifest record 186 may include a translated PID 204" (FIG. 2C) and the related luggage item's license plate number 202 (FIGS. 2A-2B) that was matched to the IATA data message. In one or more embodiments, the luggage item manifest record 186 may be encrypted and secure to maintain a secure link between the PID 204 or 204' and the related luggage item's license plate number 202. For example, in a situation where a luggage item does not clear Customs authority or security clearance in another country using de-personalized data, the luggage item may need to be identified. The luggage item's license plate number 202 or other unique global identifier may be extrapolated from the de-personalized data to track down the luggage item.

The programming modules 149 of the SSIA engine 175 may include a LIM record de-personalizer 188, a de-personalized SSI file sharing package assembler 192, and a de-personalized SSI file sharing data package communicator 194.

The LIM record de-personalizer 188 may include programming instructions, which when executed cause de-personalization of a LIM record 186 to be added into a de-personalized manifest $121^1 \ldots 121^x$. The de-personalization of the LIM record 186 will be described in more detail in relation to FIGS. 4A and 9A-9B. The LIM record de-personalizer 188 removes identifying information from luggage identifying information that is associated with the passenger. Those files that hold the key to the passenger identifying information such as an IATA license plate number and a PID are encrypted and/or stored in memory that has very limited access to protect the identity of the passenger. The LIM record 186 may be encrypted to protect an identify of the passenger based on the IATA license plate number.

The de-personalized SSI file sharing package assembler 192 may include programming instructions, which when executed assemble data from the de-personalized LIM record 186 to be sent to the SS computer station 372, where the data (i.e., de-personalized file sharing data) is configured to provide access one of the SSI and data 113 (FIG. 2B) using an SSI viewing application or a generated contents list.

Figure 3A:
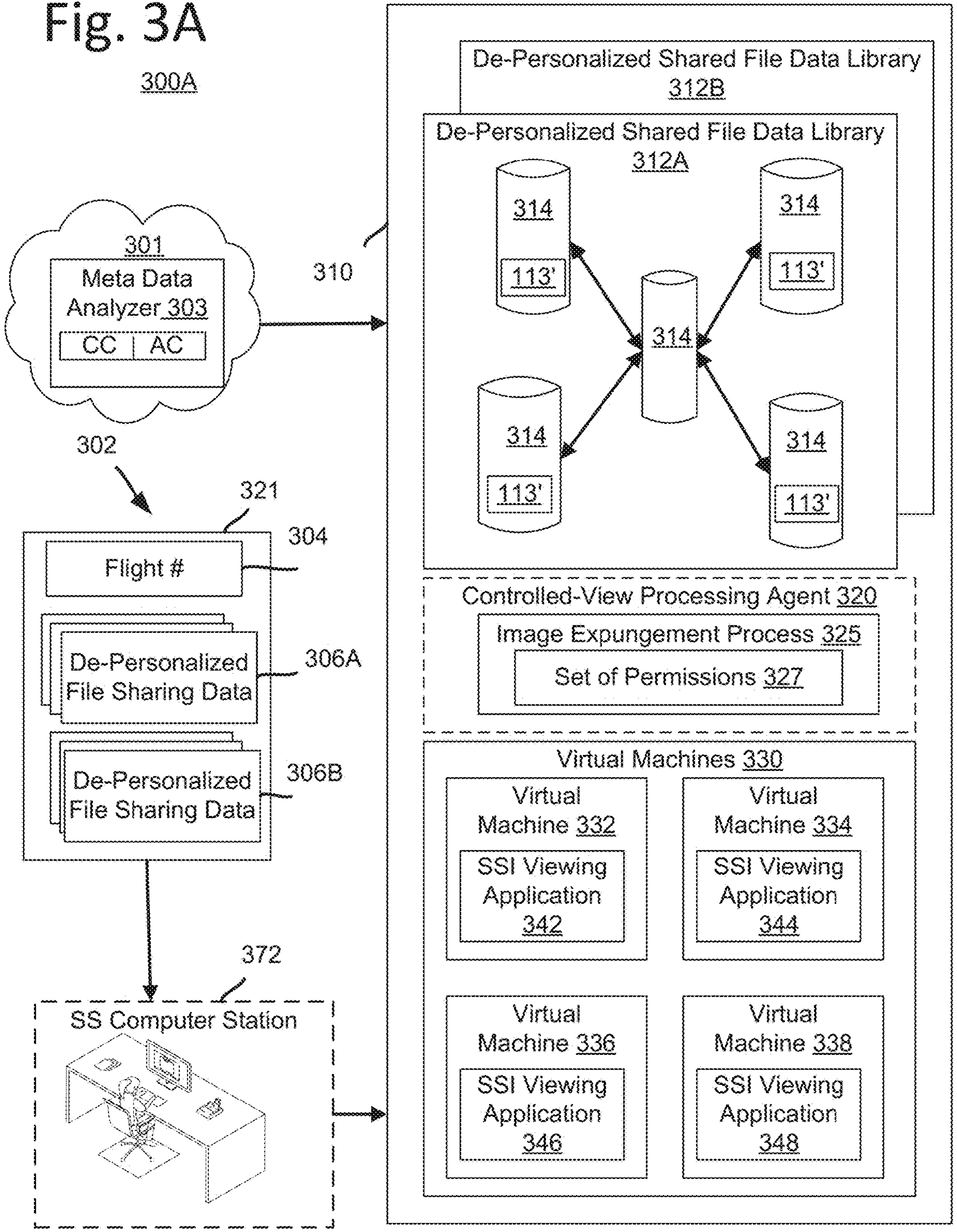
FIG. 3A illustrates a block diagram of a virtual security screening image sharing system in accordance with an embodiment.
Figure 3B:
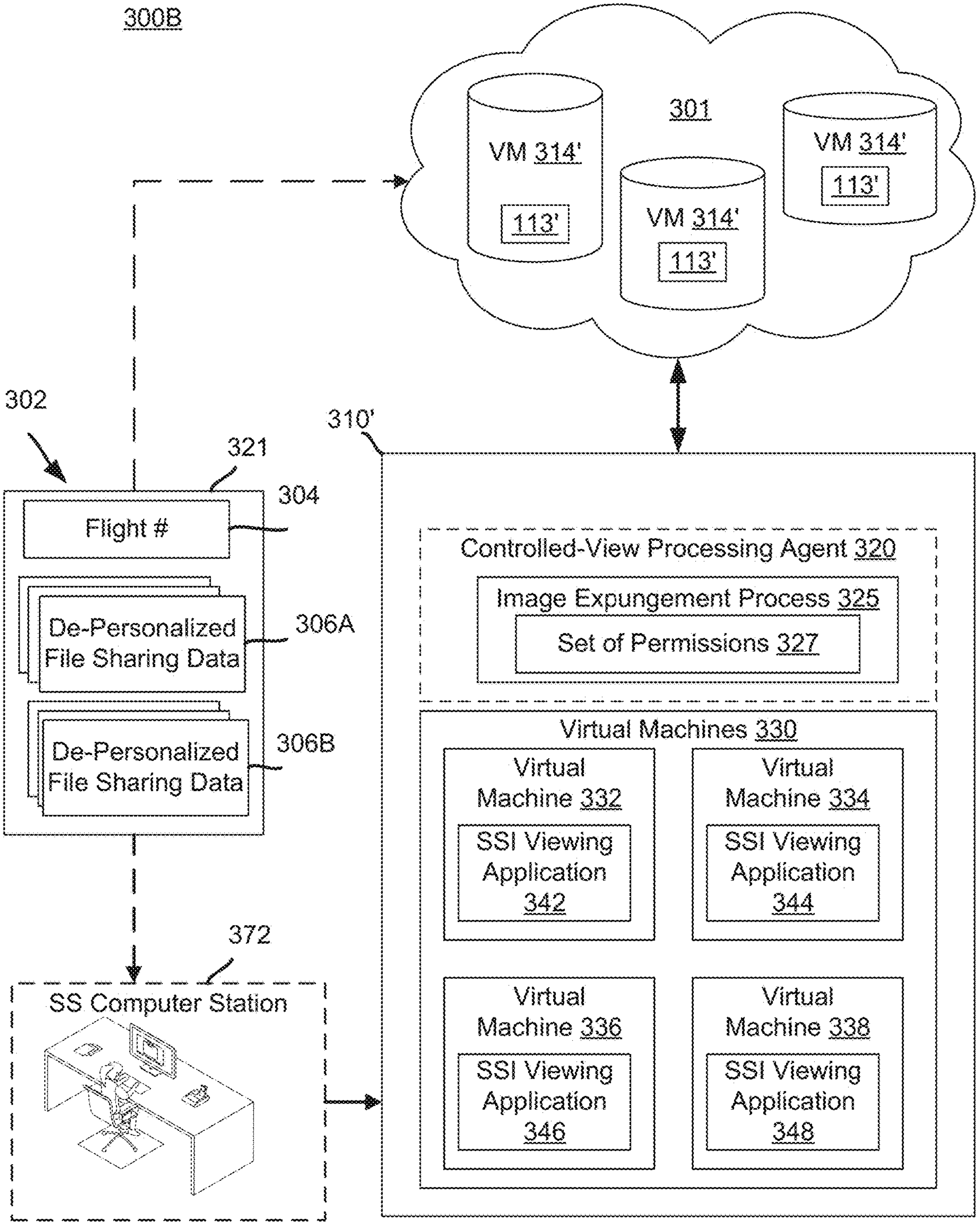
FIG. 3B illustrates a block diagram of a virtual security screening image sharing system in accordance with an embodiment.
Figure 3C:
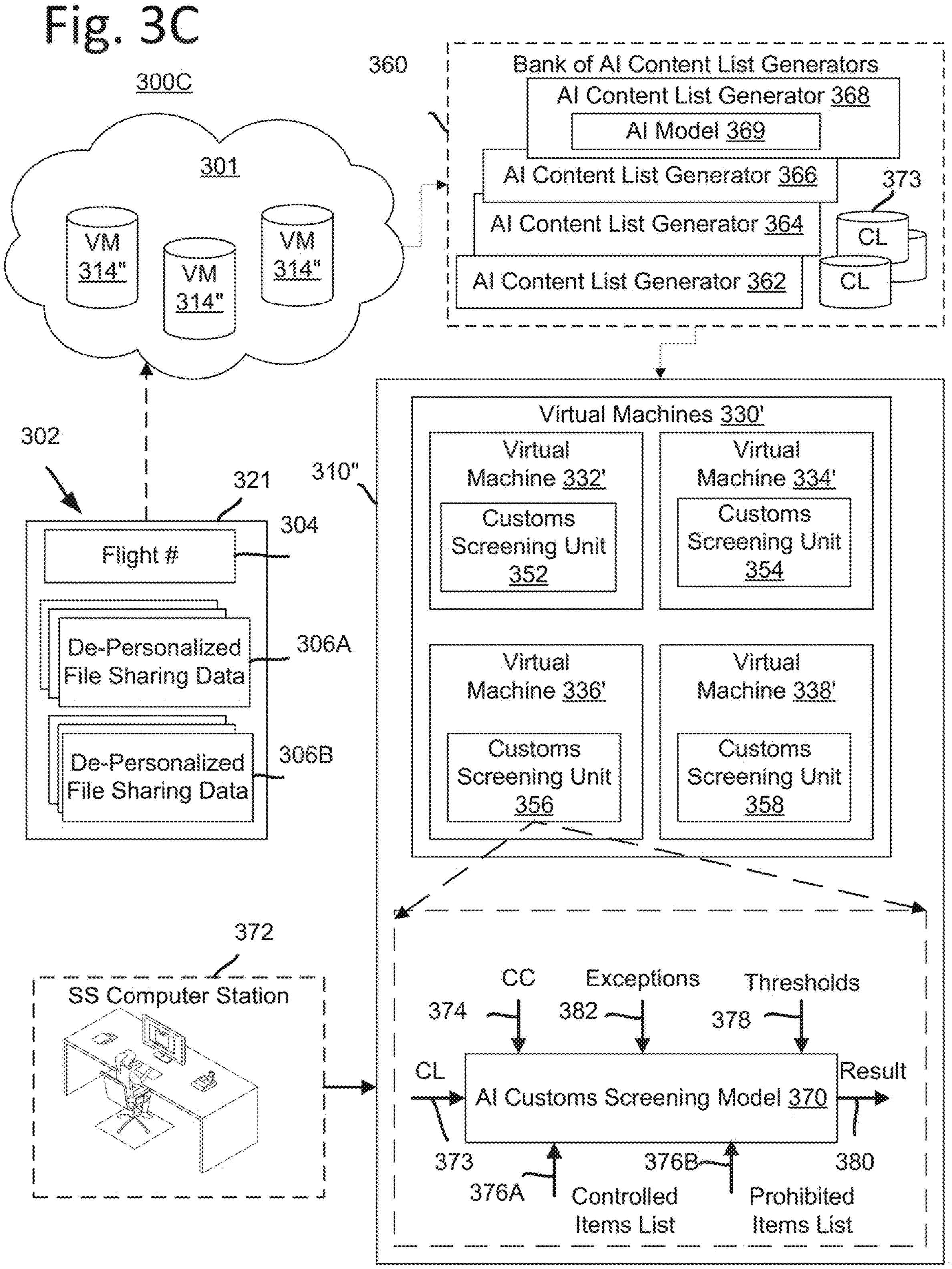
FIG. 3C illustrates a block diagram of a virtual security screening image sharing system using a content list in accordance with an embodiment.

The de-personalized SSI file sharing data package communicator 194 may include programming instructions, which when executed cause a network interface to communicate the assembled de-personalized file sharing data to a SS computer station 372 (FIG. 3A-3C).

With respect to FIGS. 1A and 4B, the LIM record de-personalizer 188 may include programming instructions, which when executed may cause de-personalizing, by at least one of the at least one processor, the security screening image file sharing data by linking the PID 204, 204' or 204" (FIG. 2A-2C) with a hyperlink to the database or a secondary shared memory location to access the security screening image and data 113 or 113' or a contents list 373 (FIG. 3C) of the contents within a volume of space within the luggage item. In one or more embodiments, the de-personalized security screening image file sharing data 306A or 306B may include the PID 204 with a hyperlink 954 embedded to the PID text sequence.

The LIM record de-personalizer 188 may include programming instructions, which when executed may cause de-personalizing the security screening image file sharing data by embedding, by at least one of the at least one processor, the hyperlink in text of the PID 204, 204' or 204", where the hyperlink providing access to the SSI and data 113 or 113' in the database or the secondary shared memory location. In one or more embodiments, the text of the PID may have the hyperlink embedded to the PID text sequence.

Figure 9A:
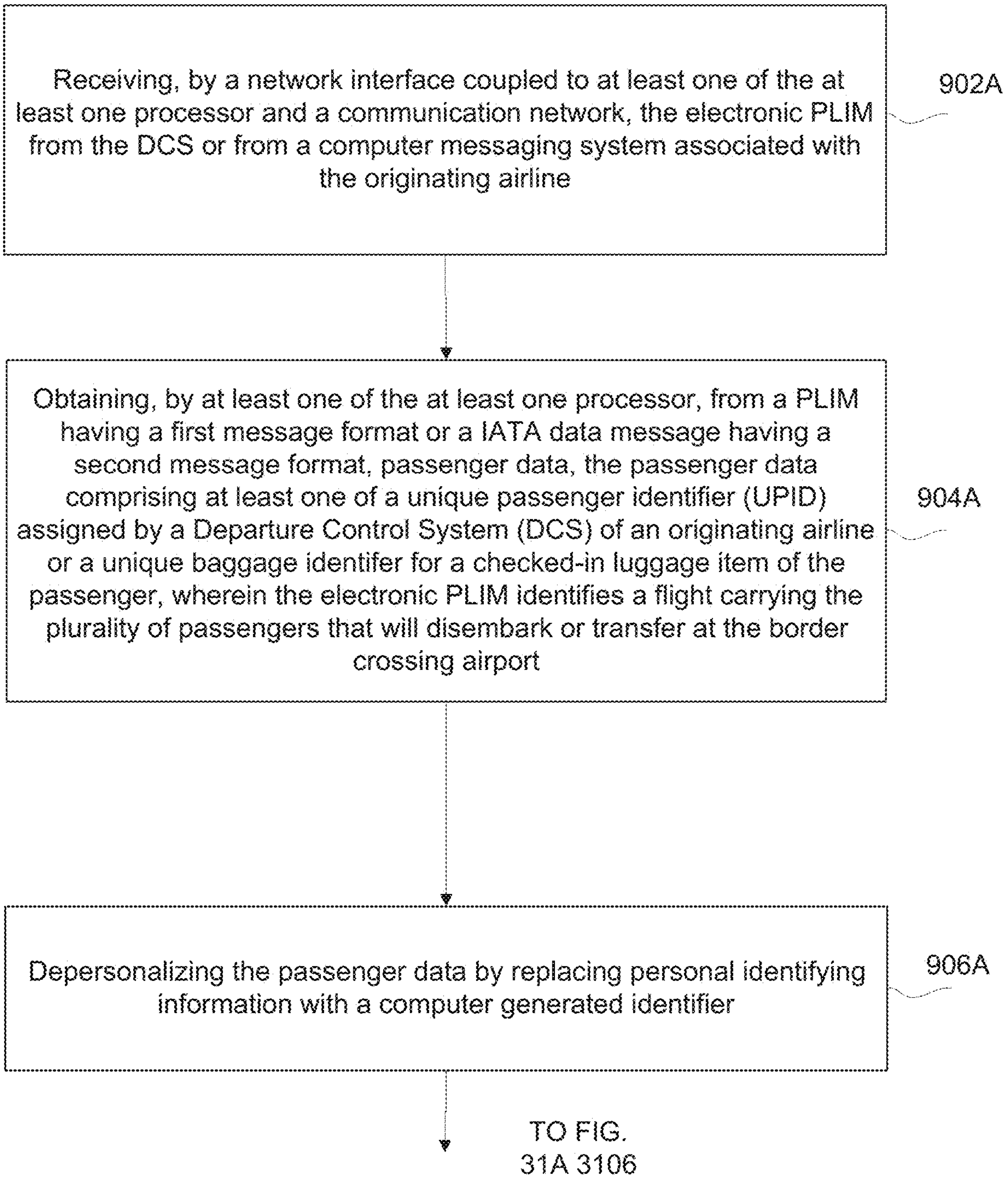
FIG. 9A illustrates a flowchart of a method for de-personalizing passenger list information message data from passenger list information messages (PLIMs) or International Air Transportation Association (IATA) data messages in accordance with an embodiment.
Figure 9B:
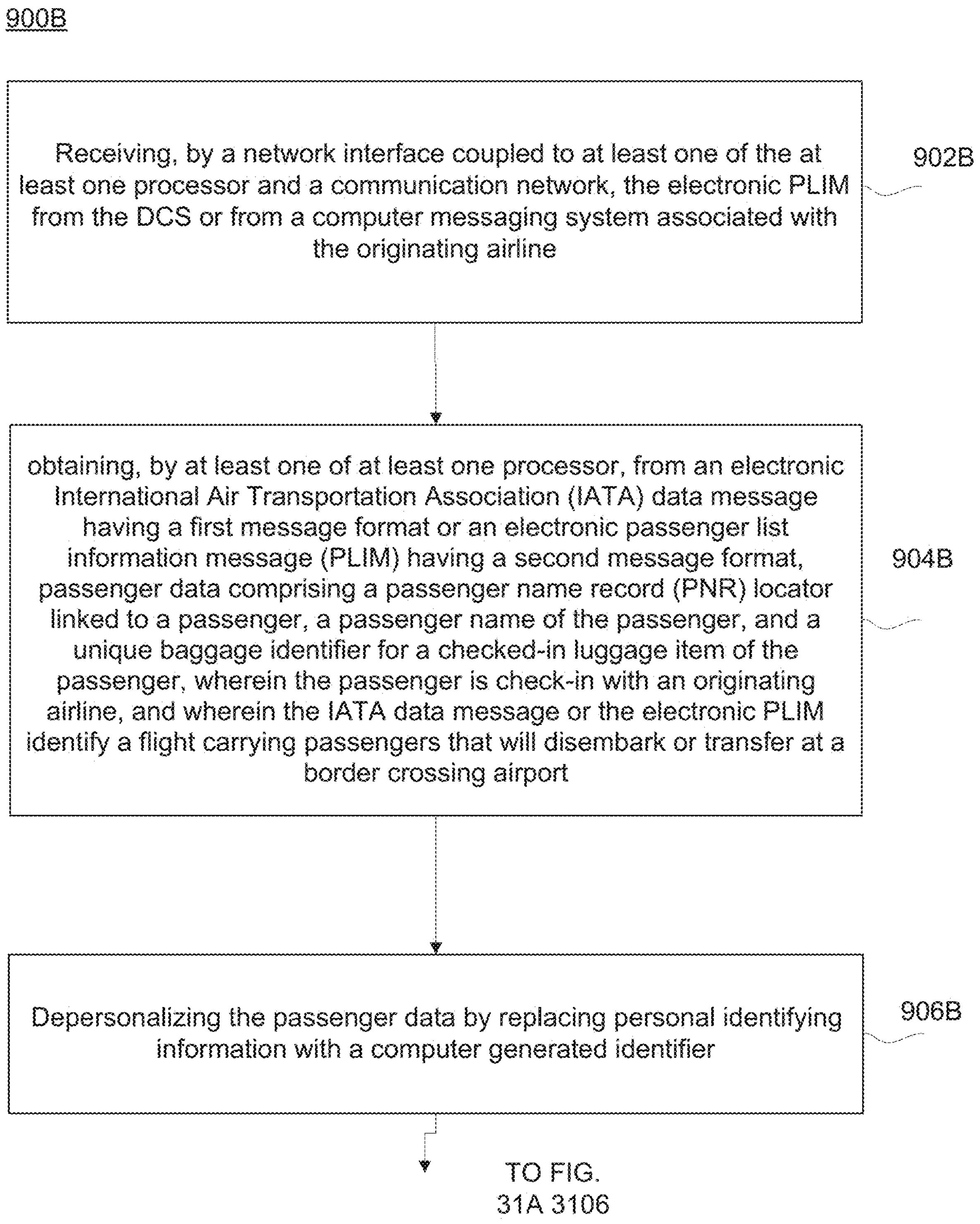
FIG. 9B illustrates a flowchart of a method for de-personalizing passenger list information message data from PLIMs or IATA data messages in accordance with an embodiment.

Referring also to FIG. 9B, the de-personalizing the security screening image file sharing data may include the PID 204, 204' or 204" (FIG. 2A-2C) and a file name of the shared security screening image and data 113 or 113', hereinafter referred to as "SSI file name" (FIG. 2B). The LIM record de-personalizer 188 may include programming instructions, which when executed may cause de-personalizing the security screening image file sharing data 306A or 306B (FIG. 3A-3C) by embedding, by at least one of the at least one processor, the hyperlink 954' in the text of the SSI file name 206 or 206', where the hyperlink 954' provides access to the SSI and data 113 in the database or the secondary shared memory location. In one or more embodiments, the text or characters of the PID 204, 204' or 204" may alternately, or in addition to, have the hyperlink 954' embedded to the PID text sequence. The text sequence may include alphanumerical characters. In some embodiments, the text may include special characters.

In one or more embodiments, the de-personalized luggage manifest $121^1 \ldots 121^x$ may include one at least one of the PID 204, 204', 204" for the luggage item or the SSI file name 206 or 206'. Furthermore, security screening trigger generator 170 may include programming instructions which when executed may generate a trigger to be sent, using wired or wireless communication protocols, to a security screening integration assistant (SSIA) system 190 (FIG. 16). In one or more embodiments, the SSI file name 206 may be converted to an encoded file name, as described in relation to FIG. 8. The encoded file name may be encoded with personal identifiable information (PII) of the passenger. By way of a non-limiting example, encoded file name may be encoded with a passengers birth data as a sequence of numerical digits. For example, a portion of the image's file name may include the passengers date of birth. Other PII may include a passport number, a government identification number, a driver's license number or other global identifier.

In one or more embodiments, based on a match, a security screening integration assistant (SSIA) process 405 (FIG. 4) may be performed by the SSIA engine 175 when triggered. This process may be performed within system 100 or by a remote system (i.e., SSIA system 190). The SSIA engine 175 may include programming instructions which when executed may perform the steps of blocks 406, 408 and 410 of FIG. 4.

Figure 1B:
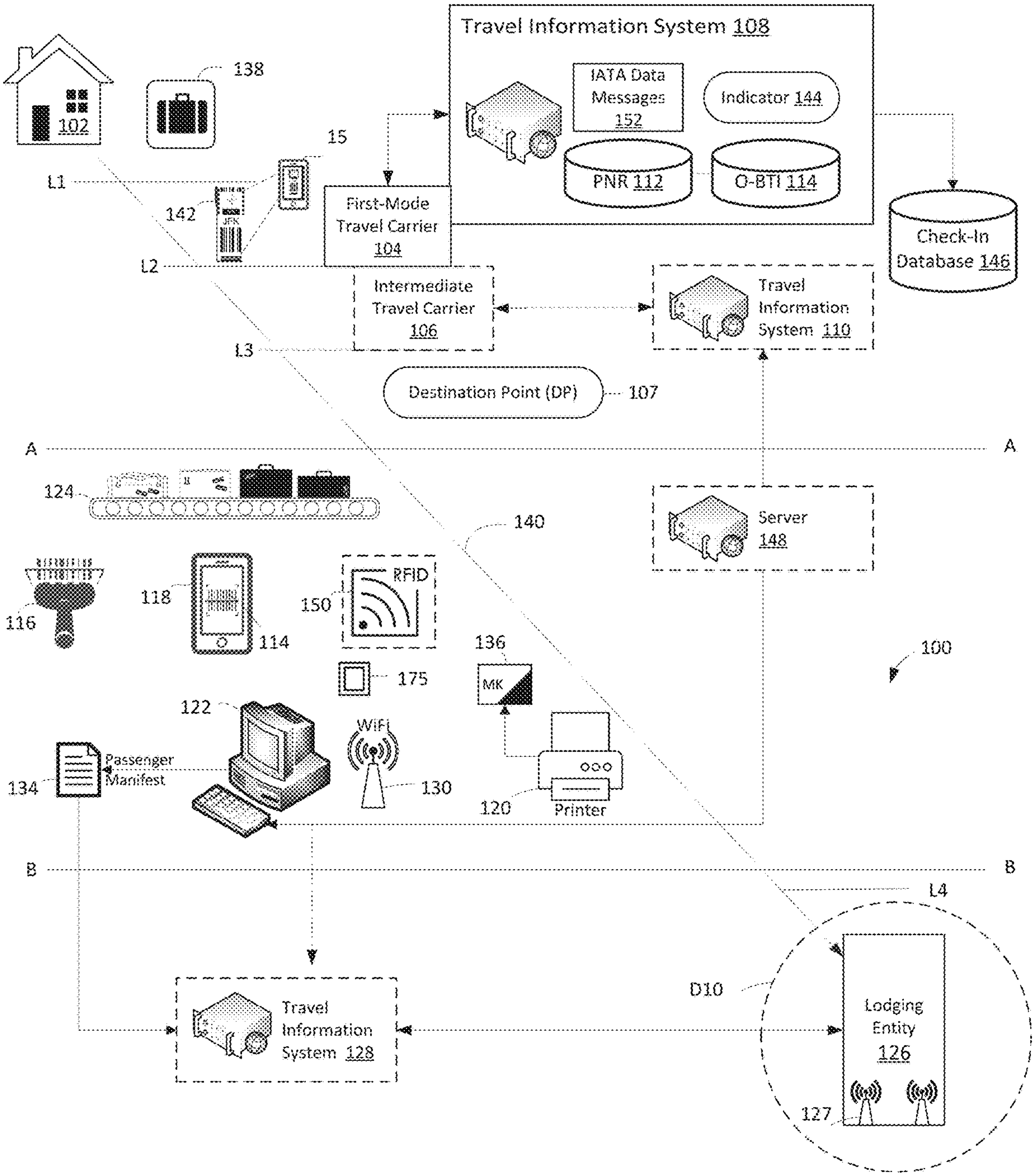
FIG. 1B illustrates a block diagram of a system for checking in a passenger for return legs of travel in accordance with an embodiment.
Figure 1C:
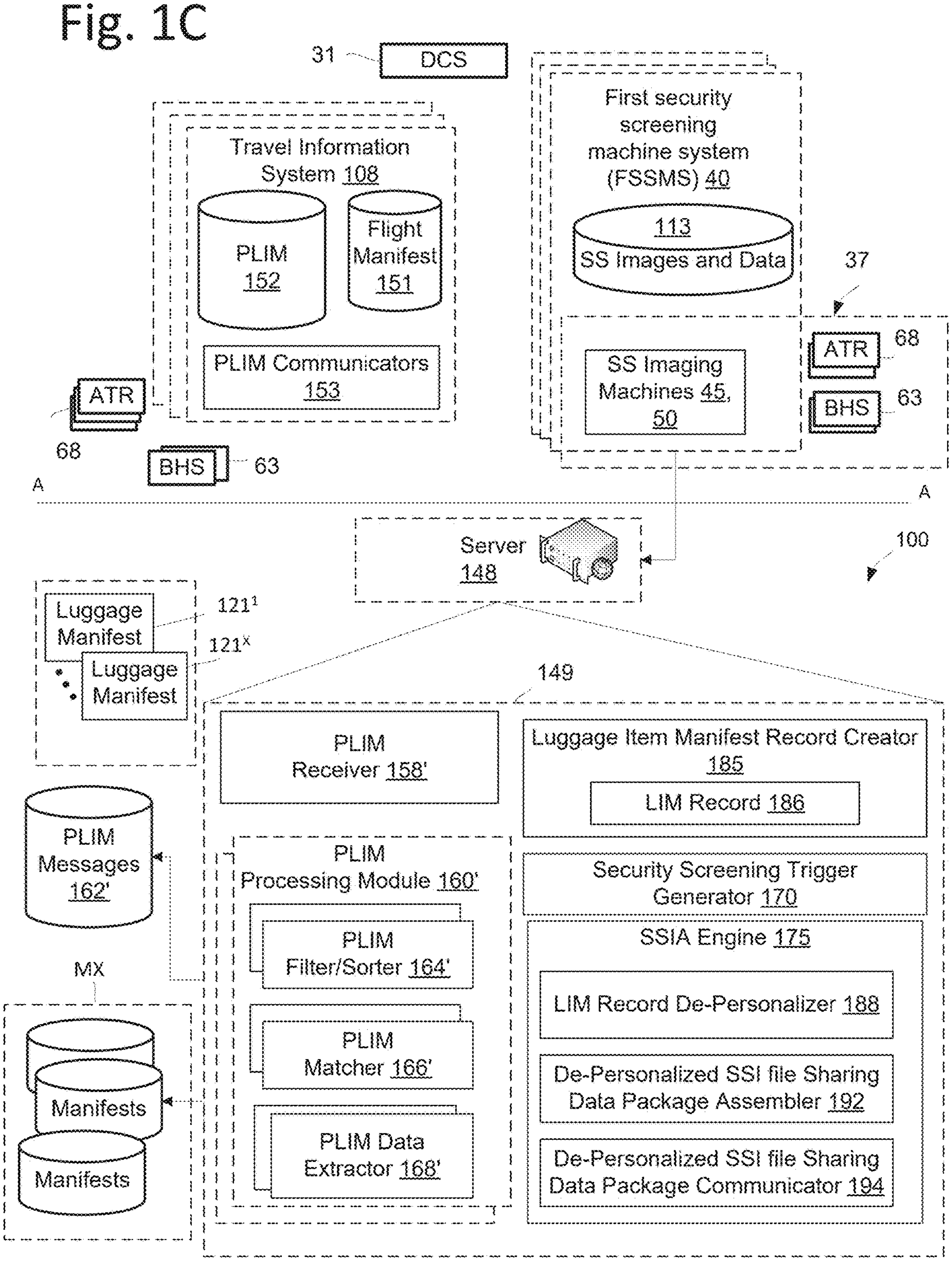
FIG. 1C illustrates a block diagram of a system for creating at least one de-personalized luggage manifest triggered by passenger list information messages (PLIMs) in accordance with an embodiment.

FIG. 1C illustrates a block diagram of the system 100 for creating at least one de-personalized luggage manifest triggered by a passenger list information messages (PLIMs) in accordance with an embodiment. The PLIMs may be received based on a flight reservations, for example. FIG. 1C is similar to FIG. 1A, so only the differences will be described in detail.

For example, the PLIM may be created for a particular flight and board point produced by an airline's reservation system at a point in time that is prior to departure of the flight, such as provided by the passenger name list (PNL). The PLIM may be provide details of the checked-in passengers that actually boarded a flight, such as provided by the passenger reconcile list (PRL). The PLIM may be provide details about booked and actual passengers that loaded on the flight, such as provided by the passenger final sales (PFS) message.

Depending on the bilateral agreement with each country, the data required in the PLIM may vary. The PNR locator can be assigned to multiple passengers. Therefore, the PNR locator in some instances is not unique to only one passenger name. Therefore, to uniquely identify each passenger, a unique passenger identifier (UPID) is generated by various systems.

The PLIM may include Advance Passenger Information (API) system (APIS) messages, such as described in "Message Implementation Guidelines For Airlines UN/EDIFACT PAXLST/CUSRES Message Sets" v.2. The guidelines are updated periodically. The PLIMs of different formatted messages may have different headers and syntax. For example, an APIS type message may uses a beginning of message code "BGM". The passenger name list PAXLST may be filtered by "BGM+745". The "BGM" represents beginning of message. The number "745" is a document code name for the passenger name list message. The message may have many parts. For example, each passenger may have a part that includes passenger data. The APIS message may have a PNR locator number and a unique passenger reference identifier that is required by DHS or other countries. The unique passenger reference identifier is a UPID, as used herein. The PNR locator and UPID and IATA bag tag number may be extracted according to the syntax identified for PAXLST/CUSRES. These messages also include flight information, airport codes, etc. using UN/EDIFACT codes, for example, or other agreed upon terms. Examples are shown in related to PNRgov messages. However, in PAXLST, the UPID is sent in with a segment code "RFF". The PNR locator currently has 6 digits. The UPID may have up to 25 digits or characters but greater than 6 digits. In some embodiments, the UPID is in a line or segment with a .U/code proceeding the unique passenger identifier. The UPID may be identified using a "REF" code in the PNRgov message.

The PNR locator and IATA bag tag number/license plate also extractable by designated message codes that precede the designated information. Some messages use a document type code to identify a passport document number is being sent.

Plim Processing

In FIG. 1C, a PLIM receiver 158' is provided. By way of a non-limiting example, system 100 may include the programming modules 149 that may be configured to receive PLIMs from an airport and start the filtering/sorting and matching from the PLIMs according to the schedule of the airport and operating times. As described in relation to FIGS. 10B, the first-mode travel carrier 104 may be an air travel carrier for a flight that originates in another country. The PLIM receiver 158' may include programming instructions, which when executed cause the receiver to receive PLIMs based airport codes that denotes a border crossing. Baggage source indicators are described in more detail in relation to FIG. 14.

In this manner, the PLIM receiver 158' may receive all PLIM messages to filter/sort all luggage items against a flight manifest, for example, for customs and/or security screening processing based on originating airport codes and an airport code of arrival. In some embodiments, the flight will be a multi-leg flight with multiple airport codes identified. Some PLIMs include a multi-flight codes which can be used as a filtering indicator.

For those air carriers originating outside of a country, and landing at an airport, matched by an airport code, which is a first border crossing, for example, the system 100 may receive the entire flight manifest 151 and such as a PNL message, a PFS message or a PRL message. The DC-PM message are IATA data messages. However, there are other passenger messages. The PLIM may include a PNRgov message that is communicated to countries.

PNRgov messages are described in "PASSENGER AND AIRPORT DATA INTERCHANGE STANDARDS, EDIFACT IMPLEMENTATION GUIDE-PNR DATA PUSHED TO STATES OR OTHER AUTHORITIES PNRGOV MESSAGE," version 21.1, copyright 2021 by International Air Transportation Association. The messages employ the International Standard Organization (ISO) 9735 standard that is titled "Electronic Data Interchange for Administration, Commerce and Transport (EDIFACT)." The "PASSENGER AND AIRPORT DATA INTERCHANGE STANDARDS" will hereinafter be referred to as "PADIS").

The PADIS standard describes the ISO 9735 syntax implementation. However, the use of XML syntax is also referenced. The ISO 9735 syntax can be converted to an XML syntax for communication using internet communication protocols. However, as the standards are updated other coding schemes and communication protocols may be adopted and used.

The PADIS PNRGOV message has individual message segments, or United Nations Service Segments (UNSS) that as shown in Table 1.

TABLE 1

| UNSS | Description |
|---|---|
| UNA | Service String Advice |
| UNB | Interchange Header Segment |
| UNG | Functional Group Header |
| UNH | Message Header Information |
| MSG | Specifies the Function of the Message |
| ORG | Specifies the Sender of the Message |
| TVL | The Flight (Departure Date/Time, Origin, Destination, Operating Airline Code, Flight Number, and Operation Suffix) of passenger |
| EQN | Total Number of PNRs of Flight Push |
| ITM | Push Sequence Number (Push Label) |

In the service string, designated syntax characters have specific meanings. For example, the colon ":" is a component data element separator. The Plus sign "+" is a data element separator. A segment terminator is represented as an apostrophe "'". There are other designated syntax characters not mentioned here.

The embodiments herein may filter the received transmission of messages to find the start of each new message such as by finding the UNSS that starts with "UNA" and/or "UNB," as shown in Table 1.

The PADIS also includes PADIS reservation sub-group segments (RSGS) with structured syntax and nomenclature. The PADIS RSGS are shown in Table 2.

TABLE 2

| PADIS Reservation Sub-Group Segments | Description |
|---|---|
| ABI | Additional Business Source Information |
| ADD | Address Information |
| APD | Additional Product Details |
| DAT | Date and Time Information |
| EBD | Excess Baggage Details |
| EQN | Number of Units |
| ERC | Application Error Information |
| FAR | Fare Information |
| FOP | Form of Payment |
| FTI | Frequent Traveler Information |
| IFT | Interactive Free Text |
| ITM | Item Number |
| LTS | Long Text String |
| MON | Monetary Information |
| MSG | Message Action Details at Level 0 (PNRGOV) |
| MSG | Message Action Details GOVREQ (ACKRES) |
| ORG | Originator of Request Details |
| PTK | Pricing/Ticketing Details |
| RCI | Reservation Control Information |
| REF | Reference Information |
| RPI | Related Product Information |
| SAC | Source and Action Information |
| SRC | Segment Repetition Control |
| SSD | Seat Selection Details |
| SSR | Special Requirements Details |
| TBD | Traveler Baggage Details/Electronic Ticketing |
| TIF | Traveler Information |
| TKT | Ticket Number Details |
| TRA | Transport Identifier |
| TRI | Traveler Reference Information |
| TVL | Travel Product Information |
| TXD | Tax Details |

For the sake of brevity, only a few of the PADIS RSGS will be described. The PADIS RSGS "ADD" may start a message line or row and will be followed by syntax characters to start and/or separate data elements in the row.

The PADIS message line or row may be parsed to obtain the "data elements" such as the passenger address from the row starting with "ADD." Data elements associated with the passenger address may be sent in different groups. For example, in group 1, the data elements associated with the passengers contact information may be sent. In group 2, the data elements associated with an emergency contact information may be sent. As the messages are received, the groups are filtered to obtain the appropriate names.

The PADIS message line or row may be parsed to obtain the "data elements" such as related to the PNR locator from the row starting with "RCI." The "RCI" may include the operating carrier's record locator, known as the PNR locator. The PNR locator may include a six digit sequence of alphanumeric characters. However, the number of digits may change as the standards change.

The PADIS message line or row may be parsed to obtain the "data elements" such as related to a unique passenger identifier from the row starting with "REF." The reference number is for communications with one or more States.

The PADIS message line or row may be parsed to obtain the "data elements" such as the IATA baggage license plate from the row starting with "TBD." Other information may be obtained from this row, such as the number of luggage (baggage) items. For example, the airline designator or airline code is identified in the "TBD" row. Therefore, the airline code can be extracted. The "TBD" row may also provide an airport code of the destination location. In some embodiments, if a passenger checked-in 3 luggage items, the "TBD" row may include all three IATA license plates that may be parsed from the row. In some embodiments, a message may include a sequence number of the number of bag tags (i.e., license plate numbers) associated with a bag tag number in a message. Therefore, license plate numbers may be extracted from messages that use such a message coding scheme.

The PADIS message line or row may be parsed to obtain the "data elements" such as the passenger's name from the row starting with "TIF." Other information may be obtained from this row, such as the number of luggage (baggage) items. The "TIF" row communicated on different levels provides different names. The "TIF" row on level includes at least the passenger's surname and given name.

The PADIS message line or row may be parsed to obtain the "data elements" such as the airport arrival from the row starting with "TVL." The information in the "TVL" row may be used for international flights and multi-leg flights. The "TVL" row may convey information of a flight itinerary.

Other PADIS message lines or rows may be used to obtain data elements described herein such as the airline code, the airport code, etc. and should not be limited to those described herein.

The IATA data messages are received and processed in FIG. 1A. Those messages arriving at an airport that also require a Customs security clearance, for example, may be matched by comparing an IATA license plate number or the UPID in the flight manifest and filtered/sorted IATA data messages. Therefore, once there is a match detected and the IATA license plate number may be extracted from the PLIM, a trigger may be sent to a security screening integration assistant (SSIA) system 190 (FIG. 16) via a security screening trigger generator 170, for example. The trigger generator 170 may include programming instructions, which when executed, send the IATA license plate associated with the luggage item to be screened and/or the UPID and/or PNR number/locator, for example, to the SSIA system 190.

A IATA data message may indicate that the luggage item is transferring air carriers. In this instance, the luggage items may need to 1) clear the Customs authority and 2) be re-screened by the aviation screening authority in border-crossing country.

IATA data messages may be terminating IATA data messages or transferring IATA data messages that may include a DCS-passenger message or a baggage information message.

The PLIM message processing module 160' may include programming instructions, which when executed cause a PLIM message data extractor 168 to extract information from the PLIM message and send the data to the luggage item manifest record creator 185.

As described in FIG. 1B, the first leg of travel may have been on an airplane. However, the luggage item may have been picked up by employees of system 100 or other baggage handlers from a train station, bus station, hotel, etc. before being scanned to register the luggage item as arrived at a lodging entity according to a manifest MX. At the lodging entity, the luggage item begins its next leg of travel. It may be a cruise ship or a resort. As technology advances, security screening imaging machines may be deployed at ports. Accordingly, the SSI and data may be derived by SS imaging machines at other locations other than airports.

Figure 1D:
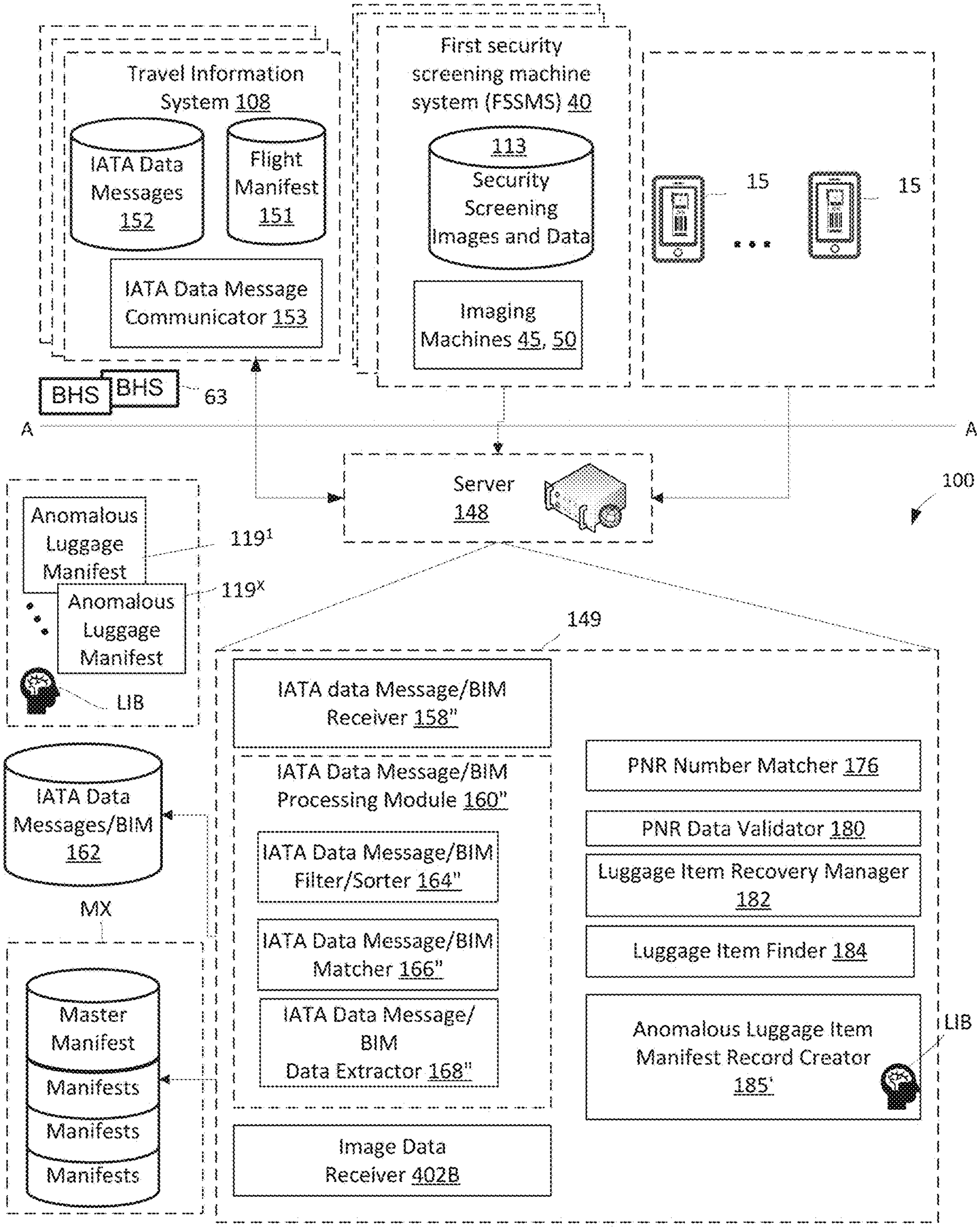
FIG. 1D illustrates a block diagram of a system for recovering an anomalous luggage item based on one or more IATA data messages in accordance with an embodiment.

FIG. 1D illustrates a block diagram of a system for recovering an anomalous luggage item based on one or more IATA data messages such as without limitation, baggage information messages (i.e., BIMs) in accordance with an embodiment. In FIG. 1D, a baggage information message receiver 158" is provided. By way of a non-limiting example, system 100 may include the programming modules 149 that may be configured to receive baggage information messages from one or more airports and performing filtering/sorting and matching of the baggage information messages according to reference indicators representative of a non-routine route of checked in luggage items. The non-routine route may cause delays in arrival of the luggage item or may indicate lost or missing luggage items.

The baggage information message receiver 158" may receive baggage information messages for passengers with an originating airline BSM of a flight manifest, receive subsequent baggage information messages as the luggage items, of these passengers, interact with the baggage handling system 63 and then filter/sort for reference indicators in the baggage information messages representative of an anomalous luggage item. The server may receive a flight manifest.

In one or more embodiments, IATA data message/BIM receiver 158" may receive IATA data messages or baggage information messages for passengers with an originating airline BSM of a manifest MX from a hotel, lodging entity or resort or flight manifest, receive subsequent baggage information messages as the checked luggage items, of these passengers, interact with the baggage handling system 63 and then filter/sort for reference indicators in the baggage information messages representative of an anomalous luggage item. The manifest MX may identify a reservation of the passenger including an address to deliver the luggage item, a reservation date and reservation duration.

In one or more embodiments, there may be a need to generate a master manifest or the flight manifest is used to match passenger names from the manifest based on baggage information message and filter/sort for reference indicators representative of a non-routine route being traveled to build an anomalous luggage item manifest record.

In one or more embodiments, IATA data message/BIM receiver 158" may receive baggage information messages for passengers with an originating airline BSM of a flight manifest or a manifest MX from a hotel, lodging entity or resort, receive subsequent baggage information messages as the luggage items, of these passengers, interact with the baggage handling system 63 and then sort for reference indicators in the baggage information messages representative of an anomalous luggage item. The manifest MX may identify a reservation of the passenger including an address to deliver the luggage item, a reservation date and reservation duration.

Once one or more reference indicators in one or more baggage information messages that represent an anomalous luggage item is detected, the reference indicator information and baggage information message information may be sent to the luggage item recovery manager 182. The luggage item recovery manger 182 processes the reference indicator information and baggage information message information so that the luggage item may be recovered or found by the luggage item finder 184, as will be described in more detail in relation to FIGS. 37A-37B and 38.

The baggage information message processing module 160" may include programming instructions, which when executed may cause an IATA data message/BIM filter/sorter 164" to sort for reference indicators that is representative of a non-routine route of a luggage item.

The baggage information message processing module 160" may include programming instructions, which when executed cause a IATA data message/BIM matcher 166' to match the passenger's name in an IATA data message or baggage information message to the name of a passenger in a manifest MX or the flight manifest. The passenger information in the IATA data message or baggage information message may be matched to pre-loaded information in a respective one manifest MX for a lodging entity or a mode of travel.

The IATA data message/BIM processing module 160" may include programming instructions, which when executed cause an IATA data message/BIM data extractor 168" to extract information from the IATA data message or baggage information message and merge the data into an anomalous luggage manifest 1191 . . . 119*x* and/or a luggage item manifest record. Because of delays or changes that occur in the air travel industry, the LIB 2450 (FIG. 24) or an anomalous luggage manifest 1191 . . . 119*x* may be updated with new LIB data based on the information in a terminating BSM.

For example, changes in the transport of the luggage item or passenger may produce a new PNR number with new flight or travel information. The new flight or travel information in an IATA data message or baggage information message may cause a new routine route for the luggage item to be generated for finding or locating and recovering an anomalous luggage item.

The programming modules 149 may include programming instructions, which when executed cause an anomalous luggage item manifest record creator 185' to create an anomalous luggage item manifest record for entry in a corresponding anomalous luggage manifest 1191 . . . 119*x*.

With regard to FIG. 1D, the PLIM message may be for a manifest associated with a vehicle for a cruise ship. The QPID as described in relation to air transportation regulations, may include a cruise ship booking identifier for each passenger or other unique passenger identifier in the cruise ship industry. The PLIM message may be for other mass transportation vehicles that require security screening of luggage items now or in the future. As a consequence, the methods described herein would be adapted for the messages and the code syntax of each industry to extract unique passenger identifiers and/or unique baggage identifiers.

Originating Path Travel Experience

FIG. 1B illustrates a block diagram of a system 100 for checking in a passenger for return legs of travel in accordance with an embodiment. In one or more embodiments, the system 100 may be used to check in the passenger for the return leg of travel. FIG. 1B provides an example travel journey of a luggage item along multiple legs of travel to a lodging entity or next mode of travel.

The system 100 is denoted between lines A-A and B-B. The system 100 may communicate with the travel information system 108 of a first-mode travel carrier 104, the travel information system 110 of an optional intermediate travel carrier 106 and/or the travel information system 128 of a lodging entity 126. In the embodiments described herein, the lodging entity 126 is a cruise ship. The travel information systems 108, 110 and 128 may include web-based servers connected to the Internet, for example. One or more components of the system 100 are located local to a DP 107 where the destination point is also local to a lodging entity. In one or more embodiments, the lodging entity 126 may be a resort destination or hotel.

The first-mode travel carrier 104 may be one of an airline carrier, bus carrier, and a train carrier. However, for the purposes of discussion, the examples will be described in relation to the first-mode travel carrier being an airline carrier. The optional intermediate travel carrier 106 may be one of an airline carrier, bus carrier, and a train carrier.

The travel journey 140, represented as a dashed line, denotes a path of travel legs L1, L2, and L3 of the passenger and passenger luggage 138 from the point of origin (i.e., home 102) to the point of lodging with or embarkation at the lodging entity 126 via leg LA. Leg L1 is a travel path journeyed from home 102 to a first-mode travel carrier 104. Leg L2 is a travel path journeyed using the first-mode travel carrier 104 to the DP 107 or to optional leg L3 associated with an intermediate travel carrier 106. Optional leg L3 is a travel path journeyed using the intermediate travel carrier 106 to the DP 107. For example, a passenger may end its travel path at the end of leg L2 and board vehicle of a different travel carrier or flight to begin travel along leg L3 to the DP 107. Still further, it should be recognized that the travel path of leg L3 may include one or more intermediate travel carriers. In some instances, the passenger's journey may have zero (0) intermediate travel carriers, such as in the case of a direct flight or direct travel journey to the destination point DP along the path of the travel journey 140.

According to one or more embodiments, the system 100 untether a luggage item from the passenger for other modes of travel to be checked in for a return flight within the regulated check-in window, print a return flight bag tag for placement on the luggage item, and transfer the luggage item into the custody of the airline carrier.

According to one or more embodiments, the system 100 may cause a printer associated with the airline carrier or a kiosk of the airline carrier to print a return flight IATA compatible bag tag for the return flight with an airline travel carrier. In one or more embodiments, system 100 may include a printing device to print an IATA bag tag for a return flight to replace the originating hardcopy bag tag with the return flight IATA bag tag.

In one or more embodiments, the printed IATA bag tag number on the return flight IATA bag tag may be recycled for use at off-airport locations and temporary lodging entities as a recycled unique identifier during those portions of the return path after the luggage items have been off-loaded from an airline carrier and picked up from the airline or airport infrastructure. The return flight IATA bag tag on the return path is a non-discarded machine-readable bag tag for any other modes of travel and lodging entities, including temporary lodging entities after the luggage has completed its return path on an airline travel carrier.

The destination point DP 107 is local to the port of embarkation of the lodging entity 126. The system 100 or one or more components of the system may be controlled and manned by a third-party service provider independent from any travel carriers. The system 100 may be controlled and manned by a travel carrier local to the destination point DP 107. The travel carrier local to the destination point DP 107 may be an airline carrier, a train carrier, a bus carrier, a cruise ship carrier, or combination thereof. The acquiring devices described herein may be distributed at off-airport locations to locate and track luggage items such as at alternate modes of travel.

In some instances, the traveled paths by the first-mode travel carrier and the travel path of the optional intermediate travel carrier 106 may be reversed, such that the travel path journeyed by the passenger on leg L2 may be by an intermediate travel carrier 106 and the travel path journeyed by the passenger on leg L3 to the DP 107 may be using the first-mode travel carrier.

A component of system 100 may include a scanner 116 for scanning a bag tag (BT) 142. The BT 142 is an original paper bag tag (OP-BT) with an original bag tag identifier (O-BTI) 114, such as from a first-mode travel carrier 104 of a first leg of travel. The O-BTI 114 may be stored in a database by first-mode travel carrier 104.

In one or more embodiments, a passenger with a mobile communication device 15 may capture an image of the BT 142. According to one example, the BT 142 may have been printed by a kiosk at the airport and placed on the luggage item by the passenger.

In one or more embodiments, the components of the system 100 may also include a radio-frequency identification (RFID) reader or a near field communication (NFC) identification reader, both of which are referenced to herein as an RFID-R 150, denoted in a dashed box to denote that it is optional. The RFID reader receives electromagnetic fields to automatically identify and track tags. In some instances, the passenger luggage 138 may use an RFID tag or near field communication (NFC) compatible tags that produce a license plate or equivalent identifier. However, currently most luggage still uses the printed or paper bag tag as the primary means of identifying a passenger's piece of luggage 138.

In one or more embodiments, the passenger luggage 138 may include a radio-frequency communication device such as a Global Positioning System (GPS) tracker, a Global System for Mobile Communications (GSM) tracker, a GSM-5G tracker, a WIFI-enabled communication device, a BLUETOOTH Low Energy (BLE) device, a BLUETOOTH-enabled communication device, a short-range RF communication device and a long-range communication device using compatible wireless communication protocols.

The term passenger luggage 138 may include one or more luggage items. The one or more luggage items may include a first luggage item. In some instances, only the BT 142 of the first luggage item may need to be scanned to digitally recreate a passenger's bag number (i.e., license plate number).

The stored digital O-BTI may be converted to a format compatible with the International Air Transport Association (IATA) bag tags code and other standardized formatting of the carrier. For example, an airline bag tag may include an IATA code that includes a three-character alpha numerical geocode designating airports and metropolitan areas. The IATA code is also known as an IATA location identifier. The IATA also publishes industry standard rules for creation of bag tags for the airline industry. The printed BT 142 may include a 10-digit license plate and corresponding bar code. The digital O-BTI may include information to create the IATA geocode, the original airline flight information, the 10-digit license plate, and other BT information printed on a BT 142. The BT 142 may use a license plate used for other travel carriers.

A component of the system 100 may include an imaging device 118 for capturing an image of the passenger luggage 138. The components of the system 100 may include an optional printing device 120 that is configured to print on a substrate a marker (MK) 136. An example MK 136 is described in relation to FIG. 15.

The components of the system 100 may include a computing device 122, as will be described in more detail in relation to FIG. XX1. The computing device 122 may be in communication with the scanner 116, the imaging device 118, and the printing device 120 via wireless communication, denoted by reference numeral 130. In one or more embodiments, the computing device 122 may communicate with the scanner 116, the imaging device 118, and/or the printing device 120 using wired communication protocols. The printing device 120 may be a laser printer, inkjet printer, or other printer device.

It should be understood from this disclosure that the system herein accommodates for many possible outcomes that can be experienced by various passengers. The need for a MK 136 is because some baggage that arrives at a destination may not include the originally printed bag tag or the airline's marker, both of which may include an IATA bar code. In such a situation, the system would need to prepare a marker to temporarily tag the baggage.

Figure 10A:
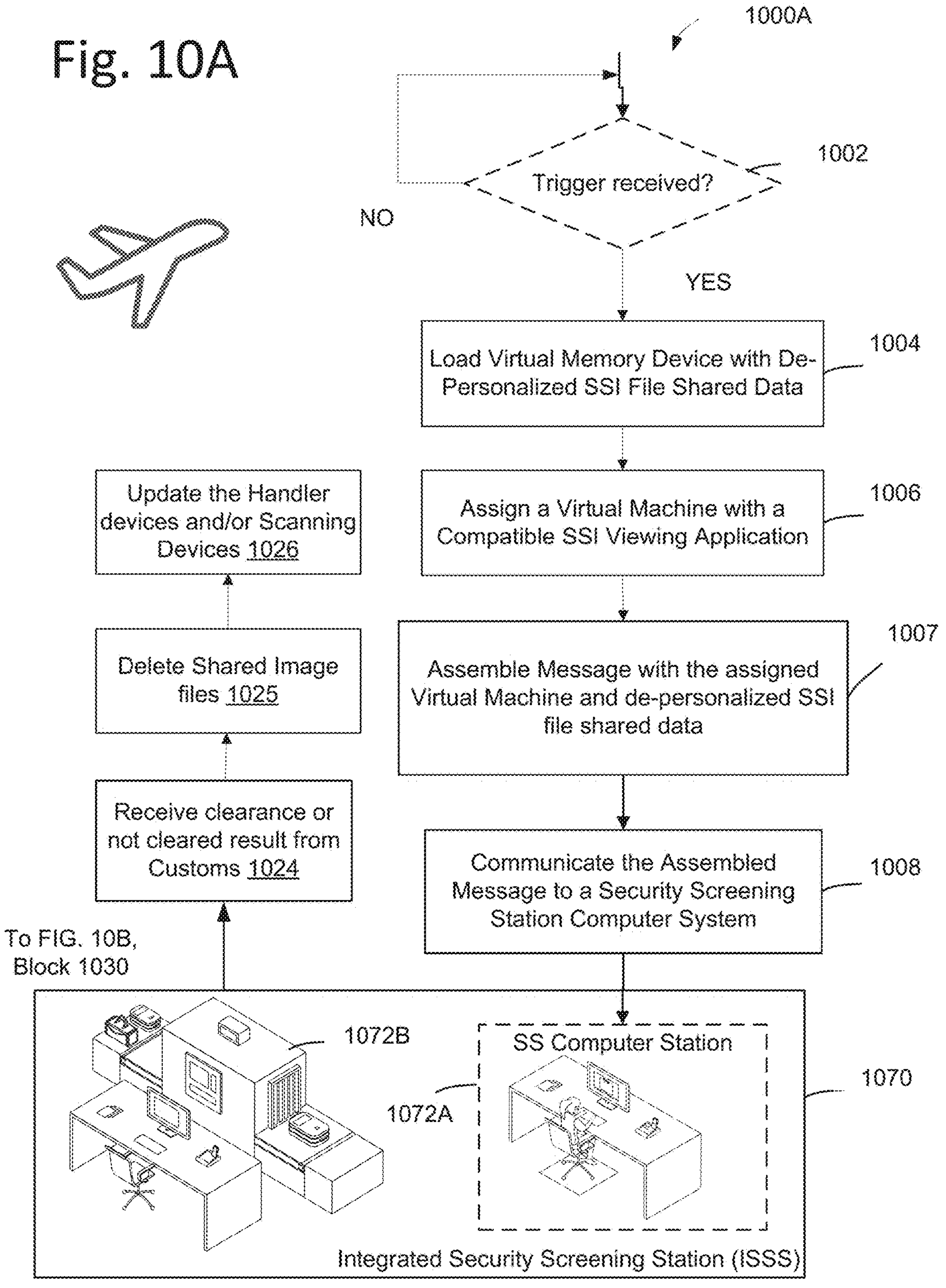
FIG. 10A illustrates a method for file handling for an integrated security screening process of luggage items that need to be processed through a security screening station in accordance with an embodiment.

Additionally, the MK 136 may be used in one or more embodiments for those luggage items that are processed through an integrated security screening station, such as described in FIG. 10A.

This marker may include the 10-digit license plate or other information. This marker can be used to identify the baggage by the passenger in the event of lost baggage, for example.

The system may include creating, by a printing device in communication with the at least one processor, a MK 136 with a marker identifier linking the luggage manifest record to a luggage item when the originating paper bag tag identifier (OP-BTI) associated with or on the printed bag tag of the luggage item is one of damaged or missing; and populating the luggage manifest record with the marker identifier. The marker identifier may be a barcode, readable by a barcode scanning device, where the marker identifier includes one of OP-BTI or a new tracking identifier.

The computing device 122 may communicate with the scanner 116, imaging device 118 and/or printing device 120 using near-field communications (NFC) protocols such as without limitations, BLUETOOTH. The computing device 122 may communicate with the scanner 116, imaging device 118 and/or printing device 120 using wireless fidelity (WI-FI) communications based on Institute of Electrical and Electronic Engineers (IEEE) 802.11 standards. The computing device 122 may communicate with the scanner 116, imaging device 118 and/or printing device 120 using ZIGBEE wireless technology compatible with IEEE 802.15, for example. The computing device 122 may communicate with the scanner 116, imaging device 118 and/or printing device 120 using long range communication protocols, short range communications protocols, cellular radio frequency protocols or other mobile radio frequency protocols.

In other embodiments, the scanner 116 may be a software application stored on the computing device 122 and programmed to interact with a video device or camera device incorporated into, integrated into, or connected via a cable to the computing device 122. In one or more embodiments, the computing device 122, imaging device 118 and scanner 116 may be a single device, such as a smart phone, tablet or other handheld computing device that is video-enabled, herein after referred to as a "smart communication device." In one or more embodiments, the system 100 may include a local computing device or a server 148 to communicate with the smart communication device(s) and travel information systems 108, 110 and/or 128. The local computing device (i.e., server 148) communicates using wired or wireless communications with at least one smart communication device and/or to the travel information systems 108, 110 or 128.

In one or more embodiments, the computing device 122, imaging device 118, scanner 116 and RFID-R 150 may be a single device, such as a smart phone, tablet or other handheld computing device that is video-enabled, also herein after referred to as a "smart communication device."

The imaging device 118, scanner 116, and RFID-R 150 may be electronic devices (i.e., acquiring devices) that acquire the barcode or other information associated with the IATA license plate, such as the 10-digit license plate. As should be understood from this disclosure, while the IATA standards use a 10-digit license plate number, other license plate formats may be used with more or less digits. For example, the 10-digit license plate number may be acquired by optical character recognition, computer vision machine learning algorithm, or other artificial intelligence algorithm that can recognize alphanumeric characters and convert the recognized characters to machine-encoded text, for example.

A component of the system 100 may include an optional luggage receiver 124 to transport received luggage, such as on a conveyor belt. While the passenger luggage 138 moves on the conveyor belt, at least one scanner 116 and at least one imaging device 118 may scan or image the information representative of the O-BTI. In one or more embodiments, the imaging device 118 may capture images of one or more passenger luggage 138. Additionally, the RFID-R 150 may also read an RFID tag or NFC tag placed on the luggage receiver 124. In one or more embodiments, the scanner 116 may scan a QR code-enabled bag tag. The RFID, NFC, and QR code-enabled bag tags may include certain personal information or PU. This personal information of the passenger and the information in the PNR 112 may be used to validate the personal information. The RFID tag or NFC tag should be compatible with IATA RP 1740*c*, for example, or other requirements. The PNR 112 represents a storage location where an airline carrier may store the PNR of their passengers. The PNR number is also known as a PNR locator. The PNR data may be located using at least the PNR number, which may be found in certain baggage information messages, such as without limitation baggage source messages. By way of a non-limiting example, the PNR data may be stored in a passenger service system (PSS) or an order management system (OMS). However, over time the location of the storage devices for the PNR data may change. Hence, the system may use and update PNR access instruction according to each airline carrier to determine how to navigate to the PNR 112. The communications exchange may include Internet Protocols (IP), Extended Markup Language (XML) standards and XML messaging.

In other embodiments, the luggage receiver 124 may include a designated pad or surface for the placement of a single passenger luggage 138 with a scanner, imaging device 118 and/or RFID-R 150 in proximity to the pad to scan the O-BTI 114 and/or capture images of a passenger luggage 138. The scanner 116 and imaging device 118 may be the same device but operated to look for and scan a barcode with the O-BTI 114 in one process and in a second optional process, find a portion or a side of the body of the passenger luggage 138 to capture identifying luggage features. The scanner 116, imaging device 118 and RFID-R 150 may be integrated into the same device, where the RFID-R 150 will read the RFID tag or NFC tag if a printed bag tag is not present to develop personal information for a manifest.

In a process to capture identifying luggage features, such as using computer vision, a determination may be made that the passenger luggage 138 does not include an original paper bag tag. In this instance, received information from the RFID-R 150 may be used. In some instances, the passenger luggage 138 may have both an RFID tag or NFC tag and an original paper bag tag, as the original paper bag tag may include information associated with a travel carrier for a return leg local to home 102.

According to one or more embodiments, the computing device 122 and/or server 148 of the system 100 may include programming instructions which when executed may cause generation of a communication session with a travel information system 108 or 110 to access the PNR 112 based on the scanned BT 142 to obtain information representative of the original O-BTI 114 with an embedded code of a passenger's bag number, as will be described later.

According to one or more embodiments, the computing device 122 and/or server 148 of the system 100 may generate a communication session with a travel information system 108 or 110 to access the PNR 112 based on the image of the BT 142 to obtain passenger information that includes at least the PNR number captured from the BT 142.

The travel information system 108 or 110 may generate a communication with passenger file data 132 that includes the return leg information of the passenger while maintaining the PII in the PNR confidential. The received passenger file data 132 is assembled into a manifest file 134 or sent to the travel information system 128 where a manifest file 134 is created. In some instances, the server 148 may create a manifest file. One of the computing devices 122 and/or server 148 may communicate a manifest file to travel information system 128 of the lodging entity 126. The manifest file 134 is different from the de-personalized luggage manifest $\mathbf{121}^{1} \ldots \mathbf{121}^{x}$.

The computing device 122 and/or server 148 may merge all the passenger file data 132 into a single manifest file 134 of checked-in passenger baggage and/or passengers. The computing device 122 and/or server 148 will then communicate a manifest file 134 to a travel information system 128 for a lodging entity 126.

Departure Control System (DCS) may control the management of the check-in process for an airline travel carrier. The travel information system 108 or 110 may include a check-in indicator 144 that indicates that a passenger and/or their luggage item(s) is checked-in for travel within a particular window. In one or more embodiments, the travel carrier may include a check-in database 146 for those passengers and/or their luggage that have been checked in for travel.

In one or more embodiments, the luggage item 138 may be provided a wireless tracking device 41 (FIG. 2A). By way of a non-limiting example, the wireless tracking device 41 may be a tracking device that may include accelerometers (ACC), gyroscopes, Global Positioning System (GPS) and/or an Inertial Navigation Unit (INU) to determine its own location, such location may be sent in a computing device (i.e., server 148) of system 100. The wireless tracking device 41 may have a unique identifier such as a registered serial number, media access control (MAC) address, or another assigned unique identifier, which may be stored in the LIM record 186.

The wireless tracking device 41 may be an AIRTAG by APPLE Inc., a Global Positioning System (GPS) tracker, a Global System for Mobile Communications (GSM) tracker, a GSM-5G tracker, a WIFI-enabled communication device, a BLUETOOTH Low Energy (BLE) device, a BLUETOOTH-enabled communication device, short-range RF communication device and a long-range communication device using compatible wireless communication protocols.

For short-range communication devices, such as without limitation, WIFI-enabled communication device, a BLUETOOTH Low Energy (BLE) device, and a BLUETOOTH-enabled communication device, the system 100 may include remote network devices 127 in lodging entity 126. In one or more embodiments, the remote network devices 127 may be those of the lodging entity 126 and used by system 100 to carry location data by the wireless tracking device 41. Alternately or in addition to, some of the remote network devices 127 may be owned by system 100 and others are owned by the lodging entity 126.

In one or more embodiments, the wireless tracking device 41 may be temporarily assigned to the luggage item. For example, the wireless tracking device 41 may be configured to communicate in a designated area D10 such as within a cruise ship and a nearby surrounding areas such as dockside. Once the luggage item is disembarking and checked in for the return flight, for example, or at some other time, the wireless tracking device 41 may be removed and re-assigned to another luggage item for the next cruise on the cruise ship.

For example, a cruise ship area (i.e., designated area D10) may include the cruise ship and a diameter of 100 feet surrounding the cruise ship. The cruise ship area (i.e., designated area D10) may have receivers or network communication devices to receive signals from the wireless tracking device 41. The diameter may be 10-50 feet, 10-75 feet, or 10-100 feet. The diameter may be up to 200 feet, up to 300 feet, up to 500 feet or up to 1000 feet surrounding the cruise ship.

For long-range communication devices, such as without limitation, an AIRTAG by APPLE Inc., a Global Positioning System (GPS) tracker, a Global System for Mobile Communications (GSM) tracker, and a GSM-5G tracker may communicate with cellular, satellite and GSM communications service providers. The location signals may be sent to the server 148 or other designated computing device for access by and/or storage in the LIM record 186. In one or more embodiments, the long-range communication devices may be configured to communicate using short-range communication protocols, as well. In this case, the wireless tracking device 41 may communicate in the designated area D10 using short-range communication protocols using the remote network devices 127 or long-range communication protocols.

The wireless tracking device 41 may be used to track its location while traveling on any mode of travel or next mode of travel using long-range or short-range communications depending on the wireless tracking device configuration.

The system may obtain lite passenger information by scanning a barcode or quick-response (QR) code associated with a boarding pass of the original flight. In some instances, the passenger's ticket may include information associated with the 10-digit license plate which may be retrieved from the passenger and placed on the baggage without the need to print a MK 136. For example, the passenger may receive a marker with an adhesive backing from an airline attendant at the time of checking in their baggage at the airport.

Example 1

An example scenario will now be described in detail. A passenger ready for a travel journey begins at home 102 where the passenger luggage 138 originates, for example, and travels on leg L1 of travel journey 140. The passenger luggage 138 may travel with the passenger or via a luggage transport service to a first-mode travel carrier 104, which begins leg L2 of travel. Assume the first-mode travel carrier 104 is an airline. At the first-mode travel carrier 104, the passenger luggage 138 receives a BT 142, as shown in FIG. 1B. The BT 142 includes printed information representative of the O-BTI 114 compatible with the International Air Transport Association (IATA) bag tag format. A BT 142 may be printed on paper or paper composite at the airline counter via an airline agent, a luggage transport service or by the passenger at a kiosk. The BT 142 remains on the passenger luggage 138, as it travels on leg L3 of travel, if used, as described later. In one or more embodiments, once the BT 142 is printed a passenger may capture at least one image of the BT 142, as described later, and communicate the at least one image to the computing device 122 or server 148.

The passenger's travel journey will include a lodging entity 126. In this example, assume the lodging entity 126 is a cruise ship. In one or more embodiments, prior to the passenger embarking on a cruise (i.e., lodging entity 126), the BT 142 with the O-BTI 114 is scanned by scanner 116 to digitize the printed representation of O-BTI 114 or imaged by an imaging device to digitize the passenger's personal information printed on the BT 142. The passenger's personal information may include their unique PNR number. The passenger's personal information may include the passenger's name. The passenger's personal information may include O-BTI 114 created by optical character recognition into a format that is machine-encoded text, for example.

In various scenarios, the passenger's travel journey may include leg L2 of travel and leg L3 of travel. For example, if there is only a first-mode travel carrier then leg L3 of travel is omitted. In this instance, the first-mode travel carrier may provide a direct flight to a city or destination in proximity or local to the lodging entity 126. In other examples, a passenger's travel journey may include an intermediate travel carrier 106 to provide for a leg L3 of travel. For example, a passenger's travel journey may include at least one connecting flight or leg of travel to a city or destination in proximity to the lodging entity 126. The connecting leg of travel may be denoted as leg L3 of travel, which begins at the end of leg L2 and ends at a DP 107.

The communication instructions may identify the information associated with tools (i.e., programming instructions) compatible with the transmission control protocol/internet protocol (TCP/IP), the file transfer protocol (FTS), the hypertext transfer protocol (HTTP), the hypertext transfer protocol secure (HTTPS), the secure socket layer (SSL), the secure file transfer protocol (SFTP), and the user datagram protocol (UDP).

In one or more embodiments, the server 148 and travel information system 128 may be integrated into the same computing system. In other embodiments, the server 148 may be integrated into travel information system 108 or 110.

FIG. 2A illustrates a block diagram of a security tracking zone 37. An example security tracking zone 37 is described in "Planning Guidelines and Design Standards for Checked Baggage Inspection Systems," by Transportation Security Administration, Version 8.0, Chapter 12, Dec. 30, 2022.

The security tracking zone 37 may include a baggage handling system 63. The baggage handling system 63 in the security tracking zone 37 may assign a unique tracking ID or pseudo ID (hereinafter referred to as the "PID") to each luggage item 138 that enters the security tracking zone 37. The PID may be used for positive bag tracking, such as required by TSA. Other screening authorities may have a different process. The positive bag tracking tracks the movement of a luggage item within the zone 37, for example.

The automatic tag reader 68 in the security tracking zone 37 may be configured to read the barcode of the IATA license plate on a bag tag or receive an RFID signal from an RFID compatible bag tag. The automatic tag reader 68, being part of the baggage handling system 63, may associate and/or maintain the PID 204 and the IATA license plate number 202 for those luggage items being read in the security tracking zone 37. The barcode may be converted to a license plate number (i.e., bag tag identifier or BTI).

The PID may be communicated from the baggage handling system 63 via BHS device 67 to the SS imaging machine 45, where the PID is a primary ID. In those systems where an automatic tag reader 68 is present, the IATA license plate number (LPN) 202 may be communicated from the baggage handling system 63 to the SS imaging machine 45.

In one or more embodiments, the SS imaging machine 45 may not accept both the PID and the IATA license plate number. In this example, the IATA license plate number may be communicated to the SS imaging machine 45 as a primary ID.

In an example, the SS imaging machine 45 may generate a PID 204', such as when a PID 204 from the baggage handling system 63 is not available. The SS imaging machine 45 may include an image capturing device 237 to capture image data 210 (FIG. 2B). The image capturing device 237 will be described in more detail later. The SS imaging machine 45 may generate meta data 208 such as a machine identifier (MID) 225. Other meta data 208 may include machine settings, time stamp, manufacturer, and location data. The machine identifier 225 may be used to determine whether the security screening images and data are in compliance with the standards required by a particular government agency in any one country.

Figure 23A:
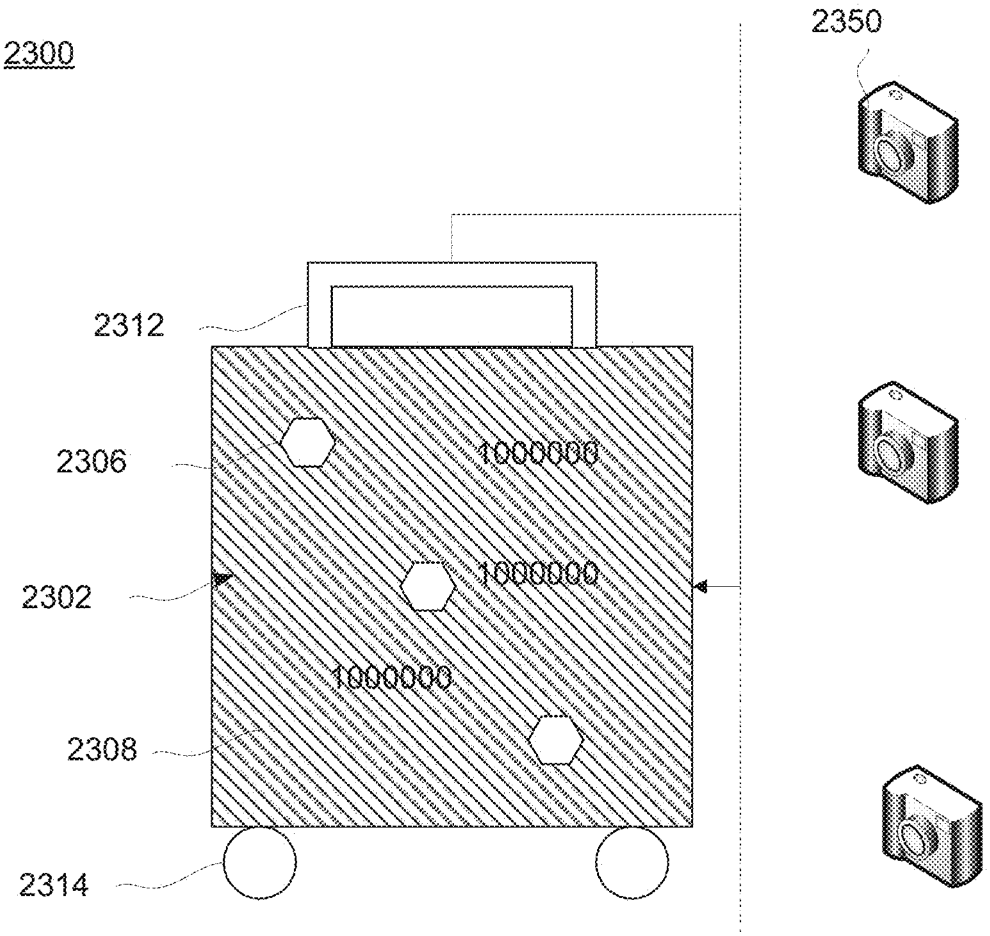
FIG. 23A illustrates a luggage item with a pattern embedded in a body of the luggage item in accordance with an embodiment.

In one or more embodiments, the system 100 may capture an image of the luggage item, as described in FIG. 23A, by an imaging device 2350. The picture data 227 may be stored together with the SSI and data 113, In one or more embodiments, the picture data 227 may be used to link the SSI, LPN 202 and PID 204 together. This may be used to recover missing links so that data in the database of the SSI and data 113 may be recovered. The LPN 202 and PID 204 may form a link together as both are computer-generated numbers. The SSI contents may be used to prevent fraud or theft.

Each BHS has machines at airport locations. The luggage item may be placed in containers 217 that include RFID chips/transmitters 223 that can be received by RFID receivers of the BHS at a particular airport. The container 217 may travel along a conveyor system of the BHS. All of the scanning and receiving activities of the BHS may be tracked and stored in memory by a computer system of the BHS, a computer system associated with an air travel carrier, or other designated computer system. For example, information associated with a luggage item traveling on an airline may be stored in memory and accessible by a computer system associated by the air travel carrier or other designated computer system regardless of which BHS scanned or received an RFID signal associated with the luggage item.

In one or more embodiments, the PID may include the sequence of the RFID generated by the RFID chip/transmitter 223. In one or more embodiments, the PID may be encoded with the sequence or portion of the RFID received from the RFID chip/transmitted 223.

A new PID 204" may be an encoded PID that includes a PID generated by the BHS 63 and the sequence or a portion of the RFID from the container 217, for example. The security tracking zone may have one or more BHS devices that may include RFID readers to receive the RFID from the container and read the IATA license plate number or receive a signal that include an RFID that represents the IATA license plate number. In one or more embodiments, the container's RFID may be obtained from a IATA data message using the IATA license plate number. In one or more embodiments, the container's RFID may be communicated to the SS imaging machine 45, 50. The stored SSI and data 113 may include the container's RFID.

As used herein the term PID stands for both the pseudo ID and/or the primary ID for the purposes of security screening.

FIG. 2B illustrates a block diagram of a secure cloud data storage 201 of the security screening image and data 113 generated in the security tracking zone 37 in accordance with an embodiment. At each airport, the security screening of checked luggage items may be performed by multiple SS imaging machines 45, 50. The SS imaging machines 45, 50 at an airport may be made from a single manufacture or different manufactures. In this instance, in order for a workstation to view the images, the workstation needs the proper viewing software. This can be very expensive to maintain and deploy around the country or world for sharing the security screening images captured by one of the SS imaging machines 45, 50. A respective one luggage item may be passed through a respective one SS imaging machine where the contents within the volume of space of the luggage item is captured.

In one or more embodiments, access to the secure cloud data storage 201 is limited. In some embodiments, the data stored by storage 201 may be encrypted.

Each SS imaging machine 45, 50 may upload to a secure cloud system 201 the LPN 202, the PID 204 (or PID 204'), the SSI file name 206 tagged to the security screening image (SSI) and data 113. The SSI file name 206 may be associated with the security screening image and data 113 of the contents within a volume of space of the luggage item that is associated with the LPN 202 and PID 204. The SS imaging machine 45, 50 may include meta data 208 with the SSI file name 206. The meta data 208 may include a machine identifier (MID) 225, for example. The machine identifier 225 may be a manufacturer's serial number or product identifier. The machine identifier 225 may be a digital identifier.

The meta data 208 may include an Internet Protocol (IP) address, network address, a private IP address, a local area network (LAN) address, or the like. The meta data 208 may include a time stamp. The image data 210 is stored by the SSI file name 206 and may be accessed by the PID 204 or PID 204' or the SSI file name 206, for example. The image data 210 may include tomogram data, for example.

Figure 2C:
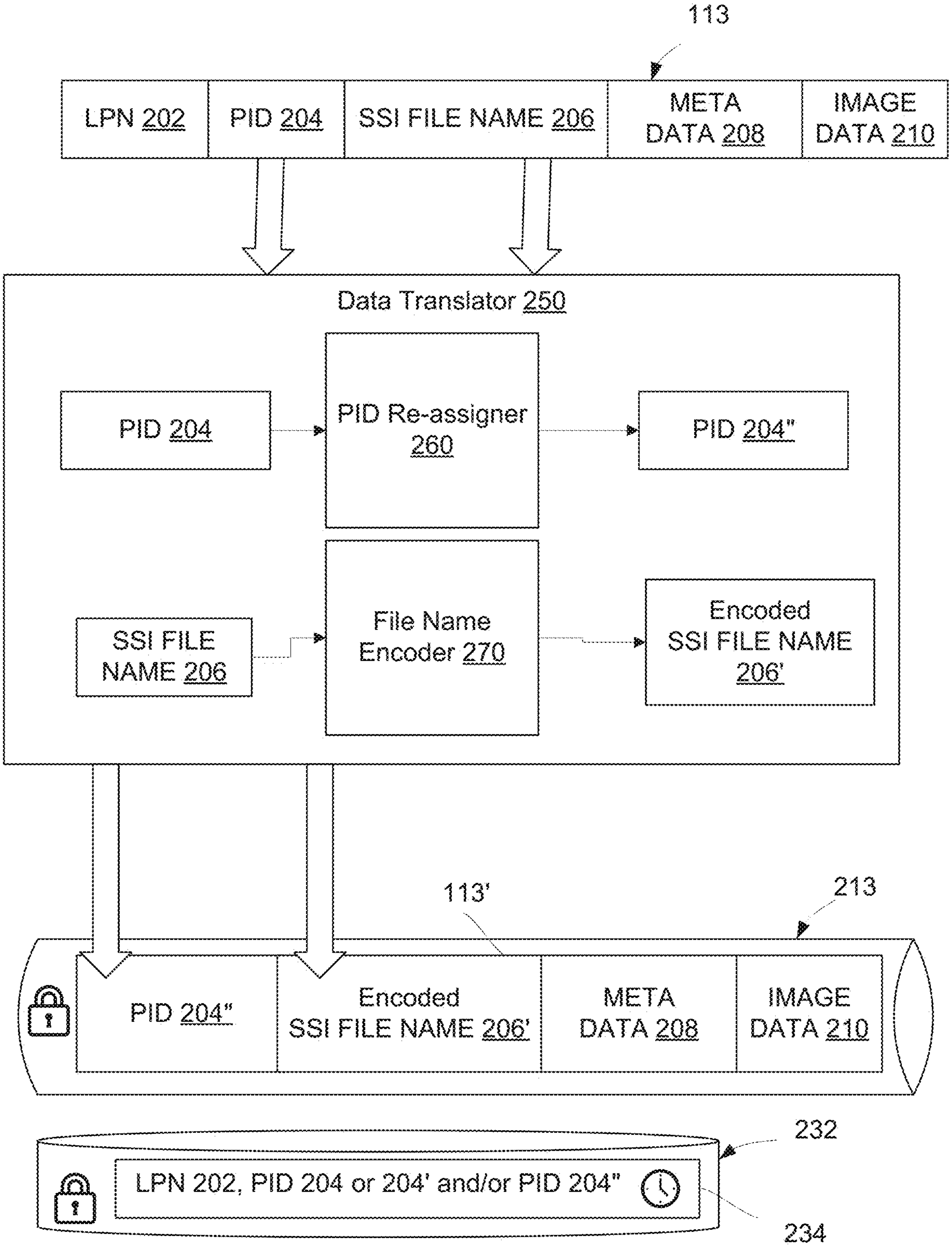
FIG. 2C illustrates a block diagram of a data translator to translate the security screening image data from the security tracking zone in accordance with an embodiment.

FIG. 2C illustrates a block diagram of a data translator 250 to translate the security screening image and data 113 from the security tracking zone in accordance with an embodiment. The LIM record de-personalizer 188 may include a data translator 250 to conceal the original PID 204 or 204'. The data translator 250 may include programming instructions, which when executed causes a reassignment of a PID 204" by a PID re-assigner. The PID re-assigner may link the original PID 204 or 204' to the new PID 204" and store the PIDs 204 or 204' with 204" and the LPN 202 in a secure database 232 as entry 234. The entry 234 may delete itself after a predetermined time period or after the flight has cleared all potential screening in a border-crossing country. As used herein, PID 204, 204' and 204" may refer to a primary identifier that was based on a pseudo identifier created in a secure tracking zone to positively track a luggage item undergoing security screening (i.e., explosive detection) for aviation travel.

The data translator 250 may include programming instructions, which when executed causes encoding of the SSI file name 206 by file name encoder 270 to produce file name SSI file name 206'. The file name encoder 270 may include programming instructions, which when executed may perform the method 800 of FIG. 8. Alternately, the file name encoder 270 may include programming instructions, which when executed may cause encoding of the SSI file name 206 by generating a sequence of digits to name a file in a memory location denoted as SSI file name 206'.

The LIM record de-personalizer 188 may include programming instructions which when executed generates security screening image and data 113' in a secure database 213. The database 213 may be separate from secure database 232. The security screening image and data 113' may link together the PID 204", an encoded SSI file name 206' of the image data 210 and the image data 210. The security screening image and data 113' may include meta data 208.

FIG. 3A illustrates a block diagram of a virtual security screening image sharing system 300A (hereinafter "image sharing system 300A") in accordance with an embodiment. The image sharing system 300A may include a secure cloud computing system 310. The secure cloud computing system 310 may be provided by services on premise or remote such as in the "cloud" through vendors operating under the brands, MICROSOFT AZURE, AMAZON WEB SERVICES, RACKSPACE, and KAMATERA, by way of non-limiting examples.

The secure cloud computing system 310 may communicate with a secure cloud system 301. The secure cloud computing system 310 and the secure cloud system 301 may be the same system. The secure cloud system 301 may perform those activities of SSIA engine 175, for example. The secure cloud system 301 may include a meta data analyzer 303. The meta data analyzer 303 may include programming instructions which when executed may analyze the meta data 208 for the manufacture or model of the SS imaging machine 45, 50 to determine which countries (CC) will allow the image data 210 from the machine 45, 50 to be used for Customs analysis and/or security analysis. The countries (CC) may be based on the terminating or transferring airport code (AC) in a IATA data message. Each country may determine whether or not image data 210 of a particular machine 45, 50 is acceptable. In other embodiments, in lieu of analyzing the meta data 208, a look-up table may be used of collaborating airports. For example, the airport code (AC) in the IATA data message associated with a baggage source indicator may provide an indication of whether the border-crossing airport will allow for sharing image data 210 to clear the Customs authority or for security screening when transferring the luggage item to another air carrier in the country. The look-up table may provide an indication of collaborating airports via the airport code. If an airport is not collaborating, then the image data is not shared.

In one or more embodiments, the image data 210 produced by machines 45, 50 may be acceptable for Customs authority screening but not aviation screening when transferring luggage items to another air carrier of the same country. In one or more embodiments, certain countries may allow the image data 210 produced by machines 45, 50 to be acceptable for both Customs authority screening and aviation screening for transferring the luggage item to another air carrier of the same country.

The programming instructions of the secure cloud computing system 310 may include programming instructions, which when executed provide virtual machines 330. For example, virtual machines 330 may include virtual machines 332, 334, 336, and 338. Each virtual machine may have a corresponding SSI viewing application or one or more SSI viewing applications may be shared. For example, virtual machine 332 may include SSI viewing application 342. The virtual machine 334 may include SSI viewing application 344. The virtual machine 336 may include SSI viewing application 346. The virtual machine 338 may include SSI viewing application 348. An SSI viewing application may compatible for viewing the captured SSI and data associated with a corresponding SS imaging machine.

Although the explanation herein references four virtual machines 332, 334, 336, and 338, any number of virtual machines may be used to accommodate the volume of luggage items that need to be processed on a daily basis.

In an example, the programming instructions of the secure cloud computing system 310 may include programming instructions, which when executed provide a de-personalized shared file data library 312A. The de-personalized shared file data library 312A may be accessible by the virtual machine 332 and SSI viewing application 342. By way of a non-limiting example, the de-personalized shared file data library 312 may include a plurality of virtual memories 314 to store uploaded SSI and data tagged to the PID 204, 204' or 204" and the SSI file name 206 or 206'. The uploaded SSI and data may be tagged to other identifiers such as a flight number, and/or a unique tracking device identifier. In some messages, the flight number may be designated as a border crossing flight. In such an embodiment, the need for searching for bag source indicators may be skipped.

In an example, the programming instructions of the secure cloud computing system 310 may include programming instructions, which when executed provide a plurality of de-personalized shared file data libraries 312A and 312B. Each library may be for an airline. Each library may be for a different country. Each library may be for a different SS imaging machine. Virtual memories may be partitioned by country, SS imaging machine or other criteria.

Depending on the security screening zone 37, the SS imaging machines 45, 50 may be of the same model from the same manufacture at a particular airport. In this instance, the SSI viewing application 342 may view the SSI of the luggage items aboard an air carrier that departed the airport and scheduled to arrive at a border-crossing airport. In an example, communication 302 to a SS computer station 372 (i.e., SS computer station 1072A) may include de-personalized file sharing data 306A associated with data of a LIM record for a luggage item with the SSI and data 113 captured by the SS imaging machine 45. The de-personalized file sharing data 306B is associated with data of a LIM record 186 for a luggage item with the SSI and data 113 captured by the SS imaging machine 50. The SS imaging machine 50 may be different from the SS imaging machine 45. The SSI associated with de-personalized file sharing data 306A from SS imaging machine 45 may require an SSI viewing application 342 to view the image data on a display screen. The SSI associated with de-personalized file sharing data 306B from SS imaging machine 50 may require an SSI viewing application 344 to view the image data on a display screen.

The de-personalized file sharing data 306A or 306*b* will be described in relation to FIGS. 9A and 9B and FIGS. 31A-31B. The communication 302 may include a link or access to the assigned virtual machine 332, 334, 336, or 338 to be used by a respective SS computer station 372.

In one or more embodiments, respective SS computer station 372 may be assigned a dedicated virtual machine. However, the secure cloud computing system 310 may include virtual memories for storing a library of SSI viewing applications 342, 344, 346 and 348 that may be individually uploaded onto the virtual machine as needed to review the SSI with the compatible viewing application.

By way of a non-limiting example, the communication 302 may include a plurality of de-personalized LIM records in a de-personalized luggage manifest 321 (i.e., de-personalized luggage manifest 121$^1$ . . . 121$x$) for different luggage items that have SSI that require viewing by SSI viewing application 342, for example, provided under de-personalized file sharing data 306A. The communication 302 may include a plurality of de-personalized LIM records for different luggage items that have SSI that require viewing by SSI viewing application 344, for example, provided under de-personalized file sharing data 306B.

Each under de-personalized file sharing data 306A or 306B may be assigned a message unique identifier number, as described In one or more embodiments, a first communication 302 to SS computer station 372 may include a de-personalized luggage manifest 321 (i.e., de-personalized luggage manifest 121$^1$ . . . 121$x$) for different luggage items that have SSI that require viewing by SSI viewing application 342, for example, provided under de-personalized file sharing data 306A.

A second communication 302 to another SS computer station may receive a de-personalized luggage manifest 321 (i.e., de-personalized luggage manifest 1211 . . . 121$x$) for different luggage items that have SSI that require viewing by SSI viewing application 344, for example, provided under de-personalized file sharing data 306B.

A Customs authority may have several SS computer stations manned by personnel. Each station may receive a different list of luggage items in a de-personalized luggage manifest to screen according to customs rules and regulations. These luggage items may be identified from a flight manifest.

In one or more embodiments, a portion of the security screening image and data 113 stored in a secure cloud system 301 may be transferred to one of the virtual memories 314. For example, a first one of the virtual memories 314 may store the security screening image and data 113' for those luggage items on a flight that may require screening by the Customs authority. The security screening image and data 113' may include the PID 204, PID 204' or 204", the SSI file name 206 or 206', and the imaging data capture by the image capturing device 237. The security screening image and data 113' may include the MID 225 or other meta data 208. However, the security screening image and data 113' may be devoid of PII. Another one of the virtual memories 314 may store the security screening image and data 113' for those luggage items on another flight that may require screening by the Customs authority in a different border-crossing country or the same border-crossing country.

Image data may have certain copyrights associated with it. By way of a non-limiting example, the programming instructions of the secure cloud computing system 310 may include a controlled-view processing agent 320. The programming instructions of the controlled-view processing agent 320 when executed may allow for a single view of the SSI and data 113' according to a set of permissions 327. The system 100, the government, or another party may have a contractual agreement to pay for or otherwise controlled viewing of the copyrighted data to the manufacturer of the SS imaging machines 45, 50. For example, the set of permissions 327 may approve a single view of or access to the SSI and data 113' stored in virtual memory 314. The set of permissions 327 may include a time duration. For example, a viewing window for the files for the luggage items on a flight schedule to land at a border-crossing airport may be used, where the viewing window is set for a time duration for clearing the luggage items of the flight.

The programming instructions of the single view processing agent 320 when executed may execute an image expungement process 325 to expunge the SSI and data 113' from the virtual memory 314 and the secure cloud computing system 310, after a single view, a time frame or other criterion.

Although virtual memory described as both software and hardware. The process 325 clears, cleans, or otherwise delete the stored the SSI and data 113' after the criterion of the set of permissions 327 are met so that it is not retrievable for additional viewing by SSI viewing application. The cleaning or clearing of memory files may be performed using off-the-shelf products.

In one or more embodiments, a stored data itself may be tagged for one-time access.

FIG. 3B illustrates a block diagram of a virtual security screening image sharing system 300B (hereinafter "image sharing system 300B") in accordance with an embodiment. The image sharing system 300B is similar to image sharing system 300A. Accordingly, only the differences will be described. In an example, the programming instructions of the secure cloud computing system 310' may include programming instructions, which when executed accesses virtual memory 314' in the secure cloud system 301. The virtual memories 314' may store the security screening image and data 113', such as described in relation to FIG. 3A. In operation, the virtual machines 330 may access the security screening image and data 113' stored in the virtual memories 314'. Alternately, the SS computer station 372 may access secure cloud system 301 to retrieve the data. In some embodiments, virtual machines are optional.

FIG. 3C illustrates a block diagram of a virtual security screening image sharing system 300C using a content list (CL) (hereinafter "image sharing system 300C") in accordance with an embodiment. FIG. 3C has similarities to FIGS. 3A and 3B. Therefore, only the differences will be described.

The programming instructions of the secure cloud computing system 310" may include programming instructions, which when executed provide virtual machines 330'. For example, virtual machines 330' may include virtual machines 332', 334', 336', and 338'. Each virtual machine may have a corresponding one customs screening unit 352, 354, 356, and 358. An example, customs screening unit 356 will be described.

The customs screening unit 356 may include an artificial intelligence (AI) customs screening model 370. The AI customs screening model 370 may include programming instructions, which when executed causes screening of a received content list develop from the contents within a volume of space of the luggage item to determine whether the luggage item is clear or not clear to pass customs without further examination or inspection by the Customs authority at the border-crossing country.

The AI customs screening model 370 may include programming instructions, which when executed may cause receipt of a customs list 373 and/or a country code (CC) 374, as each country may have its own set of training data for clearing a luggage item through an artificial intelligence (AI) customs authority screening process. The AI customs screening model 370 may include programming instructions, which when executed may cause receipt of thresholds 378. By way of a non-limiting example, certain products or objects have quantity limits that can be entered into a country, such as currency.

The AI customs screening model 370 may include programming instructions, which when executed causes receipt of a controlled items list 376A and/or a prohibited items list 376B to train the model 370. By way of a non-limiting example, the Customs authority may control entry of or prohibit certain products, objects, animals, or things into the country. By way of a non-limiting example, certain drugs, chemicals, agricultural goods (i.e., seeds), animals, etc. may be banned or prohibited in one country but allowed in another country.

The country code (CC) 374 may be determined by the airport code. The country code may be extrapolated from the airport code based on a lookup table that maps country codes and airport codes.

The AI customs screening model 370 may include programming instructions, which when executed causes a result 380 to be produced. By way of a non-limiting example, the result 380 may be representative of clear to pass the Customs authority without further examination or inspection by the Customs authority at the border-crossing country. By way of a non-limiting example, the result 380 may be representative of not clear meaning further examination or inspection by the Customs authority at the border-crossing country may be needed.

The AI customs screening model 370 may include programming instructions, which when executed causes receipt of exceptions 382 to train the model 370. By way of a non-limiting example, a cell phone (i.e., object) of a particular manufacture may be banned in a certain country. A controlled object may be controlled based on entering quantities (i.e., thresholds) and/or a certain manufacturer or model (i.e., exception). Certain training data may be used in real time to train a model as new rules and regulations change per country.

The AI customs screening model 370 may include programming instructions, which when executed employs machine learning (ML) or artificial intelligence (AI) algorithms. The ML/AL algorithms may include neural networks, Bayesian networks, Tree-based models, supervised learning algorithms, and reinforcement learning algorithms.

As can be appreciated, describing herein each and every object, exception or threshold per country is prohibitive.

The image sharing system 300C may include a bank of AI content list generators 360. The AI content list generators 360 may include AI content list generators 362, 364, 366 and 368. Each AI content list generators 362, 364, 366 and 368 may include an AI model 369 trained to generate a content list 373 based on the SSI and data 113 captured by a particular SS imaging machine 45 or 50. The content list 373 may be stored in memory such as virtual memory for access by virtual machines 330'. In one or more embodiments, the content list 373 may be sent to a virtual machine according to a schedule of flight landings. For example, the content list may be reviewed by the SS computer station 372 prior to the air carrier landing at the border-crossing airport. In this instance, the baggage handling system can be programmed with information about those luggage items that require screening by the Customs authority to expedite processing of the luggage items on a flight manifest.

Although only two SS imaging machines 45 and 50 are mentioned, collectively airports around the world may have any number of SS imaging machines that differ from one country to the next. An AI model 369 may receive training data for different models of the same manufacture of the SS imaging machine, such as when machines are replaced for repair or upgraded. The content list 373 may be accessed via the de-personalized file sharing data 306A or 306B, for example by the SS computer station 372. The AI content list generator 364 may generate a list of contents within the volume of space of a luggage item that are prohibited from entering a country or controlled. The list of contents may include a combination of ingredients or materials, which if combined may create a hazardous material that is prohibited or controlled by the country.

The virtual memories 314' may store the security screening image and data 113. By way of a non-limiting example, the security screening image and data 113 stored in virtual memory 314" from SS imaging machine 45 may be sent to AI content list generator 362. However, the security screening image and data 113 stored in virtual memory 314" from SS imaging machine 50 may be sent to AI content list generator 364.

In an example, memory devices may store a contents list 373. In one or more embodiments, instead of the contents list 373, a content list identifier or contents list locator may be stored in memory. The content list identifier or contents list locator may locate the content list in a content list database. The content list 373 may also be used for different vehicles of travel.

The system may use a search algorithm to search the content list for prohibited items on the vehicle of travel associated with the second mode of travel.

The methods described herein below depict a particular sequence of operations. The sequence may be altered without departing from the scope of the present disclosure. For example, some of the operations depicted may be performed in parallel or in a different sequence that does not materially affect the function of the methods. In other examples, different components of an example device or system that implements the methods may perform functions at substantially the same time or in a specific sequence. In one or more sequences, one or more acts, blocks, or events may be omitted.

In one or more embodiments, the AI generated contents list of the volume of space within the luggage item may be used to identify a lost or mishandled luggage item by identifiable contents from the contents list. The PID 204, 204' or 204" may be used to extrapolate back to the license plate number 202. From the license plate number 202, the passenger's name may be determined to pair the passenger with their luggage item.

The contents list may be based on three-dimensional (3D) tomography data or other X-ray data. The 3D data may be generated by CT scanners.

Figure 4:
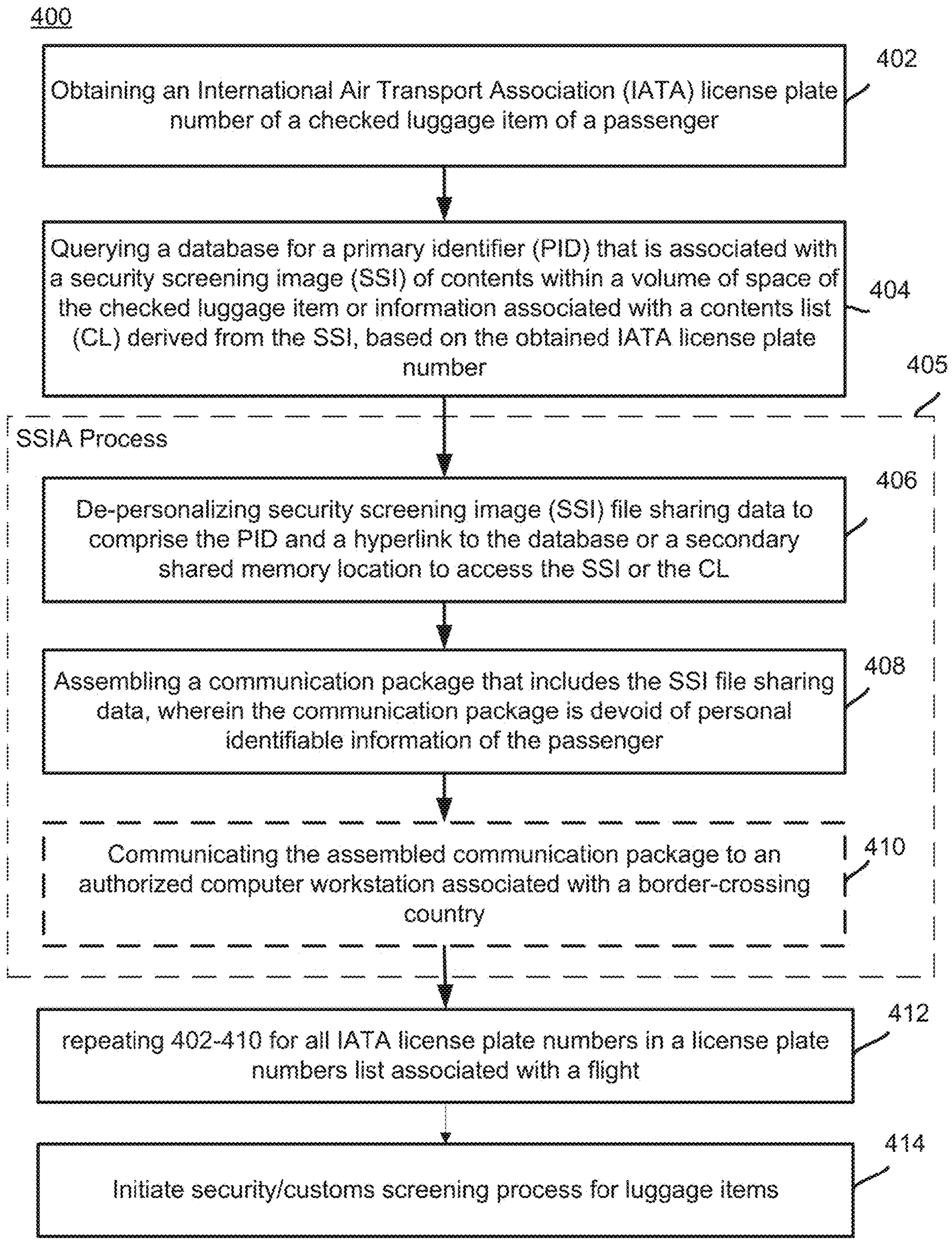
FIG. 4 illustrate a flowchart of a method for retrieving and transferring de-personalized security screening images for use by a customs authority in accordance with an embodiment.

FIG. 4 illustrate a flowchart of a method 400 for retrieving and transferring de-personalized security screening images for use by a customs authority in accordance with an embodiment.

The method 400 may include, at block 402, obtaining, by at least one of at least one processor of the system, an International Air Transport Association (IATA) license plate number of a checked luggage item of a passenger. The obtaining of the IATA license plate number may include receiving, by at least one of the at least one processor of the system, a IATA data message generated by a computer system associated with an air carrier in the originating country or the border-crossing country. The processor for obtaining the license plate number of a checked luggage item of a passenger may be described in relation to FIG. 5A or 5B.

Method 400 may include, at block 404, querying, by at least one of the at least one processor, a database for a primary identifier (PID) that is associated with a security screening image (SSI) of contents within a volume of space of the checked luggage item or information associated with a contents list (CL) derived from the SSI, based on the obtained IATA license plate number.

In one or more embodiments, the PID is generated by one of a baggage handling system 63 transporting the luggage item to a security screening imaging machine 45, 50 in an originating country that captures the SSI or the security screening imaging machine. In one or more embodiments, the PID (i.e., PID 204") may be linked to the PID (i.e., PID 204 or 204') that was generated by the baggage handling system 63 or the security screening imaging machine 45, 50.

Method 400 may include, at block 405, a security screening integration assistant (SSIA) process 405 to de-personalize security screening image file data for sharing with other authorities, including authorities around the world. The security screening integration assistant (SSIA) process 405 may include blocks 406, 408 and 410 described below.

Process 405 of method 400 may include, at block 406, de-personalizing, by at least one of the at least one processor, security screening image (SSI) file sharing data to may include the PID 204, 204' or 204" and a hyperlink to the database or a secondary shared memory location to access the SSI or the CL.

FIG. 9A illustrates a flowchart of a method 900A for de-personalizing passenger list information message data from passenger list information messages (PLIMs) or International Air Transportation Association (IATA) data messages in accordance with an embodiment.

Figure 34A:
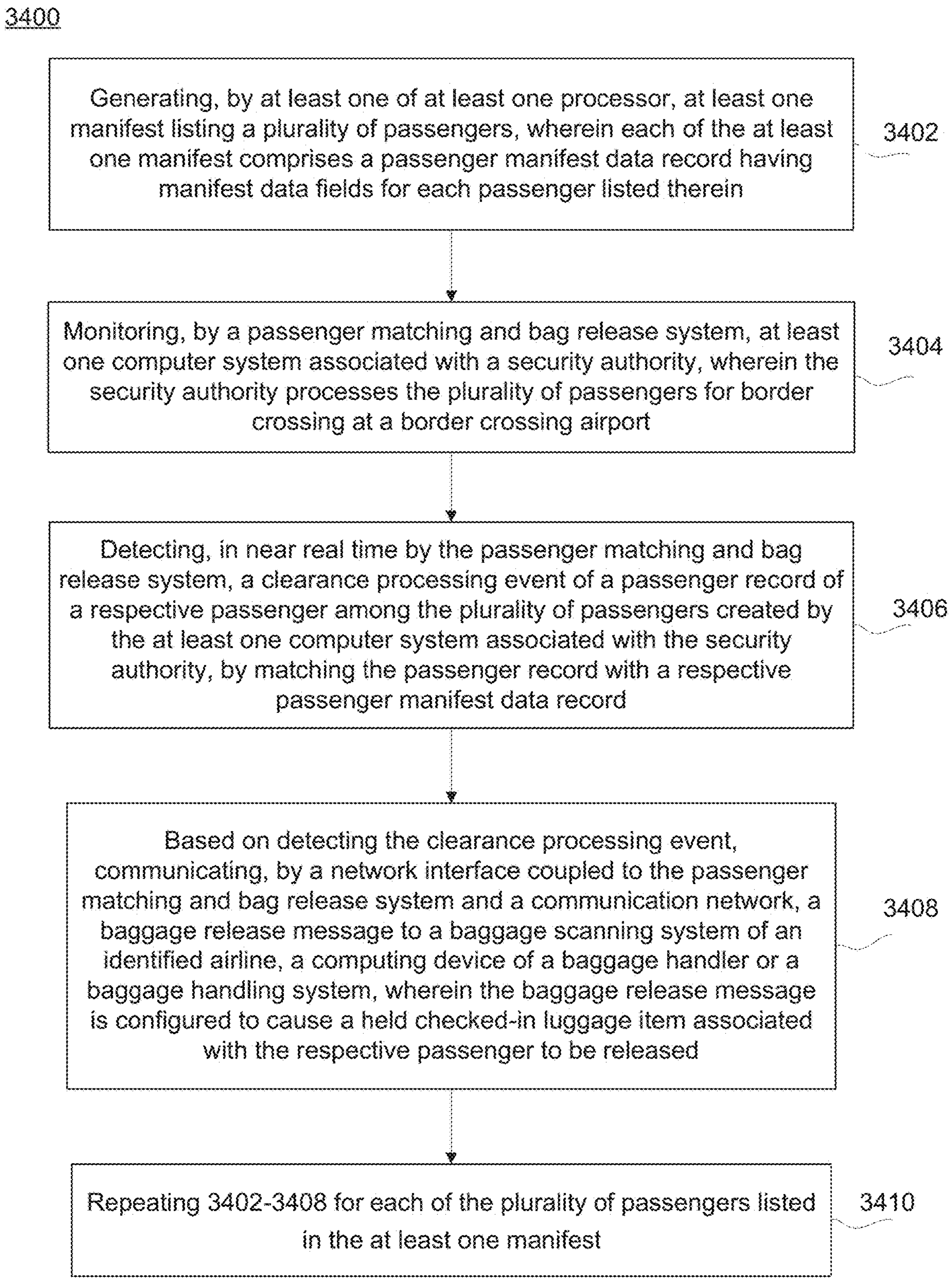
FIGS. 34A, 34B and 34C illustrate a flowchart of a method for passenger matching and baggage release in accordance with an embodiment.

The method 900A may include, prior to block 3402 of FIG. 34A, receiving, by a second network interface coupled to at least one of the at least one processor and a second communication network, at block 902A. The electronic PLIM may be from the DCS or from a computer messaging system associated with the originating airline. The electronic PLIM may include one of a passenger final sales message, a passenger reconcile message, a passenger name list message, an advance passenger information (API) message, a passenger list message, or a PNRgov message.

The manifest data fields may include at least one of the UPID of the respective passenger and a baggage tag identifier of each checked-in luggage item of the respective passenger.

The method 900A may include obtaining, by at least one processor, from PLIMs having a message format, passenger data for each passenger of the plurality of passengers. The passenger data may include a unique passenger identifier (UPID) assigned by the DCS of an originating airline or other at least one of a control server or cloud computing control system of the originating airline. The PLIM identified a flight carrying the plurality of passengers that may border cross at that border crossing airport.

The method 900A may include depersonalizing the passenger data by replacing personal identifying information with a computer-generated identifier, at block 906A. The de-personalized passenger data include identifying the passenger in a manifest or other passenger list by their UPID and/or IATA license plate.

By way of a non-limiting example, the UPID may be used for each leg of travel to identify the passenger with a de-personalized identifier. The combination of the UPID and IATA license plate can follow the passenger until the passenger is checks into a return flight at which time a new UPID and IATA license plate may be assigned. As a consequence, the UPID and/or IATA license plate may be used to link the passenger to other vehicles in other modes of travel until the return flight using de-personalized data.

Figure 31A:
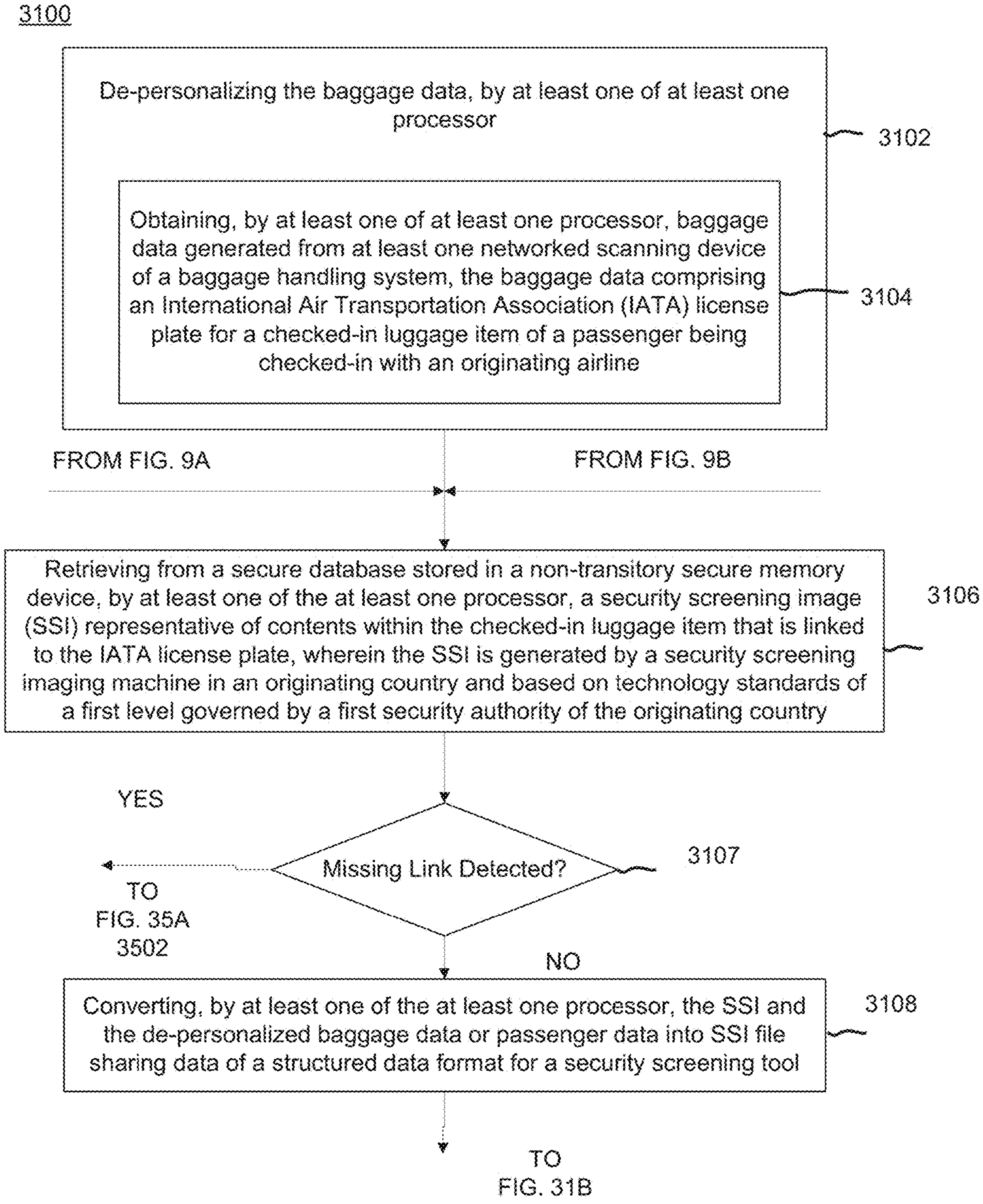
FIGS. 31A and 31B illustrates a flowchart of a method for de-personalized security data file sharing with a security screening image in accordance with an embodiment.
Figure 31B:
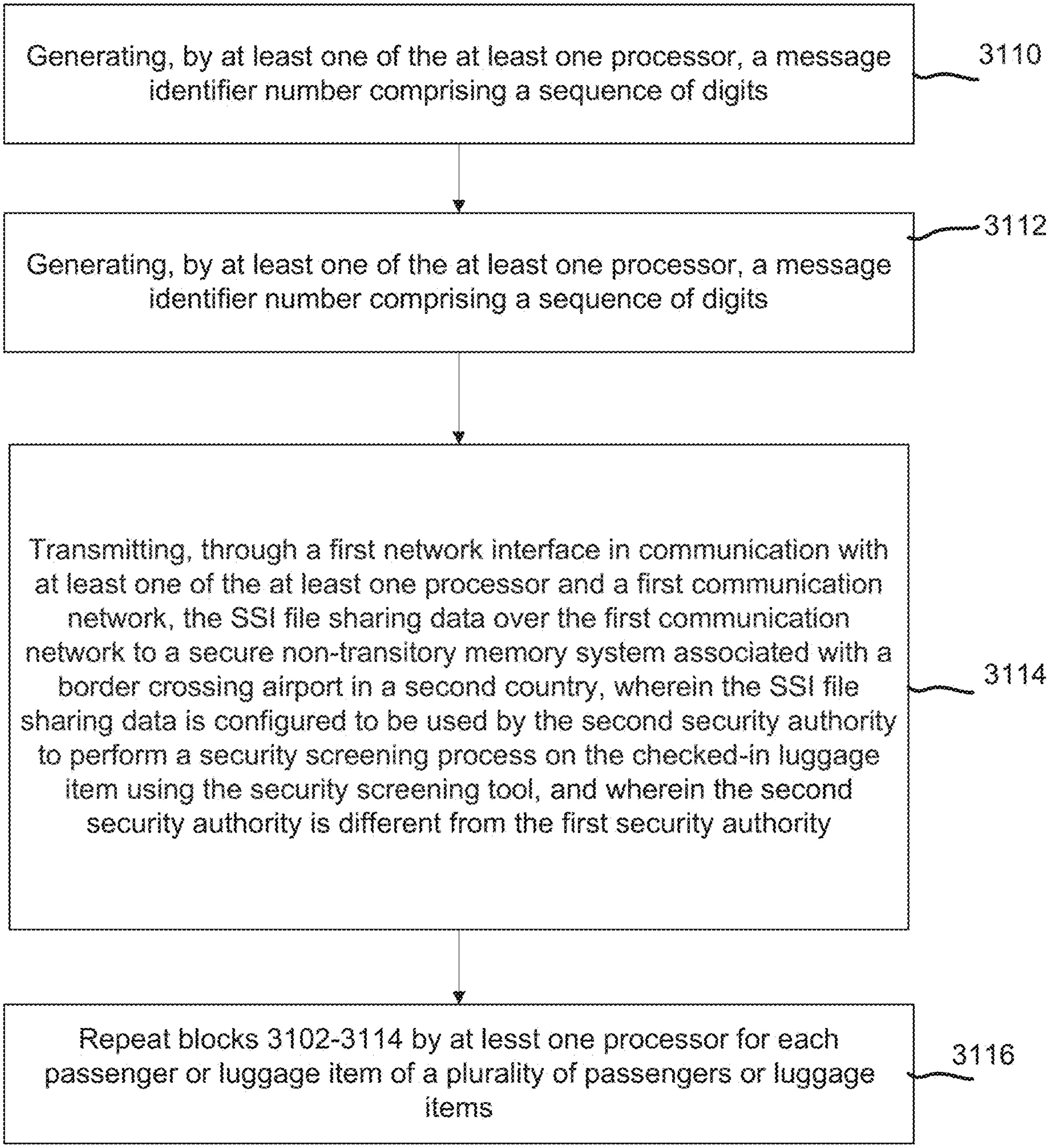

After block 906A, a process for converting an SSI data file to a standardized format for a security screening tool is described in FIG. 31A-31B, beginning at block 3106.

FIG. 9B illustrates a flowchart of a method 900B for de-personalizing passenger list information message data from PLIMs or IATA data messages in accordance with an embodiment. The method 900B is similar to method 900A. Therefore, only the differences will be described. At block 904B, method 900B may include obtaining, by at least one of at least one processor, from an electronic IATA data message having a first message format or an electronic PLIM having a second message format, passenger data. The passenger day may include a passenger name record (PNR) locator linked to a passenger, a passenger name of the passenger, and a unique baggage identifier for a checked-in luggage item of the passenger. The passenger is check-in with an originating airline. The IATA data message or the electronic PLIM identifies a flight carrying passengers that will disembark or transfer at a border crossing airport. After block 906B, a process for converting a SSI data file to a standardized format for a security screening tool is described in FIG. 31A-31B, beginning at block 3106.

Process 405 of method 400 may include, at block 408, assembling, by at least one of the at least one processor, a communication package that includes the SSI file sharing data, wherein the communication package is devoid of personal identifiable information of the passenger. The assembling, at block 408, may include incorporating a flight number with the de-personalized SSI file sharing data. The assembling, at block 408, may include incorporating meta data 208 with the de-personalized SSI file sharing data.

Process 405 of method 400 may include, at block 410, communicating, by at least one of the at least one processor, the assembled communication package to an authorized computer workstation associated with a border-crossing country.

Regarding FIGS. 9A-9B, de-personalized data used in the SSI file sharing data may include at least one of a flight number, an airline code, a passport document number, a passenger name record (PNR) locator, the IATA license plate, the UPID or a pseudo identifier (PID).

Method 400 may include, at block 412, repeating blocks 402-410 for all the IATA license plate numbers in a license plate list associated with a flight. However, based on the MID data the list may be parsed so that the SS computer station 372 of FIG. 3A receives those PIDs associated with imaging machine 45, while another station receives PIDs for imaging machine 50.

The order of block 410 and 412 may be interchanged in some embodiments. Therefore block 410 is shown as a dashed box in the block of process 405.

Method 400 may include, at block 414, initiating security/customs screening process for the luggage items. For example, by way of a non-limiting example, one of the virtual machines 330 may need to be assigned to a workstation (i.e., SS computer station 372 of FIG. 3A) of the Customs authority. In another example, the virtual machines 330 may be assigned according to a flight schedule. In another example, the content lists 373 may be sent to an assigned virtual machine 330 to initialize the security/customs screening process.

In some instances, a border-country may use a content list for additional screening for aviation travel when the luggage item is transferring to another air carrier. In such an instance, the luggage item may bypass imaging using the SS imaging machines at the border-crossing airport.

In one or more embodiments, the security/customs screening process may be completely automated according to an AI engine at a first stage of evaluation. A second stage of evaluation requires a man in the loop to inspect the luggage items, if necessary.

The steps of block 402 will be described in relation to the examples of FIG. 5A and FIG. 5B.

Figure 5A:
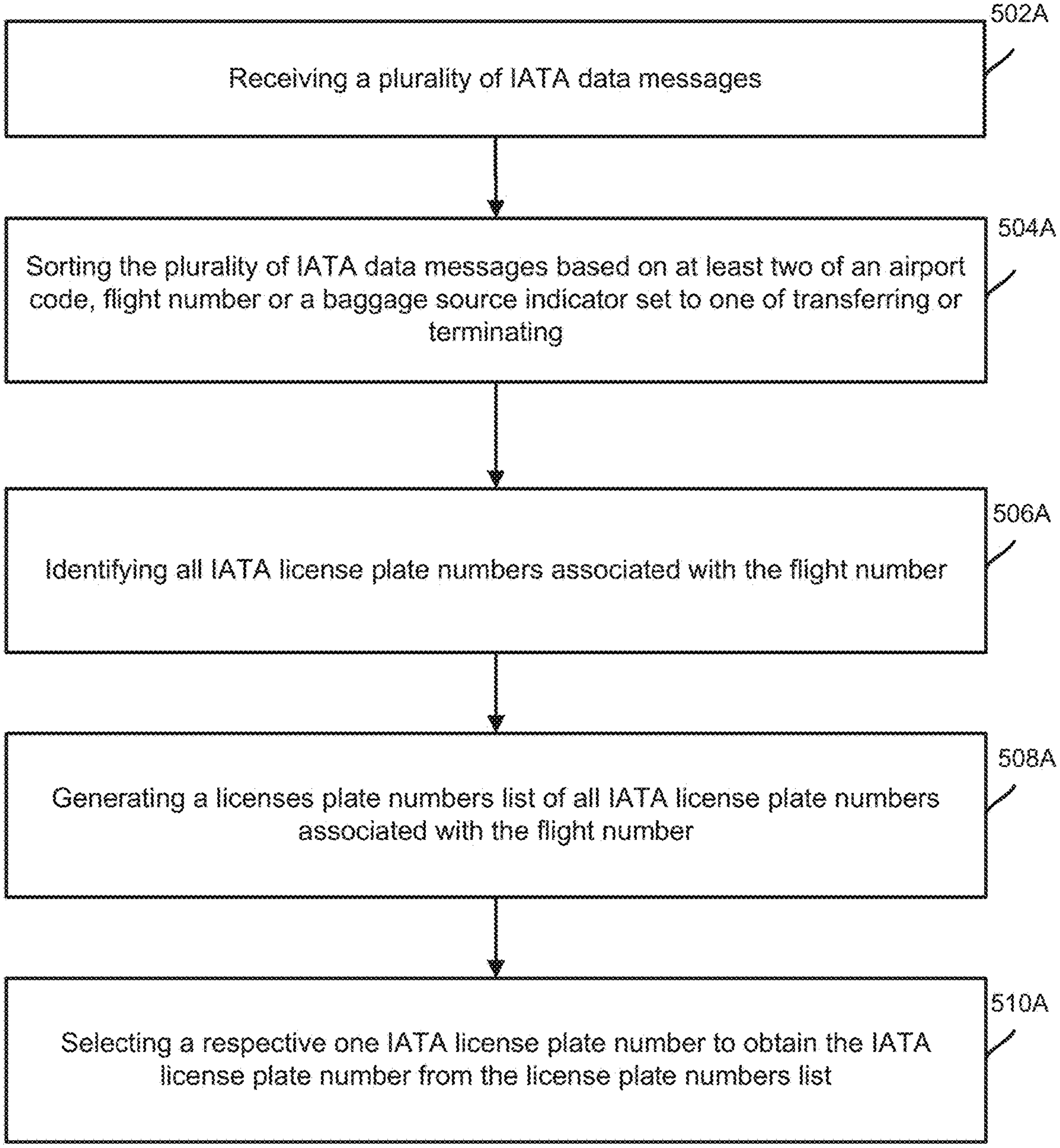
FIG. 5A illustrates a flowchart of a method for identifying luggage items transferring or terminating at a border-crossing airport based on a flight number or airport code in accordance with an embodiment.

FIG. 5A illustrates a flowchart of a method 500A for identifying luggage items transferring or terminating at a border-crossing airport based on a flight number or airport code in accordance with an embodiment.

Method 500A may include, at block 502A, receiving, by at least one of the at least one processor of the system, a plurality of IATA data messages from a computer system associated with an airline carrier or other designated computer system. The IATA data message may be generated by a computer system associated with an air carrier in the originating country of the flight or the border-crossing country in which the flight lands.

In one or more embodiments, the IATA data message may be one of a transfer baggage sources message or a terminating baggage source message.

Method 500A may include, at block 504A, sorting, by at least one of the at least one processor, the plurality of IATA data messages based on at least one of an airport code, flight number or a baggage source indicator set to one of transferring or terminating.

Method 500A may include, at block 506A, identifying, by at least one of the at least one processor, all IATA license plate numbers associated with the flight number.

Method 500A may include, at block 508A, generating, by at least one of the at least one processor, a licenses plate numbers list of all IATA license plate numbers associated with the flight number.

Method 500A may include, at block 510A, selecting, by at least one of the at least one processor, a respective one IATA license plate number to obtain the IATA license plate number from the license plate numbers list.

Figure 5B:
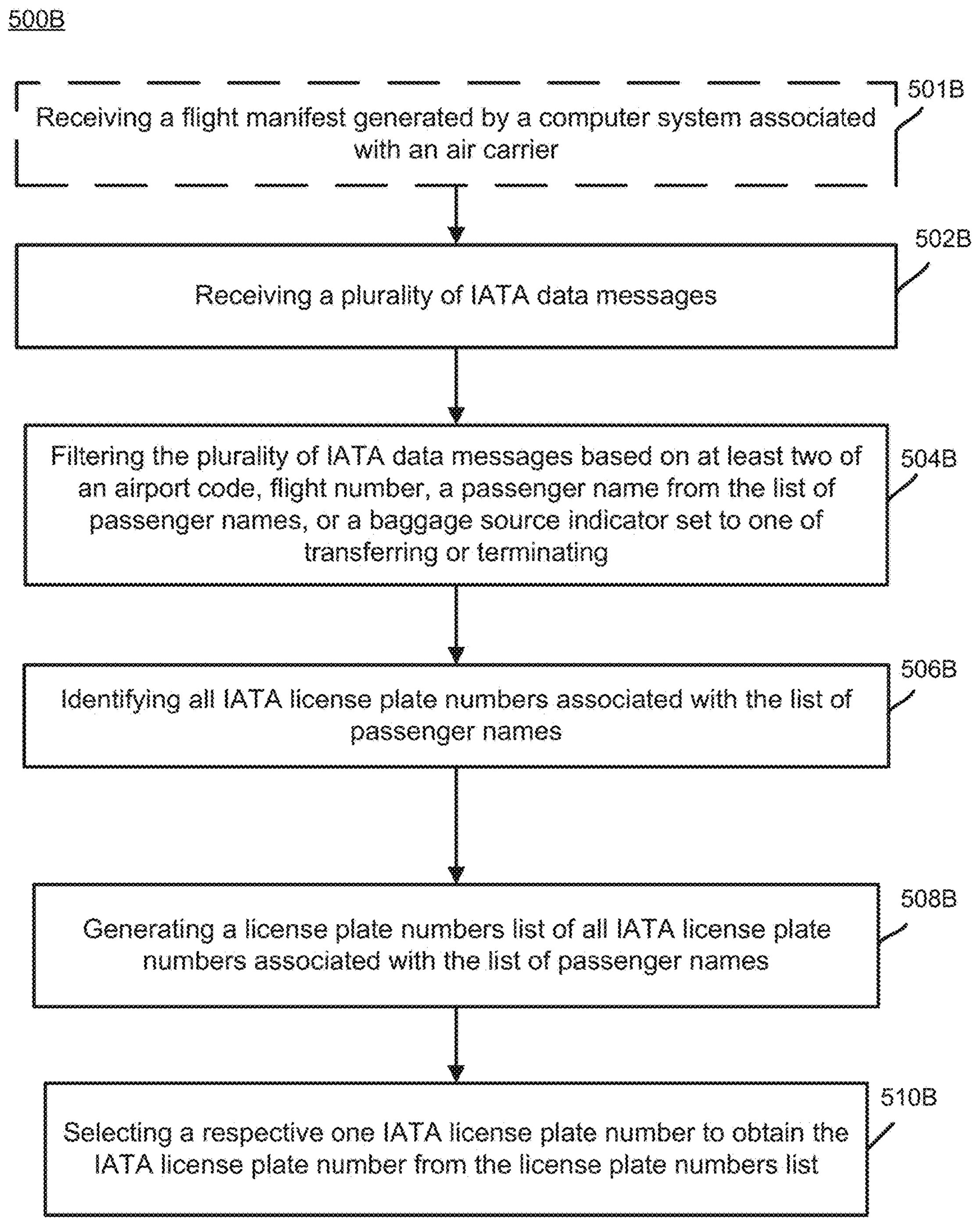
FIG. 5B illustrates a flowchart of a method for identifying luggage items transferring or terminating at a border-crossing airport based on a flight number, airport code or passenger list in accordance with an embodiment.

FIG. 5B illustrates a flowchart of a method 500B for identifying luggage items transferring or terminating at a border-crossing airport based on a flight number, airport code or passenger list (or flight manifest) in accordance with an embodiment.

Method 500B may include, at block 501B, receiving, by at least one of the at least one processor of the system, a flight manifest generated by a computer system associated with an air carrier to land at an airport in the border-crossing country. The flight manifest may include a list of passenger names associated with a flight number. The flight manifest may include a list of passenger names and license plate numbers.

Method 500B may include, at block 502B, receiving, by at least one of the at least one processor, a plurality of IATA data messages from a computer system associated with an airline carrier. The IATA data message may be generated by a computer system associated with an air carrier in the originating country of the flight or the border-crossing country in which the flight lands.

In one or more embodiments, the IATA data message may be one of a transfer baggage sources message or a terminating baggage source message. The baggage source message may include a baggage source indicator that indicates that the message is one or a transfer baggage source message or a terminating baggage source message. The baggage source message may include an airport code that is associated with the baggage source indicator to identify which airport the luggage item will transfer or terminate from when landing and off-loading from its current air carrier.

Method 500B may include, at block 504B, sorting, by at least one of the at least one processor, the plurality of IATA data messages based on at least two of an airport code, flight number, a passenger name from a list of passenger names, or a baggage source indicator set to one of transferring or terminating. The list of passenger names may be a flight manifest associated with the flight number.

Method 500B may include, at block 506B, identifying, by at least one of the at least one processor, all IATA license plate numbers associated with the list of passenger names.

Method 500B may include, at block 508B, generating, by at least one of the at least one processor, a licenses plate numbers list of all IATA license plate numbers associated with the list of passenger names or flight manifest.

Method 500B may include, at block 510B, selecting, by at least one of the at least one processor, a respective one IATA license plate number to obtain the IATA license plate number from the license plate numbers list.

Figure 6:
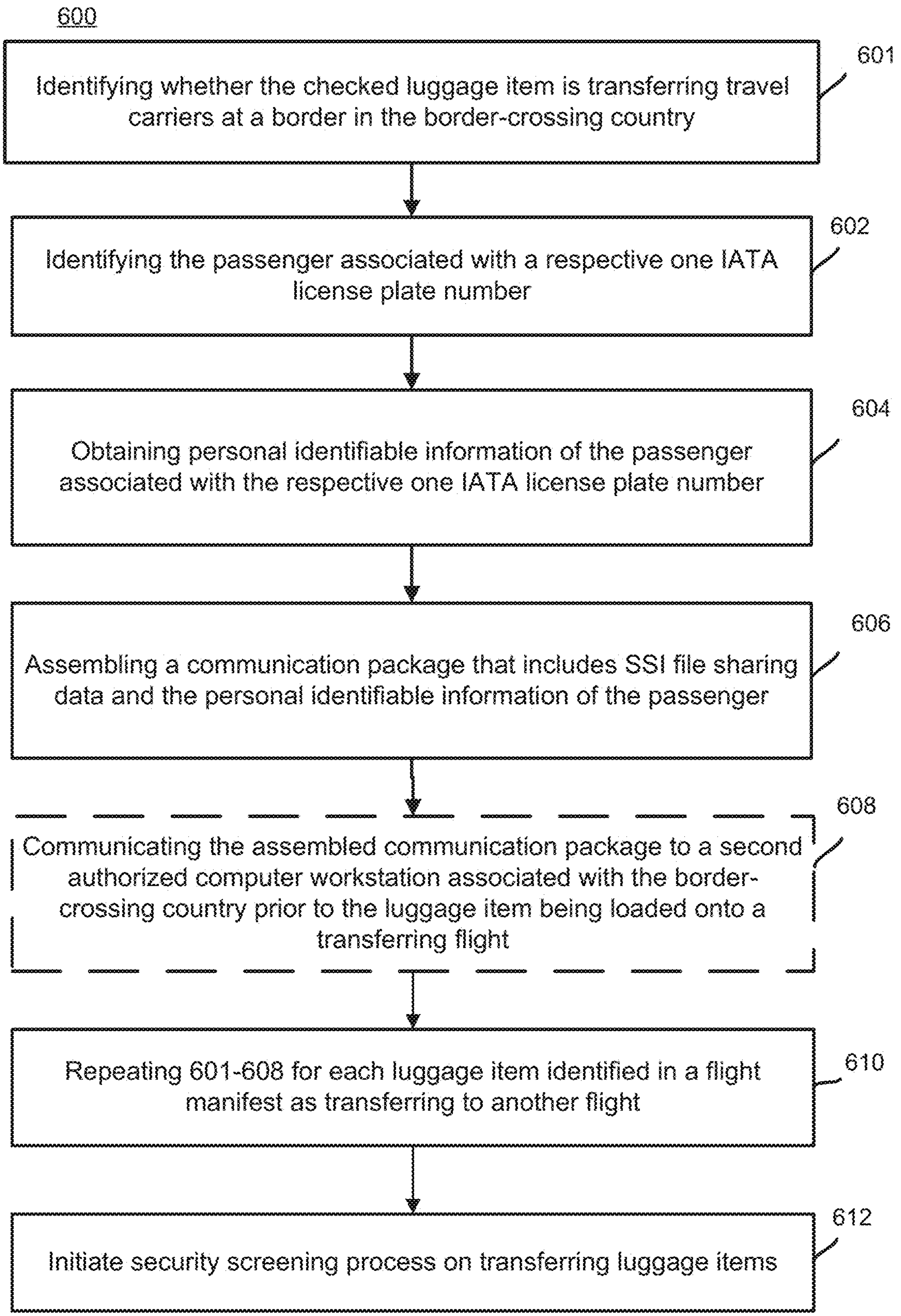
FIG. 6 illustrates a flowchart of a method for identifying luggage items requiring re-screening for transferring to a second air carrier in accordance with an embodiment.

FIG. 6 illustrates a flowchart of a method 600 for identifying luggage items requiring re-screening for transferring to a second air carrier in accordance with an embodiment. Method 600 may include, at block 602, identifying, by at least one of the at least one processor of the system, whether the checked luggage item is transferring travel carriers at a border in the border-crossing country, such as at a border-crossing airport.

Method 600 may include, at block 602, identifying, by at least one of the at least one processor of the system, the passenger associated with a respective one IATA license plate number. Method 600 may include, at block 604, obtaining, by at least one of the at least one processor of the system, personal identifying information of the passenger associated with the respective one IATA license plate number. By way of a non-limiting example, personal identifiable information may be identified from PNR data stored in PNR 112 (FIG. 1B). The PNR data may be retrieved by extracting the PNR number from a IATA data message such as a baggage source message described in FIG. 14.

Method 600 may include, at block 606, assembling, by at least one of the at least one processor of the system, a (second) communication package that includes SSI file sharing data and the personal identifying information of the passenger. Method 600 may include, at block 608, communicating, by at least one of the at least one processor of the system, the assembled (second) communication package to a second authorized computer workstation associated with the border-crossing country prior to the luggage item being loaded onto a transferring flight.

Method 600 may include, at block 610, repeating blocks 601-608, by at least one of the at least one processor of the system, for each luggage item identified in a flight manifest as transferring to another flight. The order of 608 and 610 may vary.

Method 600 may include, at block 612, initiating security screening process for the luggage items. For example, by way of a non-limiting example, one of the virtual machines 330 may need to be assigned to a workstation (i.e., SS computer station 372 of FIG. 3A) of the Customs authority. In another example, the virtual machines 330 may be assigned according to a flight schedule. In another example, the content lists 373 may be sent to an assigned virtual machine 330 to initialize the security/customs screening process.

In one or more embodiments, the SSI file name may be an encoded SSI file name 206' without the need to send the personal identifying information of the passenger separately.

Figure 7:
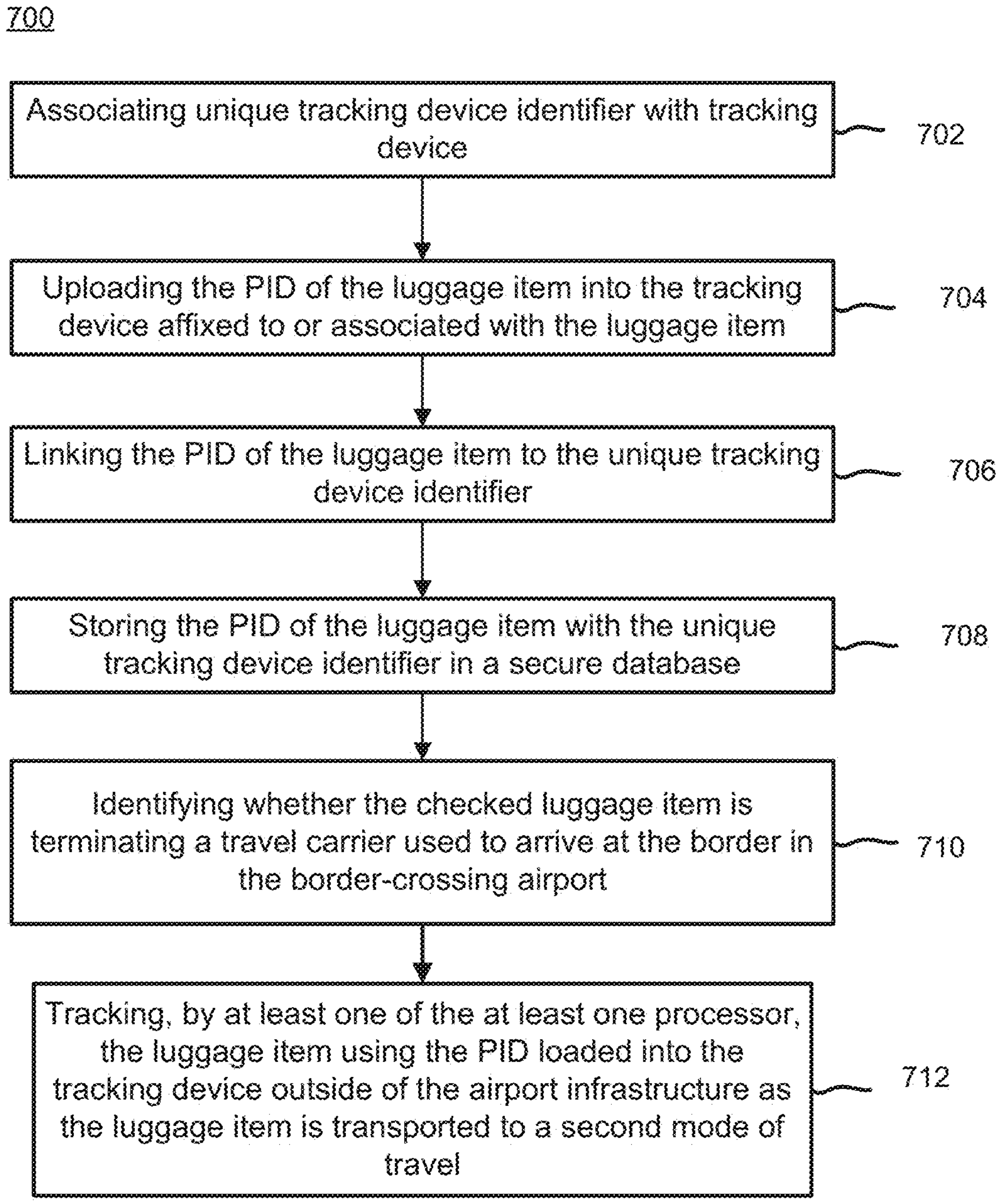
FIG. 7 illustrates a flowchart of a method for tracking a luggage item using the PID in accordance with an embodiment.

FIG. 7 illustrates a flowchart of a method 700 for tracking a luggage item using the PID loaded in a tracking device 41 in accordance with an embodiment. The tracking device 41 is in more detail in FIG. 12A. Method 700 may include, at block 702, associating, by at least one of the at least one processor of the system, a unique tracking device identifier with tracking device 41. Method 700 may include, at block 704, uploading, by at least one of the at least one processor of the system, the PID 204, 204' or 204" of the luggage item into the tracking device 41 affixed to or associated with the luggage item. Method 700 may include, at block 706, linking, by at least one of the at least one processor of the system, the PID of the luggage item to the unique tracking device identifier. Method 700 may include, at block 708, storing, by at least one of the at least one processor of the system, the PID of the luggage item with the unique tracking device identifier in a secure database. Method 700 may include, at block 710, identifying, by at least one of the at least one processor of the system, whether the checked luggage item is terminating a travel carrier used to arrive at the border in the border-crossing airport.

Method 700 may include, at block 712, tracking, by at least one of the at least one processor of the system, the luggage item using the PID loaded in the tracking device 41 outside of the airport infrastructure as the luggage item is transported to a second mode of travel.

Figure 8:
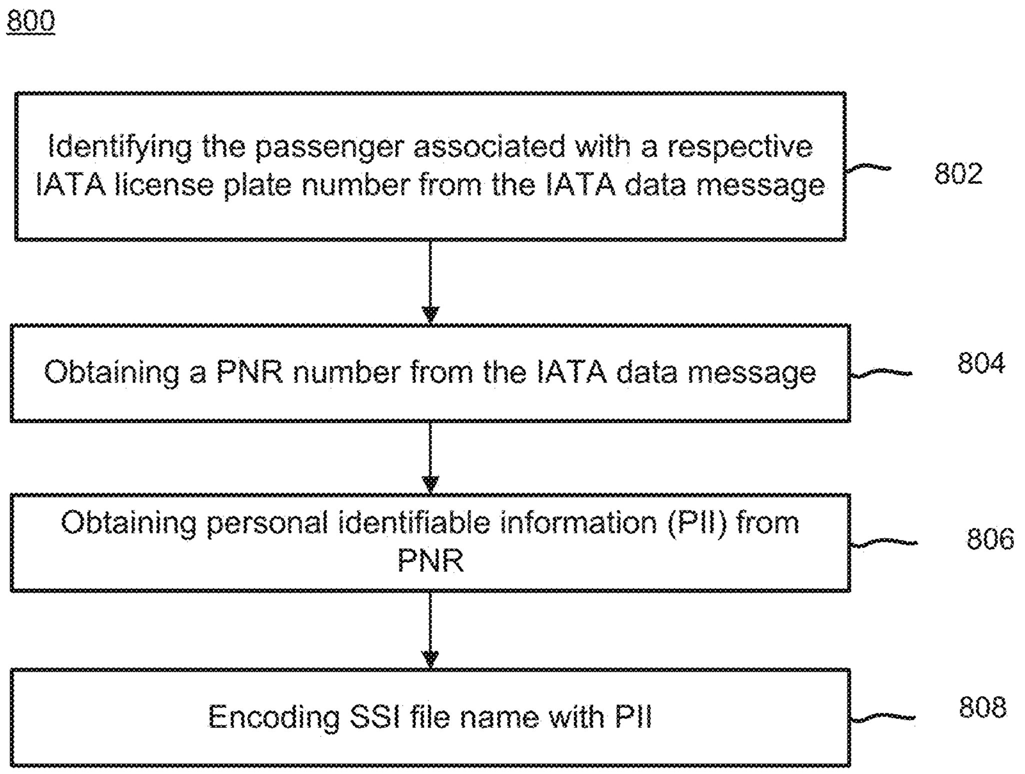
FIG. 8 illustrates a flowchart of a method for converting a security screening image file name to an encoded a security screening image file name in accordance with an embodiment.

FIG. 8 illustrates a flowchart of a method 800 for converting a security screening image file name to an encoded a security screening image file name 206' in accordance with an embodiment.

Method 800 may include, at block 802, identifying, by at least one of the at least one processor of the system, the passenger associated with a respective IATA license plate number from a IATA data message. The passenger may be identified by the passenger name and or the passenger name record (PNR) number found in the IATA data message, such as a BSM.

Method 800 may include, at block 804, obtaining, by at least one of the at least one processor of the system, a PNR number. Method 800 may include, at block 806, obtaining, by at least one of the at least one processor of the system, personal identifiable information (PII) from PNR 112 (FIG. 1B) or other memory device with PII associated with the passenger name or PNR number. Method 800 may include, at block 808, encoding, by at least one of the at least one processor of the system, SSI file name with the PII.

The PII may include a birth date of the passenger where a portion of the file name may include a sequence of numbers that represent the birth date. In an example, the PII may include a passport number where a portion of the file name may include a sequence of numbers that represent the all or a portion of the passport number. In an example, the PII may include a social security number where a portion of the file name may include a sequence of numbers that represent the all or a portion of the social security number or government issue identity number. In an example, the PII may include a unique identifier where a portion of the file name may include a sequence of numbers that represent the all or a portion of the unique identifier. In an example, the PII may include a driver's license number where a portion of the file name may include a sequence of numbers that represent the all or a portion of the driver's license number.

The programming instruction which when executed causes encoding of the SSI file name may include generating an SSI file name that includes the birth date or a portion of the birth date. The programming instruction which when executed causes encoding of the SSI file name may include generating an SSI file name that includes a portion of a passenger's social security number. For example, the last four digits. In encoding may include all digits of the PII in another example. The encoding may transpose digits in a different order to conceal the PII.

In one or more embodiments, a passenger may register for a service with approval or permission to provide a birth date to a foreign government.

Integrated Security Screening Process

FIG. 10A illustrates a method 1000A for file handling for an integrated security screening process of luggage items that need to be processed through a security screening station in accordance with an embodiment. The Integrated Security Screening Station (ISSS) 1070 may include CBP, Coast Guard, TSA, Custom government entities at a border crossing, such as airports, trains, buses, or dockside, private security screening entities for cruise ships, and private security screening entities for hotels, for example.

The processes described herein may allow security screening images and data 113' to be transferred between government-to-government entities, business-to-business entities, and government-to-business entities without passing PII data by using, for example, a IATA data message, an IATA license plate and/or PNR number.

The method 1000A may include receiving, by a processor, a trigger, at 1002. The trigger may have been received from the security screening trigger generator 170. The trigger may be based on information from an airline flight manifest for passengers/luggage items exiting an air travel carrier. This is an example, for an international flight, where all passengers/luggage items may be required to be processed by the ISSS 1070, such as CBP or other Customs authority, for example. The trigger may be based on information from a cruise ship manifest for passengers disembarking a cruise ship travel carrier. The trigger may be based on a travel carrier crossing a border and the designated border control government agency requires a security screening of the luggage items to cross the border. The passenger may be on a train and the luggage item checked in under security protocols entering a different country. An example system that different uses security protocols is described in U.S. Pat. No. 10,366,293, titled "COMPUTER SYSTEM AND METHOD FOR IMPROVING SECURITY SCREENING," to Applicant Synapse Technology Corporation.

The trigger may be based on information from a cruise ship manifest for passengers exiting an air travel carrier and transferring to a cruise ship as the next vehicle of travel. The trigger may be based on information from a train manifest for passengers exiting an air travel carrier and transferring to a train as the next vehicle of travel. The trigger may be based on information from a bus manifest for passengers exiting an air travel carrier and transferring to a bus as the next vehicle of travel. The trigger may be based on information from a hotel or resort (i.e., lodging entity) manifest for passengers exiting an air travel carrier and transferring to a lodging entity as the next vehicle of travel.

The trigger may be based on a manifest MX maintained by system 100 for passengers registered by a luggage pickup and delivery service for delivery home or another address.

The file handling for an integrated security screening process of luggage items may rely on the security screening images taken of a luggage item when the first-mode of travel uses an air travel carrier. The image(s) 210 and related data by advanced scanning technologies like CT (Computed Tomography) scanners (i.e., CT imaging machine 237) can provide a more detailed, 3D image(s) of the bag's (i.e., luggage item) contents. These images 210 and related data may be used for other next vehicles of travel when the custody of the luggage item remains in compliance for maintaining security protocols so that the luggage item may be handed off from one vehicle of travel to the next vehicle to travel by analyzing the shared images for designated prohibited items for the next vehicle of travel. Additionally, different countries use different regulations on the amount of currency or other items being brought into a country. These are but a few examples and to describe each and every regulation between the United States and any other country is prohibitive.

A luggage item remaining inside of an airport infrastructure is considered to maintain it security status if handled by the trusted airport custody procedures. For example, the luggage item was not routed to the carousel and/or left unattended. However, luggage items leaving a terminating airport for the purposes of transferring to another vehicle of travel, for example, can be transferred to a trusted custody luggage handler to maintain the luggage item secure so that the luggage item can be processed using an ISSS 1070, described in more detail below.

When a passenger arrives with a checked luggage item at a border-crossing airport, the luggage item should be cleared by a Customs agency, for example, when entering the country. Each country may have a different set of customs guidelines. However, many countries require checked luggage items to be screened for prohibited items or prohibited quantities of items, for example under customs guidelines to cross the border.

A passenger arriving at a border-crossing airport may depart the airport along two different lanes. In one or more embodiments, both lanes may require screening by the Customs authority.

Method 1000A may include, at block 1004, loading, by at least one processor, a virtual memory device (FIG. 3A-3B) with de-personalized security screening image (SSI) file sharing data. Method 1000A may include, at block 1006, assigning, by at least one processor, a virtual machine (FIG. 3A-3B) with an SSI viewing application compatible to open and read the de-personalized security screening image file sharing data.

Method 1000A may include, at block 1007, assembling, by at least one processor, a communication message with the assigned virtual machine. In one or more embodiments, the communication message may be message 302 with the de-personalized SSI file shared data that includes a hyperlink to the virtual machine. The hyperlink may be embedded in a sequence of text that represents instructions.

Method 1000A may include, at block 1008, communicating, by at least one processor, the assembled message to a security screening computer station 1072A.

In one or more embodiments, the system and method may de-personalize security screening image (SSI) file sharing data to a security or customs authority. The de-personalized SSI file sharing data may include a pseudo identifier (PID) and a flight number, where the PID is an identifier that is associated with or linked to the security screening image 210 taken according to the security screening authority before the checked luggage item boards the air carrier from the originating airport.

The message may be communicated over an Intranet or Internet using wired or wireless communication protocols. The message may be transported over a public utility communication system, satellite communication system or cellular communication system. The ISSS 1070 may receive the message and perform the security screening according to the government agency regulations for the border and vehicle of travel. In some instances, the ISSS 1070 may be controlled by a private business entity such as a hotel chain or resort. Blocks 1004, 1006-1008 and activities of ISSS 1070 may be performed by system 190, described in relation to FIG. 16, in one or more embodiments.

By way of a non-limiting example, the communication of the assembled message may be received by a Security Screening (SS) computer station 1072A of the ISSS 1070. The image and data in the assembled message may be a follow-along security image and data. The first screening may include screening a follow-along security image and/or data of the assembled message. If the first screening is not passed, the luggage item may be re-screened using a security screening device 1072B and using securing screening regulation associated with the location (i.e., country) of security screening device 1072B. In other embodiments, the luggage item may be manually searched.

For the passenger and the luggage item to proceed, the luggage item needs to be cleared.

This same image and data tagged with the PID, may follow the luggage item through its travel journey for other ISSSs 1070 or until trusted custody is broken. However, for a next vehicle travel, if the current follow-along security image and/or data does not clear the ISSS 1070 according to the rules or regulation for the next vehicle, the luggage item is rescreened by the security screening device 1072B of the ISSS 1070. However, the follow-along security image and/or data may be available until the security custody is completed such as the luggage item is delivered to a cabin in a cruise ship or a room in a lodging entity; and/or delivered to a train station or bus station and placed on board the next vehicle of travel. If the luggage item is transferred to multiple planes to arrive at a final destination, the security custody may be maintained and the security image and/or data may follow-along the journey until the passenger or other non-trusted persons receive custody of the luggage item.

In FIG. 10A, the SS computer station 1072A and security screening device 1072B are shown side by side. However, these two entities may be at different locations within an airport infrastructure. In such an embodiment, a trusted handler may receive those luggage items marked as not cleared or not passed and deliver them to another location where the security screening device 1072B is housed.

In one or more embodiments, the marker may include the IATA license plate of the originating bag tag and other BSM information such as the passenger's name, or personal identifiable information. The IATA license plate number may be extrapolated from the PID as previously described.

The method 1000A may include receiving, by a processor of the system, one of clearance or not cleared indications from the SS computer station 1072A or the security screening device 1072B, at block 1024. The method 1000A may include updating, by a processor, the handler devices and/or scanning devices with routing information associated with the IATA bag tag, (optional) PID, or marker to identify where the luggage item should go next, at block 1026. In one or more embodiments, the PID may be encoded into a barcode that is scannable by a scanning device or acquiring device. In one or more embodiments, once the marker is printed all shared image data may be deleted from memory, at block 1025. In this instance, access to the PID does not expose the shared image data.

The updating performed, at block 1026, may be performed by system 190, by a computer system associated with a baggage handling system in the airport infrastructure, other vendor assigned the task to update messaging in the airport infrastructure, a computer associated with other travel carriers for sending clearing luggage items, or other vendor assigned the task to update messaging outside of the airport infrastructure. The luggage item, if not cleared, may not be able to enter the baggage handling system for transfer to another air carrier, be transported to the next leg of travel, out of the airport or out of the ISSS, for example. The scanner and baggage handler devices may scan for the IATA license plate or bingo tag for baggage handling instructions. The baggage handling instructions may be embedded in IATA data messages.

In the scenario where the luggage items of an entire air carrier are checked, some passengers and luggage items that are cleared will leave the airport, where the airport code was designated as a terminating airport code. Furthermore, the luggage item when leaving the airport may be handled by system 100 and status information may be stored in fields of the LIM record.

In another scenario, a passenger and their luggage item may board another plane to a destination point. In one or more embodiments, the luggage item terminating the airport from screening by the ISSS 1070 may be transferred using trusted custody to a cruise ship, train, or bus, according to the sorted terminating IATA data messages.

Figure 10B:
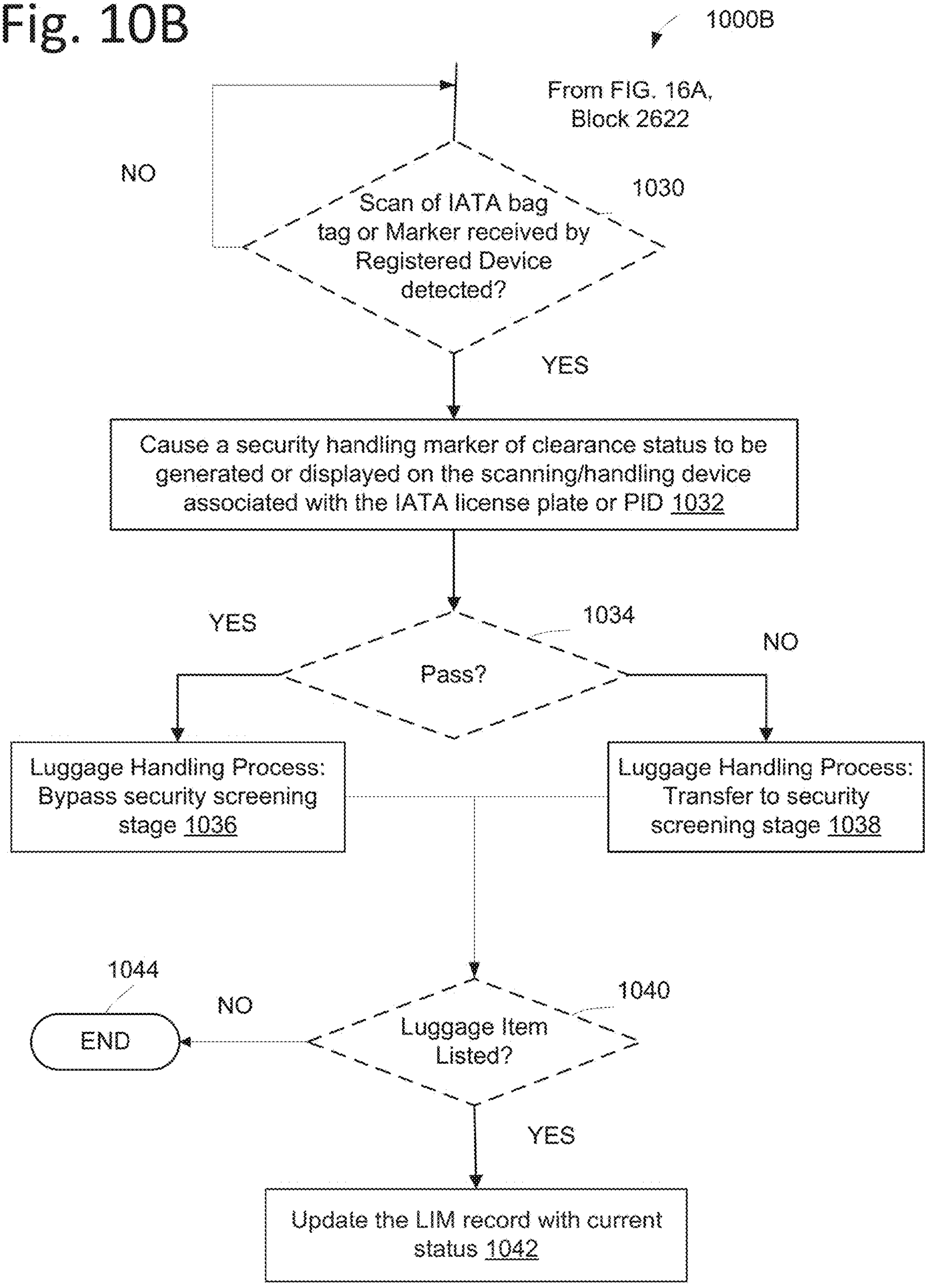
FIG. 10B illustrates a method for luggage item status reporting and handling for the integrated security screening process of luggage items, after being processed through a security screening station, in accordance with an embodiment.

From block 1024, the method 1000A may proceed to FIG. 10B, block 1030.

FIG. 10B illustrates a method 1000B for luggage item status reporting and handing for the integrated security screening process of luggage items, after being processed through an ISSS, in accordance with an embodiment.

The method 1000B may include determining, by a processor, at block 1030, whether a trusted custody handler scans the bag tag or bingo marker on the luggage item by acquiring the originating IATA license plate, PID, or other unique identifier. If the determination, by a processor, at block 1030, is "NO," the method 1000B may loop back to the beginning of block 1030 to wait for the scan. In one or more embodiments, the scan acquires data of the originating hardcopy of the bag tag or marker. The acquired (scan) data is converted into a digital BTI or digital PID. If the scan is image data, the image data is converted to machine-encoded text.

Figure 15:
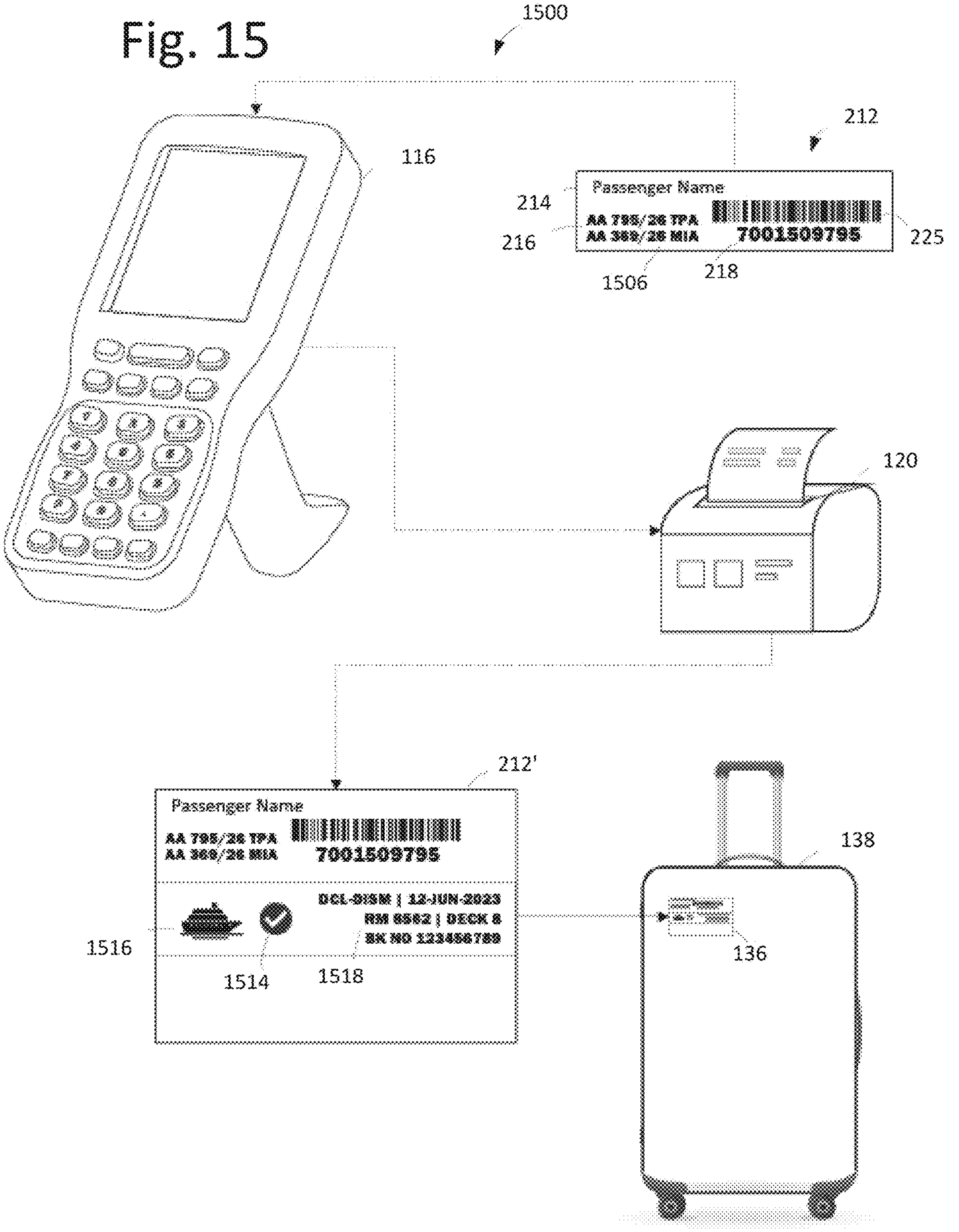
FIG. 15 is a diagrammatic view of a process for generation of baggage authorization indicia for bypassing additional baggage screening or indication of screening completion in accordance with an embodiment.

If the determination, by a processor, at block 1030, is "YES," the method 1000B may cause, by a processor, a clearance handling marker of clearance status to be generated or displayed on the scanning device associated with the IATA license plate or PID, at block 1032. An example clearance handling marker (i.e., MK 136) is shown in FIG. 15. The SSIA system 190 may receive indication of pass/cleared or fail/not cleared. The indication may trigger the SSIA system 190 to cause the programming of the handling devices and/or scanning devices with pass/cleared or fail/not cleared and/or next routing information. The routing information may be based on various information including IATA data messages, PNR travel information accessed by the PNR number, manifest information, or any combination thereof.

The clearance handling marker may include delivery location data from an itinerary, PNR data, or reservation data. The delivery location data may include room or cabin data, or other instructions for secure handling of the luggage item from the terminating airport to the next vehicle of travel. However, in other examples, the MK 136 may include a unique identifier and a symbol or icon representative of pass/cleared or fail/not cleared security indicator.

Other markers may be used. For example, if the luggage item is being delivered home for a registered passenger, a home icon may be displayed with a check mark indicating clearance followed by a home address or building address representative of the delivery address.

The method 1000B may include determining, by a processor, whether the contents of the luggage item passed the ISSS, at block 1034. If the determination, at block 1034, is "YES," the method 1000B may include performing a luggage handling process to bypass the security screening device 1072B of the ISSS 1070. In other words, the luggage item requires no further security screening for the mode of travel. The follow-along security image and/or data analyzed by the SS computer station 1072A cleared the luggage item for departure from the ISSS 1070. When the luggage item is cleared, the luggage item may be sorted based on additional routing information. For example, the cleared luggage item may be terminating a travel carrier or an airport without further service. In this example, the programmed additional routing information may indicate the routing of the luggage item to a carousel or other terminating station for luggage items to be picked up by their owners at a designated location.

In another example, the cleared luggage item may be terminating a travel carrier or an airport with further service. In this example, the programmed additional routing information may indicate the routing of the luggage item to a designated area in an airport or travel carrier infrastructure for luggage items to be picked up by luggage handlers associated with system 100 and delivered to another location according to service instructions. The service instruction may be delivery to a home address, an office address, or other designated address.

In another example, the cleared luggage item may be transferring travel carriers, such as from one airplane to the next airplane. In this instance, the programmed additional routing information may indicate this type of information. In this instance, the luggage item may travel independently from ISSS 1070 to the next air carrier marked as cleared.

In another example, the cleared luggage item may be transferring from one vehicle of travel to the next vehicle of travel where the vehicles of travels are different vehicles of travel. For example, from an air carrier to a cruise ship, train, bus, or lodging entity. In this instance, the programmed additional routing information may indicate this type of information including a location address for drop off. In the case of a cruise ship or lodging entity, additional routing information may include a room number or cabin number.

If the determination, at block 1034, is "NO," the method 1000B may include, at block 1038, performing a luggage handling process to transfer the luggage item to the security screening device 1072B of the ISSS 1070 for further security screening and processing according to the mode of travel associated with the ISSS 1070.

At block 1040, the method 1000B may include determining, by a processor, whether the luggage item is in a list, such as for a registered passenger associated with a manifest MX (FIG. 1A) of a next vehicle of travel or associated with a manifest for delivery to a home address, office address, or other designated address. If the determination, at block 1040, is "NO," the method 1000B may end, at block 1044. This may be the case when system 190 processes the entire plane. If the determination, at block 1040, is "YES," the method 1000B may include updating the LIM record 186 with the current status and location of the luggage item, at block 1042.

Figure 11A:
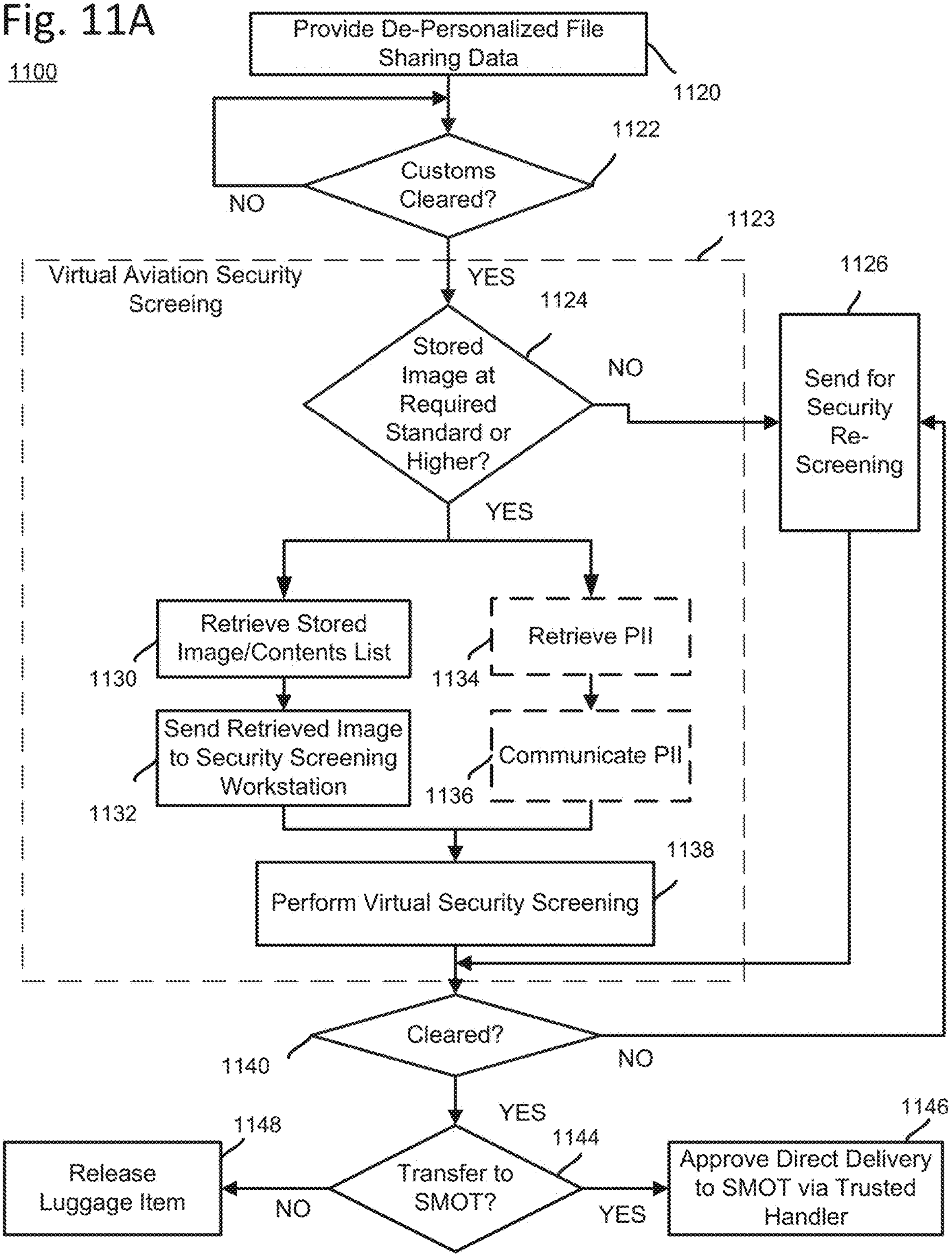
FIG. 11A illustrates a flowchart of a method for security screening reanalysis of a luggage item based on a security level in accordance with an embodiment.

FIG. 11A illustrates a flowchart of a method 1100 for security screening reanalysis of a luggage item based on a security level in accordance with an embodiment. In an example, method 1100 may include, at block 1120, providing, by a processor, de-personalized file sharing data, as described in relation to FIGS. 2C and 3A-3C.

In one or more embodiments, personnel at a workstation (i.e., SS computer system 1072A) or AI algorithms may analyze the data to determine whether a luggage item can pass through a Customs authority. For example, machine learning algorithms may be used to determine that the contents of the luggage item include a Z number of cellular phones, B amount of money, or C amount of a regulated commodity. Some countries only allow a certain number X of cellular phones. If the content includes a Z number of cellular phones that is greater than X, then the luggage item may not clear Customs. If the luggage items include C amount of a regulated commodity and a regulation limits the commodity to P which is greater than C, then the luggage item may be cleared by Customs, for example. As can be appreciated, describing each and every regulation herein is prohibitive. The processor may access the security screening images and/or the contents list that is stored in memory, for example, such as a secure cloud storage system.

In an example, method 1100 may include determining whether the passenger has cleared Customs, at block 1122. If the determination, at block 1122, is "NO," method 1100 may loop back to the beginning of block 1122. If the determination, at block 1122, is "YES," method 1100 may proceed to block 1123.

In an example, method 1100 may include performing virtual aviation security screening, at block 1123. The aviation security screening may determine whether the stored security screening image (SSI) is at the required standard for the current mode of travel or higher, at block 1124. If the determination at block 1124 is "NO," method 1100 may proceed to block 1126. For example, a luggage item entering a first airport in country from another country, the luggage item may be required to be checked for a level of aviation security screening at the originating airport or airport that captured the current security screening images. In another example, a luggage item may require re-screening based on actionable intelligence reports. In one or more embodiments, a stored MID 225 (FIG. 2A) or a manufacture name in meta data associated with a PID or SSI file name may be used to determine whether the stored security screening image (SSI) is at the required standard for the current mode of travel or higher, at block 1124.

By way of non-limiting example, airports around the world use different security screening machines. These machines may not all comply with the current security standards of a particular country. In this instance, the determination at block 1124, may be "NO," and method 1100 may re-screen, at block 1126, the luggage item so the luggage item can be transferred to a connecting flight at a border-crossing airport.

For example, a determination, at block 1124, may be "NO," when no image exists. In this instance, method 1100 may re-screen, at block 1126, the luggage item so the luggage item can be transferred to a connecting flight at a border-crossing airport. For example, some small airports do not have sophisticated screening machines that meet current standards, requirements, or certifications. For example, a small airport may perform a manual search and allow the luggage item to fly without an image. In other examples, the luggage item may be tested using an explosive trace detection (ETD) devices but was not screened using a TSA-certified explosive detection system. In other examples, the luggage item may be too large to fit within the TSA-certified explosive detection system (i.e., security screening machine). In such an instance, a security screening image may not be available for each and every luggage item.

In many instances, TSA-certified explosive detection system (i.e., security screening machine) used by a first mode of travel meets or exceeds standards or requirements for second modes of travel that include lodging entities, buses, trains, ferries, and cruise ships. However, security screening images of luggage items on an air carrier departing one (first) airport anywhere in the world and landing at another (second) airport somewhere else in the world (i.e., in another country) may not meet the requirements of the security screening authority of the second airport.

At block 1126, method 1100 may include performing security re-screening of the luggage item at the required standards, requirements, or certifications for checked baggage in civil aviation. This may occur when countries have different standards. This may occur such as when, the originating screening security image was captured by a security screening machine that meets lower standards or requirements than currently required. The standards and requirements change on a regular basis followed by subsequent equipment installation. The method can be adapted to accommodate improved screening when a second mode of travel has improved security screening technology and algorithms over the security screening machinery and algorithms at the first mode of travel. Alternately, the method can be adapted to accommodate improved screening by the second mode of travel when the first mode of travel has improved security screening technology and algorithms over the security screening machinery and algorithms at the second mode of travel.

If the determination at block 1124 is "YES," method 1100 may include retrieving the stored security screening image of the luggage item or a contents list, at block 1130. At block 1132, method 1100 may include sending the retrieved stored security screening image to a security screening workstation. At block 1138, method 1100 may include performing security screening of the luggage item. The security screening may use AI algorithms or a man in the loop to look at images of the previous security screening images, such as taking in a previous country or airport.

In one or more embodiments, the screening authority may have intelligence of a particular type of threat, which may allow the contents of the luggage items to be screened using the security screening machine through CT or X-ray imaging for checked baggage in civil aviation.

Returning again to block 1124, if the determination at block 1124 is "YES," method 1100 may include obtaining personal identifiable information of the passenger associated with the luggage item undergoing security screening, at block 1134. Method 1100 may include communicating the obtained personal identifiable information of the passenger, at block 1136. At block 1138, method 1100 may include performing virtual security screening of the luggage item for a threat security level using both the image and the personal identifiable information. As defined herein "virtual security screening" means that the luggage item did not reenter the security screening machine to capture the security screening image currently under review. Instead, the security screening image is a follow-along image that can follow the luggage item as long as the luggage item remains in trusted custody and the image meets a particular locations security screening imaging requirements, standards, or certification.

In one or more embodiments, the SS file name is encoded with the personal identifiable information. This may be used to protect the identity of the passenger.

In one or more embodiments, the screening authority may have intelligence of a particular type of threat from a country, a person, or a group of persons. The personal identifiable information may be used to evaluate the threat security level of the passenger relative to the security screening results.

Blocks 1126 and 1138 may proceed to block 1140. If the determination, at block 1140, is "NO," the luggage item may be re-screened, at block 1126, using a security screening machine operating at the security screening requirements, standard, or certification for checked baggage in civil aviation. At block 1140, a determination is made whether the luggage item or passenger is cleared. If the determination, at block 1140, is "YES," method 1100 may determine whether the luggage item is to be transferred to a second mode of travel, at block 1144. In other words, the reanalysis of method 1100 allows the luggage item to be moved from the first mode of travel 1110A (FIG. 11B) directly to the second mode of travel 1110B (FIG. 11B) via a trusted custody handler 1117. If the determination, at block 1140, is "YES," method 1100, method 1100 may include approving, by a processor, direct delivery of the luggage item to the vehicle of travel associated with the second mode of travel.

If the determination, at block 1144, is "NO," the luggage item may be released, at block 1148. For example, a baggage handler or trusted custody handler may scan the IATA bag tag or other marker or tag with an electronic acquiring device. The acquiring device may include a message that represents instructions to release the luggage item such as to bring the luggage item to a carousel. A luggage item may be released from a first mode of travel such as when the airport is a terminating airport, or when a vehicle of travel carrier arrives at a destination or dockside for passengers to disembark.

Figure 11B:
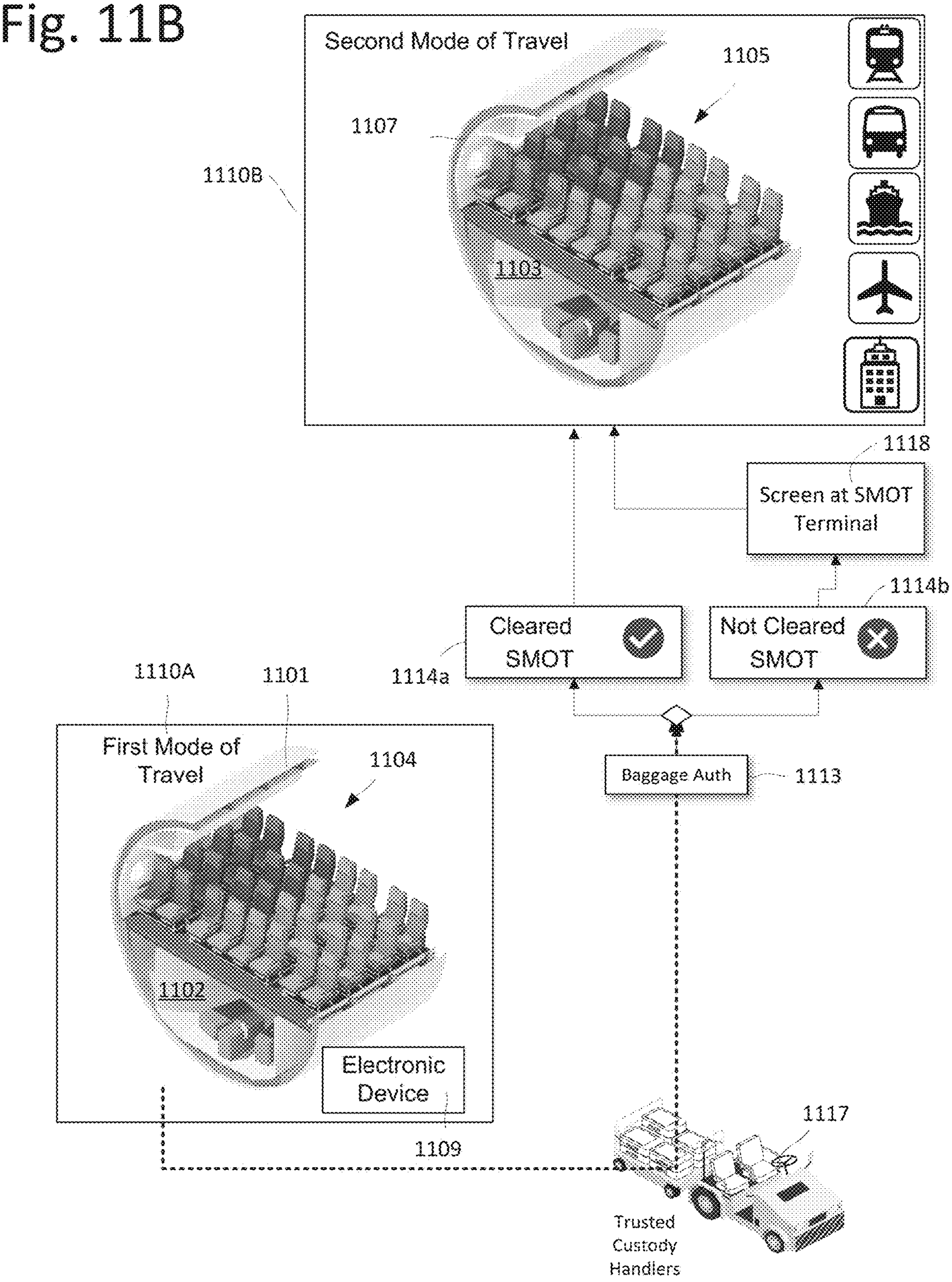
FIG. 11B illustrates a diagrammatic view of an embodiment showing a trusted custody handler having a baggage authorization to move baggage between a first mode of travel and a second mode of travel in accordance with an embodiment.

FIG. 11B is a diagrammatic view of an embodiment showing a trusted custody handler 1117 between a first mode of travel 1110A and a second mode of travel (SMOT) 1110B in accordance with an embodiment. From the time the baggage was checked at the airport it has been within a trusted custody, e.g., meaning that unauthorized individuals including the owner of the baggage do not have direct access to the contents. A trusted custody handler may have sufficient security mechanisms that meet or exceed relevant security standards of the corresponding travel carriers. Additionally, in these trusted custody facilities there is no opportunity for the passenger to change the contents of the baggage while it is under trusted custody of the first mode of travel 1110A. Checked baggage in at airline, bus, rail, and maritime or additional governmental agencies is released to the custody of the transportation entities or holding facility. Upon receiving a baggage authorization record 1113, an airline (and/or its designated partners or authorized entities) may move the checked baggage directly to a trusted custody handler 1117 instead of rescreening the checked baggage at a second mode of travel (SMOT) terminal 1118 because reanalysis (FIG. 11A) determined that the contents of the checked baggage met the rules and regulations for the second mode of travel 1110B. Furthermore, once the checked bags are transported to the second mode of travel 1110B the luggage item is not rescreened at the second mode of travel 1110B but delivered directly for loading in the vehicle of travel. In the illustration, the second mode of travel 1110B is another airplane. However, the second mode of travel 1110B may be a cruise ship. In the case of a cruise ship, the luggage item may be directly delivered to the passenger's stateroom on the ship. In the case where the second mode of travel 1110B is a vehicle of travel and the passenger has a seat and the luggage item is loaded elsewhere, then the luggage item may be taken directly to the designated loading location for the luggage item. In the case where the second mode of travel 1110B is a hotel, the luggage item may be directly delivered to the passenger's room.

In FIG. 11B, air carrier 1101 has a passenger cabin 1104 and a checked baggage hold 1102. Passengers before, during and after the flight have no ability to access checked baggage hold 1102. The operator of air carrier 1101 has custody of the checked bags in baggage hold 1102. If the passenger was to take another air carrier 1107 also having checked bag storage 1103 and a separate passenger seating area 1105 then the trusted custody handlers 1117 may move the passenger baggage between baggage hold 1102 in air carrier 1101 and checked bag storage 1103 in air carrier 1107. However, in this case the baggage was reanalyzed under the rules and regulations for air carrier 1107 of which baggage authorization record 1113 conveys either approval 1114*a* or rejection 1114*b* of the luggage item. If approval 1114*a* is present in the baggage authorization record 33 then the luggage item may be moved directly from baggage hold 1102 to checked bag storage 1103 without additional screening at the SMOT terminal 1118. Alternatively, if baggage authorization record 1113 indicates a rejection 1114*b* of the baggage then it is screened again at the SMOT terminal 1118 to ensure compliance with the relevant security protocols.

The first mode of travel 1110A may include an electronic device 1109. The electronic device 1109 may be part of a baggage handling system or a computing device of an employee working to offload the luggage items (or load the luggage items). In one or more embodiments, the electronic device 1109 may be associated with a security screening authority or another entity. The tracking device on the luggage item may be configured to communicate information that is within its memory including at least one of: security information, IATA license plate number, PNR number, personal identifiable information, or luggage item image. In an example, security information may be sent to an electronic device approved to receive security information and/or personal identifiable information upon landing at a transfer or terminating airport. The tracking device may receive BSM information from a terminating BSM at a terminating airport or transfer BSM at a transfer airport. The electronic device may be configured to transmit communication information associated with the transferring or terminating airport to receive the security information and/or personal identifiable information. In some embodiments the electronic device is configured to require the automatic transmission of the communication information associated with the transferring or terminating airport to receive the security information and/or personal identifiable information as an additional security compliance mechanism.

In the case where the second mode of travel 1110B is a cruise ship, the SMOT terminal 1118 may be located dockside, adjacent to or be part of the cruise ship. In the case where the second mode of travel 1110B is a bus, the SMOT terminal 1118 may be located at a bus station or near a bus station. In the case where the second mode of travel 1110B is a train, the SMOT terminal 1118 may be located at a train station or near a train station. In the case where the second mode of travel 1110B is a ferry, the SMOT terminal 1118 may be located at a located dockside, adjacent to or be part of the ferry. In the case where the second mode of travel 1110B is a lodging entity, the SMOT terminal 1118 may be located at a located adjacent to, remote from, or be part of the lodging entity. In the case where the second mode of travel 1110B is an air carrier, the SMOT terminal 1118 may be located in an airport terminal or hanger.

In an example, the first baggage screening requirement may require an explosive detection system (EDS) that is a Transportation Security Administration certified EDS or a European Union/European Civil Aviation Conference (EU/ECAC) EDS standard 3.0/3.1, such as when the first mode of travel is civil aviation. When the vehicle of travel of the first mode of travel associated with civil aviation lands at a transfer airport or a terminating airport, the luggage item may be required to be subjected to 1) Customs screening and/or 2) a threat security level screening before the luggage item can transfer to another vehicle of travel via a second mode of travel or be released from a terminating airport. The vehicle of travel of the second mode of travel may use a baggage screening requirement that is the same as or lower than the first mode of travel. In this instance, the contents of the luggage item may be searched for those items that are prohibited on the vehicle of travel of the second mode of travel without the need to rescreen the luggage item through an EDS.

Figure 12A:
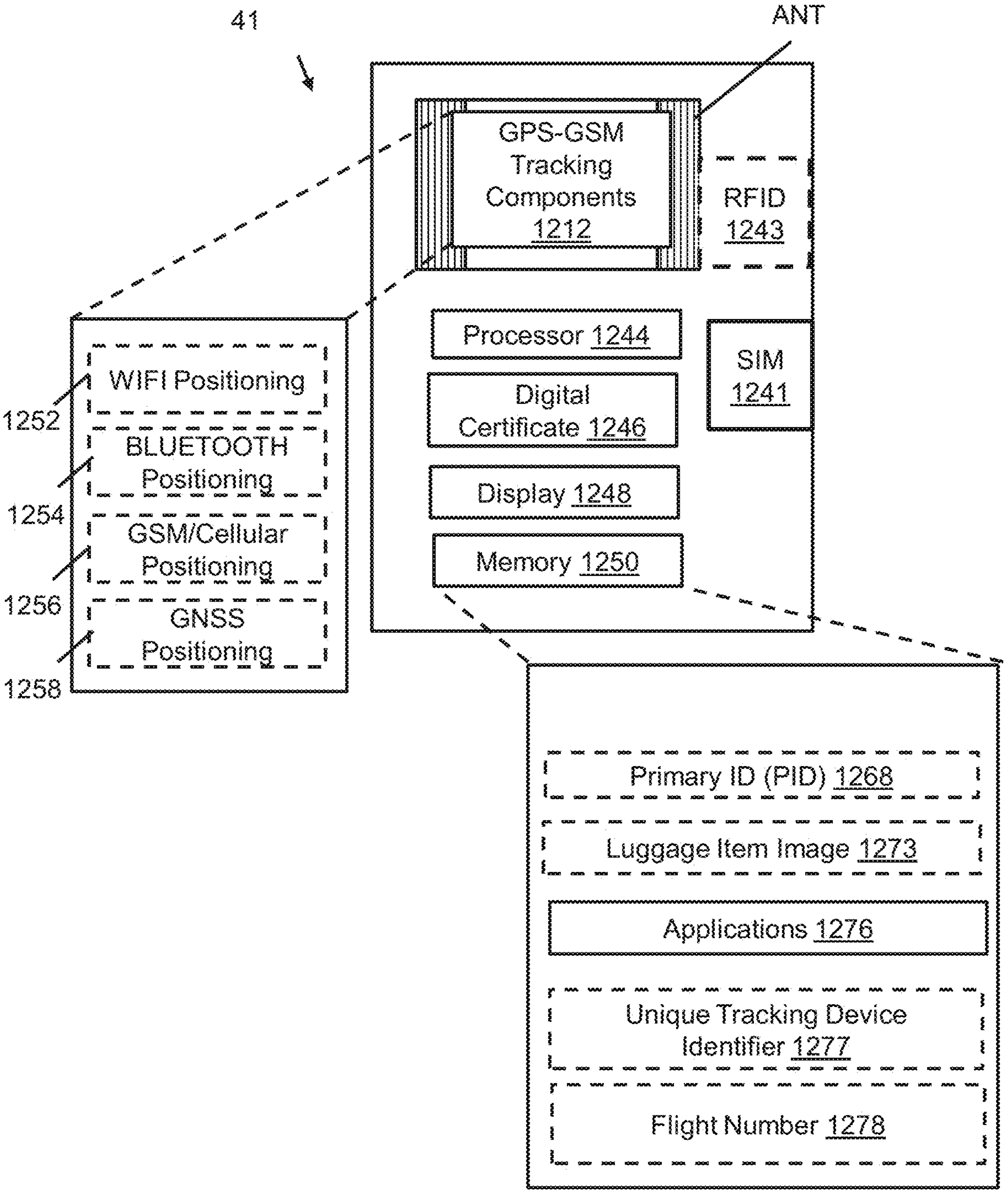
FIG. 12A illustrates a block diagram of a tracking device in accordance with an embodiment.

FIG. 12A illustrates a block diagram of a tracking device 41 in accordance with an embodiment. Tracking device 41 may include subscriber identity module (SIM) card 1241, a GPS-GSM tracking components 1242 and antenna ANT. The GPS-GSM tracking components 1242 may be configured to perform cell tower positioning via GSM/Cellular positioning protocol 1256, WIFI positioning via WIFI positioning protocol 1252, GNSS positioning via GNSS positioning protocol 1258, and BLUETOOTH positioning via BLUETOOTH positioning protocol 1254. In one or more embodiments, subscriber identity of the SIM card 1241 may be associated with a baggage handling service, luggage tracking service, an air travel carrier or vehicle of travel. In one or more embodiments, the subscriber identity of the SIM card 1241 may be associated with a passenger. The GPS-GSM tracking components 1242 may include at least one processor. Tracking device 41 may include at least one processor 1244.

The tracking device may include an inertial navigation system (INS) for Global Navigational Satellite System (GNSS)-denied environments. In GNSS-denied environments, the obtained location information may be obtained from the INS. The tracking device may include a Global Positioning System (GPS) unit. The tracking device may include other location determination protocols or location derivable locations based on locations of surrounding devices such as IoT devices, BLUETOOTH-enabled, or RF access points when available. IoT devices BLUETOOTH-enabled, or RF access points may be found in hotels, cruise ships, airports, restaurants, stores, and buildings, for example. RF access points may support various RF communication platforms including, without limitation, WIFI communication protocols or GSM-5G communication protocols.

When underground, the tracking device may use a mobile ad-hoc communication protocol as airport staff devices may be capable of being an ad-hoc node for delivering location information from underground out to either wired or wireless communications networks above ground. The location information may be sent to a network interface of a computing system associated with the at least one processor of system 100, a computer system designated to track tracking devices, a network device, a baggage handling system device, and a computer system associated with an airline carrier or other vehicle of travel. The location information may include location coordinate data of the tracking device and the loaded information from the BSM.

In addition to providing location information, the tracking device may operate in other modes to interact with vehicle of travel devices including, without limitation, a Kiosk, RFID receiver, baggage handling system, mobile communication device of the passenger, and more.

The tracking device 41 may be routed within buildings along a journey above ground and/or underground, which may cause a GNSS-denied environment. Consequently, the tracking device 41 may provide location information in a GNSS-denied environment. However, for use outside of the airport infrastructure, the tracking device 41 may have GNSS access. Accordingly, the tracking device 41 may be able to provide location information derived from GNSS data.

While GSM or cellular networks are readily available, these networks do not have 100% global coverage. For example, in a building floor or level underground, cellular communications may be blocked. Depending on a building's construction or nearby buildings, communications within building may be blocked or intermittent. Accordingly, because luggage items travel through buildings and underground, as well as, outside, a tracking device may need to be able to obtain location information using various methodologies and adapt to its surroundings and situational communication parameters.

In one or more embodiments, the tracking device 41 may use available RF access points, which may include BLUETOOTH access points and/or WIFI access points, as will be described later. In an example, the tracking device 41 may include an RFID unit 1243 configured to communicate using RFID frequencies. By way of non-limiting example, a tracking device 41 with an RFID unit 1243 may be configured to communicate with RFID receivers of the baggage handling system. Some baggage handling systems have RFID receivers to read or receive an RFID signal from an IATA compatible RFID bag tag.

In one or more embodiments, the tracking device 41 may serve as an RFID bag tag that is IATA compatible while within an airport infrastructure but also provide tracking capabilities outside of the airport infrastructure. Tracking device 41 may include at least one digital certificate 1246. In an embodiment, a digital certificate 1246 may be an organization level digital certificate, where the organization level digital certificate allows the encryption and decryption of organization level information.

Tracking device 41 may include a digital certificate 1246 to allow a passenger's mobile device to pair with the tracking device 41. Tracking device 41 may include a digital certificate 1246 to communicate with various communication platforms.

Tracking device 41 may include a display 1248 with a display screen, power source, and memory 1250. The memory 1250 may store information.

In one or more embodiments, the power source may be a battery with one or more battery saving modes. A first battery saving mode may be based on a detected altitude of the tracking device. A second battery saving mode may be based on a detected speed of the tracking device. For example, when the tracking device is in a plane while in flight, the tracking device may be turned off or placed in a sleep or airplane mode. A third battery saving mode may be based on a selected mode of communication of the tracking device. For example, a BLUETOOTH communication protocol may use less power than other communication protocols. As a result, the tracking device may select a communication protocol to save battery power.

In one or more embodiments, the display 1248 may be configured to display stored information.

In an example, memory 1250 may store a PID 1268 associated with the luggage item. The PID may be sent from the baggage handling system to the SS imaging machine 45, as described in FIG. 2A. In an example, the PID may be a TSA compatible number required to be sent by the baggage handling system 63 (FIG. 1A) to the SS imaging machine to identify the luggage item in the security tracking zone 37. The PID 1268 may be PID 204" described in relation to FIG. 2C.

In an example, memory 1250 may store a luggage item image 1273. A luggage item image may be captured and uploaded in memory 1250 when the tracking device 41 is installed on the luggage item and registered to the luggage item.

In an example, memory 1250 may store a unique tracking device identifier 1277 and application 1276. The unique tracking device identifier 1277 uniquely identifies the tracking device. The applications 1276 may include programming instructions which when executed control the operation of the tracking device 41 to communicate across various platforms, transmit information, store information and display the stored information.

Figure 12B:
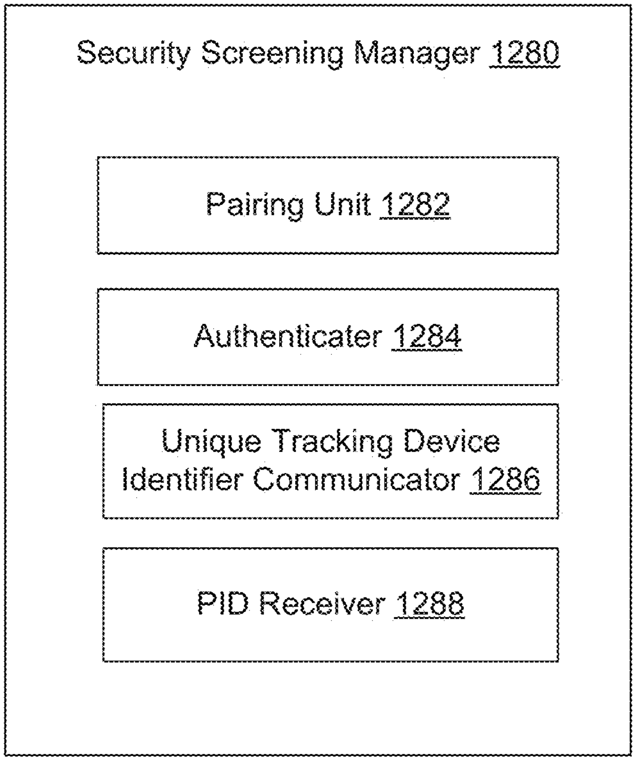
FIG. 12B illustrates a block diagram of a security screening manager in accordance with an embodiment.

FIG. 12B illustrates a block diagram of a security screening manager 1280 in accordance with an embodiment. The security screening manager 1280 will be described in combination with FIG. 2A and may be part of the programming instructions of applications 1276. FIG. 2A illustrates an example of a baggage handling system device in the security tracking zone 37 communicating the PID to the tracking device 41. In this example, the memory 1250 may store the PID created by the baggage handling system that is also provided to the SS imaging machine 45 (FIG. 2A). By way of a non-limiting embodiment, the SS imaging machine 45 that creates the PID may communicate the PID to the tracking device 41. The PID may be uploaded by a registration computing device that uploads one of PID 204, PID 204' or PID 204".

The security screening manager 1280 may include a pairing unit 1282 and an authenticator 1284. The pairing unit 1282 may use a BLUETOOTH pairing, for example. The authenticator 1284 may require a certain digital certificate to allow for the BLUETOOTH pairing between a BHS device, SS imaging machine 45, or a registration computing device and the tracking device on luggage item 138. When the tracking device/luggage item are in proximity to the BHS device 67 entering the SS imaging machine 45, the BHS device 67 and tracking device 41 may pair together. The BHS device 67 may be programmed to communicate to the tracking device 41 the primary ID, pseudo-ID, or other TSA compatible number (i.e., PID 204) to identify the luggage item entering a SS imaging machine.

In an example, the unique tracking device identifier communicator 1286 may communicate the unique tracking device identifier to the BHS device 67 (FIG. 2A) prior to receiving the primary ID, pseudo-ID, or other TSA compatible number. In this instance, the unique tracking device identifier may serve as a travel application number, where the application is to receive the primary ID, pseudo-ID or other TSA compatible number. The primary ID, pseudo-ID, or other TSA compatible number may be received by the PID receiver 1288. The received PID is then stored in memory of the tracking device 41.

By way of a non-limiting example, the unique tracking device identifier and PID may be configured as de-personalized information that allows the luggage item to be identified by luggage item identifiers and not passenger identifiable information.

The memory 1250 may store a flight number 1278.

Figure 13:
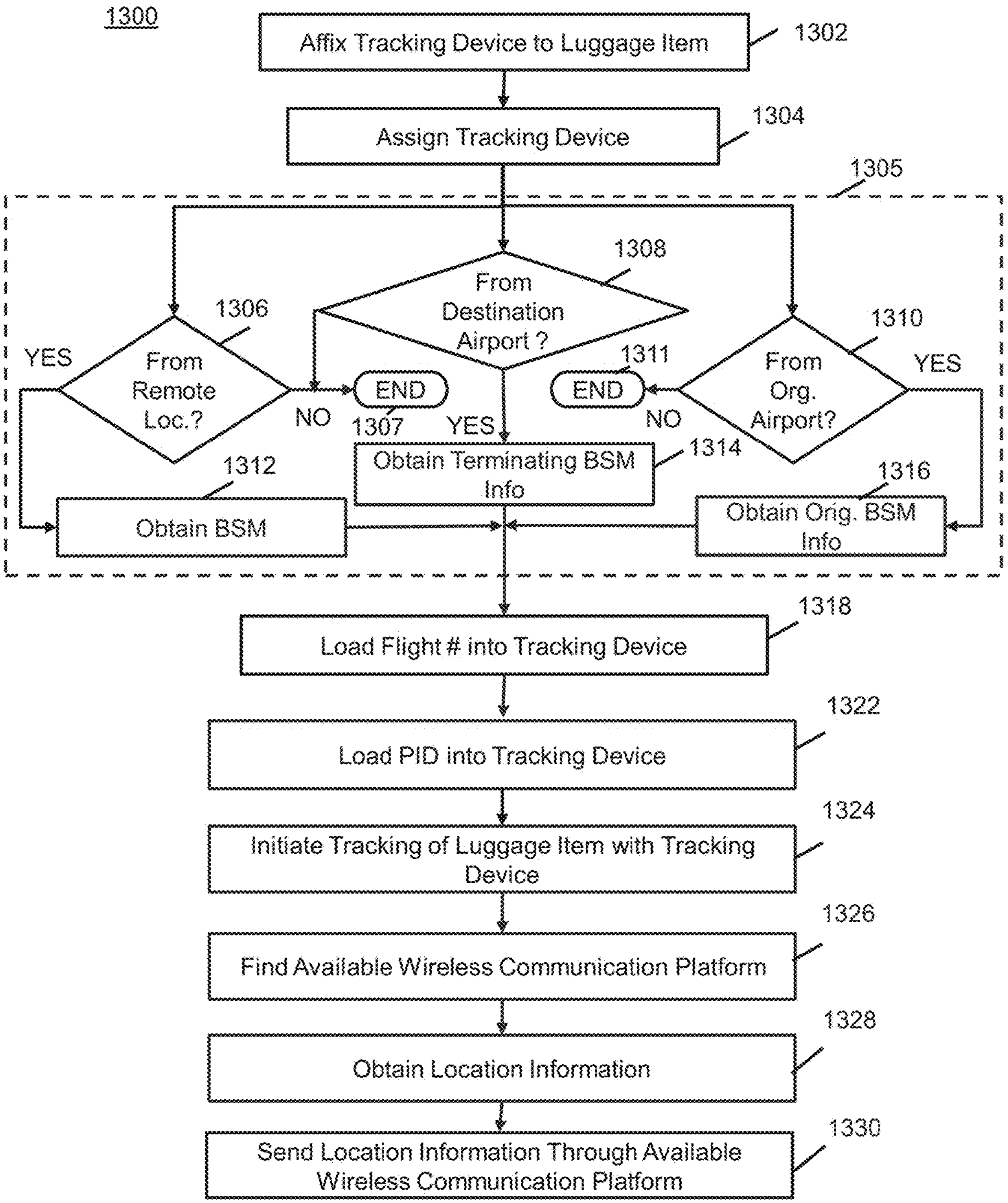
FIG. 13 illustrates a flowchart of a method for assigning a tracking device and initiating tracking of a luggage item in accordance with an embodiment.

FIG. 13 illustrates a flowchart of a method 1300 for assigning a tracking device 41 and initiating tracking of a luggage item in accordance with an embodiment. Method 1300 may include affixing a tracking device 41 to a luggage item, at block 1302. Method 1300 may include assigning, by a processor, the tracking device 41 to a luggage item, at block 1304. The assigning may include programming by the processor, the tracking device 41 with a unique tracking device identifier 1277.

In an example, the tracking device may have a unique tracking device identifier that may be added to a manifest or a baggage information messages (i.e., IATA data messages) to locate a luggage item with the tracking device 41. In an example, the tracking device 41 may communicate its unique tracking device identifier 1277 in communication signals to other devices including devices associated with baggage handling system, acquiring devices, or the like.

By way of a non-limiting example, a baggage information message may include one of the IATA license plate number, flight number, or unique tracking device identifier 1277. A tracking device of the luggage item may respond to a request for locating the associated luggage item 138. For example, baggage handling system devices may be sent an inquiry from system 100 for a missing luggage item using the IATA bag tag number and/or the unique tracking device identifier 1277. If a baggage handling system device 67 detects a tracking device, the baggage handling system device 67 may communicate a return baggage information message identifying its one or more of machine ID and/or location data, airport information, date, and time.

In an example, the unique tracking device identifier 1277 may be part of the registration and assigning process and may be added to the LIM record 186.

Block 1305 may include determining, by a processor, whether the tracking device 41 is assigned at a remote location, at block 1306. For example, a tracking device may be assigned by a baggage handling service that picks up luggage items from a passenger's or traveler's home, or other designated address and transports the luggage item to an airport or another vehicle of travel. If the determination, at block 1306, is "NO," the path from block 1306 may end at block 1307. If the determination, at block 1306, is "YES," method 1300 may include obtaining, by a processor, BSM information from an airline, at block 1312. The BSM information may be from a BSM of an originating airline carrier. However, the airline BSM information is available provided the passenger has checked in with an airline carrier using a personal computing device or mobile communication device. In an example, from a remote location, the tracking device may be programed with itinerary information. The itinerary information may include a PNR number, a reservation number or other itinerary confirmation number from an itinerary of a vehicle of travel. The flight number may be captured from the BSM or baggage information message.

At block 1305, method 1300 may include determining, by a processor, whether the tracking device 41 is assigned from a destination airport/location, at block 1308. If the determination, at block 1308, is "NO," the method from block 1308 may end at block 1307. If the determination, at block 1308, is "YES," method 1300 may include obtaining, by a processor, BSM information from a terminating BSM, at block 1314, for example. The BSM may be an airline terminating BSM. The tracking device may also be programmed with information described in relation to block 1312 as well. In an embodiment, the tracking device may be provided as a service to the passenger as a reward for frequently purchasing a cruise or staying in a particular hotel (i.e., vehicle of travel).

Block 1305 may include determining, by a processor of system 100, whether the tracking device 41 is assigned from an original airport, at block 1310. If the determination, at block 1310, is "NO," the method from block 1310 may end at block 1311. If the determination, at block 1310, is "YES," method 1300 may include obtaining, by a processor, BSM information from an originating airline BSM, at block 1316, for example. In an example, an airline carrier may provide as a service to the passenger a tracking device for a travel journey. The travel journey may be one-way or round-trip. The tracking device may be assigned at the counter by an air carrier agent. In another embodiment, the tracking device may be provided as a service to the passenger at another time, such as a reward for frequently flying. In another embodiment, the tracking device may be provided as a service to the passenger for always flying first class.

Method 1300 may include loading a flight number 1278, by a processor of the system, into the tracking device, at block 1318. The flight number may be obtained from a IATA data message or BSM. In an example, method 1300 may include loading the PID, by a processor of the system, into the tracking device 41, at block 1322.

In an example, method 1300 may include initiating tracking of the luggage item with the tracking device, 41 by a processor of system 100 or other computer system designated for tracking, at block 1324. For example, an airline carrier may have a designated computer system for tracking the tracking device of the luggage item. The baggage handling service may have a designated computing system or server for tracking luggage items via the assigned tracking devices.

In an example, method 1300 may include finding, by the tracking device 41, an available wireless communication platform to make a communication connection, at block 1326. The tracking device 41 may include a GPS-GSM communication device configured to receive Global Navigational Satellite System (GNSS) signals. The tracking device 41 may be configured to communicate with WIFI wireless communication platforms, BLUETOOTH wireless communication platforms, long-term evolution (LTE) wireless communication platforms, cellular wireless communication platforms, GSM-5G wireless communication platforms, long-range communication platforms, short-range communication platforms, radio frequency identification communication platforms and near-field communication platforms. In one or more embodiments, the tracking device may establish a wireless RF communication connection using ad-hoc protocols or connect with Internet of Thing (IoT) devices. The tracking device may be configured to communicate using one of wireless communication platforms to send the location information to a network interface of a computing system.

In an example, method 1300 may include obtaining, by the tracking device 41, location information, at block 1328, and sending, by the tracking device 41, the location information through the available wireless communication connection platform, at block 1330, to a processor of system 100.

FIG. 14 illustrates a conventional BSM 1400 for an airline carrier. The BSM is a IATA data message. The IATA data message may include a plurality of data fields that include coded characters. For example, the coded characters may include one of American Standard Code for Information Interchange (ASCII) code, Baudot, and Padded Baudot, for example. The Baggage Information Messages or the IATA data messages code and format is described for example in the "Recommended Practice 1745 Baggage Information Messages" by IATA, in the "Passenger Services Resolution Manual," June 2010, $30^{th}$ Edition, pgs. 1110-1205, hereinafter "RP 1745". The IATA data message may be communicated over the Internet and using message using Extended Markup Language (XML) messages.

The DCS-PM are described in the "Passenger Services Resolution Manual," "Recommended Practice **1707*a* Data Field Dictionary for DCS Passenger Messages," "Recommended Practice 1707*b* Data Element Directory for DCS Passenger Messages." In one or more embodiments, the DCS-PM may include the passenger name list (PNL) or additions and deletions list (ADL) identified in "Recommended Practice 1708 Passenger Name List (PNL) and Additions and Deletions List (ADL)." In one or more embodiments, the DCS-PM may include a passenger reconcile list (PRL). The details of the PRL is described in "Recommended Practice 1719*b* Passenger Reconcile List," in the "Passenger Services Conference Resolution Manual," for example, hereinafter "RP 1719*b*.**"

The BIM message includes fields described below. The DCS-PM includes fields as well some of which overlap with the BIM. However, the BIM and DCS-PM differ in that the BIM includes a .P/field to represent the passenger's name. However, in the DCS-PM the P/field is not in use. The data entry of the passenger's name in a message may take various formats. The data field. U/in BIM and DCS-PM each has a different definition and use. For example, in the DCS-PM the .U/field is used to enter a unique passenger identifier (UPID). As used herein both the BIM and DCS-PM use the .L/field for the PNR locator (address). Furthermore, the both the BIM and DCS-PM use the .N/field for bag tag number. An IATA data message that is a PLIM type message, the .V field is not in use. Therefore, the terminating and transferring indicators are missing. However, the PLIM type message indicates the flight information may be used to determine whether the flight is arriving at a border crossing airport, such as JFK in the United States. Each country have designated border crossing airports. These airport codes can be cross checked with the originating flight airport code to detect a border crossing event.

The IATA data message (i.e., BIM) may include field or line 1402 that includes a header. For example, the header may be labeled "BSM," which represents the heading of the beginning of an airline's BSM. The field or line 1404 may include a line preface ".V/" followed by a set of alphanumeric characters. By way of a non-limiting example, the line preface ".V/" may denote version and supplemental data. For example, supplement data may include a transfer station in an airline or airport infrastructure. The .V/data field may indicate whether the IATA data message, such as a BSM, is a terminating BSM. The .V/data field includes after the "/" a digit that indicates a data dictionary version number. The next character may be a baggage source indicator denoted by a "L" to denote Local, a "T" to denote Transfer, an "X" to denote Terminating, or a "R" to denote Remote. The baggage source indicator is followed by a three-digit airport code. In FIG. 14, the BSM is a transfer BSM with a version number 1 and an airport code of JFK.

When sorting on the BSM, the BSMs from all air carriers are received and sorted. By way of a non-limiting example, the .V/field may be searched for the baggage source indicator of "T." Additionally, the system 100 may have many site locations. Therefore, a cruise ship departing Tampa, the system would sort on a terminating BSM with an a "T" and "TPA" in the .V field in the baggage source indicator and the airport code corresponding digits.

Other IATA data messages may have or be modified to have similar in the baggage source indicators.

The field or line 1406 may include a line preface ".F/" followed by a set of alphanumeric characters that represent the outbound flight number, date, and airport code. The alphanumeric characters may be separated by a symbol "/". For example, the data "22MAY" may represent the date of arrival. The airport code "IST" represents Istanbul Airport, which follows the date. In the field or line 1406, the sequence of alphanumeric characters set off by the symbols "/" prior to the date and after ".F" includes an airline code followed by an outbound flight number.

The field or line 1408 may include a line preface ".I/" followed by a set of alphanumeric characters that represent the inbound flight number, date, and airport code. The alphanumeric characters may be separated by a symbol "/". For example, the data "12MAY" may represent the date of departure. The airport code "SLC" represents Salt Lake City Airport, which follows the date. In the field or line 1408, the sequence of alphanumeric characters set off by the symbols "/" prior to the date and after ".I" includes an airline code followed by a, inbound flight number.

By way of a non-limiting example, the luggage item with an LPN 2793461000 identified on line 1412 has an outbound flight number identified in field or line 1406. Based on the airport code "IST," this flight originates in Turkey. This flight will transfer or land at the airport with airport code JFK, a border-crossing airport, as identified in field or line 1402. The luggage item may require screening by the Custom authority of the border-crossing country, the United States.

In the example of FIG. 14, the luggage item may require re-screening by TSA to transfer air carriers to fly from JFK to Salt Lake City in the United States (i.e., the border-crossing country). However, once the luggage item arrives in Salt Lake City, additional screening by the Customs authority is not required.

The field or line 1412 may include a line preface ".N/" followed by a set of numbers, which represent the digital BTI data record of the OP-BTI. The field or line 1410 may include a line preface ".P/" followed by a set of characters, which represent the passenger's name. The first name may be separated by the last name by a symbol "/".

The field or line 1418 may include a line preface ".L/" followed by a set of alphanumeric characters, which represent the passenger name record number or PNR number. The field or line 1420 may include an end of message indicator, such as "ENDBSM."

Between lines 1402 and 1420, there may be other fields or lines, such as fields 1414 and 1416. The field or line 1414 has a preface ".S/" and is related to reconciliation data. The field or line 1416 has a preface of ".W/" and is related to the weight, pieces, dimension, and type data of the luggage item. Since, the airline's IATA data messages are known in the art, no further description of IATA data messages will be described. Some of the fields/lines are mandatory and others are optional depending on the IATA data message.

However, the system 100 may access other IATA data messages from a computer system associated with the airline carrier to determine whether a luggage item is missing or not found, for example. The system 100 may access other IATA data messages stored in a computer system associated with the airline carrier to determine the status of a luggage prior to the passenger starting their stay at a lodging entity, for example, or at other times to track the status of the luggage moving through the airport environment.

The example conventional BSM 1400 is provided for descriptive purposes and is not meant to be limiting in any way. Each airline may have changes to the airline's BSM.

Beyond the Airport

The airline infrastructure may generate a IATA data message that is a terminating IATA data message or a terminating Baggage Source Message (BSM) that may designate the terminating airport and city where the travel of the luggage item's handling and travel will terminate, as described in A BSM "Recommended Practice 1745 Baggage Information Messages" by IATA, in the Passenger Services Resolution Manual, June 2010, $30^{th}$ Edition, pgs. 1110-1205, incorporated herein by reference in full, or another IATA compatible message that designates a terminating airport and city from which a luggage item's handling and travel will terminate. The IATA data messages may include the IATA license plate digits and other information linking the luggage item to the passenger.

FIG. 15 is a diagrammatic view of a process 1500 for generation of baggage authorization indicia for bypassing additional baggage screening or indication of screening completion in accordance with an embodiment. The process shown in FIG. 15 may create MK 136, for example.

In FIG. 15, a process 1500 may begin with scanning marker 212 or an originating hardcopy bag tag. The marker 212 is shown to prevent overcrowding in the figure. The marker 212 may include the passenger's name 214, origination airport flight identifier 216, destination airport flight identifier 1506, a 10-digit license plate number 218 and adjacent barcoded license plate (i.e., barcode 220) and/or BSM record indicium.

Bar code scanner 116 reads barcode 220. Scanner 116 is communicatively coupled to server 148 to receive the results of the security screening as described in FIGS. 10A-10B and information from the simulated BSM. The MK 136 in one or more embodiments may be similar to marker 212. However, in this instance, MK 136 is updated with the same or similar BSM data from 212, and the cruise inline mode of the travel or lodging entity is represented by marine mode indicium 1516 and the indication it has passed screening under the cruise line and government security rubric is presented by marine approval indicia 1514. Additional details 1518 on the destination on a cruise ship for the luggage item 138 are enumerated from a cruise ship (lodging entity) manifest which contains the cruise line, cruise ship, departure date, room number, deck number and booking number. The print file of MK 136 is sent to printing device 120, for example, for printing. The MK 136 is affixed to the luggage item 138.

From the airport to the luggage item 138 is in trusted custody and only accessible by trusted custody handlers. In other words, the passenger or owner of baggage 138 does not have access to baggage 138 and therefore there is no opportunity to insert contraband or prohibited items since in the initial screening by TSA.

In the event, the originating hardcopy bag tag is missing and the marker 212 is missing, for example, the luggage item would need to be process independently. However, the system 100 would match the passenger with their luggage item and simulated BSM created for example, from the image data captured by the mobile communication device. The simulated BSM and/or security data can be printed by process 1500. The MK 136 may include information from the cruise ship (lodging entity) manifest which contains the cruise line, cruise ship, departure date, room number, deck number and booking number.

Security Screening Integration Assistant System

FIG. 16 illustrates a security screening integration assistant (SSIA) system 190 in accordance with an embodiment. The SSIA system 190 is shown in the black lined box below line L1. The security screening integration assistant (SSIA) system 190 may perform security screening independent of customs screening and aviation screening when transferring to another air carrier. Instead, the SSIA system 190 may perform security screening for transfer of luggage items through a trusted custody to a different vehicle/mode of travel that has a different rules and regulations than the aviation. The description of FIGS. 2A-2C and FIGS. 3A-3C also apply to security screening for transfer of luggage items through a trusted custody to a different vehicle/mode of travel that has a different rules and regulations than the aviation. For example, in one or more embodiments, de-personalization of certain data can be used in some instances to protect the identity of the passenger.

The description and acts described in FIGS. 16 and 17A-17C may be performed in parallel to those acts needed to be performed by the Customs authority, for example. Security screening for a second mode of travel using trusted custody handling described in FIGS. 11A-11B may be performed independently, including before, during or after, screening from the Customs authority.

Furthermore, personnel using workstations that interact with virtual machines 330 may use graphic user interfaces which display images of objects on a display screen. Additionally, images of training data may be displayed on the graphical user interface to allow the personnel to make necessary judgements about the contents within the volume of space of the luggage item.

The SSIA system 190 may be communicatively coupled with a first mode of travel system (FMTS) 10 and a first security screening machine system (FSSMS) 40, both of which are shown above the line L1. By way of a non-limiting example, the FMTS 10 may include one or more computing systems 30, 35 or server systems with memory devices that are either directly or indirectly associated with the FMTS 10. It should be understood from the disclosure that each airline carrier company has many server systems and/or computing systems. The FMTS 10 may include a plurality of air carriers 20 and 22, for example, for a particular airline company.

The term "SVTS" is used to denote a second vehicle of travel system (SVTS) which may be a cruise ship, a bus, a train, or lodging entity. In one or more embodiments, a cruise ship is a lodging entity. In one or more embodiments, a train may be a lodging entity. The SVTS may be the next vehicle of travel system. The FMTS 10 is a first vehicle of travel system (FVTS) and is an airline travel carrier originating anywhere in the world.

To prevent overcrowding in the figure, the FMTS 10 may include a plurality of air carriers for a plurality of airline companies. Each airline company may have their own respective computer systems 30 and computer systems 35. The term "air carrier" may be used interchangeably with the airline company and the vehicle of travel.

The computer systems 30 may be a travel information system which stores passenger itinerary data, flight information, and checks in passengers, for example. The computer systems 35 may store IATA data messages that are generated by the baggage handling systems routing checked-in luggage items through the airport infrastructure. The computer systems 30 or 35 may provide for checking in luggage items. In one or more embodiments, a travel carrier such as an airline travel carrier may require the passenger to check-in and then print or generate their boarding pass. After the passenger checks in, the luggage item may be checked in.

The passenger's luggage items are checked-in with an air carrier, which is part of the FMTS 10. The checked-in luggage items are tagged with an originating hardcopy bag tag. After tagging, the luggage item is sent through an automated conveyor system of a baggage handling system to the FSSMS 40.

The FSSMS 40 is shown separately from the FMTS 10, but both may be housed in or be part of an airport infrastructure. The FSSMS 40 may include one or more security screening imaging machines 45 and 50. The FSSMS 40 may include one or more computing systems 55 or server systems with memory devices 113 to store security screening images from imaging machines 45. The FSSMS 40 may include one or more computing systems 65 or server systems with memory devices 113 to store security screening images from imaging machines 50.

The government agency that governs security screening of airlines may be denoted by TSA. Several vendors manufacture CT scanners (i.e., image capturing device 237 of FIG. 2A) used by TSA for baggage screening. Some of the prominent vendors include, for example:

SMITHS DETECTION: SMITHS DETECTION is a leading provider of advanced security solutions, including CT scanners. Their HI-SCAN XCT series scanners, like the HI-SCAN 6040 XCT and HI-SCAN 7555 XCT, are designed for screening checked and carry-on baggage at airports.

L3HARRIS Technologies: L3HARRIS Technologies is another major supplier of security equipment, including CT scanners for baggage screening. The company's CLEARSCAN brand family of CT scanners is used by TSA at various airports in the United States.

ANALOGIC Corporation: ANALOGIC Corporation develops advanced imaging technologies, including CT scanners for airport security. Their CONNECT brand series of scanners, such as the CONNECT 70 and CONNECT 100, are designed to enhance airport security screening.

LEIDOS (previously Lockheed Martin): LEIDOS is a global technology company that provides security solutions, including CT scanners for baggage screening. They have developed the VACIS M6500 system, a high-performance CT scanner for screening baggage at airports.

CT images generated during baggage screening are typically saved in a multi-image format. This format allows for the exchange, storage, and transmission of images across different systems and devices. CT scanners capture a series of 2D cross-sectional images, which can then be reconstructed into a 3D representation of the scanned object. The 3D visualization and analysis of CT images often involves specialized software designed for processing and rendering the multi-image files. These software solutions can reconstruct the 2D slices into 3D models, enabling security personnel to examine the scanned baggage in more detail.

The DICOS (Digital Imaging and Communications for Security) standard is an image format standard developed by NEMA (National Electrical Manufacturers Association) in collaboration with DHS. It aims to enhance the interoperability and effectiveness of security screening systems, such as those used in airports and other critical infrastructure facilities. DICOS is designed to meet the specific needs of security imaging, including the storage, transmission, and processing of security images. It addresses the limitations of the DICOM (Digital Imaging and Communications in Medicine) standard, which is primarily focused on medical imaging. The DICOS standard provides:

Interoperability: DICOS enables seamless communication between different security imaging systems and components from various manufacturers, allowing for more efficient and effective security screening processes.

Extensibility: The DICOS standard is designed to be easily extended and adapted to incorporate modern technologies and methods as they emerge in the field of security imaging.

Flexibility: DICOS supports a wide range of security imaging modalities, including X-ray, CT, MRI, and others, making it suitable for various security applications.

The size of TSA files can vary significantly depending on several factors such as the scanner's resolution, the number of slices captured, the level of compression applied, and the size of the baggage being scanned. In general, CT scans produce many high-resolution images, which can result in substantial file sizes. A single multi-image file for a CT scan can range from a few hundred kilobytes to several megabytes. When considering an entire baggage scan, which may include multiple files, the total size can easily reach several tens or even hundreds of megabytes.

The initial screening process by the FSSMS 40 may be performed by large X-ray machines (i.e., security screening imaging machines 45 and 50). These security screening imaging machines 45 and 50 are designed to detect a range of materials, including explosives and other contraband. Baggage is screened using dual-energy X-ray systems that allow security personnel to differentiate between organic and inorganic materials based on their atomic number. This helps in identifying potentially dangerous substances. If the X-ray scan shows something suspicious, the bag is diverted for further inspection. This usually involves a physical inspection by a trained security officer and may also involve the use of more advanced scanning technologies like CT (Computed Tomography) scanners, which can provide a more detailed, 3D images of the bag's contents. In some cases, explosive trace detection (ETD) machines may also be used. These machines can detect traces of explosives on the outside of the bag or on the items inside the bag. They work by swabbing the bag or item and then analyzing the swab for any explosive residue.

Those luggage items with detected explosives or certain hazardous items within the luggage item are prevented from boarding the air carrier. The security screening imaging machine 45 and/or 50 may detect materials or chemicals that individually are not hazardous but if combined may be hazardous. Once on a second mode of travel, those materials or chemicals may be combined deliberately or accidentally. In one or more embodiments, the SSIA system 190 may request the FSSMS 40 to provide a list of all detected chemicals and the amounts associated with an object within a luggage item.

The objects allowed in checked-in luggage items stored in the cargo hold of an air carrier can be different from objects allowed in luggage items boarding a cruise ship (i.e., second mode of transportation system (SMTS) 1680A), for example. This may be in part because weapons are not accessible in checked-in luggage items during the flight of a passenger while the luggage item is in the cargo hold. On cruise ships, however, the luggage items are delivered to the cabin room of the passenger where the passenger has direct access to the weapon during the cruise, which can be a threat to other passengers.

By way of a non-limiting example, the security screening imaging machine 45 and/or 50 may receive a primary ID sent from the baggage handling system to the security screening imaging machine 45 and 50, for example. In an example, the primary ID may be a TSA compatible number required to be sent by the baggage handling system to the security screening imaging machine 45 and 50 to identify the luggage item. The primary ID may be a pseudo-ID. The primary ID may be stored with and linked to the security screening image in memory devices 113.

In one or more embodiments, an imaging standard associated with the security screening imaging machine 45 and 50 may be stored with and linked to the security screening image of the luggage item in the memory devices 113.

In one or more embodiments, an algorithm may be executed on the security image to generate a contents list within the luggage item. The contents list associated with the security screening image taken by the screening imaging machine 45 and 50 may be stored with and linked to the security screening image in the memory devices 113. The contents list may include a machine-readable encoded text that can be searched for prohibited items for a second mode of travel. In this instance, the contents list may be searched in lieu of visual inspection of the security screening image. This may save computer processing time to limit the amount of data that needs to be sent between computing devices. The use of a contents list may save processing luggage items at a second mode of travel that have been with a trusted custody handler when all of the contents are already known ahead of time. In one or more embodiments, one or more contents may be identified as being combinable to create an explosive or other hazard.

Depending on the next vehicle of travel, the luggage item may be screened by ISSS 1670A, 1670B, 1670C and 1670D, for example. Each ISSA 1670A, 1670B, 1670C and 1670D may include an SS computer station 1072A and security screening device 1072B as described in relation to ISSS 1070 of FIG. 10A. The SSIA system 190 may be configured to interface with the ISSS 1670A, 1670B, 1670C and 1670D, as described in more detail in relation to the methods 1000A and 1000B of FIGS. 10A and 10B.

What a traveler is permitted to carry within checked-in luggage on a flight may be different than what is permitted on ship. For example, some weapons may be approved for a checked-in and travel in a luggage item placed in an airplanes cargo. However, once on a cruise ship, the owner of the luggage item would have access to the weapon during the cruise, which presents a hazard risk. The specific list of prohibited items may vary between cruise lines, but some common items that are allowed on airplanes but prohibited on cruise lines may include, for example:

Alcohol: Many cruise lines have strict policies on bringing personal alcohol on board. While you can carry a limited amount of alcohol in your checked luggage on an airplane, cruise lines often restrict or limit the amount you can bring onboard.

Power Strips: Power strips, surge protectors, and extension cords are typically allowed in airplane carry-on or checked luggage, but many cruise lines prohibit them due to potential fire hazards.

Clothing Irons: Clothing irons are usually allowed in checked luggage on airplanes but are often prohibited on cruise ships. Cruise ships typically provide laundry services or self-service laundry facilities with irons.

Pool Inflatables: While these items are allowed on airplanes, they may not be permitted on cruise ships due to limited pool space and safety concerns.

Drones: Some airlines allow drones as carry-on or checked luggage, but most cruise lines prohibit them for safety and privacy reasons.

Hoverboards and similar devices: These items are typically allowed on airplanes if they meet specific battery requirements. However, many cruise lines ban them due to fire hazards and safety concerns.

Sporting equipment: Some cruise lines may restrict or prohibit specific sporting equipment, such as baseball bats or golf clubs, which are allowed in checked luggage on airplanes.

Weapons: Some cruise lines may restrict guns, knives, large scissors, and pepper mace. Small grooming scissors may be allowed.

Similarly, certain items allowed on airplanes may be prohibited or restricted on trains (railways), such as:

Large luggage: While airlines typically allow checked luggage with size and weight limits, trains often have stricter size restrictions or limited storage space for large suitcases.

Bicycles: Many airlines allow bicycles as checked luggage, but not all trains permit bicycles, or they may require a reservation and additional fees.

Sporting equipment: Some trains may restrict or prohibit specific sporting equipment, such as surfboards, skis, or golf clubs, which are allowed in checked luggage on airplanes.

Camping gear: Camping gear like portable stoves, fuel canisters, and tents with stakes may be allowed in checked luggage on airplanes but could be restricted or prohibited on trains.

Musical instruments: While airlines often allow musical instruments as carry-on or checked luggage, some trains may have size or weight restrictions for these items.

Hazardous materials: Items such as flammable liquids, compressed gases, or corrosive substances may be allowed in limited quantities on airplanes, but trains may have stricter regulations.

Buses may prohibit one or more objects and substances described above or others.

Hotels and resorts may prohibit one or more of objects and substances described above or others.

The examples described herein are for illustrative and descriptive purposes and should not be limiting in any manner. As should be understood from the description herein, to describe each and every rule and regulation for all modes of transportation or travel around the world is prohibitive.

The rules and regulations may vary based on passing through different government agencies and in differing countries. Rules and regulations may limit or prohibit amounts of currency, agriculture, food, and other objects on prohibited lists for any mode of travel.

The baggage screening process in cruise ships (i.e., SMTS 1680A) is like that in airports, though with some differences owing to the unique nature of maritime travel. The SMTS 1680A may include one or more servers or computer system 1675A. When passengers arrive at the cruise terminal, their luggage item is checked-in and tagged. These passengers arrive by driving up and hand carrying their own luggage item(s).

The luggage item may then go through an Integrated Security Screening Station (ISSS) 1670A (i.e., ISSS 1070 FIG. 10A). As described in FIG. 10A, the security screening device 1072B may be the same as one or both of imaging machines 45 and 50, for example.

The process described herein is for those luggage items that were previously screened for security and have follow-along security image and data files available to share for a first-phase security screening analysis. Other luggage items without follow-along security image and data files may be processed by the security screening device 1072B to determine if the luggage item clears the security screening process.

In the integrated security screening process, the SSIA system 190 may be configured to assist the ISSS 1670A by obtaining the follow-along security image and data and interface with a trusted custody handler taking custody of the luggage items from the air carrier to the SMTS while preserving the security chain of custody by a trusted custody handler. In this manner, the follow-along security image and data obtained by SSIA system 190 may be assembled and sent to the ISSS 1670A so that the SS computer station 1072A can be used to perform a first-phase security screening analysis for the second vehicle of travel or next vehicle of travel for prohibited objects associated with regulation or rules for the government agency or security entity associated with cruise ships. If the luggage item screening by the first-phase security screening analysis for the second vehicle of travel clears the luggage item, the SSIA system may receive information associated with the pass or fail of the luggage item screening. The SSIA system 190 may update handler devices and/or scanning devices, for sorting and handling the luggage item, as described in relation to FIG. 10B. In the environment of a cruise ship, the luggage item, if failed the security screening, may be transferred to security screening device 1072B for the second-phase security analysis of the second vehicle of travel. Once the luggage item is cleared by the second-phase security screening, the SSIA system 190 may update the routing information for delivery of the luggage item to the room or cabin independently of or in parallel with the passenger.

The trigger for obtaining the follow-along security image and data may be from an air carrier flight manifest, a IATA data message, such as a terminating BSM, scanning of an IATA license plate, or access the travel data of the PNR 112. However, the process herein intends to transfer files without the need to send PII of the passenger, as described in relation to FIG. 2C. Optionally, the passenger's name may be sent because it is visible in the originating hardcopy bag tag, bingo tag or other markers that may be placed on a luggage item by an airline carrier.

If the analysis of the follow-along security image and data cannot clear the luggage item through the ISSS 1670A, then the security screening device 1072B of the ISSS 1670A may scan the luggage item for prohibited items, which can range from weapons and explosives to items that are not allowed on the ship, like alcohol or irons, by way of non-limiting examples. If a luggage item triggers an alarm during the X-ray scan, it is set aside for further inspection. This usually involves a hand-search by security personnel. In addition to the initial luggage item screening, passengers and their carry-on items are also screened before boarding the ship. This is usually done using walk-through metal detectors and X-ray machines like those used in airport security checkpoints.

The security screening procedures in railway systems (i.e., SMTS 1680B) vary widely depending on the country and the specific rail service. The SMTS 1680D may include one or more servers or computer system 1675C. The SMTS 1680B may include an ISSS 1670B (i.e., ISSS 1070 FIG. 10A) that employs some form of security screening for both passengers boarding trains and their luggage. In some cases, ISSS 1670B might involve random checks where security personnel select bags for screening using handheld metal detectors or portable X-ray devices. In other cases, all bags might be screened by the ISSS 1670B using stationary X-ray machines like those used in airports and cruise terminals. In high-security situations or for international train services, more thorough screening procedures may be employed. The ISSS 1670B may use explosive detection systems, sniffer dogs, or even CT scanners. Additionally, passengers may also be screened using metal detectors or body scanners.

The security screening procedures in a bus carrier system (i.e., SMTS 1680C) vary widely and governed by the TSA in the United States. The SMTS 1680C may include an ISSS 1670C that employs some form of security screening for both passengers boarding a bus and their luggage. The SMTS 1680C may include one or more servers or computer system 1675C.

The security screening procedures in a lodging entity (i.e., SMTS 1680D) vary widely and may be defined by self-governance and/or governmental regulations. In one or more embodiments, lodging entities may provide a self-screening security process that may include a third-party screening entity, local police authorities, and hired security guards, for example. The SMTS 1680D may include an ISSS 1670D that employs some form of security screening for both passengers entering a lodging entity and their luggage. In some instances, a passenger and their luggage enter a hotel connected to an airport governed by TSA or other government agency. In some instances, such as the STAR WARS Hotel, at DISNEY, Orlando, Florida, the hotel's guests have direct access to the theme park from the hotel. The SMTS 1680D may include one or more servers or computer system 1675D.

The SSIA system 190 may include one or more display devices 1660 or computing device. For example, in one or more embodiments, a human in the loop may assist in obtaining files and sending those files to the respective ISSS. The display devices 1660 may be a standalone display device or a display device that is integrated into a computing device 2200, as described in relation to FIG. 22. In another embodiment, the computing devices with display devices 1660 may automate the process for obtaining and sending the follow-along security image and data files to a designated workstation (i.e., SS computer station 1072A). By way of a non-limiting example, the follow-along security image and data files may be sent to an artificial intelligence (AI) engine to process the image and data files for regulations associated with cruise ships, trains, hotels, buses, resorts, or any combination. The AI engine (i.e., SS computer station 1072A) would auto-generate a signal representative of the results.

The SSIA system 190 may include one or more servers or computer system 1650 and memory devices 1655 that may be communicatively coupled wired or wirelessly to the display devices 1660. The one or more servers or computer system 1650 is described in more detail in relation to FIG. 22.

The SSIA system 190 may include an enterprise messaging system (EMS) 1657 to send short message service (SMS) messages on the status and location of luggage items to designated luggage handler's computing devices.

The SSIA system 190 may receive information from a computing device 1602 associated a trigger associated with a registered passenger having a luggage handling service. The registration information may include flight information, such as an airline carrier company, flight information, country, originating airport, itinerary confirmation number or passenger name record (PNR) number and passenger's name, for example. Other registration information that may be entered by the passenger may include information related to the second vehicle of travel. The second vehicle of travel may be for a cruise ship reservation, a train reservation, a bus reservation, or a lodging entity reservation. The information may be collected before the day of travel with the first mode of travel.

The registration information may be used by the SSIA system 190 to generate routing information from a manifest. In one or more embodiments, the manifest may be for a single second vehicle of travel or multi-carrier second vehicle of travel. In one embodiment, the analysis cannot start until after the FSSMS 40 has completed the security screening imaging process or the air carrier 20 or 22 has taken off with the luggage item and passenger. In other embodiments, the analysis is triggered by the terminating IATA data message described in FIG. 1A.

In one or more embodiments, SSIA system 190 may screen luggage items of passengers arriving at a hotel or resort using a flight by an air carrier with or without baggage handling by system 100. SSIA system 190 may alert the SMTS 1680D of any prohibited objects or materials or combination of materials if combined may be hazardous.

In one or more embodiments, SSIA system 190 may be part of SMTS 1680A and perform analysis for cruise ships of one or more cruise ship companies only.

In one or more embodiments, SSIA system 190 may be part of SMTS 1680B and perform analysis for trains of one or more railway systems only.

In one or more embodiments, SSIA system 190 may be part of SMTS 1680C and perform analysis for buses of one or more bus carrier companies only.

In one or more embodiments, SSIA system 190 may be part of SMTS 1680D and perform analysis for a lodging entity/resort of one or more companies only.

In one or more embodiments, SSIA system 190 may be part of FMTS 10.

In one or more embodiments, SSIA system 190 may be a third-party vendor.

The examples described herein are for illustrative and descriptive purposes and should not be limiting in any manner. As should be understood from the description herein, to describe each and every rule and regulation for all modes of transportation or travel around the world is prohibitive.

Figure 17A:
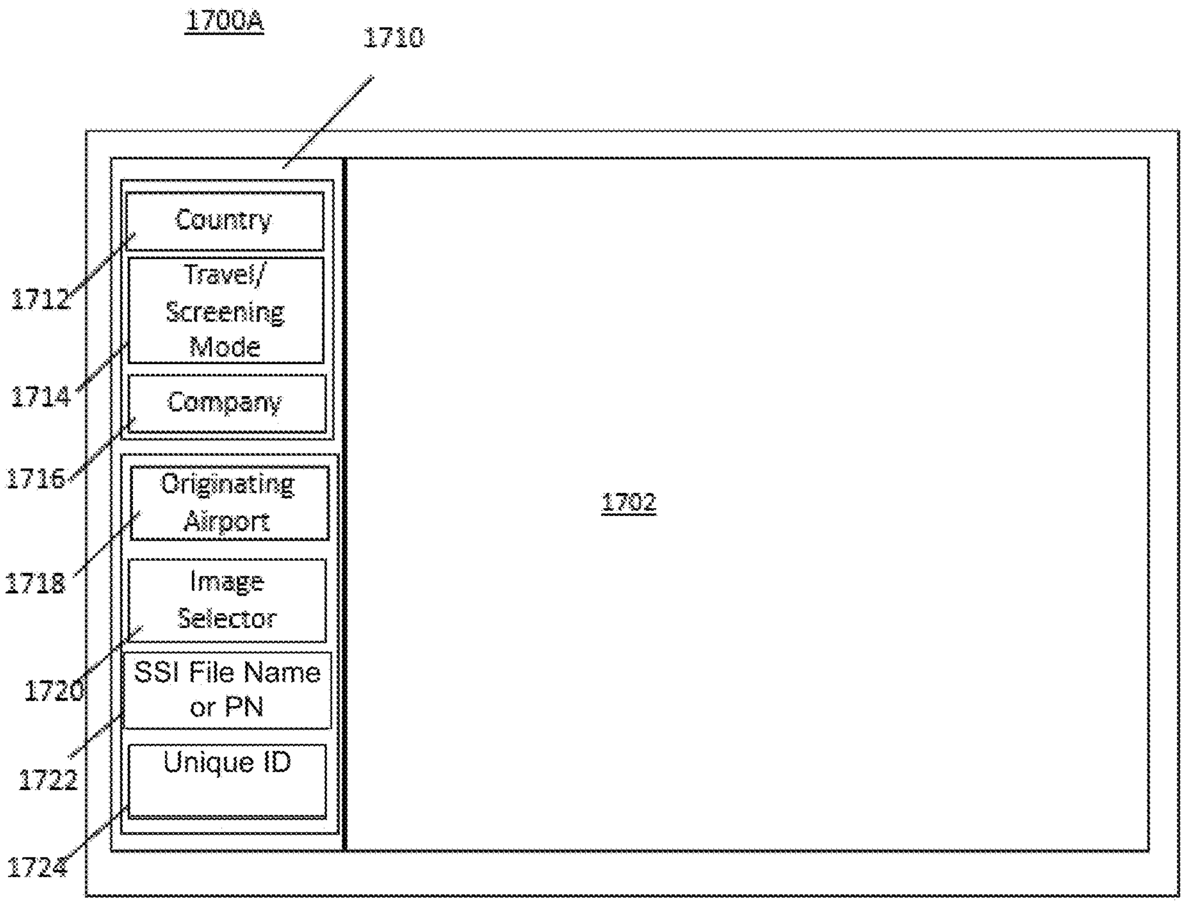
FIG. 17A illustrates a graphical user interface (GUI) for retrieving at least one security screening image in accordance with an embodiment.

FIG. 17A illustrates a GUI 1700A for retrieving at least one security screening image in accordance with an embodiment. The GUI 1700A may include a display window 1702 and data entry tabs or buttons 1710 for navigation and control. GUI 1700A may include a country tab or button 1712 and a travel/screening mode tab or button 1714. For example, the GUI 1700A may receive the country from which the second mode of travel may originate. Selecting the country tab or button 1712 may cause a drop-down menu or list of countries to be automatically displayed. Selection of a country with a mouse or other user interface enters the country into the system. The travel/screening mode tab or button 1714 may list any of the second modes of travel, including lodging entities or resorts, or second modes of transportation identified herein.

The GUI 1700A may receive the type of second mode of travel so that the training data for the regulations can be retrieved for the designated jurisdiction (i.e., country). If there are any states, county, city, provinces, etc., this information may be added. This allows the system to access regulations for all the regulating governing agencies. As described above, training data for a list of prohibited items for the second mode of travel is retrieved according to the country and the government agency.

Since CBP and/or the Coast Guard, for example, allow cruise ships to have additional rules, the GUI 1700A may receive a cruise ship company name via company tab or button 1716. This allows the one or more servers or computer system 1650 to retrieve training data associated with the rules associated with the company for analyzing the screening of the luggage items. The GUI 1700A may receive information related to the originating airport in the originating airport tab or button 1718. Selecting the tab or button 1718 may provide a drop-down list of airports that can be selected or automatically populated from communication 302, for example. The GUI 1700A may include an image selector tab or button 1720. A drop-down list of available images identified by an SSI file name, PID or de-personalized message identifier number may be listed. Any one image may be selected. In one or more embodiments, button 1722 may be used as a SSI file tab or button 1722. When the de-personalized luggage item manifest is loaded in the GUI, selecting the SSI file name tab or button 1722 may provide a list of SSI file name in the manifest that need the luggage item's image data analyzed for a different mode of travel or different country, for example. The user may select using a mouse or other user interface, an SSI file name. The GUI may display a selected unique identifier (i.e., PID, license plate, PNR number, tracking device identifier, etc.), which is entered in field 1724 or caused to be retrieved such as from the de-personalized luggage manifest or other file.

In one or more embodiments, the button 1722 may be used as a passenger name tab or button. When data from a manifest is loaded into the GUI that is not de-personalized, a list of passenger names may be displayed so that a passengers name may be selected to retrieve the SSI of the passenger using the passenger name. As described in relation to FIGS. 23B and 24, an electronic passenger identifying signature may be formed by generating a content list from a current SSI.

Although button 1722 is described as multi-functional, the GUI may have other buttons or tab for selection.

With respect to mishandled luggage items, the GUI may have data fields for entering a passengers name by a user or by scanning a passenger's identification instrument. By way of a non-limiting example, an identification instrument may be a state-sponsored electronic wallet or other electronic wallet stored on a smartphone. The identification instrument may include a driver's license, passport or other government-issued identification. A scanner or electronic acquiring device may scan a barcode or perform optical character recognition to capture data from the identification instrument, which is entered into the GUI to verify, confirm, or validate a match.

In some embodiments, training data may be develop by visually viewing past SSIs and developing a content list for each past SSI. The collection of content lists from past SSIs may be used to develop training data to autonomously develop a current content list.

Figure 17B:
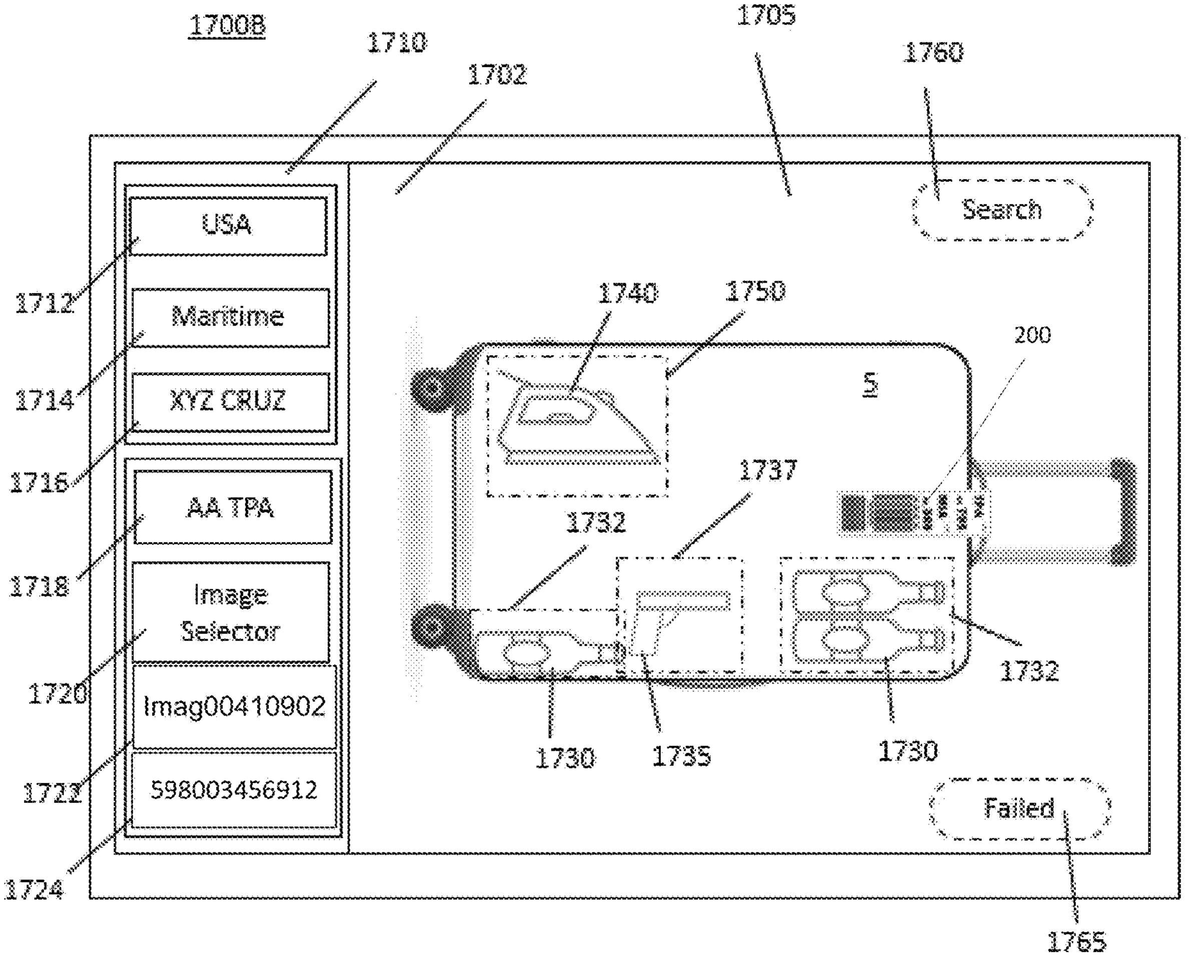
FIG. 17B illustrates the GUI of FIG. 17A screening at least one security screening image in accordance with an embodiment.

FIG. 17B illustrates the GUI 1700B of FIG. 17A screening at least one security screening image in accordance with an embodiment. According to one or more embodiments, the possible prohibited object includes weapons, bottles alcohol, irons, and electrical power strips, among other things. FIG. 17B is essentially the same as FIG. 17A so only the differences will be described. In FIG. 17B, an example PID and SSI file name of an image is displayed in fields 1724 and 1720, respectively.

In FIG. 17B, a selected image 1705 that was selected from the memory devices of FSSMS 40 is shown. The image 1705 shows luggage item 5 with a printed bag tag (i.e., bag tag 200). The image 1705 shows an X-ray representation of objects 1730, 1735 and 1740, for example. In the example, the object 1730 is annotated with box 1732 to denote that it is a prohibited object, such as alcohol. The object 1735 is annotated with box 1737 to denote that it is a prohibited or hazardous object, such as a weapon. The object 1740 is annotated with box 1750 to denote that it is a prohibited, such as an iron. The boxes 1732, 1737, and 1750, for example, may be annotated by image processing/machine learning autonomously or by a screening.

As for prohibited substances, the information may be obtained using the mass/density calculations by the machine learning process.

According to one or more embodiments, the first mode of travel or first mode of screening may provide a list of hazardous materials identified in their screening. Therefore, when the security screening images are retrieved, a file of detected hazardous material or a materials list may be obtained. For example, some weapons are made by three-dimensional printing. However, bullets that contain gun powder may be present. Accordingly, a list of bullets, gun powder or a combination thereof may be identified.

According to one or more embodiments, the first mode of travel or first mode of screening may provide a list of material or chemicals, which individually are non-hazardous. However, when one or more of certain non-hazardous material or chemical are combined, the resultant solution can become hazardous or explosive, for example.

According to one or more embodiments, the GUI 1700B may include a control button 1760 to initiate a search of prohibited objects and materials using a machine learning detection algorithm including machine learning object detection. In one or more embodiments, the screener performs the screening themselves by looking at the images on the screen and comparing the images to prohibited images, for example, as will be described in detail in relation to FIG. 17C.

According to one or more embodiments, the GUI 1700B may include an analysis results indicator 1765. In one or more embodiments, the indicator 1765 may allow a user to enter a mark in the manifest of the analysis result representative of one of a security compliance of the luggage item for travel on the second mode of transportation, travel or screening and a non-security compliance of the luggage item for travel on the second mode of transportation, travel, or screening. Accordingly, this information may be communicated to a trusted handler of those luggage items marked as having the security compliance of the second mode of transportation, travel, or screening to bypass subsequent security screening by a second security screening machine system of the second mode of transportation, second mode of travel, or second mode of screening.

In one or more embodiments, those luggage items that pass security screening and are entering from another country to transfer mode of travel, may bypass security screening at the second mode of travel.

Additionally, the passenger may save time in Custom's lines using the Global Entry Mobile application, by U.S. Customs and Border Protection (CBP) available on GOOGLE Play Store, APPLE Store or other authorized software sellers for mobile devices. The application requires a traveler to be an active member in the Global Entry Program by CBP. The traveler entering the United States, for example, at one of the ports, will take a selfie which is verified. The user is provided a code to expedite their process through CBP using the code on the application. The same code may be used to also release the luggage item that passed the transfer mode analysis to bypass security on the next travel vehicle. In this instance, the luggage item remains in trusted custody until it is passed to the next travel vehicle.

Figure 17C:
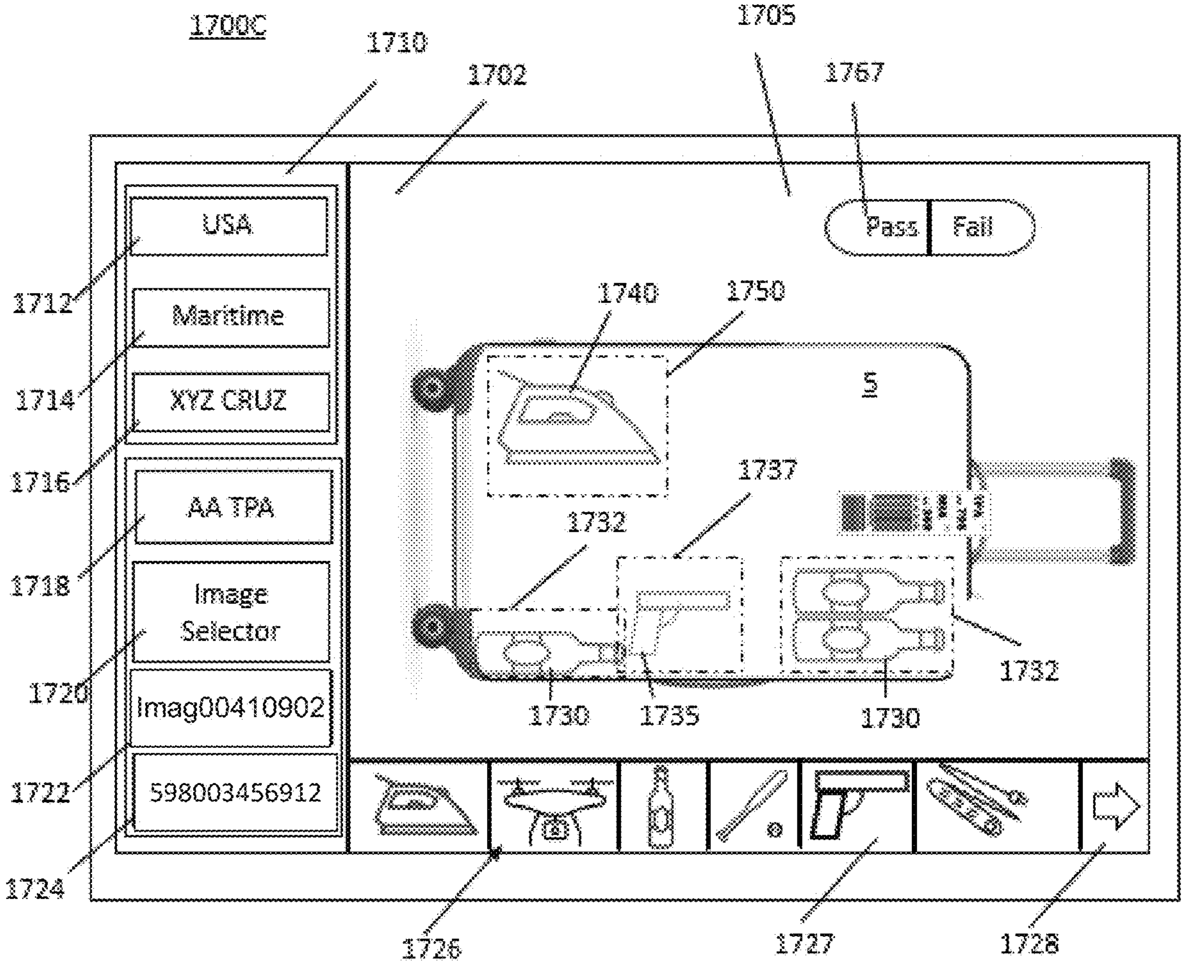
FIG. 17C illustrates the GUI of FIG. 17A screening at least one security screening image by a screener in accordance with an embodiment.

FIG. 17C illustrates the GUI 1700C of FIG. 17A screening at least one security screening image by a screener in accordance with an embodiment. GUI 1700C is similar to GUI 1700B so only the differences will be described. In this example, the scanner may have placed the boxes 1732, 1737, and 1750, for example, around the possible prohibited objects using a mouse, finger, or other implement to annotate the image. Other annotations may be added using a touch screen display device.

The GUI 1700C may include, at least one row 1726, a plurality of prohibited objects or substances 1727. The prohibited objects or substances 1727 may be in the form of an icon or an image. Clicking on any one icon or image in the row 1726 may provide a drop-down list of other shapes and styles of prohibited objects or substances. The GUI 1700C may include arrow 1728 in row 1726. The arrow 1728, when selected, may cause scrolling of the images out of view to show additional images or icons that are prohibited.

The GUI 1700C may include security analysis results indicator selector 1767. In one or more embodiments, the indicator selector 1767 may allow a user to enter a mark in the manifest of the security analysis result representative of one of a security compliance, such as selecting pass, of the luggage item for travel on the second mode of transportation, travel or screening and a non-security compliance, such as selecting fail, of the luggage item for travel on the second mode of transportation, travel, or screening.

Figure 18A:
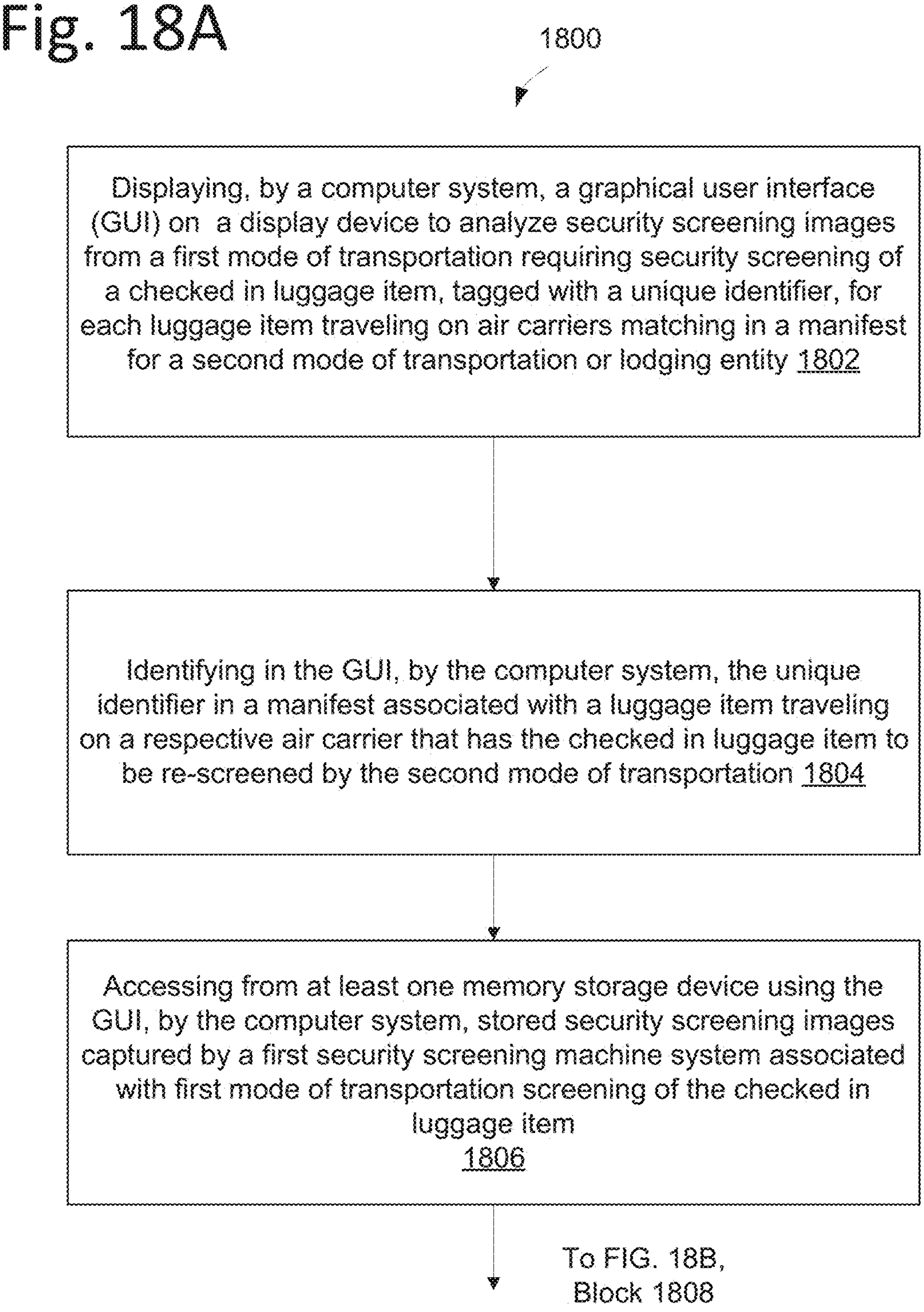
FIGS. 18A and 18B illustrate a flowchart of a method for a second mode of travel screening in accordance with an embodiment.
Figure 18B:
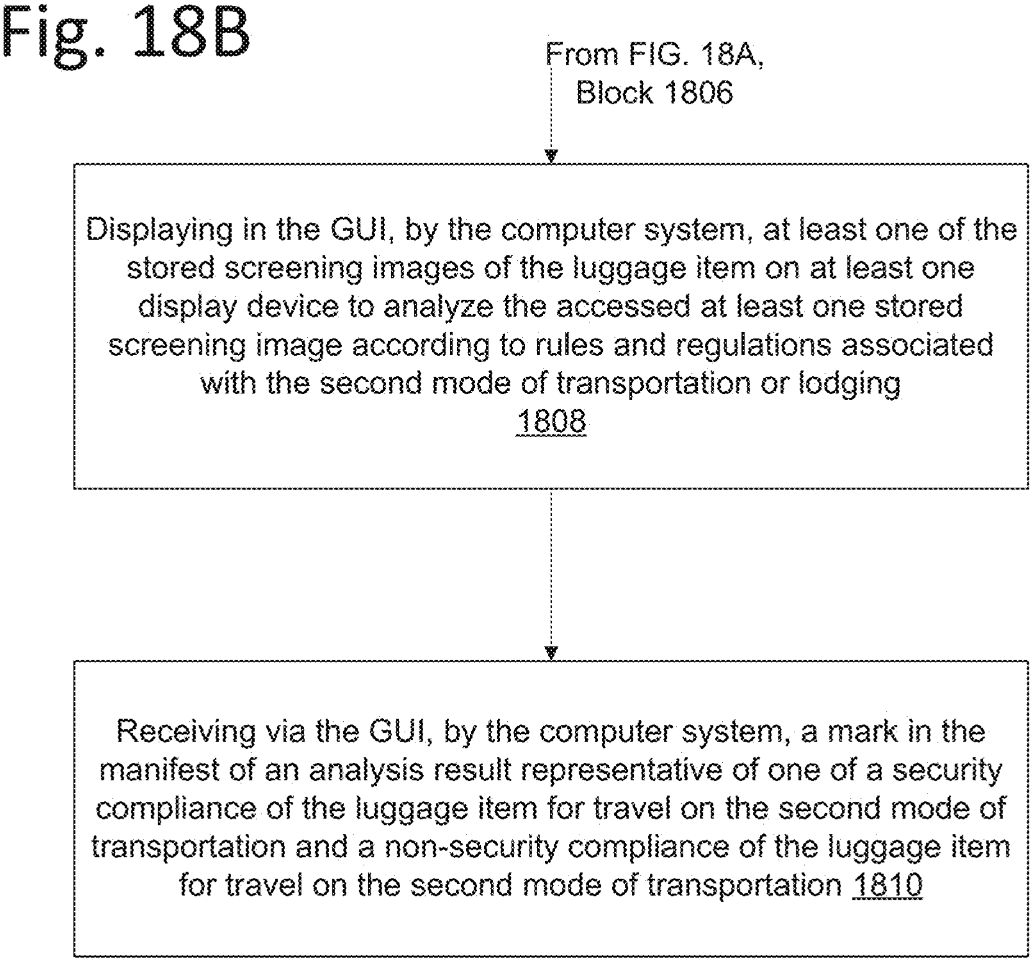

FIGS. 18A-18B illustrate a flowchart of a method 1800 for the second mode of travel screening in accordance with an embodiment.

According to one or more embodiments, the method 1800 may include, at block 1802, displaying, by a computer system 1650, a graphical user interface (GUI) 1700A, 1700B, and 1700C on a display device 1660 to analyze security screening images from a first mode of transportation requiring security screening of a checked-in luggage item, tagged with a unique identifier, for each luggage item traveling on air carriers matching in a manifest for a second mode of travel. In some embodiments, the manifest data for a second mode of travel may include a de-personalized luggage item manifest to conceal the identity of the passenger during the security screening process, if necessary.

According to one or more embodiments, the method 1800 may include, at block 1804, identifying in the GUI 1700A, 1700B, and/or 1700C by the computer system or server 1650 of system 190, the unique identifier (i.e., PID) in the manifest associated with a luggage item traveling on a respective air carrier that has the checked-in luggage item to be re-screened by the second mode of transportation, a second mode of travel or a second mode of screening. The second mode of screening may be independent of the mode of travel or transportation in one or more embodiments.

According to one or more embodiments, the method 1800 may include, at block 1806, accessing from at least one memory storage device using the GUI 1700A, 1700B, and/or 1700C by the computer system 1650, stored security screening images captured by a first security screening machine system associated with first mode of transportation screening, first mode of travel screening or a first mode of screening of the checked-in luggage item of the passenger.

According to one or more embodiments, the method 1800 may include, at block 1808, displaying in the GUI 1700A, 1700B, and/or 1700C by the computer system or server of system 190, at least one of the stored screening images of the luggage item on at least one display device 1660 to analyze the accessed at least one stored screening image according to rules and regulations associated with the second mode of travel or screening. In one or more embodiments, the at least one of the stored screening images of contents of the luggage item includes a three-dimensional dimensional representation of objects within the luggage item.

According to one or more embodiments, the method 1800 may include, at block 1810, receiving via the GUI 1700A, 1700B, and/or 1700C by the computer system or server of system 190, a mark in the manifest of an analysis result representative of one of a security compliance of the luggage item for travel on the second mode of transportation, travel or screening and a non-security compliance of the luggage item for travel on the second mode of transportation, travel or screening so that trusted handling of those luggage items marked as having the security compliance of the second mode of transportation, travel or screening will bypass subsequent security screening by a second security screening machine system of the second mode of transportation, travel or screening.

According to one or more embodiments, the method 1800 may include updating, by the computer system, the manifest with the IATA license plate or unique identifier.

After review and analysis, once a result is obtained, the image data may be deleted or access to the image may be denied. Furthermore, the PID and SSI file name may be deleted so that access to the image may be prevented.

According to one or more embodiments, the method 1800 may include accessing, by the computer system, an originating printed bag tag identification (OP-BTI) associated with the checked-in luggage item from one of a computer system associated with the respective airline or a computer system associated with the stored security screening images; and updating, by the computer system, the manifest with the OP-BTI. The OP-BTI may be the IATA license plate number, for example. The system may revert to the OP-BTI to track the luggage item outside of the airport infrastructure. However, the security image data may not accessible.

According to one or more embodiments, the method 1800 may include receiving, by a second computer system associated with the second mode of transportation or travel, updated reservation information associated with a second mode of transportation or travel for the respective passenger.

According to one or more embodiments, the method 1800 may include updating, by the second computer system associated with the second mode of transportation or travel, the manifest with the updated reservation information for the second mode of transportation for the passenger.

According to one or more embodiments, the method 1800 may include, in response to acquiring the IATA license plate, by an acquiring device, triggering a communication from the second computing system to the acquiring device with the updated reservation information of the second mode of transportation or travel.

According to one or more embodiments, the method 1800 may include displaying, on a display device of the acquiring device, the updated reservation information of the second mode of transportation or travel.

According to one or more embodiments, the method 1800 may include receiving annotations using the GUI, by the computer system, to highlight at least one object that caused a negative compliance result.

According to one or more embodiments, the method 1800 may include electronically sending a message to the owner of the baggage of a positive or negative compliance result for the second mode of transportation or travel. This may be accomplished by the EMS 1657.

Figure 21:
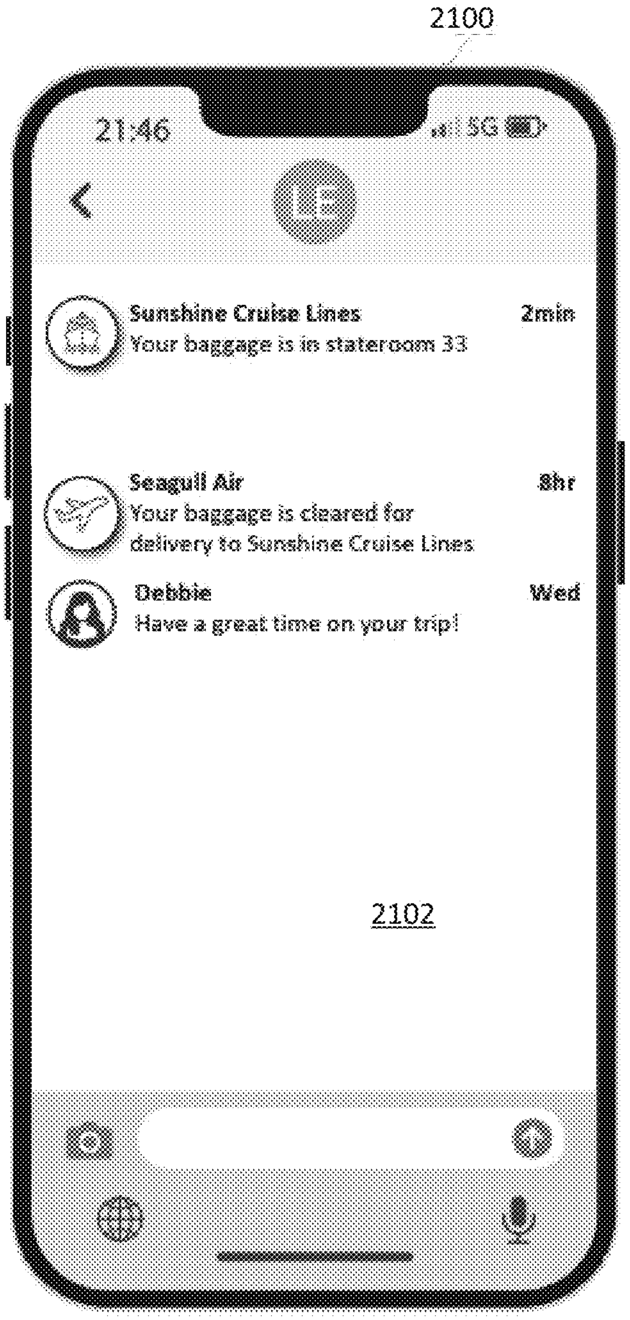
FIG. 21 illustrates a conceptual messaging graphic user interface on a mobile phone conveying the movement process of a passenger's baggage.

According to one or more embodiments, the method 1800 may include including by the computer system 1650, an explanation selected from an array of standardized explanations in the message to the owner of the baggage regarding the negative compliance result. Example messages are shown in FIG. 21.

According to one or more embodiments, the method 1800 may include advancing an annotated image of the object that caused the negative compliance result to a security screening entity at the second mode of travel. For example, the screener at display device 1660 may take a screen shot and communicate the screen shot via the one or more computing systems or servers 1650 or EMS 1657 or by email. The display device 1660 may be a touch-sensitive display device or the applications allow the user the interface with the display device with a mouse or other instrument to draw an annotation on the image.

The FSSMS 40 during the security screening process may scan the IATA license plate or otherwise obtain the baggage unique identifier using RFID or NFC technology. This can provide an index to the stored images for retrieval by system 190.

According to one or more embodiments, the bag tag number or IATA license plate is set as a unique identifier and added to the manifest. In one or more embodiments, the unique identifier is the IATA license plate or bag tag number from the IATA data message.

Figure 19:
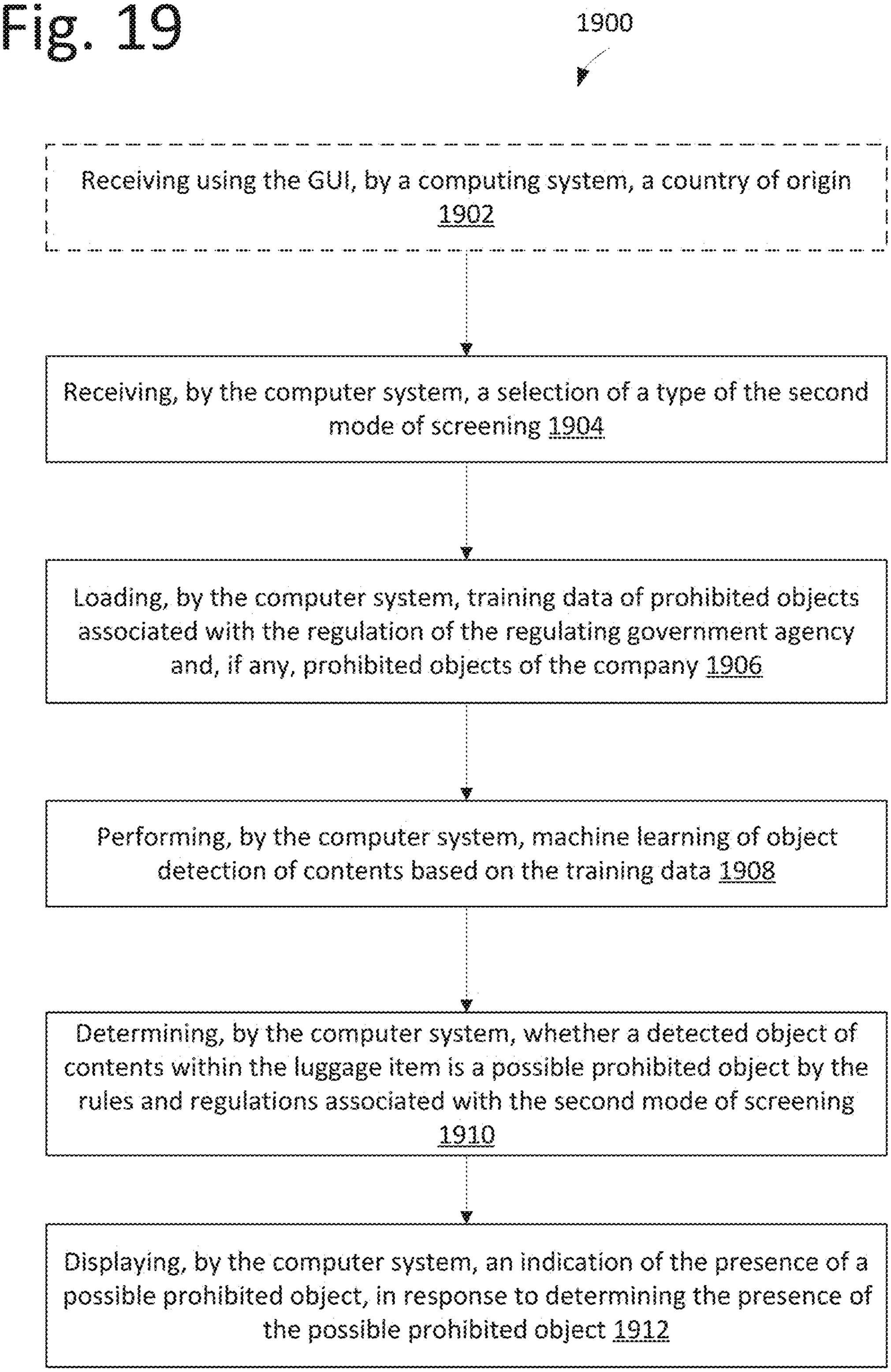
FIG. 19 illustrates a flowchart of a method for detecting the presence of a possible prohibited object in accordance with an embodiment.

FIG. 19 illustrates a flowchart of a method 1900 for detecting the presence of a possible prohibited object in accordance with an embodiment. According to one or more embodiments, the method 1900 may include, at block 1902, receiving using the 1700A, 1700B, and 1700C GUIs (FIGS. 17A-17C), by the computing system 1650, a country of origin. According to one or more embodiments, the method 1900 may include, at block 1904, receiving, by the computer system 1650, a selection of a type of the second mode of screening and loading training data of objects.

In one or more embodiments, the training data may include a list of objects that are prohibited for the second mode of travel. The screener would inspect the displayed image using the 1700A, 1700B, and 1700C GUIS (FIGS. 17A-17C) to see if any of the prohibited objects are seen. In one or more embodiments, the 1700A, 1700B, and 1700C GUI (FIGS. 17A-17C) may display a list of prohibited objects along a border of the 1700A, 1700B, and 1700C GUIs (FIGS. 17A-17C), such as a top border, a bottom border, a right border, or any combination thereof.

According to one or more embodiments, the method 1900 may include, at block 1906, loading training data of prohibited objects associated with the regulation of the regulating government agency and, if any, training data of prohibited objects of the second mode of travel company.

By way of non-limiting examples, the training data may include training images of prohibited objects of the regulating government agency and training images of the company of the vehicle of travel.

By way of non-limiting examples, the training data may include mass and density values of prohibited objects by the regulating government agency and mass/density values of prohibited objects by the company of the vehicle of travel.

The imaging machines 45 or 50 (FIG. 16) may record the resulting data. The CT scanner (i.e., imaging machines 45 or 50) may use this data to create a detailed tomogram of the luggage item and calculate the mass and a density of individual objects in the luggage item based on this tomogram. Hazardous and/or prohibited objects will have their own mass and density. So, if a particular object has mass and/or density that denotes a hazardous or prohibited material or object, the CT scanner warns the operator of this object. However, some objects that are not hazardous on an aircraft because a passenger does not have direct access to it in the cargo hold, are hazardous or prohibited on a cruise ship.

According to one or more embodiments, the method 1900 may include, at block 1908, performing machine learning of object detection of contents based on the training data of objects. The machine learning algorithm may include, by way of a non-limiting example, convolutional neural network (CNN) algorithms. For example, the CNN algorithms may include region-based CNN (i.e., R-CNN), masked R-CNN, faster R-CNN, and others. Other types of algorithms may include YOLO type algorithms (you only look once), for example.

In one or more embodiments, the machine learning algorithm may be performed in 2D images. In other embodiments, the image data is converted to 3D images to perform mass and density calculations of the tomogram (slice). The calculation may be compared to a range of the mass and density to determine if the values calculated are within the range indicating a possible prohibited object. In one or more embodiments, a prohibited object may be a hazardous object.

According to one or more embodiments, the method 1900 may include, at block 1910, determining whether a detected object of contents within the luggage item is a possible prohibited object by the rules and regulations associated with the second mode of screening of the second mode of travel.

According to one or more embodiments, the method 1900 may include, at block 1912, displaying an indication of the presence of a possible prohibited object, in response to determining the presence of the possible prohibited object. The GUIS 1700A, 1700B, and 1700C (FIGS. 17A-17C) may display an indication of a possible prohibited object such as with a color-coded annotated box, a text alert overlaid on the object in the screen or other visual alarm.

Figure 20:
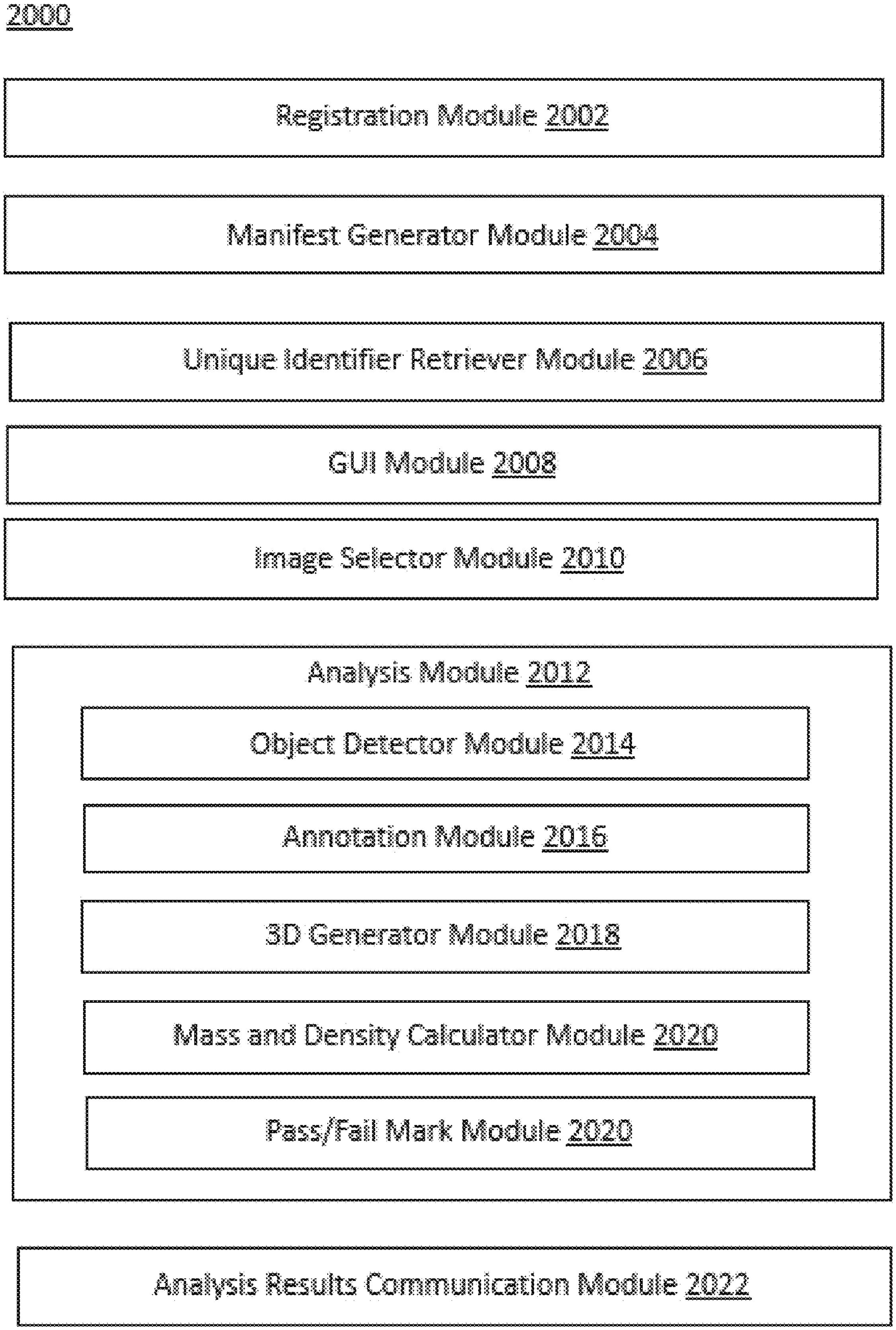
FIG. 20 illustrates a block diagram of programming modules for analyzing security screening images in accordance with an embodiment.

FIG. 20 illustrates a block diagram of programming modules 2000 for analyzing security screening images according to an embodiment. The programming modules 2000 may be stored in the one or more memory devices 1655 to be executed by the one or more computing devices or servers 1650.

The one or more programming modules 2000 may include software, hardware, firmware, or a combination of software, hardware, and firmware. The computing devices and/or servers 1650 may include at least one processor and/or hardware to execute instructions of the programming modules 2000.

According to one or more embodiments, the programming modules 2000 may include a registration module 2002, manifest generator module 2004, unique identifier retriever module 2006, GUI module 2008 (FIGS. 17A-17C), image selector module 2010, analysis module 2012 (FIG. 19), and an analysis results communication module 2022.

The registration module 2002 may include a graphical user interface that allows the passenger to enter the registration data described above. The registration module 2002 may allow the passenger to login and create an account.

Figure 22:
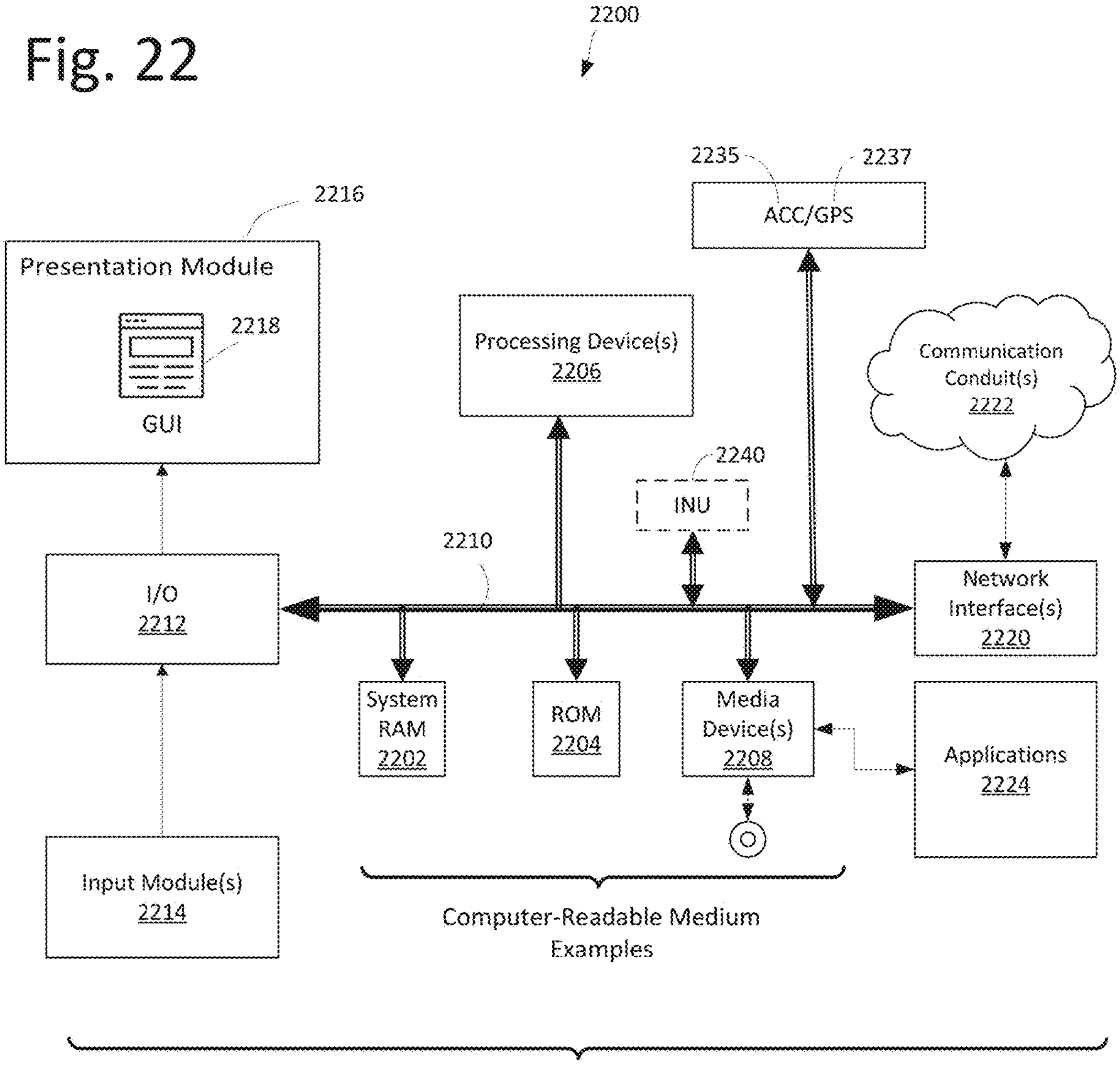
FIG. 22 illustrates a computing system in accordance with an embodiment.
Figure 22:
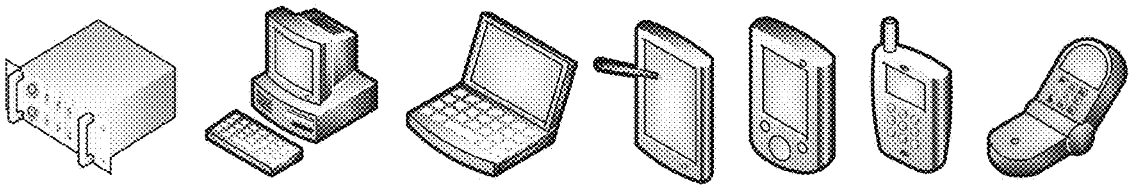

The security screening analysis results communication module 2022 may include network interfaces 2220, such as a network interface card to connect (wired or wireless) to a network or other communication conduits 2222 described in FIG. 22 to communicate with systems of the second mode of travel. The security screening analysis results communication module 2022 may use the EMS 1657 to communicate with the passenger.

The analysis module 2012 may include one or more of object detector modules 2014 such as using machine learning algorithms, an annotation module 2016, a 3D generator module 2018, a mass and density calculator module 2020, and pass/fail marker module 2020. As shown in FIG. 17B, the annotation module may allow the user to write on the screen with a stylus, finger, mouse, or other implement using a touch sensitive display screen of display device 1660.

FIG. 21 illustrates a user interface 2102 on a passenger's mobile device 2100 conveying information on the status of their luggage items. In this embodiment, an EMS 1657 (FIG. 16) sends SMS (short message service) messages to passengers on the status and location of their baggage. In this thread of messages, analysis screening occurred while the passenger was in-flight on an air carrier 20 (FIG. 16). The analysis indicated the baggage passed all screening criteria for the cruise line. Therefore, rather than having the passenger pick up their baggage at the destination airport, and then carry them to the cruise terminal (where they are screened a second time), they simply go to their state room on the cruise ship and their bags are already delivered into their room.

This process can provide more efficiency to the cruise employees because the baggage handling team may be a separate entity, which can confirm any changes to the cabin room before delivering the luggage item to the room. This can further provide a beneficial travel experience for the passenger to not worry about lugging luggage to the wrong room or standing in long lines to have their baggage checked in.

The system is programmed to provide an explanation selected from an array of standardized explanations in the message to the owner of the baggage regarding the negative compliance result. This is shown by the example messages of FIG. 21. The passenger's information may be extrapolated from the PID information. However, the passenger's information may be obtained after the image data 210 has been deleted.

The processor may display in the GUI 2102 messages associated with the screening of the luggage item according to at least one of regulations and rules associated with the second mode of travel.

In one or more embodiments, a terminating airport may be the first customs airport a passenger and their luggage item will encounter. In such an embodiment, the data from the terminating BSM may indicate the origination airport to be an international flight.

Returning again to the marker in FIG. 15, the luggage item may be handled by a trusted custody handler. When the luggage item arrives from the airport using the trusted custody handler to the ISSS 1070, for example, the luggage item may be processed by the SS computer station 1072A with the most current follow-along security image and data associated with the IATA license plate, passenger's name and/or PNR number without the need to provide any other PII.

IATA data messages are customized by airline carriers based on requirements provided the IATA data messages are compatible with IATA rules, SITA procedures or another IATA data message communicator.

The airline's IATA data messages are used by a baggage handling system at airports to track baggage routed and screened through various airports. The baggage handling system includes machine readers to read the printed bag tag as it journeys though the airports. This in essence tracks and locates the baggage while in possession of the airports or airport infrastructure.

FIG. 23A illustrates a luggage item 2300 with a pattern embedded in a body 2302 of the luggage item in accordance with an embodiment. The luggage item 2300 has a body 2302, a handle 2312 and wheels 2314. The features of the luggage item 2300 may be varied based on the body 2302, handle 2312 and wheels 2312. In some examples, the luggage item 2300 may have no wheels. In other example, the luggage item may have a different handle type or placement.

The body 2302 may be varied to provide billions of different variations. For example, the body may be made of a material with a pattern denoted by the diagonal lines 2308, which are hereinafter referred to as "the pattern 2308." These lines are for illustrative purposes only and should not be limiting in any way. The pattern 2308 may include many variations such a different surface textures, different fiber materials or steganography. An example variation includes embedded objects 2306. The pattern 2308 may stay the same but the objects 2306 may be varied. The pattern 2308 may have an embedded code. In the illustration, a 7-digit code is shown. The 7-digits may be alphanumerical characters. The code may be 3-20 digits of alphanumerical characters. The example luggage item and the pattern variations may be used to recognize the luggage item of a passenger. This may also assist in locating a lost or mishandled luggage item.

The tracking device may also be configured to store an image of an exterior of the luggage item. When the luggage item is missing, a IATA data message or baggage information message may be transmitted to other machines to find the luggage item using feature recognition of the pattern on the luggage item. Image capturing devices 2350 may capture a real-time image data of the luggage item, which can be compared using feature recognition to a baseline image data of the luggage item. The image data may be from a camera or a video device. The image data may be red, green, blue (RGB) image data. The baseline image data of the luggage item may be stored in the tracking device or a separate secure database. The image data may be accessible using a luggage item image data identifier sent in a baggage information message or stored in a tracking device. As used herein an image capturing device may be video device or a still image camera or device having both video and still image capabilities for example.

Figure 23B:
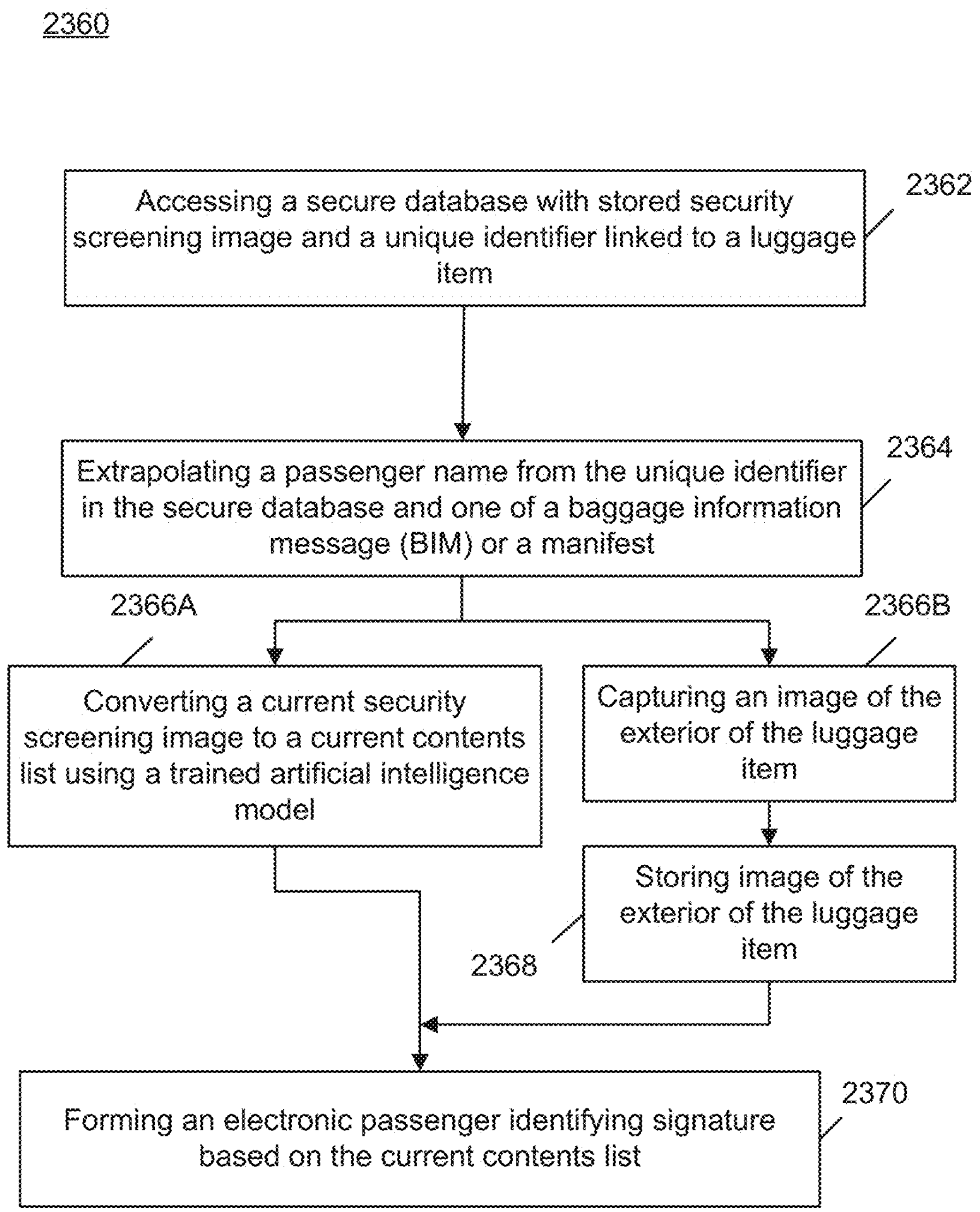
FIG. 23B illustrates a flowchart of a method for forming an electronic passenger identifying signature in accordance with an embodiment.
Figure 24:
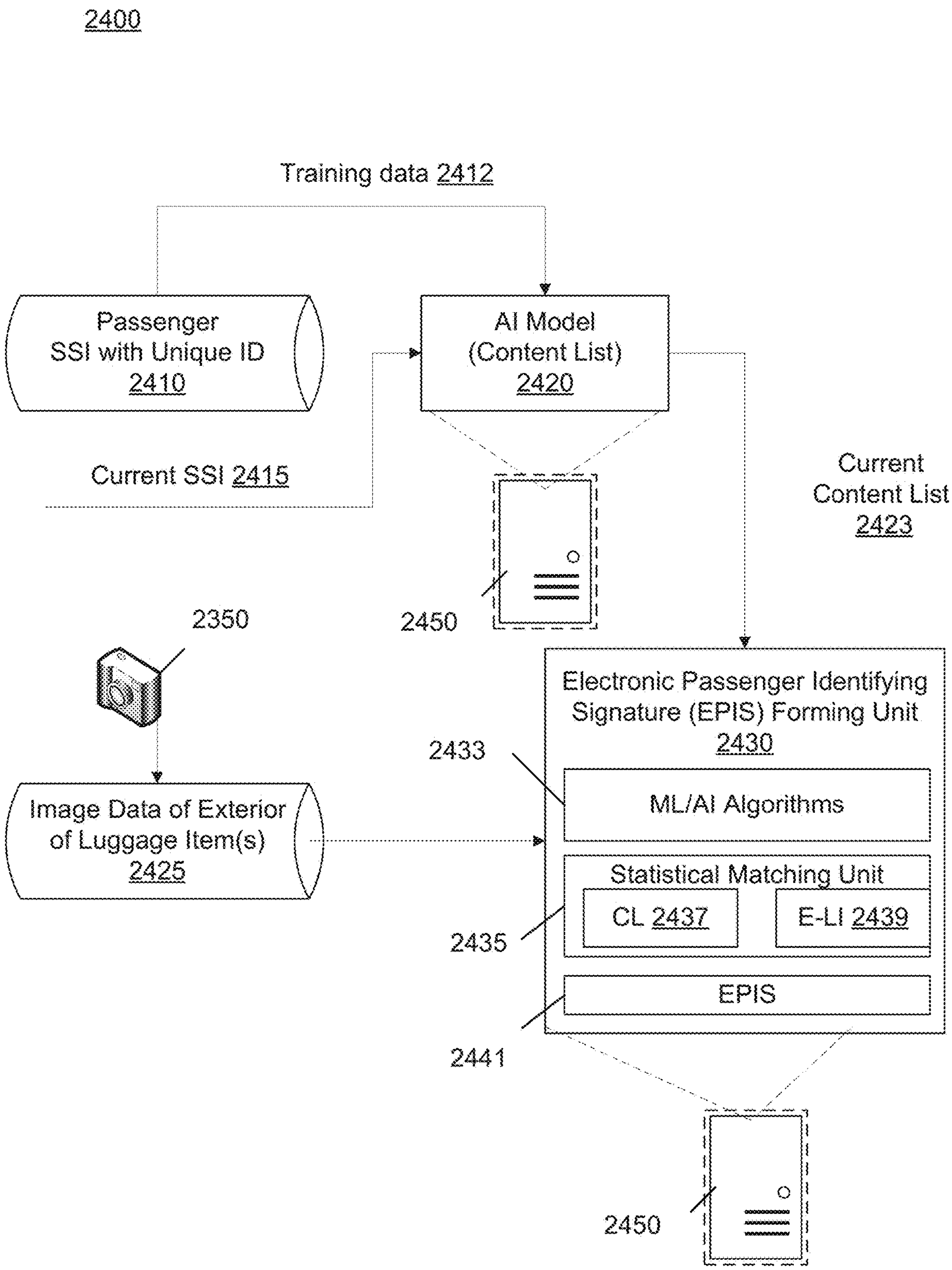
FIG. 24 illustrates a block diagram of a subsystem for forming the electronic passenger identifying signature in accordance with an embodiment.

FIG. 23B illustrates a flowchart of a method 2360 for forming an electronic passenger identifying signature in accordance with an embodiment. FIG. 23B may be described in relation to FIG. 23A and FIG. 24. FIG. 24 illustrates a block diagram of a subsystem 2400 for forming the electronic passenger identifying signature in accordance with an embodiment.

The method 2360 may include accessing, by at least one of the at least one processor 2450, a secure database 2410 with stored SSI and a unique identifier linked to a luggage item, at block 2362.

The unique identifier may include IATA license plate number, a PNR number, or a tracking identifier. The unique identifier may include a PID or derivatives thereof.

The method 2360 may include extrapolating, by at least one of the at least one processor 2450, a passenger name from the unique identifier in the secure database 2410 and one of a baggage information message (BIM) or a manifest, at block 2364. The extrapolating will be described in more detail in relation to FIGS. 26-27. The passenger name may be extrapolated based on the unique identifier used to access the SSI.

The method 2360 may include converting, by at least one of the at least one processor 2450, a current security screening image to a current contents list 2423 using a trained artificial intelligence model 2420, at block 2366A. The method 2360 may include training, by at least one of the at least one processor, an artificial intelligence model with a plurality of stored security screening images captured by security screening imaging machines located at airports to form the trained artificial intelligence model 2420. In one or more embodiments, the SSI may be labeled to develop labeled training data. The SSI viewed using the GUIs of FIGS. 17A-17C may be used to label viewed objects in the displayed SSI. In one or more embodiments, the SSI may be un-labeled training data. The plurality of stored security screening images are associated with the passenger. The method 2360 may include identifying, by at least one of the at least one processor, using the trained artificial intelligence model the current contents list from the SSI.

As used herein, the term "model" and/or "machine learning model" shall have its ordinary technical meaning referring broadly to various types of machine learning models as understood by a person of ordinary skill in the art. Various types of machine learning models are each suited to different kinds of task and have relative advantages and disadvantages. Representative machine learning models may include, for example, (1) supervised learning, (2) unsupervised learning, (3) semi-supervised learning, (4) reinforcement learning, and (5) deep learning. Each of these models is broadly discussed below in conjunction various sub-types and more detailed implementations of the same. In embodiments in accordance with the disclosure herein, the various types of models described below may be combined and altered to suit the particular task at hand.

Supervised Learning

Supervised Learning: Supervised learning machine learning algorithms are trained using labeled data, i.e., input data that is tagged with the correct output. The model learns to predict the output from the input data. There are several different sub-types of supervised learning models, for example, (1) linear regression, (2) logistic regression, (3) decision trees, (4) random forest, (5) support vector machines, and (6) neural networks.

Linear Regression: Linear Regression machine learning algorithms may be useful for predicting a continuous outcome variable based on one or more predictor variables. These types of algorithms models the relationship between the dependent and independent variables by fitting a linear equation to observed data.

Logistic Regression: Logistics Regression machine learning algorithms may be useful for predicting the probability that a given instance belongs to a particular class. Decision Trees: Decision tree models may use a tree-like graph of decisions to make predictions. In various embodiments implementing decision tree models, such algorithms may be useful for both regression and classification tasks.

Random Forest: Random forest machine learning algorithms may include an ensemble of decision trees, typically used to improve the predictive accuracy and control overfitting.

Support Vector Machines (SVMs): Support vector machine learning algorithms may be particularly well suited to determining and/or solving various issues surrounding the classification of problems and objects. These types of algorithms are effective in high dimensional spaces and they work by finding the hyperplane that best separates classes in the feature space.

Neural Networks: This type of machine learning algorithm is often used as a catch all to refer to various type of algorithms. The term "neural network" is inspired by the structure of the human brain, and these models are particularly effective for complex problems like image and speech recognition. They can model nonlinear relationships and learn complex patterns in data. For example, image analysis training and determination.

Unsupervised Learning: These algorithms are used when the training data is not labeled. The system tries to learn the patterns and the structure from the data.

Clustering Algorithms (e.g., K-Means, Hierarchical Clustering): Used to group data points into clusters such that data points in the same cluster are more similar to each other than to those in other clusters.

Principal Component Analysis (PCA): A technique used to emphasize variation and bring out strong patterns in a dataset. It's often used to make data easy to explore and visualize.

Autoencoders: A type of neural network used to learn efficient representations of data, typically for the purpose of dimensionality reduction.

Semi-Supervised Learning: These algorithms fall between supervised and unsupervised learning since they use both labeled and unlabeled data for training.

Reinforcement Learning: This type of learning uses a system of rewards and penalties to compel the computer to solve a problem by itself. It's used in various applications, such as in training models to play video games and for robotic hands to grasp objects.

Deep Learning: A subset of machine learning where neural networks-particularly those with many layers (deep networks)—are used. It's particularly powerful for processing unstructured data like images and text.

Convolutional Neural Networks (CNNs): Primarily used in image recognition and processing, they are capable of capturing spatial and temporal dependencies in an image through the application of relevant filters.

Recurrent Neural Networks (RNNs): Suitable for processing sequential data, like time series or natural language, due to their ability to store information about previous inputs using their internal memory.

Each of these models and algorithms has its own strengths and weaknesses, making them suitable for different types of data and problems. The choice of algorithm often depends on the size, quality, and nature of the data, the task to be performed, and the computational resources available.

The method 2360 may include capturing an image by a camera or video device 2350. The method 1360 may store in database 2425 image data of the exterior of luggage item(s) of the passenger. The image data may be time stamped to distinguish different luggage items at different times. A passenger may use different luggage items with different exterior appearances. The method 2360 may include capturing, by a camera or video device 2350, image data of an exterior of the luggage item, at block 2366B. The method 2360 may include storing, by at least one of the at least one processor, the captured image data representative of the exterior of the luggage item, at block 2368. In one or more embodiments, the tracking device may store one image of the exterior of the luggage item or all images of the exterior of a luggage item associated with the same passenger. The luggage item images may be transferred to the electronic passenger identifying signature forming unit 2430.

The method 2360 may include forming, by at least one of the at least one processor 2450, an electronic passenger identifying signature (EPIS) 2441 based on the current contents list 2423, at block 2370. The electronic passenger identifying signature 2441 may be formed based on statistical matching by a statistical matching unit 2435 of the current contents list 2423 with previous content lists 2437 of stored SSIs.

The electronic passenger identifying signature 2441 may be formed based on statistical matching by a statistical matching unit 2435 of the captured image data representative of the exterior of the luggage item (E-LI) 2439 and with previous image data of the exterior of the luggage item 2439.

The electronic passenger identifying signature forming unit 2430 may include machine learning and/or artificial intelligence (ML/AI) algorithms 2433 to extract features of the exterior of the luggage item to statistically match the E-LI of the current luggage item to the E-LI of stored previous images in database 2425. For example, the ML/AI algorithms 2433 may include background subtraction algorithms, feature extraction algorithms, edge detection algorithms, and/or pattern identification algorithms. Feature extraction algorithms may search for features consistent with luggage items, such as without limitation, wheels, handles, handle locations, zippers, manufacturer labels or trademarks, luggage texture, pockets, pocket locations, hidden expansion panels, and exterior surface features. The ML/AI algorithms 2433 may identify colors of the exterior surface.

Statistical matching of the exterior of the luggage items 2439 may include standard deviation calculations, mean calculations or other statistical analysis. The statistical matching of content lists 2437 may include determining an overlap of a certain number of items in a list. The list may have ranked objects In one or more embodiments, a passenger may bring a unique identifiable object, such as a medical apparatus that is placed in a luggage item. The appearance of the medical apparatus may be weighted in a list of ranked objects.

The statical analysis of the content list may vary based on the occurrence of objects in the contents of the passenger's luggage item.

A signature with a new luggage item but an expected unique identifiable object provides a high statical rating for the signature. Likewise, an old luggage item tied to a passenger with objects having less ranking may also have a higher statical rating.

Figure 25:
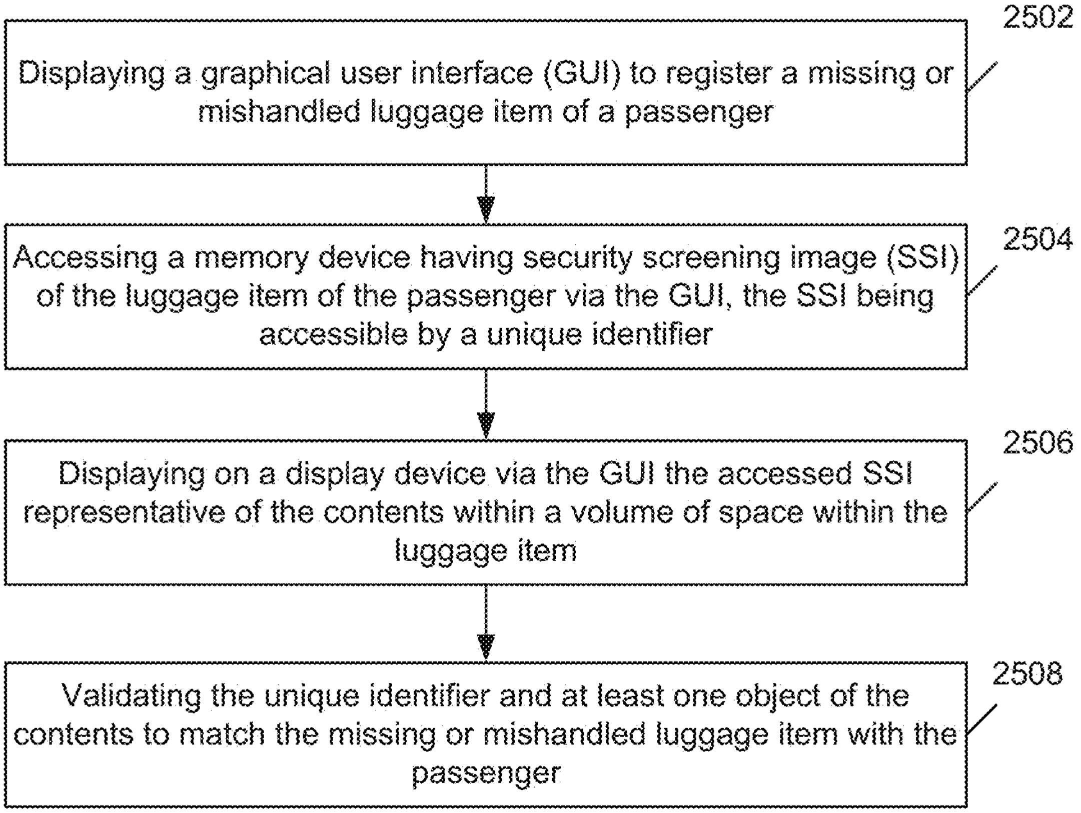
FIG. 25 illustrates a flowchart of a method for validating a missing or mishandled luggage item that belongs to a passenger in accordance with an embodiment.

FIG. 25 illustrates a flowchart of a method 2500 for validating a missing or mishandled luggage item that belongs to a passenger in accordance with an embodiment.

The method 2500 may include displaying, by at least one of at least one processor, a graphical user interface (GUI) to register a missing or mishandled luggage item of a passenger, at block 2502. An example GUI is shown in FIGS. 16 and 17A-17C.

The method 2500 may include accessing, by at least one of the at least one processor, a memory device having security screening image (SSI) of the luggage item of the passenger via the GUI, the SSI being accessible by a unique identifier, at block 2504.

The method 2500 may include displaying, by at least one of the at least one processor, on a display device via the GUI the accessed SSI representative of the contents within a volume of space within the luggage item, at block 2506.

The method 2500 may include validating, by at least one of the at least one processor, the unique identifier and at least one object of the contents to match the missing or mishandled luggage item with the passenger, at block 2508.

In one or more embodiments, the unique identifier is an International Air Transport Association (IATA) license plate number. In one or more embodiments, the unique baggage identifier is a passenger name record (PNR) number. In one or more embodiments, the unique baggage identifier is a pseudo identifier.

Figure 26:
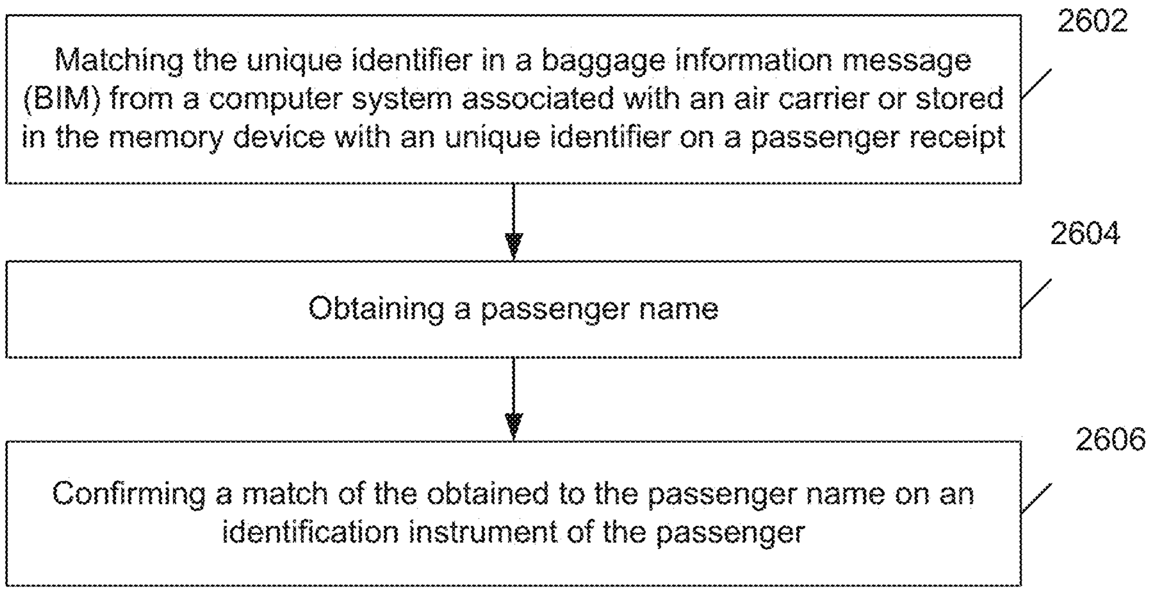
FIG. 26 illustrates a flowchart of a method for identifying the unique identifier in accordance with an embodiment.

FIG. 26 illustrates a flowchart of a method 2600 for identifying the unique baggage identifier in accordance with an embodiment.

The method 2600 may include matching, by at least one of the at least one processor, the unique baggage identifier in a baggage information message (BIM) from a computer system associated with an air carrier or stored in the memory device with an IATA license plate number on a passenger receipt, at block 2602.

The method 2600 may include obtaining, by at least one of the at least one processor, a passenger name, at block 2604. The PNR location in a database may be determined by determining a PNR number of the passenger in a BIM. The BIM associated with a passenger may be located based on an IATA license plate stored with the PID. The BIM may be communicated by a computer system associated with an air carrier or a baggage handling system.

A passenger name may be determined if stored in a tracking device 41 or stored in a manifest having the tracking device identifier linked to the passenger name.

The method 2600 may include confirming, by at least one of the at least one processor, a match of the obtained to the passenger name on an identification instrument of the passenger, at block 2606. By way of a non-limiting example, the identification instrument may be a passport, a driver's license, or government-issued identification. For example, the driver's license may be a digital driver's license wallet issued by a state.

The GUI may include data entry fields for entering information to perform a match by a processor between the information obtained such as from an air carrier system or baggage handling system, PNR database and a scan of an identification instrument, for example.

Figure 27:
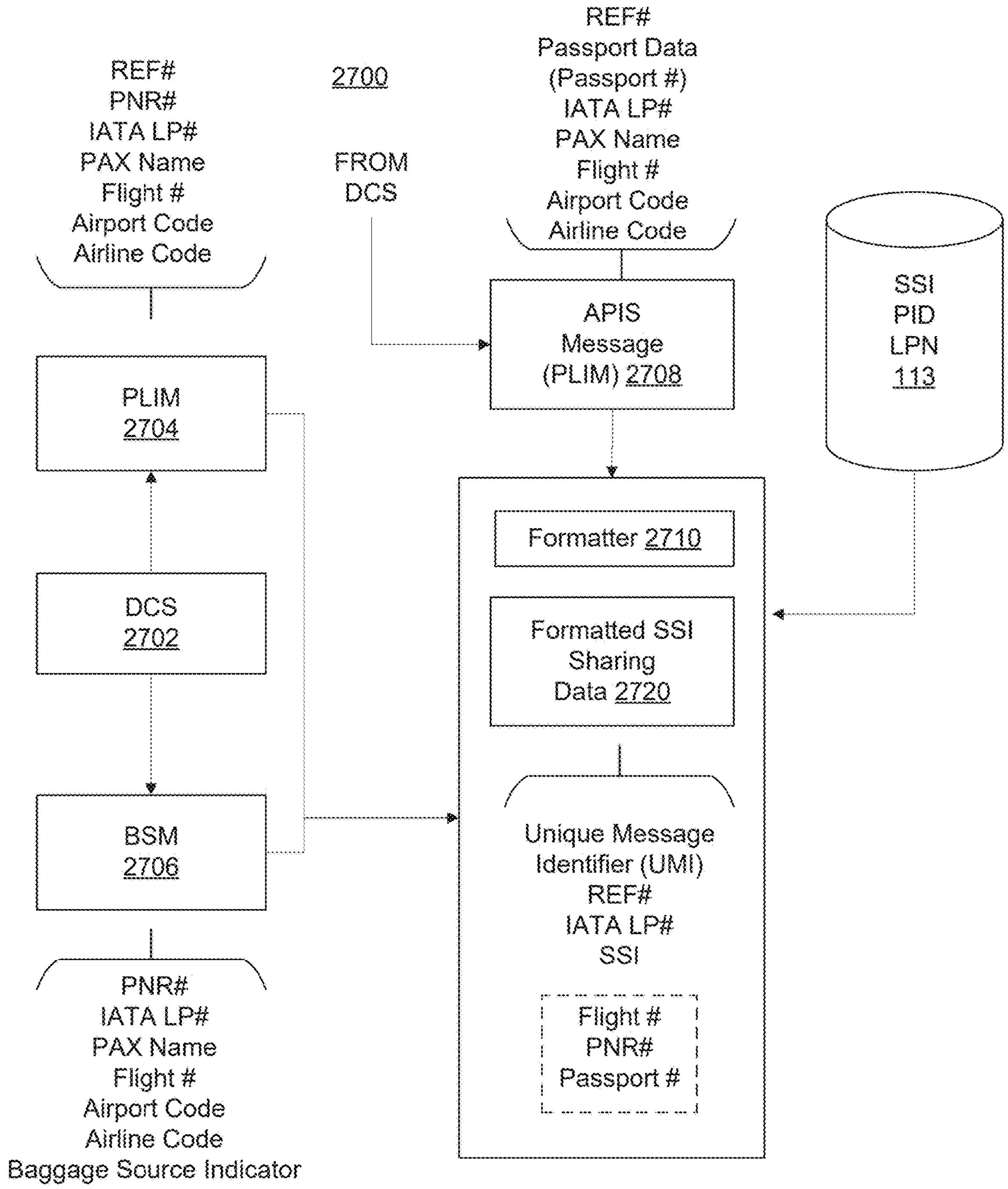
FIG. 27 illustrates a flow diagram of IATA data messages and PLMs in accordance with an embodiment.

FIG. 27 illustrates a flow diagram 2700 of IATA data messages and PLFormatFormatrMs in accordance with an embodiment. The flow diagram 2700 may begin with the DCS 2702. The DCS 2702 may create the data used in the PLIMs at 2704 according to one or more data message formats. An IATA data message format, the PLIM may be a B-Type message, for example. However, other PLIMs may use a UN/EDIFACT message format. The PLIM may use other formats as standards and requirements change and should not be limited to those described herein. A PLIM may be communicated using a Type-A messaging format. However, the Customs Authority may have a security screening tool that requires a standardized security screening tool format. This format may be configured for a graphical user interface that is programmed to access data remotely in a structured format and display the information on a display device connected to a computer system. The structured format may be sent via the Internet using various communication protocols. The structured data format may support cloud computing services or cloud computing servers. In some instances, the abbreviation "PAX" means passenger.

The DCS 2702 may create the data used in the IATA data messages, at 2706. The IATA data message may be a baggage source message or BIM. 2 at 2704 according to one or more data message formats. An IATA data message format, the PLIM may be a B-Type message, for example. The DCS 2702 may create the data for the APIS messages 2708 (i.e., PLIM). The flow diagram also include data from the memory device, denoted at 113 with SSI, the PID and the LPN or IATA license plate number. The data is de-personalized and formatted by formatter 2710 to a standardized format for a security screening tool (i.e., graphical user interface and relational database). The formatted data becomes SSI sharing data 2720 which is communicated to a cloud storage system, virtual memory or other computing infrastructure for access by the security screening tool.

Figure 28:
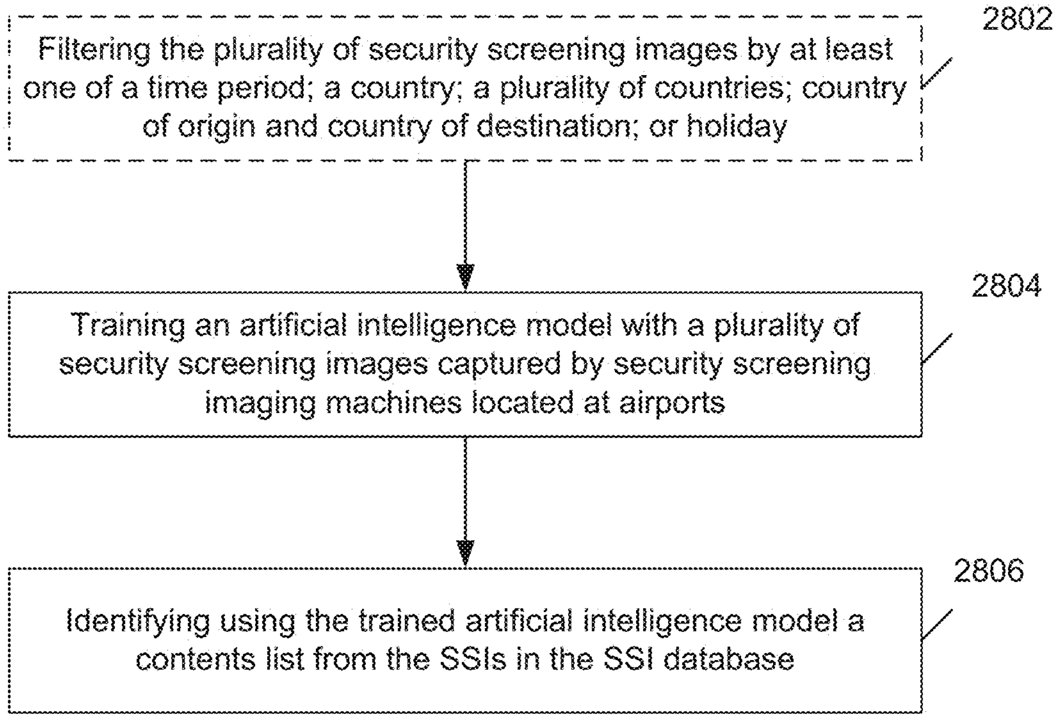
FIG. 28 illustrates a flowchart of a method for generating a content list in accordance with an embodiment.
Figure 29:
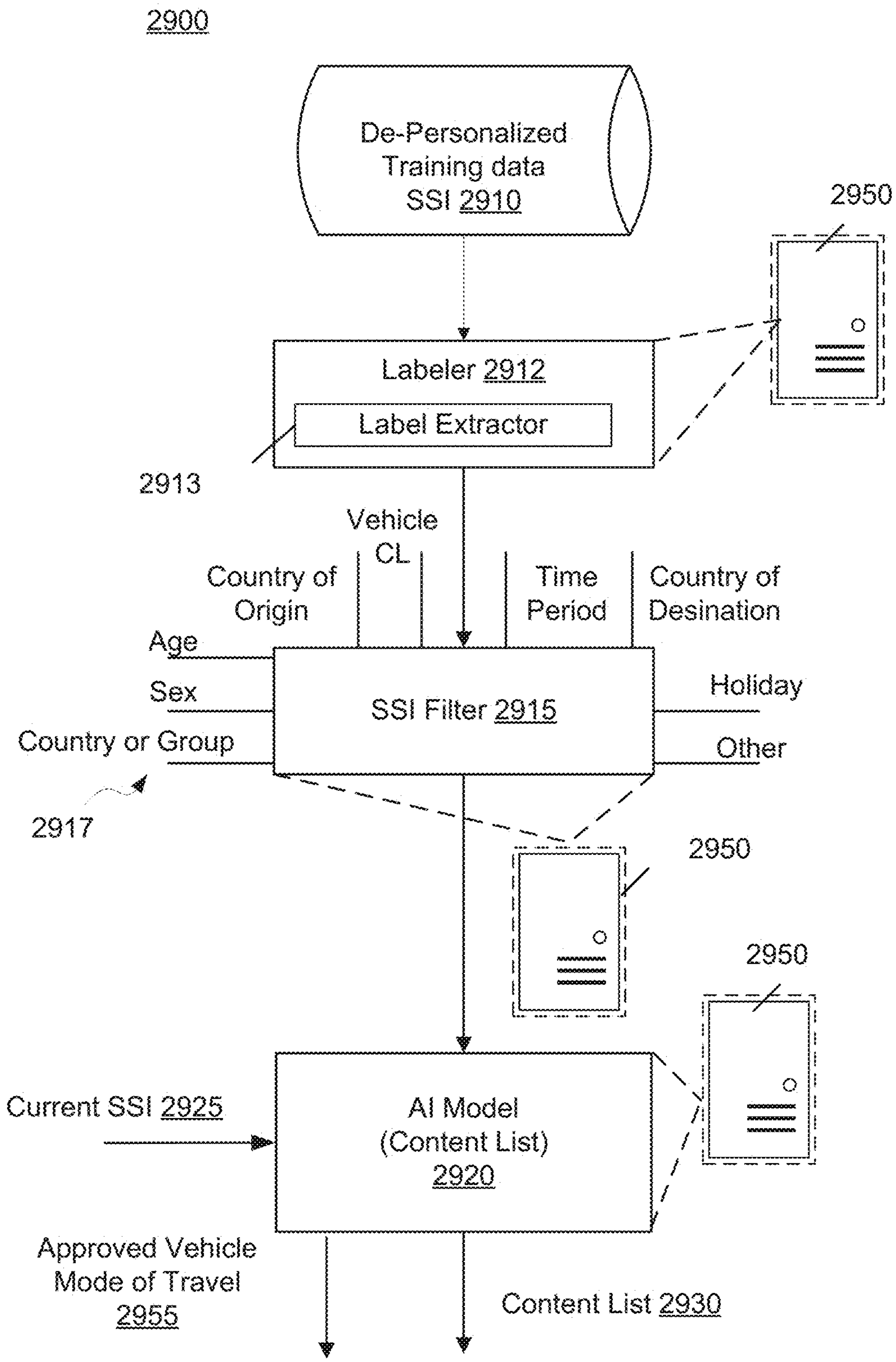
FIG. 29 illustrates a block diagram of a subsystem for training an artificial intelligence model to determining a content list in accordance with an embodiment.

FIG. 28 illustrates a flowchart of a method 2800 for generating a content list in accordance with an embodiment. FIG. 28 will be described in relation to FIG. 29. FIG. 29 illustrates a block diagram of a subsystem 2900 for training an artificial intelligence model 2920 for determining a content list 2930 in accordance with an embodiment.

The artificial intelligence model may be trained by all or some of the SSI captured by the SS imaging machines 45, 50 in a country or a plurality of countries. The de-personalized training data of SSI may be stored in a secure database 2910. An example of de-personalizing SSI and data 113' is described above in relation to FIG. 2C and stored in secure database 213. The training data may be labeled or unlabeled. As shown in FIG. 29, the subsystem 2900 may include a labeler 2912 configured to label each de-personalized SSI. The labeling process 2912 may occur before the de-personalizing process or after the de-personalizing process. However, the extracted data because not tied to a manifest or a flight, and/or pending clearance, sex and age data may be benign data when entered with other disconnected filter data in a blockchain database.

The countries may be associated by a treaty. The countries may be grouped by region, such as Asian countries, Middle Eastern countries, Gulf State Countries, South American Countries, etc. The countries may have a country code that may be entered into an SSI filter 2915. The SSI filter 2915 may receive vehicle content lists (CLs).

The label extractor 2913 may include programming instructions executed by at least one processor 2950 to extract filter control data input. The data may be extracted by using an IATA license plate to extrapolate country codes of the airports identified in an electronic IATA data message. The data may be extracted by using an IATA license plate to obtain a PNR number from an electronic IATA data message. The PNR number may provide access to a secure data with PNR data associated with the passenger to obtain a birth date, age and/or sex of the passenger. The unique identifier may be a PID to obtain meta data such as time stamps from the SS imaging machines.

The method 2800 may include filtering, by at least one of the at least one processor 2950 via filter 1915, the plurality of SSI by at least one filtering control inputs 2917, at block 2802. The filtering control inputs 2917 may include time period; country; a plurality of countries; country of origin and country of destination; holiday; vehicle content lists/per vehicle and other. The filter may limit the number of SSI used in the model to speed up the processing. Travelers may pack different items during a particular holiday. Travelers may pack different items during a particular season (i.e., time period). Travelers may pack different items when traveling from a cold-temperature country to a warm-temperature country and vice versa. The filtering data may be based on meta data produced by the SS imaging machines 45, 50. For example, the time period may be based on time stamps generated at the time an SSI is generated. The country or country code may be generated by on meta data related to a location of the SS imaging machine 45, 50 or the origination from which the SSI was generated, for example. The holiday may be based on time stamp data. Each country may have its own holiday schedule.

The country of origin and country of destination may be extrapolated based in the IATA license plate. The IATA license plate may allow a secure entity to obtain the country of the originating flight and the country of the destination. The country may be a function of the airport code for inbound and outbound flight data.

By way of non-limiting data, the de-personalized SSI training data may be updated to include data that includes different categories of filter control inputs. The filter control input designated as “other” may use other categories for filtering SSI training data to speed up the processing.

In one or more embodiments, to refine the training data to train the artificial intelligence model, the filter control input designated as “sex” of the passenger may be obtained to distinguish content lists between male passengers and female passengers to speed up the processing of the content list using the training data. The sex of the passenger may be obtained from a PNR database.

In one or more embodiments, to refine the training data to train the artificial intelligence model, the filter control input designated as “age” of the passenger may be obtained to distinguish content lists of passengers in a certain age group to speed up the processing of the content list using the training data. The age of the passenger may be obtained from a PNR database. The PNR location in a database may be determined by determining a PNR number of a passenger in a BIM. The BIM associated with a passenger may be located based on an IATA license plate stored with the PID.

The training data for filtering the de-personalized SSI training data may extrapolate a passenger’s age or sex using the license plate to locate the PNR number in a BIM, for example.

The method 2800 may include training, by at least one of the at least one processor 2950, an artificial intelligence model with a plurality of security screening images captured by security screening imaging machines located at airports in a country, at block 2804.

The method 2800 may include identifying, by at least one of the at least one processor 2950, using the artificial intelligence model a contents list 2930 from the SSI, at block 2806. The AI model 2920 may also provide approved vehicles for at least one mode of travel 2955 based on the CL for each vehicle in a geographic area surrounding the destination point/terminating airport. The marker or other instrument may provide detailed information about which vehicles of the next mode of travel the luggage item provided it stays in trusted custody is approved or cleared for travel.

In one or more embodiments, the contents list may be used to identify a mishandled luggage item of a passenger.

Figure 30:
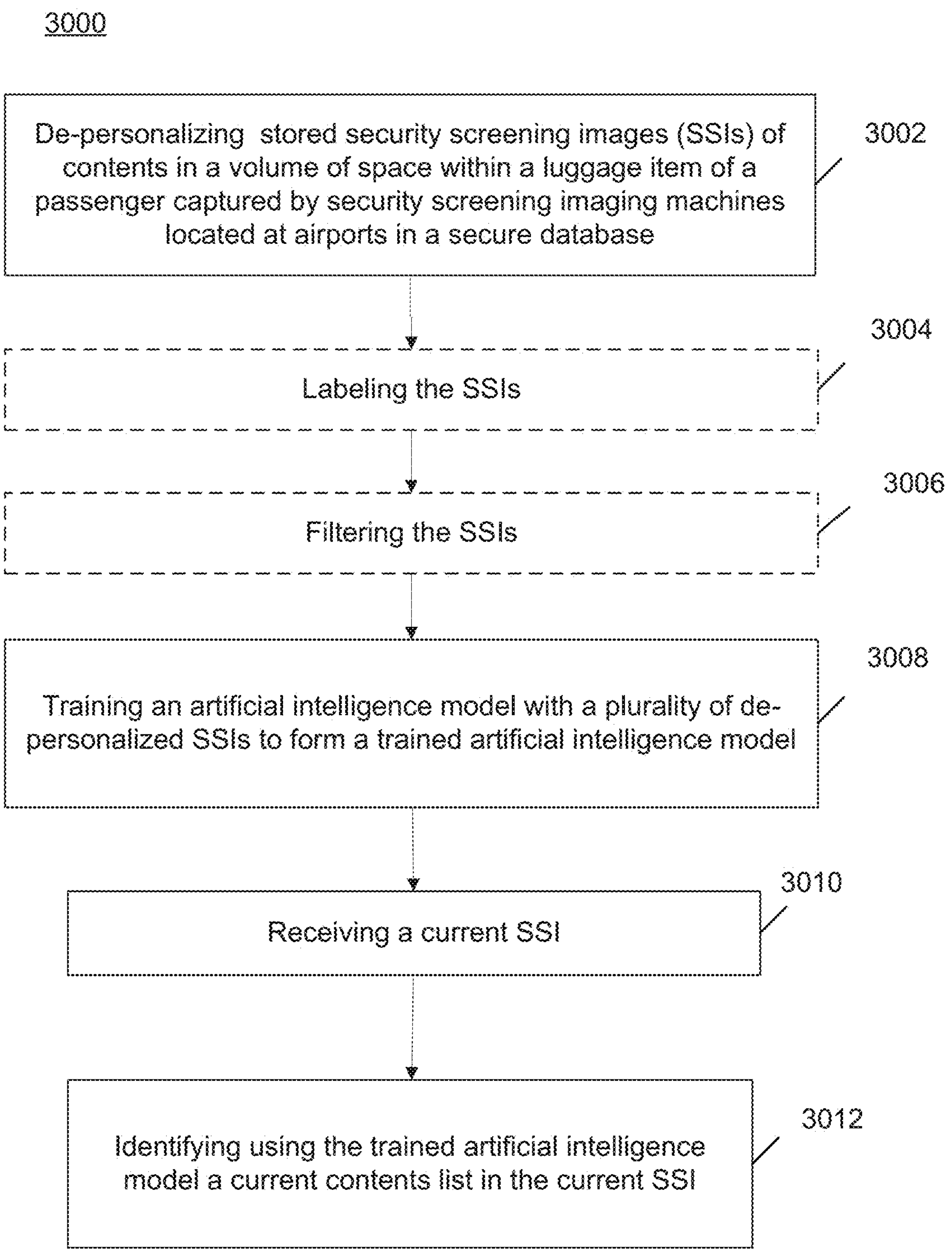
FIG. 30 illustrates a flowchart of a method for training and generating a content list in accordance with an embodiment.

FIG. 30 illustrates a flowchart of a method 3000 for training and generating a content list in accordance with an embodiment. FIG. 30 will be described in relation to FIG. 29, described above in relation to FIG. 28.

The method 3000 may include de-personalizing, by at least one of at least one processor, stored security screening images (SSIs) of contents in a volume of space within a luggage item of a passenger captured by security screening imaging machines located at airports in a secure database, at block 3002.

The method 3000 may include training, by at least one of the at least one processor, an artificial intelligence model with a plurality of de-personalized SSIs to form a trained artificial intelligence model, at block 3008.

The method 3000 may include receiving, by at least one of the at least one processor 2950, a current SSI, at block 3010; and identifying, by at least one of the at least one processor 2950, using the trained artificial intelligence model a current contents list in the current SSI, at block 3012.

The method 3000 may include labeling, by at least one of the at least one processor 2950, the de-personalized SSIs via a graphical user interface display using a browser. In various methods, content objects in each de-personalized SSI may be labeled.

The method 3000 may include obtaining, by at least one of the at least one processor 2950, at least one filter control data input associated with the de-personalized SSIs, at block 3004, wherein the labeler 2912 includes a label extractor 2913. In various methods, the at least one filter control data input may include age of the passenger, sex of the passenger, a time stamp, country of origin information, and country of destination information. In various methods, each de-personalized SSI may be labeled with the at least one filter control data input.

In one or more embodiments, at least one filter control data input may include vehicle for a mode of travel. Each vehicle, such as a hotel or a cruise ship may have its own rules and regulations in addition to regulations associated with the country of travel or the mode of travel. Different prohibited content lists may be used to filter the content lists in the content list of the SSI. A list of content lists for vehicles within a geographical region of the destination point 107 (FIG. 1B) may be input into the machine learning algorithm to identify which vehicles the luggage item is approved or cleared to board using security screening based on the SSI provided the luggage item remains in trusted custody. The machine learning algorithm may output the vehicles the luggage item is approved or cleared based on the SSI security screening.

The method 3000 may include, at block 3004, obtaining, by at least one of the at least one processor 2950, a first unique identifier associated with each stored SSI; obtaining, by at least one of the at least one processor, an electronic baggage information message associated with the passenger; and extracting, by at least one of the at least one processor, from the electronic baggage information message data representative of the at least one filter control data input.

Disclosed methods may further include, at block 3004, obtaining, by at least one of the at least one processor 2950, a first unique identifier (i.e., license plate number or PID) associated with each stored SSI; obtaining, by at least one of the at least one processor 2950, an electronic baggage information message associated with the passenger; extracting, by at least one of the at least one processor 2950, from the electronic baggage information message a second unique identifier (i.e., PNR number) associated with a passenger;

and obtaining, by at least one of the at least one processor, from a database using the second unique identifier, data representative of the at least one filter control data input. The at least one filter control data input may be stored in a blockchain database. Each de-personalized SSI may be accessible from a blockchain database. Each de-personalized SSI may include three-dimensional representations of objects within the luggage item.

The method 3000 may include, at block 3006, filtering, by at least one of the at least one processor 2950, the de-personalized SSIs prior to training the artificial intelligence model using selected at least one filter control data input. In various methods the at least one filter control data input may include age of a passenger, sex of the passenger, a period of time, a holiday, country of origin information, and country of destination information.

FIGS. 31A-31B illustrates a flowchart of a method 3100 for de-personalized security data file sharing with a security screening image in accordance with an embodiment. The method 3100 may include, at block 3102, de-personalizing baggage data, by at least one of at least one processor.

The method 3100 may include, at block 3104, obtaining, by at least one of at least one processor, baggage data generated from at least one networked scanning device of a baggage handling system. The baggage data may include an International Air Transportation Association (IATA) license plate for a checked-in luggage item of a passenger being checked-in with an originating airline.

The method 3100 may include, at block 3106, retrieving from a secure database stored in a non-transitory secure memory device, by at least one of the at least one processor, a security screening image (SSI) representative of contents within the checked-in luggage item that is linked to the IATA license plate. The SSI is generated by a security screening imaging machine in an originating country and based on technology standards of a first level governed by a first security authority of the originating country.

Block 3106 may receive the de-personalized data from FIG. 9A or FIG. 9B in order to retrieve the SSI. The IATA bag tag information may be obtained from different sources as each country may have different requirements or different systems in place to accommodate data extraction to retrieve data from the SSI with de-personalized data. Nonetheless, if a country requires the passenger's name, the system will be modified to provide the extra data to the countries authority.

The method 3100 may include, at block 3107, determining whether a missing link is detected when trying to retrieve the SSI at block 3106. If the determination, at block 3107, is "NO," the method 3100 may proceed to block 3108. However, if at block 3107 a missing link is detected ("YES"), the method 3107 may proceed to FIG. 35A, block 3502 to recover the missing link in the secure database storing the SSI and linking data such as the PID and IATA license plate number.

The method 3100 may include, at block 3108, converting, by at least one of the at least one processor, the SSI and de-personalized baggage or passenger data into SSI file sharing data of a structured data format for a security screening tool. In one or more embodiments, at least a portion of the de-personalized baggage data or de-personalized passenger data may be included in the SSI file sharing data. By way of a non-limiting example, the SSI file sharing data may include the SSI and at least one of the UPID and the IATA license plate.

At block 3108, the converting the SSI file and the baggage data into the SSI file sharing data may include, at block 3110, generating, by at least one of the at least one processor, a message identifier number that may include a sequence of digits; and at block 3112, associating, by at least one of the at least one processor. The SSI file sharing data with the message identifier by configuring the SSI file sharing data to be accessed by the security screening tool.

The method 3100 may include, at block 3114, transmitting, through a first network interface in communication with at least one of the at least one processor and a first communication network, the SSI file sharing data over the first communication network to a secure non-transitory memory system associated with a border crossing airport in a second country. The SSI file sharing data is configured to be used by the second security authority to perform a security screening process on the checked-in luggage item using the security screening tool. The second security authority is different from the first security authority.

The method 3100 may include, at block 3116, repeating blocks 3102-3114 for each passenger of a plurality of passengers or each luggage item for a plurality of luggage items. In lieu of the de-personalizing step of 3102, the de-personalizing may be obtained from the methods of FIG. 9A or 9B.

The SSI file sharing data may include at least one of a flight number, an airline code, a unique passenger identifier (UPID) required for communicating with countries, a passport document number, a passenger name, a passenger name record (PNR) locator, or a pseudo identifier (PID).

Figure 32:
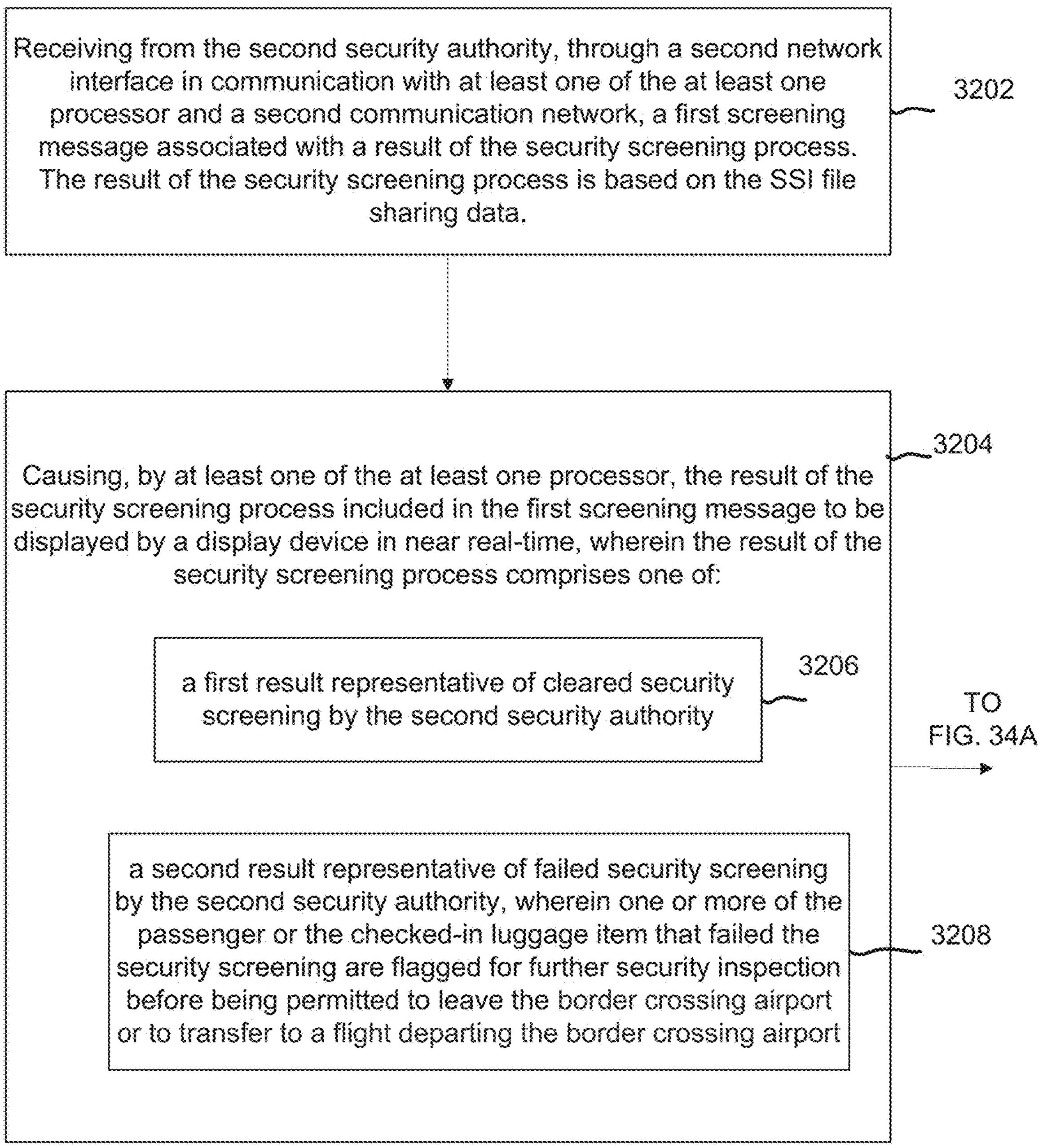
FIG. 32 illustrates a flowchart of a method for luggage item handling security management in accordance with an embodiment.

After the formatted SSI file sharing data is transmitted, the system waits for security clearance or failure messages, as described in FIG. 32.

FIG. 32 illustrates a flowchart of a method 3200 for luggage item handling security management in accordance with an embodiment. The method 3200 may include, at block 3202, receiving from the second security authority, through a second network interface in communication with at least one of the at least one processor and a second communication network, a first screening message associated with a result of the security screening process. The result of the security screening process is based on the SSI file sharing data.

The method 3200 may include, at block 3204, causing, by at least one of the at least one processor, the result of the security screening process included in the first screening message to be displayed by a display device in near real-time.

The result of the security screening process may include one of a first result representative of cleared security screening by the second security authority, at block 3206, or a second result representative of failed security screening by the second security authority, at block 3208. One or more of the passengers or the checked-in luggage item that failed the security screening may be flagged for further security inspection before being permitted to leave the border crossing airport or to transfer to a flight departing the border crossing airport.

After, the first screening message is received at block 3204, the method may proceed to FIG. 34A where a method 3400 for passenger matching and baggage release begins, for example.

Figure 33:
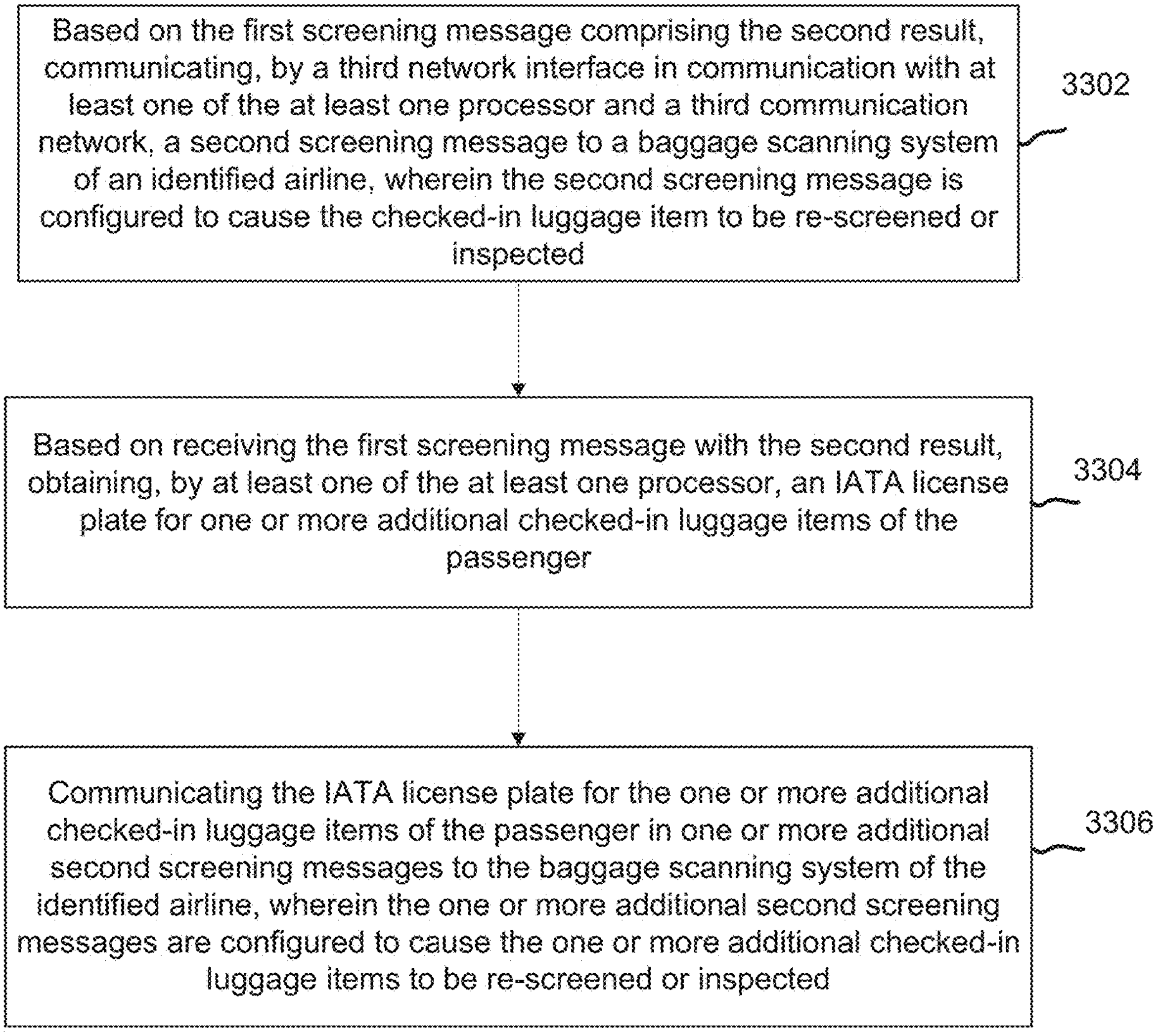
FIG. 33 illustrates a flowchart of a method for preventing release and/or re-screening of passenger's luggage item based on a security failure.

FIG. 33 illustrates a flowchart of a method for preventing release and/or re-screening of passenger's luggage item based on a security failure. If a passenger fails security screening, their luggage items cannot be release for transfer to another flight or to terminate (feed into a carousel) the airport. In one or more embodiments, a security authority may want to re-screen a luggage item by manually searching the luggage item, for example.

The method 3300 may include, at block 3302, based on the first screening message may include the second result, communicating, by a third network interface in communication with at least one of the at least one processor and a third communication network, a second screening message to a baggage scanning system of an identified airline and/or BHS. The second screening message may cause the checked-in luggage item to be re-screened or inspected. The second screening message may stop the release of the luggage item for transfer or termination from the airport The method 3300 may include, at block 3304, based on receiving the first screening message with the second result, obtaining, by at least one of the at least one processor, an IATA license plate for one or more additional checked-in luggage items of the passenger.

The method 3300 may include, at block 3306, communicating the IATA license plate for the one or more additional checked-in luggage items of the passenger in one or more additional second screening messages to the baggage scanning system of the identified airline. The one or more additional second screening messages are configured to cause the one or more additional checked-in luggage items to be re-screened.

The inventor has determined that processing passengers through the Customs Authority of any country can speed up the processing of the luggage items by determining when the passenger has been processed and cleared through the Customs Authority. Each airport may have its own process. By way of a non-limiting example, an airport may require a passenger to carry their luggage with them to the Custom's Hall or a clearance area. Since each passenger has different abilities, this process can take time to arrive at a Customs Authority Station. The inventor proposes to maintain the luggage item in trusted custody until the passenger clears the Customs Authority security screening process. In one or more embodiments, the Customs Authority may require two security screening processes, one for the passenger and another for the luggage item.

The process to clear a Custom's Hall by detecting a clearance processing event can also speed up the processing on a cruise ship. For this type of vehicle, hundreds or thousands of luggage items need to be transported to the airport. However, releasing luggage items and further processing such as for a return home flight is time constrained by a check in window and the queue of passengers through the Custom's Hall. By determining the clearance processing event, luggage items of cleared passenger may be processed in batches instead of waiting until the end for all of the passengers to be processed.

One or more embodiments herein may allow a security screening process of the luggage item to be performed while the passenger and luggage item are in flight. The second passenger screening process may take place with the luggage item, in some embodiments, held in trusted custody. The systems herein may monitor the computer systems or receive a message from a computer system of the Customs Authority of a clearance processing event of a passenger. As a consequence, the systems herein may then look up the IATA bag tag or other unique baggage identifier to send a message to release the luggage items of the passenger to a computing system of the baggage handling system, computing device of a baggage handling or other designated baggage release system.

Figure 34B:
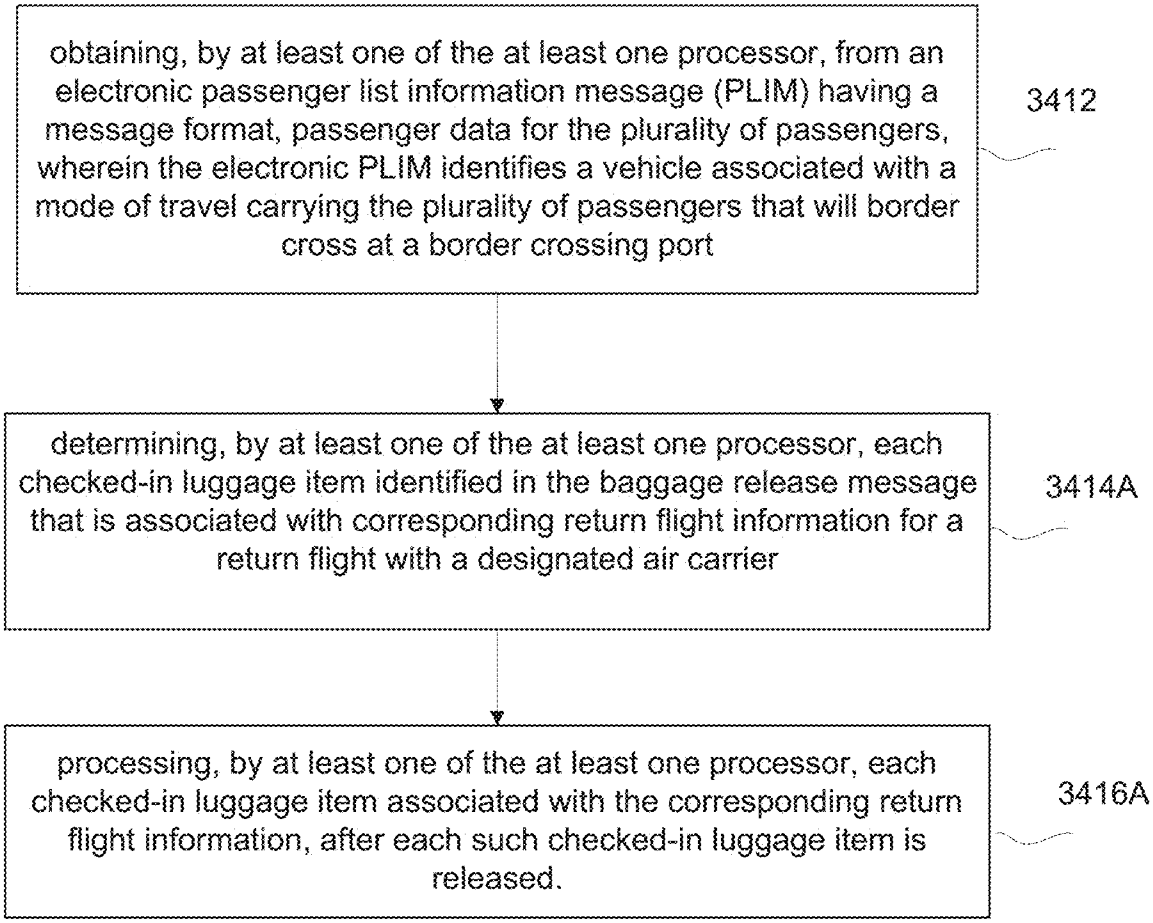
Figure 34C:
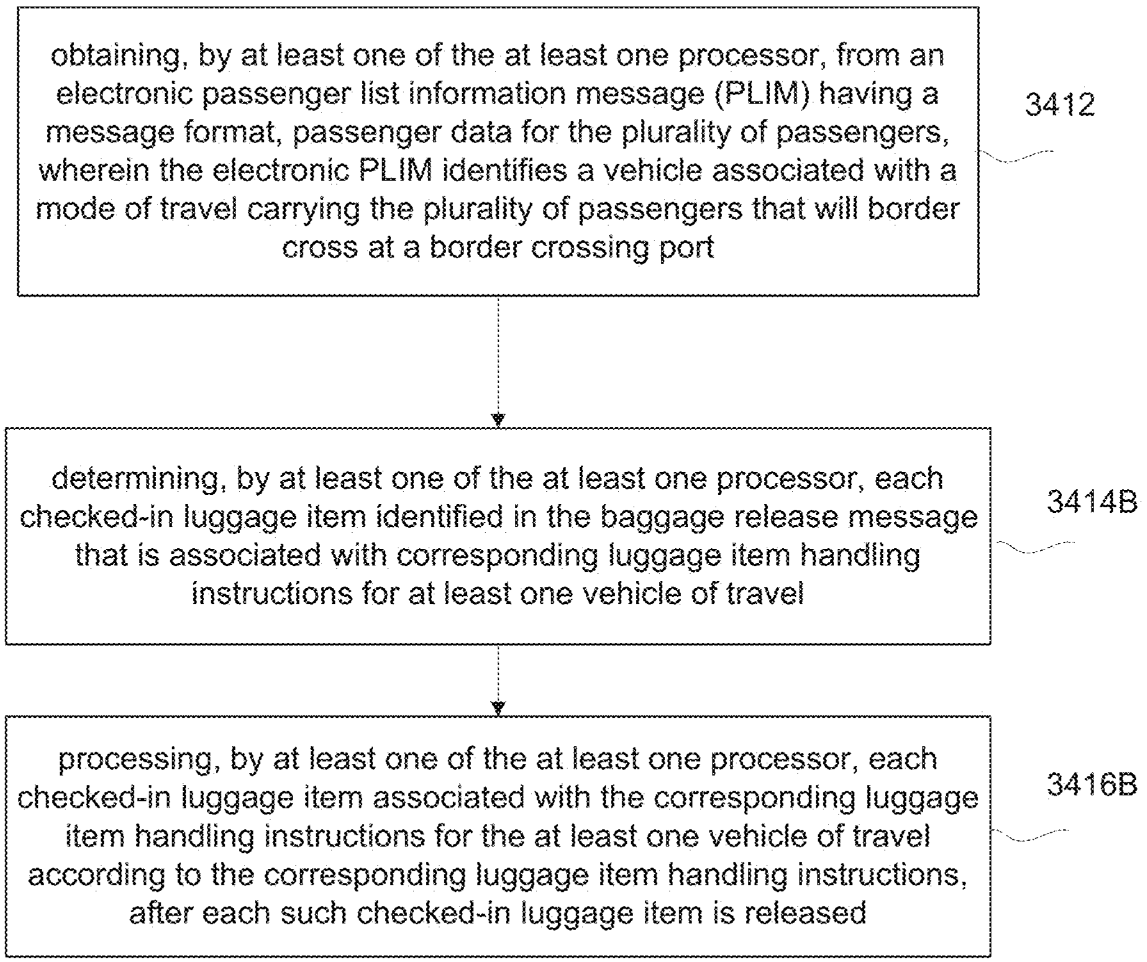

FIGS. 34A, 34B and 34C illustrate a flowchart of a method for passenger matching and baggage release. The method 3400 may include, at block 3402, generating, by at least one of at least one processor, at least one manifest listing a plurality of passengers. Each of the at least one manifest may include a passenger manifest data record having manifest data fields for each passenger listed therein.

The method 3400 may include, at block 3404, monitoring, by a passenger matching and bag release system, at least one computer system associated with a security authority. The security authority processes the plurality of passengers for border crossing at a border crossing airport.

The method 3400 may include, at block 3406, detecting, in near real time by the passenger matching and bag release system, a clearance processing event of a passenger record of a respective passenger among the plurality of passengers created by the at least one computer system associated with the security authority, by matching the passenger record with a respective passenger manifest data record.

A method 3400 may include, at block 3408, based on detecting the clearance processing event, communicating, by a network interface coupled to the passenger matching and bag release system and a communication network, a baggage release message to a baggage scanning system of an identified airline, a computing device of a baggage handler or a baggage handling system. The baggage release message may cause a held checked-in luggage item associated with the respective passenger to be released.

The method 3400 may include repeating 3404-3408 for each of the plurality of passengers listed in the at least one manifest, at block 3410.

Referring now to FIG. 34B, the method 3400 may include prior to 3402, obtaining, by at least one of the at least one processor, from an electronic passenger list information message (PLIM) having a message format, passenger data for the plurality of passengers, at block 3412. By way of a non-limiting example, the electronic PLIM identifies at least one vehicle associated with at least one mode of travel carrying the plurality of passengers that will border cross at a border crossing port.

In one or more embodiments, the vehicle is at least one cruise ship, another air carrier going to another country.

Referring still to FIG. 34B, the method 3400 may include, at block 3414A, determining, by at least one of the at least one processor, each checked-in luggage item identified in the baggage release message that is associated with corresponding return flight information for a return flight with a designated air carrier. The method 3400 may include, at block 3416A, processing, by at least one of the at least one processor, each checked-in luggage item associated with the corresponding return flight information, after each such checked-in luggage item is released.

The method 3400 may include, after block 3412, determining, by at least one of the at least one processor, each checked-in luggage item identified in the baggage release message that is associated with corresponding luggage item handling instructions for at least one vehicle of travel, at block 3414B.

The method 3400 may include, at block 3416B, processing, by at least one of the at least one processor, each checked-in luggage item associated with the corresponding luggage item handling instructions for the at least one vehicle of travel according to the corresponding luggage item handling instructions, after each such checked-in luggage item is released.

Figure 35A:
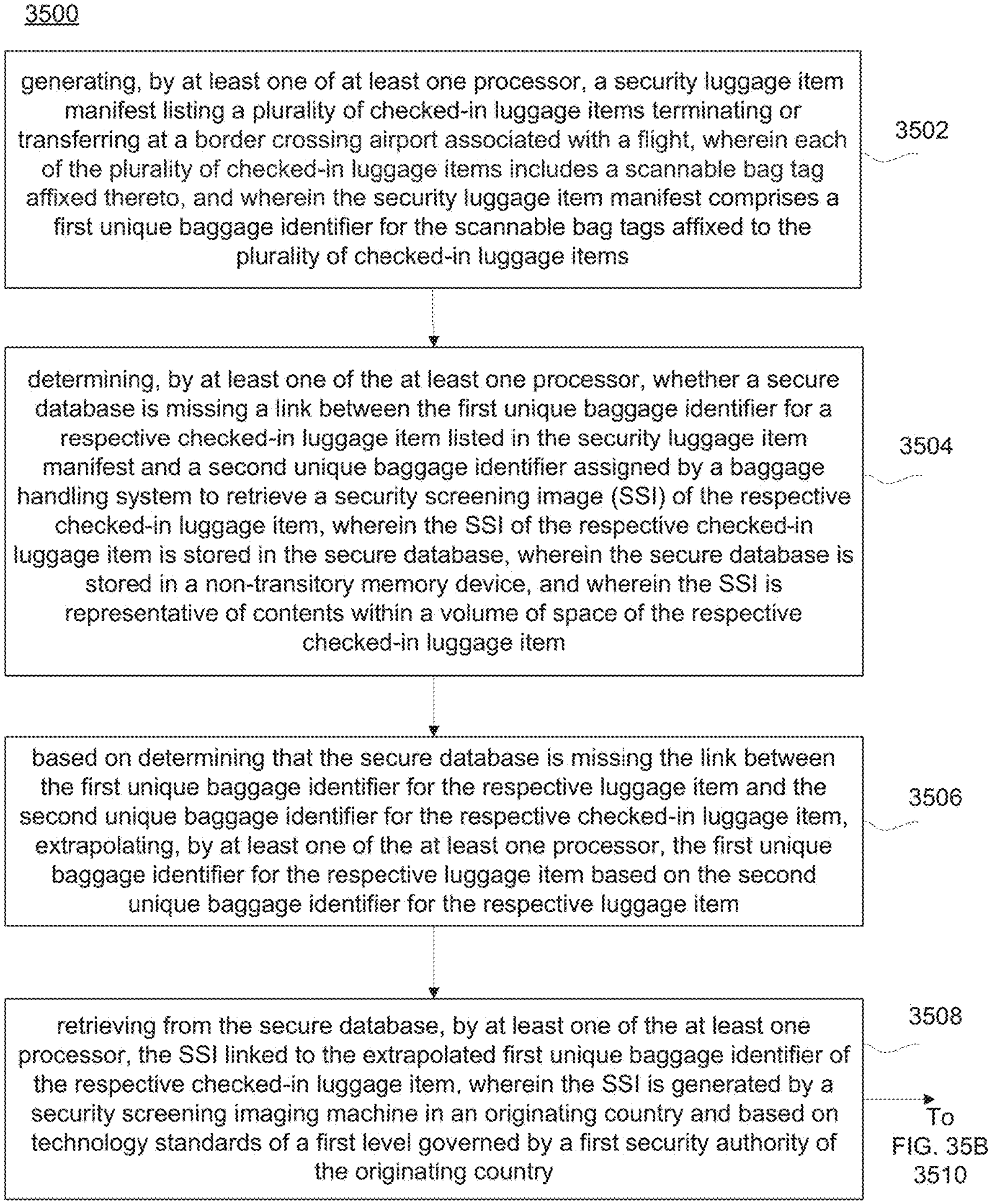
FIGS. 35A and 35B illustrates a flowchart of a method for pseudo identifier to license plate number missing link recovery in accordance with an embodiment.
Figure 35B:
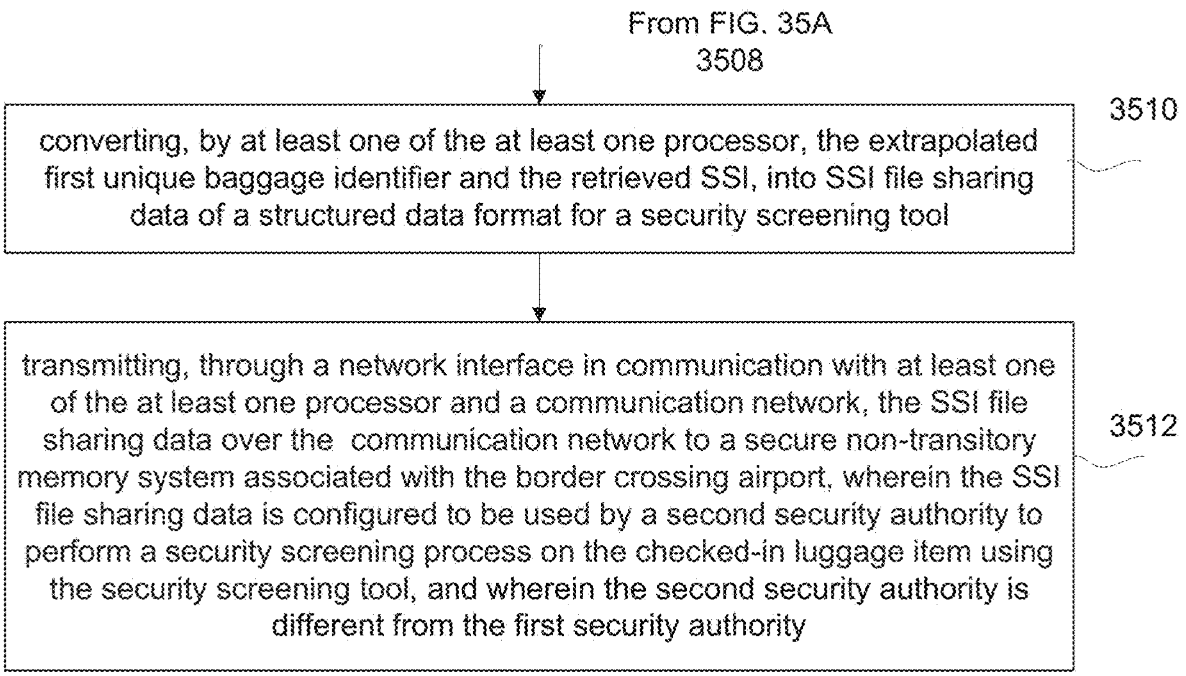

FIGS. 35A-35B illustrates a flowchart of a method for pseudo identifier to license plate number missing link recovery in accordance with an embodiment. The method 3500 may include, at block 3502, generating, by at least one of at least one processor, a security luggage item manifest listing a plurality of checked-in luggage items terminating or transferring at a border crossing airport associated with a flight. Each of the plurality of checked-in luggage items includes a scannable bag tag affixed thereto. The security luggage item manifest may include a first unique baggage identifier for the scannable bag tags affixed to the plurality of checked-in luggage items.

The method 3500 may include, at block 3504, determining, by at least one of the at least one processor, whether a secure database is missing a link between the first unique baggage identifier for a respective checked-in luggage item listed in the security luggage item manifest and a second unique baggage identifier assigned by a baggage handling system to retrieve a security screening image (SSI) of the respective checked-in luggage item. The SSI of the respective checked-in luggage item is stored in the secure database. The secure database is stored in a non-transitory memory device, The SSI is representative of contents within a volume of space of the respective checked-in luggage item.

The method 3500 may include, at block 3506, based on determining that the secure database is missing the link between the first unique baggage identifier for the respective luggage item and the second unique baggage identifier for the respective checked-in luggage item, extrapolating, by at least one of the at least one processor, the first unique baggage identifier for the respective luggage item based on the second unique baggage identifier for the respective luggage item.

The method 3500 may include, at block 3508, retrieving from the secure database, by at least one of the at least one processor, the SSI linked to the extrapolated first unique baggage identifier of the respective checked-in luggage item. The SSI is generated by a security screening imaging machine in an originating country and based on technology standards of a first level governed by a first security authority of the originating country.

The method 3500 may include, at block 3510, converting, by at least one of the at least one processor, the extrapolated first unique baggage identifier and the retrieved SSI, into SSI file sharing data of a structured data format for a security screening tool.

The method 3500 may include, at block 3512, transmitting, through a network interface in communication with at least one of the at least one processor and a communication network, the SSI file sharing data over the communication network to a secure non-transitory memory system associated with the border crossing airport. The SSI file sharing data is configured to be used by a second security authority to perform a security screening process on the checked-in luggage item using the security screening tool. The second security authority is different from the first security authority.

The methods 3600A, 3600B, 3600C and 3600C may be used for the extrapolating of block 3506 (FIG. 35A), by at least one of the at least one processor, the first unique baggage identifier for the respective luggage item based on the second unique baggage identifier for the respective luggage item.

Figure 36A:
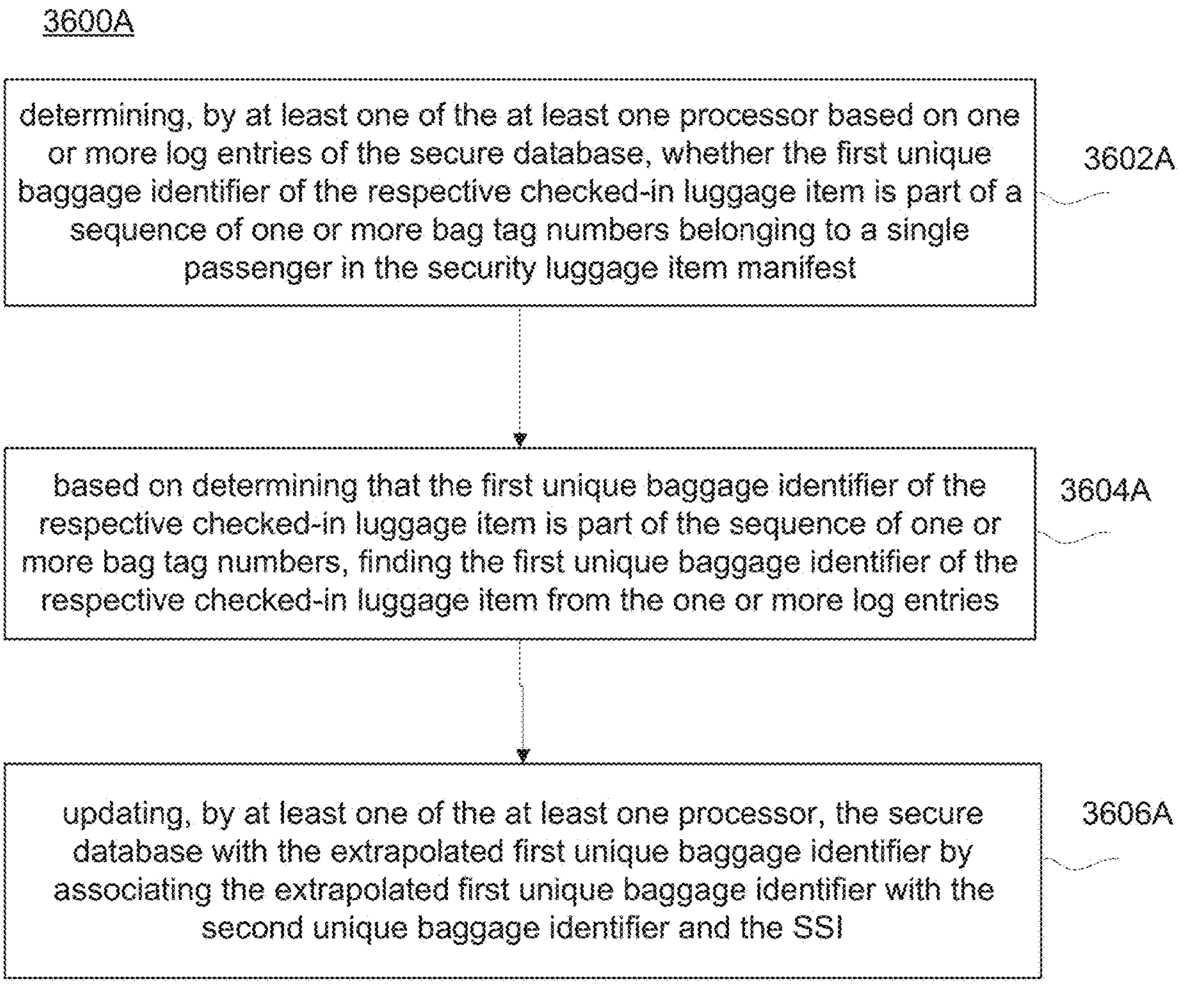
FIG. 36A illustrates a flowchart of a method for a first missing link recovery process in accordance with an embodiment.

FIG. 36A illustrates a flowchart of a method 3600A for a first missing link recovery process in accordance with an embodiment. The method 3600A may include, at block 3602A, determining, by at least one of the at least one processor based on one or more log entries of the secure database, whether the first unique baggage identifier of the respective checked-in luggage item is part of a sequence of one or more bag tag numbers belonging to a single passenger in the security luggage item manifest.

The method 3600A may include, at block 3604A, based on determining that the first unique baggage identifier of the respective checked-in luggage item is part of the sequence of one or more bag tag numbers, finding the first unique baggage identifier of the respective checked-in luggage item from the one or more log entries.

The method 3600A may include, at block 3606A, updating, by at least one of the at least one processor, the secure database with the extrapolated first unique baggage identifier by associating the extrapolated first unique baggage identifier with the second unique baggage identifier and the SSI.

Figure 36B:
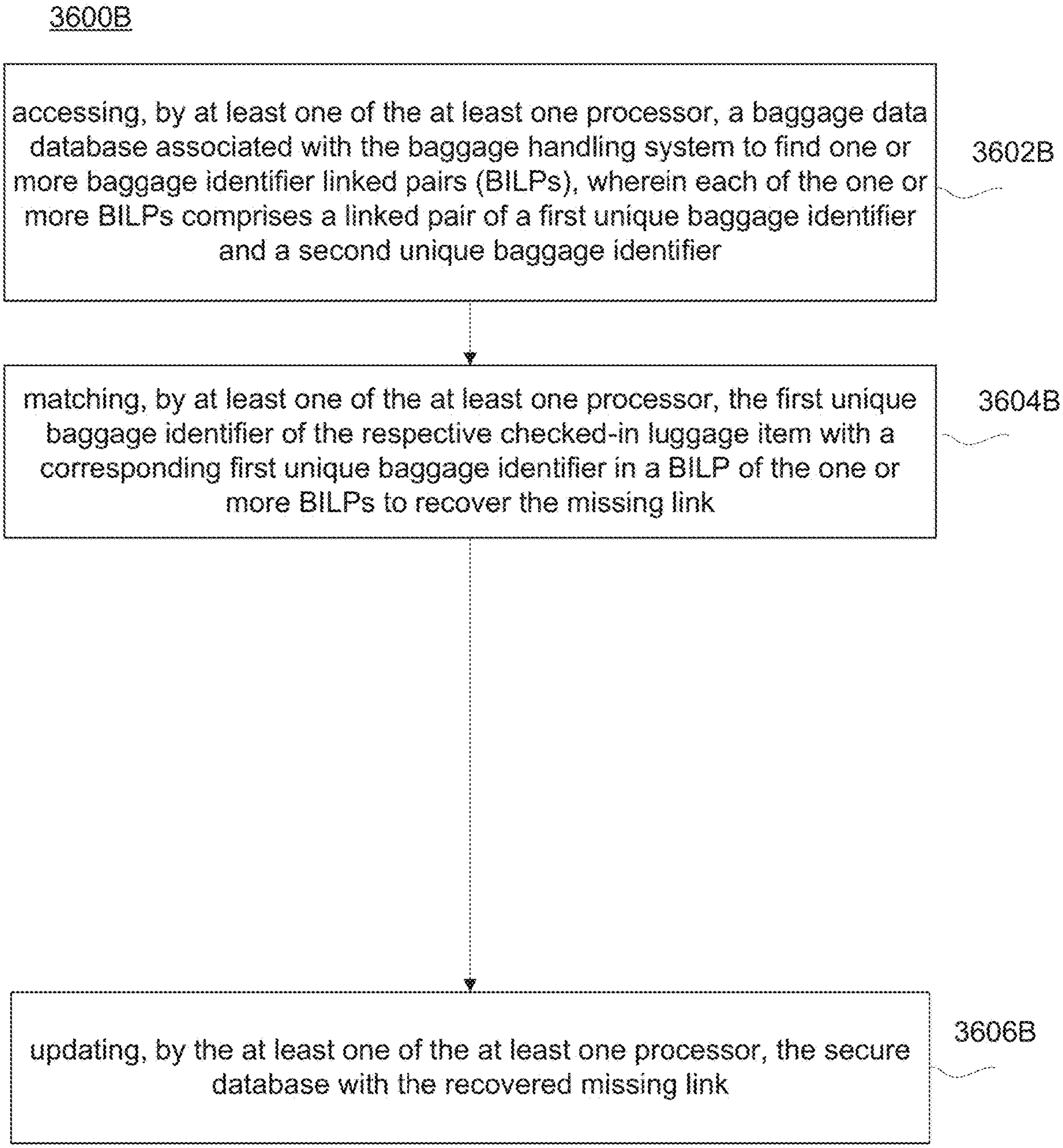
FIG. 36B illustrates a flowchart of a method for a second missing link recovery process in accordance with an embodiment.

FIG. 36B illustrates a flowchart of a method 3600B for a second missing link recovery process in accordance with an embodiment. The method 3600B may include, at block 3602B, accessing, by at least one of the at least one processor, a baggage data database associated with the baggage handling system to find one or more baggage identifier linked pairs (BILPs). Each of the one or more BILPs may include a linked pair of a first unique baggage identifier and a second unique baggage identifier.

The method 3600B may include, at block 3604B, matching, by at least one of the at least one processor, the first unique baggage identifier of the respective checked-in luggage item with a corresponding first unique baggage identifier in a BILP of the one or more BILPs to recover the missing link. The method 3600B may include, at block 3606B, updating, by the at least one of the at least one processor, the secure database with the recovered missing link.

Figure 36C:
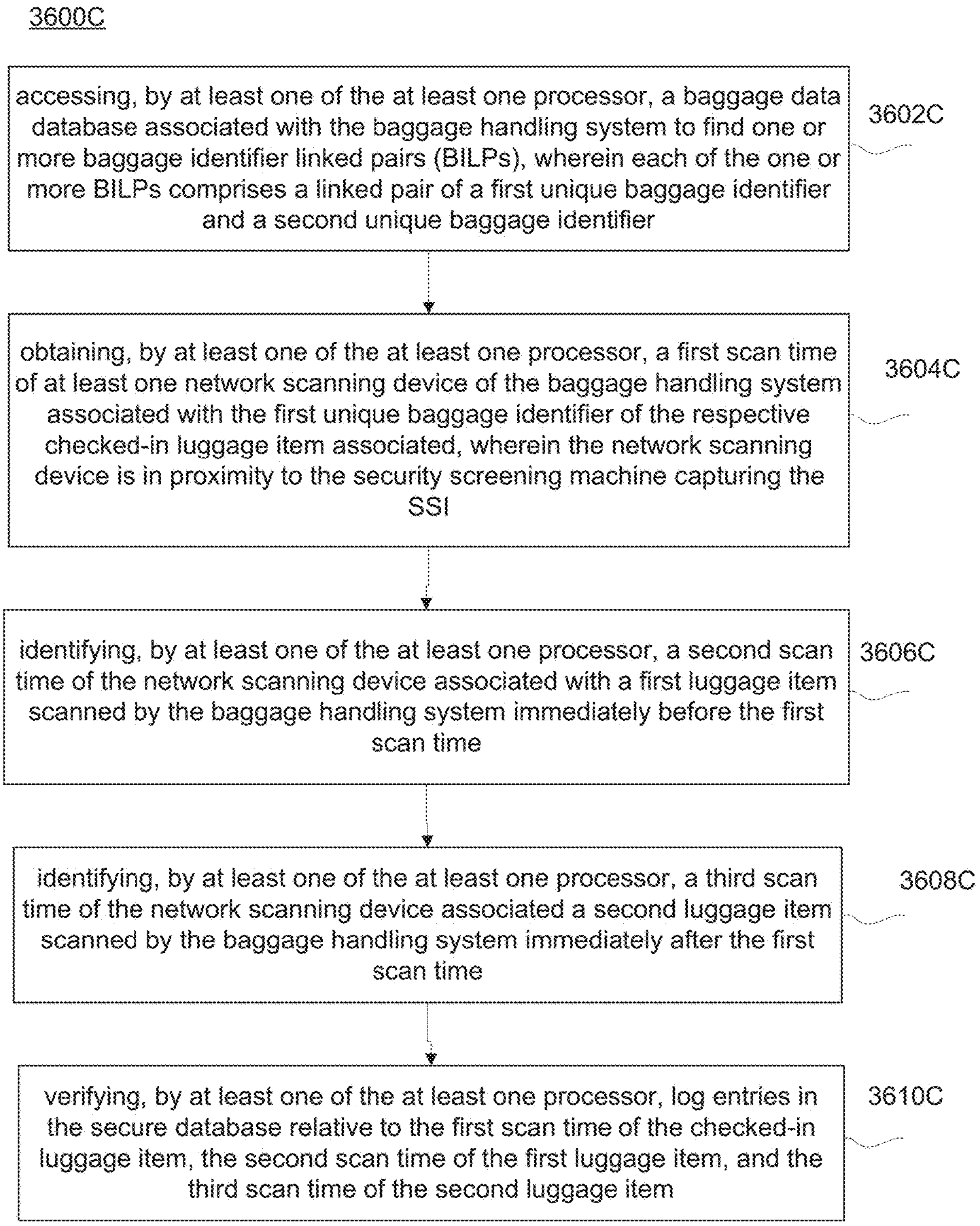
FIG. 36C illustrates a flowchart of a method for a third missing link recovery process in accordance with an embodiment.

FIG. 36C illustrates a flowchart of a method 3600C for a third missing link recovery process in accordance with an embodiment. The method 3600C may include, at block 3602C, accessing, by at least one of the at least one processor, a baggage data database associated with the baggage handling system to find one or more baggage identifier linked pairs (BILPs). Each of the one or more BILPs may include a linked pair of a first unique baggage identifier and a second unique baggage identifier.

The method 3600C may include, at block 3604C, obtaining, by at least one of the at least one processor, a first scan time of at least one network scanning device of the baggage handling system associated with the first unique baggage identifier of the respective checked-in luggage item associated. The network scanning device is in proximity to the security screening machine capturing the SSI. The method 3600C may include, at block 3606C, identifying, by at least one of the at least one processor, a second scan time of the network scanning device associated with a first luggage item scanned by the baggage handling system immediately before the first scan time.

The method 3600C may include, at block 3608C, identifying, by at least one of the at least one processor, a third scan time of the network scanning device associated a second luggage item scanned by the baggage handling system immediately after the first scan time. The method 3600C may include, at block 3610C, verifying, by at least one of the at least one processor, log entries in the secure database relative to the first scan time of the checked-in luggage item, the second scan time of the first luggage item, and the third scan time of the second luggage item.

Figure 36D:
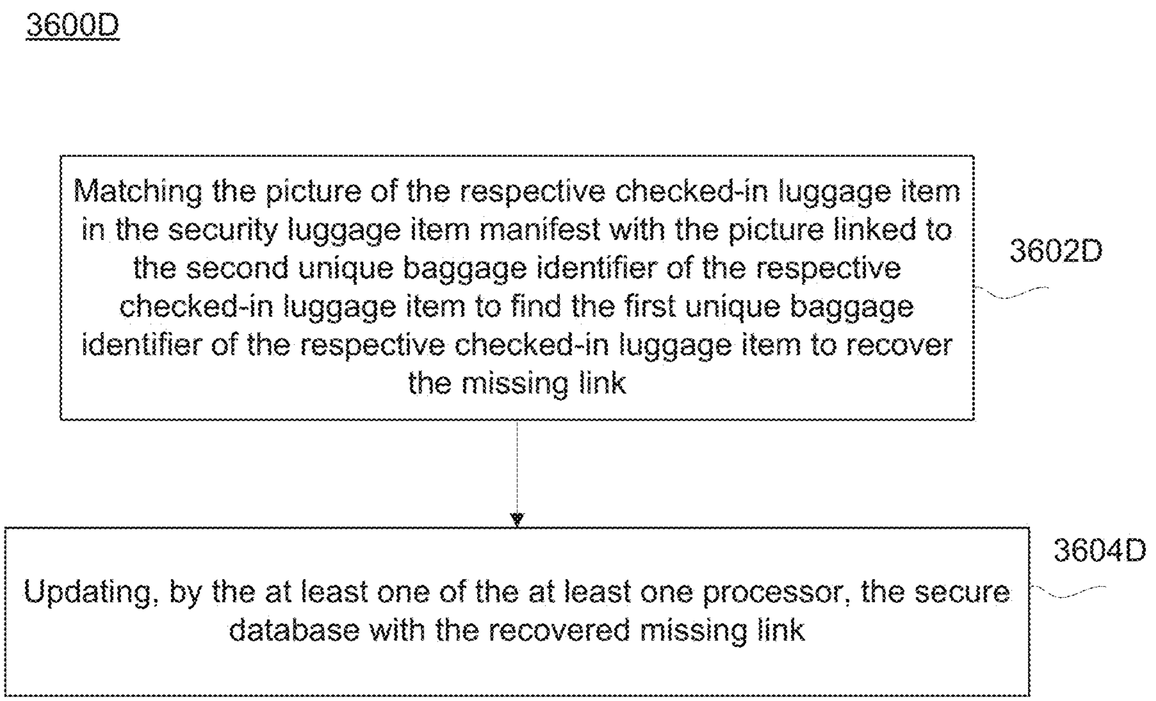
FIG. 36D illustrates a flowchart of a method for a fourth missing link recovery process in accordance with an embodiment.

FIG. 36D illustrates a flowchart of a method 3600D for a fourth missing link recovery process in accordance with an embodiment. The security luggage item manifest may include a picture of the respective checked-in luggage item. The secure database may include a picture of the respective checked-in luggage item linked to the second unique baggage identifier. The method 3600D may include, at block 3602D, matching the picture of the respective checked-in luggage item in the security luggage item manifest with the picture linked to the second unique baggage identifier of the respective checked-in luggage item to find the first unique baggage identifier of the respective checked-in luggage item to recover the missing link. The method 3600D may include, at block 3604D, updating, by the at least one of the at least one processor, the secure database with the recovered missing link.

Figure 37A:
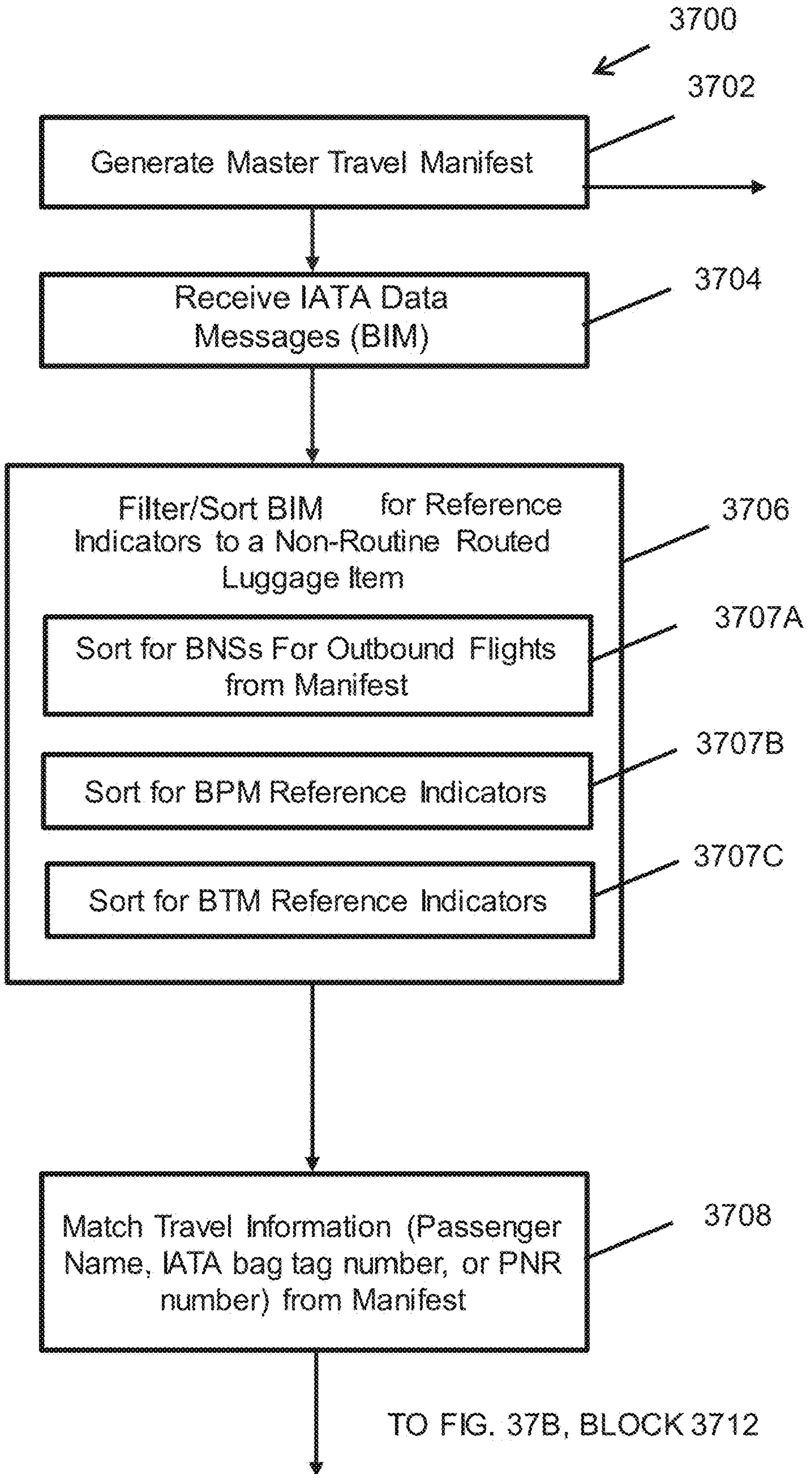
FIGS. 37A and 37B illustrate a flowchart of a method for missing, lost, rerouted, delayed, or mishandled luggage item recovery management in accordance with an embodiment.
Figure 37B:
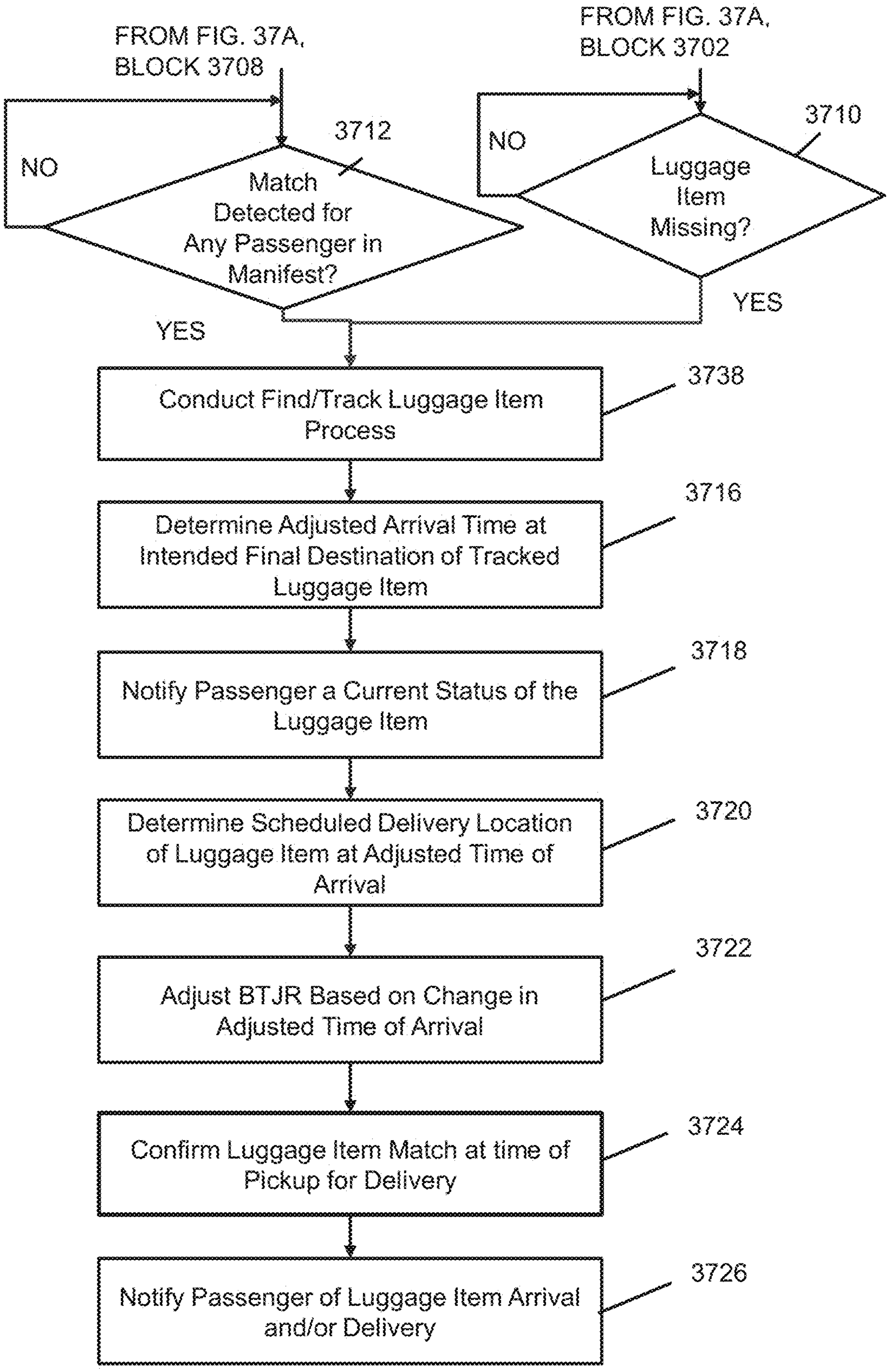

FIGS. 37A-37B illustrate a flowchart of a method 3700 for missing, lost, rerouted, delayed, or mishandled luggage item recovery management in accordance with an embodiment. As used herein an anomalous luggage item may refer to a luggage item that may be missing, lost, rerouted, delayed, or mishandled. The luggage item recovery manager 182 (see FIG. 1D) may be configured to perform one or more of the following blocks of method 3700 to electronically locate and/or recover an anomalous luggage item and manage rerouting of the recovered anomalous luggage item to an appropriate destination. The luggage item may be associated with a universal BSM. As used herein, the term "blocks" may refer to method "steps" and/or actions shown graphically by blocks of a block diagram/flowchart diagram in the corresponding FIGS.

Method 3700 may include, at block 3702, receiving and/or generating, by a processor, a manifest. In an example, the received manifest may be a flight manifest. The manifest MX (FIG. 1D) may include those passengers traveling on a current day and information concerning the cargo and/or luggage of those passengers. Once the manifest ("MX") is received/generated at block 3702, method 3700 may proceed to blocks 3704 and/or 3710 (see FIG. 37B). In one or more embodiments, the luggage item may not be traveling by an air carrier and may be traveling by any of the other various modes of transportation described at detail herein. Consequently, IATA data messages may not be received from an air carrier.

The manifest (i.e., manifest MX) may be received from a lodging entity, hotel, resort, or other mode of transportation. The manifest may be for luggage items to be delivered to a designated address, such as a hotel, resort or lodging entity. The manifest may include a list of luggage items that were checked-in, where system 100 may deliver the luggage item to a hotel, lodging entity, resort, or a location associated with another vehicle of transportation, after clearing the second security authority and crossing (terminating) the border crossing airport. Furthermore, the method 3700 may be initiated from any location, such as from a hotel, lodging entity, or resort, to name a few.

The airline BSM, when a luggage item is checked in, provides "routine" routing information of an expected route taken by a luggage item. The .V/data field 1404 of FIG. 14 includes a baggage source indicator "T" to denote Transfer. The baggage source indicator is followed by a three-digit airport code of "JFK." The field 1406 of FIG. 14 represents the outbound flight number, airline code, and date "22MAY." The airline code "IST" represents Istanbul Airport. The field 1408 is an Inbound flight number, airline code, and date "12MAY." The airline code "SLC" represents Salt Lake City Airport.

In this example instance, the luggage item will be routed through BHSs of the airports with codes "SLC," "IST," and "JFK." The transfer function is provided by the baggage source indicator in the .V field. This is an international flight, and the luggage item may need to be screened by security. This is still a routine process. Each BHS has machines at airport locations. The luggage item may be placed in containers that include RFID chips that can be scanned by machines of the BHS at a particular airport. All of the scanning activities of the BHS may be tracked and stored in memory by a computer system of the BHS, or a computer system associated with an air travel carrier. For example, information associated with a luggage item traveling on an airline may be stored in memory and accessible by a computer system associated by the air travel carrier regardless of which BHS scanned the luggage item.

As previously described, the airline BSM may be a terminating BSM with the baggage source indicator of "X" followed by an airport code. The manifests MX or master manifest may indicate which airport is the intended transfer airport and/or terminating airport (e.g., final airport of a resultant multi-leg trip). In one or more embodiments, the terminating airport may be predicted based on the original BSM for use in anomalous luggage item detection.

Method 3700 may include, at block 3704, receiving, by a processor of system 100, at least one IATA data message, such as without limitation a baggage information message (BIM). Method 3700 may include, at block 3706, filtering/sorting, by a processor of system 100, the IATA data messages for reference indicators that represent a possible non-routine routed luggage item. The processor(s) (i.e., webserver 148) of system 100 described above may search or sort for a reference to a possible non-routine routed luggage item in IATA data messages. The method 3700 may sort for reference indicators in BNSs for outbound flights from the manifest, at block 3707A, for example. The reference indicators of possible non-routine routed luggage items may cause the luggage item to be an anomalous luggage item.

For example, the processor(s) (i.e., webserver 148) of system 100 may look for any baggage not seen messages for passengers in the manifest MX. In order to save processing time, the received or accessed BNSs may be focused on outbound flight data for a single passenger and/or plural passengers associated with the baggage handling service. Once the BSM is received, the IATA bag tag number is obtained for identifying those IATA data messages to search or sort through.

Another reference indicator to a possible non-routine routed luggage item in a IATA data message may be found in a BPM, at block 3707B. For example, the BPM may include bag not seen reference indicators. The BPM may include reference indicators for irregularities under field .B. The BPM may include reference indicators that represent other non-routine routing of a luggage item. The BPM includes various fields, such as field .J for communicating data about scanners that scan the luggage items, and include that date, time, and location. The BPM data may be used to backtrack the route or to track the current location of an anomalous luggage item. The BHS may include data of scanners, date of scan and location data for finding the route a luggage item took after a luggage items route diverged from a normal or routine route to a non-routine route. A non-routine route can be caused by many factors, such as delays in flights, equipment malfunctions, inclement weather, damaged bag tags, and more that are unforeseen.

Another reference to a possible non-routine routed luggage item in IATA data messages may be a reference indicator for irregular operation and/or involuntary rerouting, in a BTM, at block 3707C. This may be represented in a IATA data message in the field ".E/IROP" for example, from a BTM. A still further reference to a possible non-routine routed luggage item in an IATA data message may be a reference to an unaccompanied baggage denoted in a field ".E/UNAC. A still further reference to a possible non-routine routed luggage item in an IATA data message may include reference to the reference indicator for rerouting of the luggage item denoted as ".E/RRTE." The reference indicators may represent information that can be considered for an anomalous luggage item that is not following the routine route to the final destination. Delays in arrival of a luggage item can significantly impact the travel experience and pleasure experience by its owner especially if the passenger is embarking on a cruise voyage or traveling a long distance from the airport.

Another reference indicator representative of a possible non-routine routed luggage item in a IATA data message may include a reference for re-tagging a luggage item denoted as "E/STCK," which may be found in a BSM for example. As can be appreciated, there are numerous scenarios where a combination of data in IATA data message(s) may indicate a non-routine routed luggage item which may cause the luggage item to be anomalous. Delayed luggage for those passengers embarking on a cruise ship can be devastating to the overall enjoyment of the passenger. The method herein intends to identify possible luggage items, which may be routed in a non-routine manner so that it can be identified early on in the travel process. Based on time of scanning, the system 100 may determine that the luggage item may be delayed.

The IATA data message may be received from a computer system associated with an air carrier, the BHS 63 (FIG. 1D) or other computing system that receives and stores IATA data messages. The received IATA data messages may include BSM messages associated with names of passengers in the manifest MX or a flight manifest. As described above, as the passenger(s) begins their journey, their luggage item may receive an IATA bag tag for attachment to the luggage item or already have an RFID bag tag. The A-BSM may provide outbound flight information.

Method 3700 may include, at block 3708, matching, by a processor of system 100, travel information (passenger name, IATA bag tag number, and/or PNR number) from the manifest to passenger name, IATA bag tag number, and/or PNR number in the IATA data message. In some embodiments, block 3708 may be performed before block 3706. For that matter, all steps of any method may be performed out of sequence, or in an alternate sequence, then specifically depicted by the corresponding flow chart diagrams unless the context clearly indicates otherwise. The travel information may be passenger travel information or baggage travel information. The passenger travel information may include the UPID or unique passenger identifier that is unique to one and only one passenger name.

Method 3700 may include, at block 3712 of FIG. 37B, determining, by a processor of system 100, whether a match related to a reference indicator for a non-routine routed luggage item has been detected for any passenger in the manifest. If the determination, at block 3712, is "NO," the method may loop back onto the beginning of block 3712. If the determination, at block 3712, is "YES," the method 3700 may include finding/tracking the luggage item, by conducting a find luggage item process, at block 3714. The luggage item finder 184 (FIG. 1D) will be described in more detail in relation to FIG. 38.

Returning to block 3710, a determination may be made whether the luggage item is missing or anomalous. If the determination, at block 3710, is "NO," the method may loop back onto the beginning of block 3710. If the determination, at block 3710, is "YES," the method may proceed to block 3714.

The BHS 63 (FIG. 1D) or other airport scanners or RFID readers interacting with the luggage item may determine that a luggage item did not load onto an air carrier. See "Recommended Practice 1745 Baggage Information Messages" by IATA, in the Passenger Services Resolution Manual, June 2010, $30^{th}$ Edition, incorporated herein by reference in entirety. In some embodiments, the IATA bag tag, or other bag tag mechanism, may be damaged and not readable or malfunctioning, which may be a cause for non-routine routing. In other embodiments, scanners may scan the location of the luggage item at a location, which is not routine, as the luggage item may have been loaded on the wrong air travel carrier and arrived at the wrong airport. In this instance, the scanners may also be configured to provide and/or communicate information concerning the location of the identified luggage item so various systems disclosed herein may track the route of the identified luggage item for correctness and make appropriate adjustments in the routing of the identified luggage.

At block 3714, once a reference indicator for non-routine routing of a luggage item has been detected, routing information from the BHS and/or IATA data messages before or after the occurrence of the reference indicator may be retrieved and analyzed, by a processor of the system 100, for locating and tracking the luggage item.

Method 3700 may include determining, by a processor of the system 100, an adjusted arrival time at an intended final destination, at block 3716, for the tracked luggage item on a non-routine route path. The intended final destination may be for both the tracked luggage item and the associated passenger, the passenger, or just the tracked luggage item. The difference in final destination may vary depending on the time it takes to find the luggage item, the location at the time the luggage item is found and the distance to bring the found luggage item to meet up with the passenger from the non-routine route path.

Method 3700 may include notifying, by a processor of the system 100, the passenger associated with the luggage item of the current status of the luggage item, at block 3718. The passenger may be alerted of the current status and any status changes of the lost luggage item, found luggage item and/or rerouted luggage item, iteratively and up until the passenger receives the luggage item.

Method 3700 may include determining, by a processor of the system 100, a scheduled delivery location of the luggage item at the time of arrival, at block 3720, from the manifest. The processor(s) of system 100 may be configured to review the manifest of the luggage item and/or passenger reservations for the current travel journey to determine a location(s) to deliver an anomalous luggage item. Using data from a respective manifest MX, disclosed systems and methods may identify a location of a reservation the anomalous luggage item can rendezvous with the passenger. Method 3700 may include, at block 3722, adjusting the baggage travel journey record (BTJR) in the luggage manifest $\mathbf{121}^1 \ldots \mathbf{121}^x$ or the LIM record 186 based on change in the adjusted time of arrival.

Method 3700 may include confirming, by a processor of the system 100, the luggage item match at the time of pickup for delivery, at block 3724. This may include scanning an IATA bag tag to match the IATA license plate to the IATA license plate number in the LIB 2400, luggage manifest record or universal BSM. Still further, an image of the luggage item may be compared to a stored image of the luggage item in the LIB 2400, luggage manifest record or universal BSM. Method 3700 may include notifying the passenger of luggage item arrival and/or delivery, at block 3726.

In an example, the method 3700 for tracking and locating a luggage item may include matching, by at least one processor, first travel information including a passenger name and an International Air Transport Association (IATA) license plate number for a luggage item of a passenger in a flight manifest with second travel information from a created IATA data message that includes a reference indicator representative of a non-routine routed luggage item; generating, by at least one of the at least one processor, an anomalous luggage item manifest record for the non-routine routed luggage item associated with the flight manifest; retrieving, by at least one of the at least one processor, third travel information of the non-routine routed luggage item generated by a baggage handling system prior to or after the created IATA data message; and locating, by at least one of the at least one processor, the non-routine routed the luggage item.

The method 3700 may include generating, by at least one of the at least one processor, delivery instructions to reroute the located luggage item based on passenger reservation information in a manifest for a next mode of travel to rendezvous with the passenger.

In various examples, the IATA data message may be representative of at least one of: a baggage not seen message (BNS); a baggage processing message (BPM); a baggage transfer message (BTM); and a baggage source message (BSM) from an airline. In various examples, the IATA data message may be representative of only one of the immediately mentioned message types.

The method 3700 may include training a model (FIG. 39), by least one of the at least one processor, with the reference indicators of the non-routine routed luggage item associated with one or more IATA data messages; inputting, by least one of the at least one processor, into the model data representative to create information for a routine route; inputting, by least one of the at least one processor, into the model data from one or more of current IATA data messages related to the transport of the luggage item with the IATA license plate number; and training the model, by least one of the at least one processor, with each baggage handling system handling the luggage item. The model (FIG. 39) may use machine learning algorithms to detect that the luggage item is the non-routine routed luggage item with a difference from a current route and the routine route being greater than a threshold or being different from a predetermined value associated with the routine route.

The method 3700 may include, prior to matching: receiving, by at least one of the at least one processor, an originating BSM to determine a routine route for the luggage item, based on originating reference indicators.

The method 3700 may include determining, by at least one of the at least one processor, that the reference indicator represents a deviation in time or distance between the routine route of the luggage item and a current route of the luggage item being greater than a threshold or being different from a predetermined value associated with the routine route.

The method 3700 may include determining, by at least one of the at least one processor, that the reference indicator is representative that the luggage item is not seen or detected; notifying, by at least one of the at least one processor, the passenger of the not seen luggage item; and submitting, by at least one of the at least one processor, a claim to an air carrier of the not seen or not detected luggage item.

The method 3700 may include receiving, by at least one of the at least one processor, the flight manifest on a current day of travel with first travel information of those registered passengers traveling on the current day; and receiving, by at least one of the at least one processor, a terminating baggage source message (BSM) or a transfer BSM with the second travel information.

The method 3700 may include determining, by at least one of the at least one processor, that the reference indicator represents the non-routine route of the luggage item; accessing, by at least one of the at least one processor, location data generated by a tracking device on the luggage item to track a current location of the luggage item; and generating, by at least one of the at least one processor, delivery instructions to reroute the recovered luggage item includes using the current location of the luggage item from the tracking device.

Figure 38:
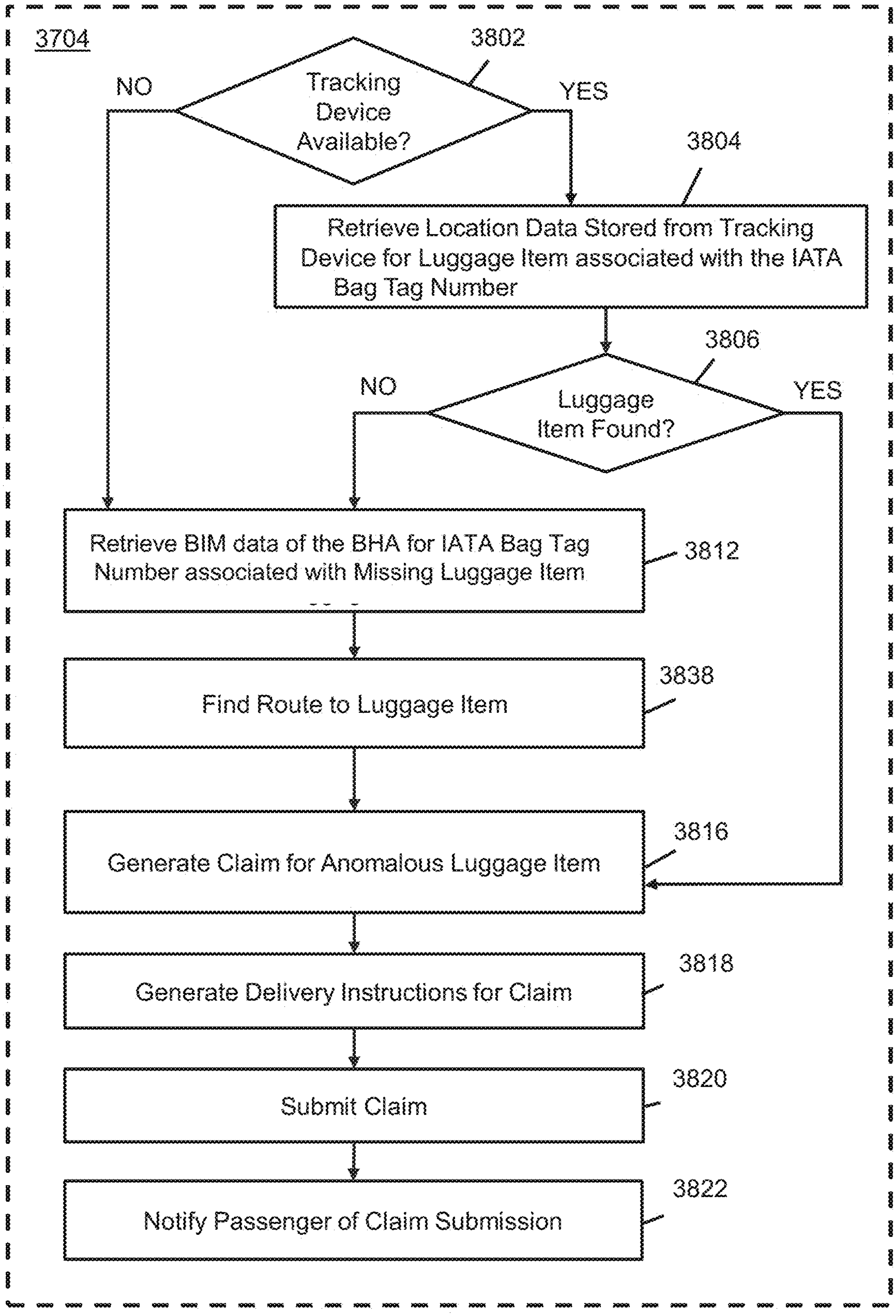
FIG. 38 illustrates a flowchart of a method for finding an anomalous luggage item in accordance with an embodiment.

FIG. 38 illustrates a flowchart of a method 3704 for finding an anomalous luggage item in accordance with an embodiment. The luggage item finder 184 (FIG. 1D) may be configured to find anomalous luggage items according to the steps of FIG. 38. The blocks of FIG. 38 are specific to an air carrier. However, some of the blocks may be used for other types of travel carriers and screening locations.

Method 3704 may include determining, at block 3802, by a processor of system 100, whether a tracking device 175 is available on the luggage item. If the determination, at block 3802, is "NO," method 3704 may proceed to block 3812. If the determination, at block 3802, is "YES," method 3704 may include retrieving, by a processor of the system 100, location data 984 from the tracking device 175, at block 3804. The location data 984 may be linked to the luggage item through the IATA license plate affixed to the luggage item.

Method 3704 may include determining, by a processor of the system 100, whether the luggage item is found at block 3806. If the determination, at block 3806, is "NO," method 3704 proceeds to block 3812. If the determination, at block 3806, is "YES" method 3704 proceeds to block 3816 as will be described in more detail later.

Method 3704 may include retrieving, by a processor of system 100, the BIM (i.e., IATA data message data) of the BHS for the IATA bag tag number associated with a luggage item matched in a IATA data message, associated with the IATA luggage item, at block 3812. In other words, system 100 may retrieve any BIM data or machine readings prior to or after the BIM with a reference indicator representative of a non-routine routed luggage item to find where the luggage item was last recorded or is currently being recorded or detected. The routing of the luggage item may be due to a damaged or a missing IATA bag tag, for example. The BHS includes scanners for scanning the barcodes of the IATA bag tag. The BHS may include RFID readers to receive an RFID signal representative of the IATA bag tag.

The BHS 63 (FIG. 1D) creates many IATA data messages as the luggage item is tracked and routed through. A respective IATA data message may include tracking information of the luggage item generated by a BHS 63 (FIG. 1D) prior to or after the creation of a IATA data message or BIM that has a detected reference indicator, for example. The tracking information in certain IATA data messages or BIM provides location information of where the luggage item was scanned, in the past and the future. This information can be useful in backtracking and tracking the route path the luggage item traveled. This information may be useful in tracking the path the luggage item traveled to its current location, although the current location may technically be wrong location or a rerouted location. For training purposes, the information of scanners, IATA data messages or BIM, reference indicators, and/or BHS information may be used to find patterns to find cause and effect drivers for the anomalies.

Method 3704 may include finding, by a processor, a route to the anomalous luggage item, at block 3814, that brings the luggage item to an intended destination or rendezvous with the passenger. The route may be a back-on-track route, for example a route to get the luggage item back-on-track to its intended destination. When finding, by a processor of the system 100, a route, the route may include travel in an air carrier and along BHS to a final destination. A back-on-track route may include other routes that remove the luggage item from an air carrier and use another mode of transportation of the luggage item.

The analysis to find the back-on-track route may be accomplished by using artificial intelligence (AI) algorithms using the data from the retrieved IATA data messages prior to or after the occurrence of reference indicators of non-routine routing of the luggage item being detected by system 100. The data may include other information if the IATA bag tag is damaged or missing as the luggage item possibly could not be routed to the correct air carrier. The point of lost scanning or the point of current scanning may determine a proximity for the lost luggage item to be fetched. The luggage item route data analyzer 182 may analyze the data from the IATA data message database 152, flight information and/or location data from a tracking device 175 to develop a route to find the luggage item or find a back-on-track route to bring the anomalous luggage item to a destination to rendezvous with a travel path of the passenger.

Method 3740 may include generating, by a processor, a claim for an anomalous luggage item, at block 3816. Once the luggage item is lost and its proximity determined, a claim may be generated. In one or more embodiments, baggage handlers may search for and retrieve the anomalous luggage item in an airport based on the retrieved IATA data message data. For example, disclosed systems and methods may communicate information sufficient for baggage handlers to search for and retrieve the anomalous luggage item.

Method 3704 may include generating, by a processor, delivery instructions for a claim, at block 3818. Once the actual location of the found luggage item is found, system 100 may determine a delivery location for the luggage item to be sent based on the current route, routine route, and/or delivery instructions. The delivery instructions may include coordination with the passenger depending on whether any of their legs of travel have changed on the current travel journey.

Method 3704 may include submitting, by a processor, the claim to a VOT, at block 3820. Method 3704 may include notifying, by a processor, the passenger of claim submission, at block 3822. System 100 may use the passenger's email address, telephone number of a mobile communication device or other communication medium to communicate confirmation of receipt of the claim submission. System 100 may also send an alert or a communication to the passenger about the claim submission to the VOT.

Figure 39:
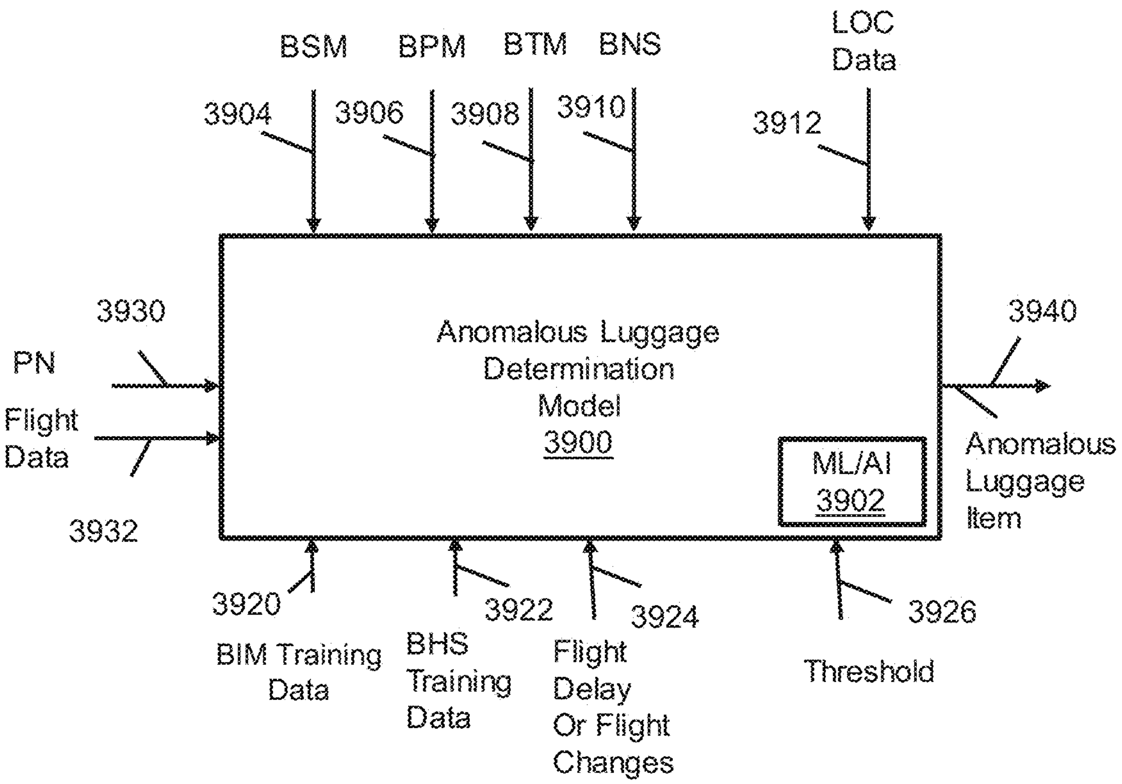
FIG. 39 illustrates a diagram of an anomalous luggage item determination model in accordance with an embodiment.

FIG. 39 illustrates a diagram of an anomalous luggage item determination model. The model 3900 may receive data related IATA data messages. By way of non-limiting reference, model 3900 may receive reference indicators associated with one or more BSMs on line 3904, BPMs on line 3906, BTMs on line 3908, or a BNS on line 3910. While there is a single line, it should be understood that various information for each message may need to be entered including date, fields, airport data, flight information, and more (in at least some embodiments). The original A-BSM may be used to predict an expected route for the luggage item that is within routine limits. The reference indicators from BPM data, BTM data or BNS data may be used to predict non-routine routes.

Model 3900 may receive location data on line 3912 if the luggage item has a tracking device 175. In embodiments, with location data, reliance on tracking IATA data message data may be weighted less than location data from the tracking device once a reference indicator of a non-routine route has been detected.

Model 3900 may receive IATA data message training data on line 3920 or BIM training data indicative of reference indicators that are routine and reference indicators that are non-routine. Model 3900 may receive BHS training data on line 3922 related to scanners and other devices associated with BHSs of airports. Model 3900 may receive current flight delays or flight changes on line 3924 from airlines or airports. Model 3900 may receive a variable threshold on line 3926. Depending on the next leg of travel of the journey, the threshold of deviation between the current route and the routine route may vary depending on the type of next leg of travel and location of the next leg of travel. For example, embarkation on a cruise ship can be very costly to deliver delayed or lost luggage after a passenger has embarked on a voyage. In some embodiments, model 3900 may take into account departure times, connection times, and final arrival times, to determine a probability that the luggage item may be delivered with sufficient time to account for the luggage item making it to luggage handlers of a cruise ship.

Model 3900 may receive a passenger name (PN) on line 3930, for example. In some embodiments, the model 3900 may receive a PNR number or an IATA license plate number on line 3930. Model 3900 may receive the flight data on line 3932 to derive the routine route using the originating BSM. Model 3900 may use various machine learning or artificial intelligence algorithms to 1) predict a routine route of the luggage item and/or 2) predict a non-routine route of the luggage item to find an anomalous luggage item. In some embodiments, the non-routine route may need to deviate from the routine route by a predetermined amount of time and/or predetermined amount of distance.

Model 3900 may output information representative of an anomalous luggage item on line 3940. The output information may include the flight data, the IATA license plate number, passenger name, and/or PNR number. The output information may include location information of the non-routine route, time difference between the expected routine route and the current non-routine route. The threshold by distance may be represented in miles, airport codes, or city codes. The threshold by time may be represented by days, hours, minutes and seconds.

The machine learning (ML) or artificial intelligence (AI) algorithms 3902 may include neural networks, Bayesian networks, Tree-based models, supervised learning algorithms, and reinforcement learning algorithms. In some embodiments, the ML/AI algorithms may use classification models based on the reference indicators.

Figure 40:
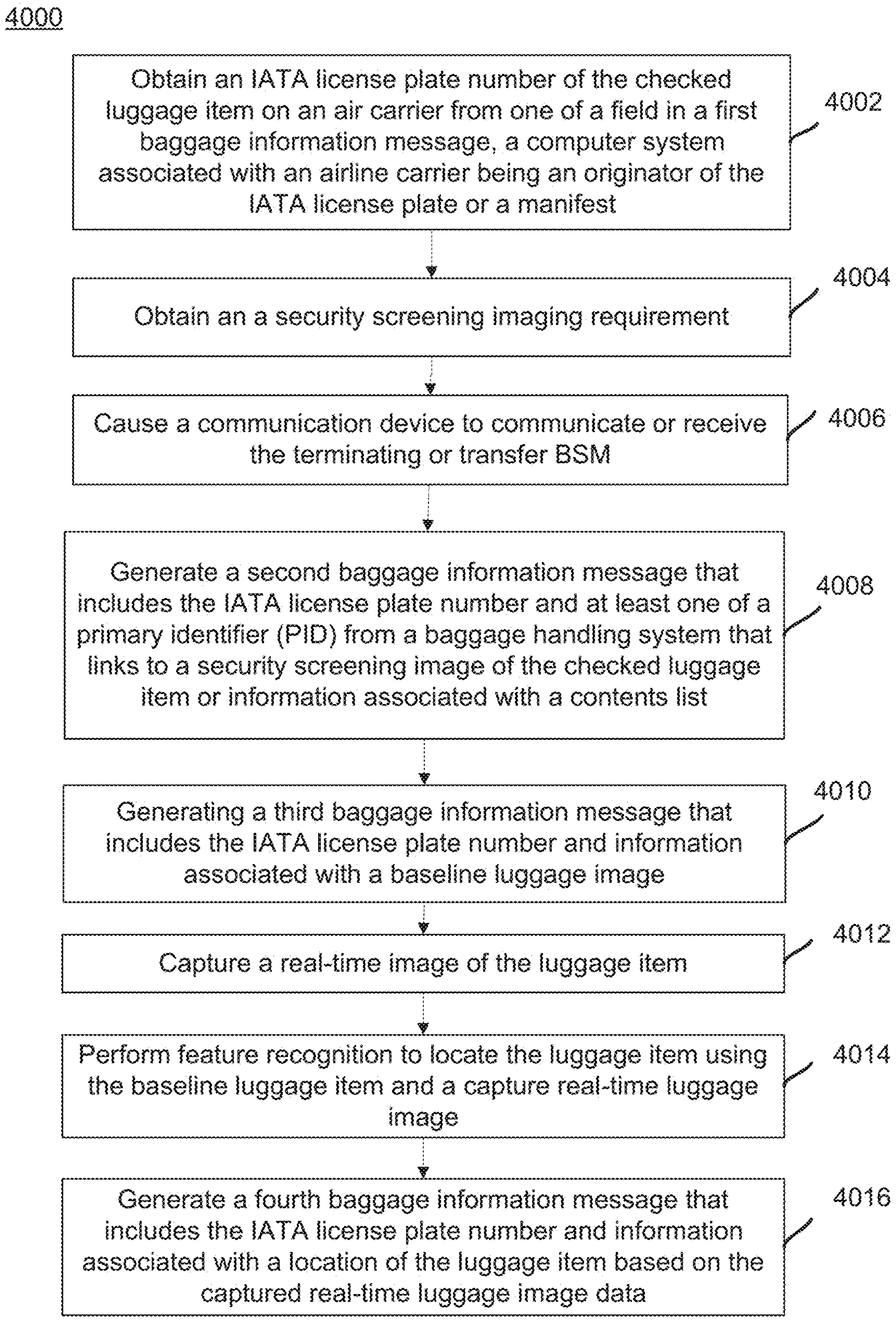
FIG. 40 illustrates a flowchart of a method for generating baggage information messages in accordance with an embodiment.

FIG. 40 illustrates a flowchart of a method 4000 for generating baggage information messages in accordance with an embodiment. In one or more embodiments, the baggage information messages may be generated by system 100 or at least one mode of travel. The baggage information message may be communicated using IoT devices across platforms of multiple modes of transportation.

In an example, the method 4000 may include obtaining, by at least one of at least one processor, an International Air Transport Association (IATA) license plate number of the checked luggage item on an air carrier from one of a field in a first baggage information message, a computer system associated with an airline carrier being an originator of the IATA license plate or a manifest, at block 4002. In an example, the method 4000 may include generating, by at least one of the at least one processor, a second baggage information message that includes the IATA license plate number and at least one of a primary or pseudo identifier (PID) from a baggage handling system that links to a security screening image of the checked luggage item or information associated with a contents list, at block 4008.

In one or more embodiment, the second baggage information message of method 4000 may include one of an IATA baggage processing message (BPM) or an IATA baggage transfer message (BTM). Terms "first," "second," "third," and "fourth" are for distinguishing purposes and not to distinguish an order or a number of the message. In an example, the information associated with the contents lists may include one of: a list of contents associated with security screening image or a contents list identifier to a location of the list of contents in a secure database.

In an example, the method 4000 may include when generating, by at least one of at least one processor, the second baggage information message obtaining, by at least one of at least one processor, a security screening imaging requirement, at block 4004. The second baggage information message may include the security screening imaging requirement.

In an example, the first baggage information message may be a terminating or transfer baggage source message (BSM). The method may include causing, by at least one of at least one processor, a communication device to receive the terminating or transfer BSM, at block 4006. In another example, the method 4000 may include causing, by at least one of at least one processor, a communication device to communicate the terminating or transfer BSM.

In an example, the method 4000 may include generating, by at least one of at least one processor, a third baggage information message that includes the IATA license plate number and information associated with a baseline luggage image, at block 4010. In an example, the information associated with the baseline luggage image includes one of: a baseline image data of the luggage item or a luggage image identifier to a location of the baseline image data in a secure database.

In an example, the method 4000 may include capturing real-time image data of the luggage item, by an image capturing device, at a location, at block 4012. In an example, the method 4000 may include performing, by at least one of at least one processor, a feature recognition of the luggage item using the captured real-time luggage image data relative to the baseline image data, to recognize the luggage item at a location; and locating, by at least one of at least one processor, the luggage item, at block 4014.

In an example, the method 4000 may include generating, by at least one of at least one processor, a fourth baggage information message that includes the IATA license plate number and information associated with a location of the luggage item based on the captured real-time luggage image data, at block 4016. In view of the foregoing, a baggage source message may be generated with the IATA license plate number and any of the information stored in the tracking device including a tracking device identifier.

In view of the foregoing, a baggage source message may be generated with the IATA license plate number, any of the information stored in the tracking device, and the PNR number. In view of the foregoing, a baggage source message may be generated with the IATA license plate number, and any combination of the information stored in the tracking device.

The at least one processor may be part of system 100. The at least one processor may be part of a non-flying airline carrier. The at least one processor may be part of an airline carrier.

The system 100 may be configured to reconcile ghost baggage. A ghost baggage includes a luggage item that may have a printed IATA bag tag that was printed by a home printer but not affixed to the luggage item. Instead, a different IATA bag tag may have been placed on the luggage item that was printed at a Kiosk or by an airline counter agent.

A ghost baggage may include an IATA bag tag associated with a passenger but the luggage item was not scanned into the airline's computing infrastructure or the airports computing infrastructure. This may include Kiosk machines, BHS, scanning devices, the security scanning machine used to capture an SSI, etc. The IATA bag tag may have a reverse missing link in that a PID was not linked to an IATA bag tag because an SSI was not generated.

The ghost baggage may be reconciled using pictures of the luggage items, time and data stamps of scans captured of the IATA bag tags also assigned to the passenger in the BHS of the originating airport, finding all IATA bag tag to PID links and/or SSIs.

In one or more embodiments, the passenger identifies the number of checked-in luggage items. If the number of IATA bag tags exceeds the number of checked-in luggage items, the at one processor may determined form the time and data scans, IATA bag tag to PID links and/or SSIs, which IATA bag tag was not used and set the non-scanned IATA bag tag as a ghost bag tag.

Figure 41A:
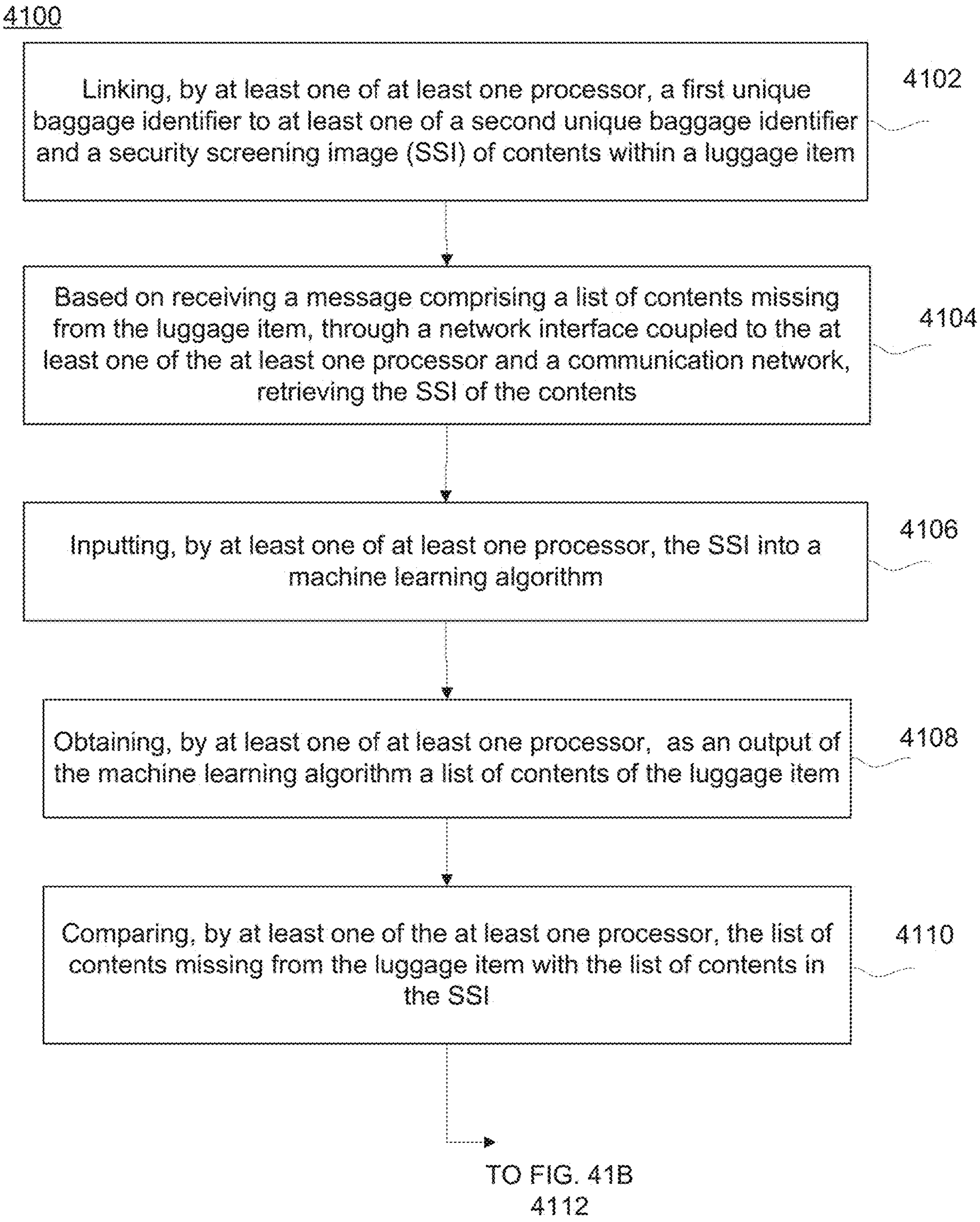
FIGS. 41A, 41B and 41C illustrate a flowchart of a method for fraud detection and prevention in accordance with an embodiment.
Figure 41B:
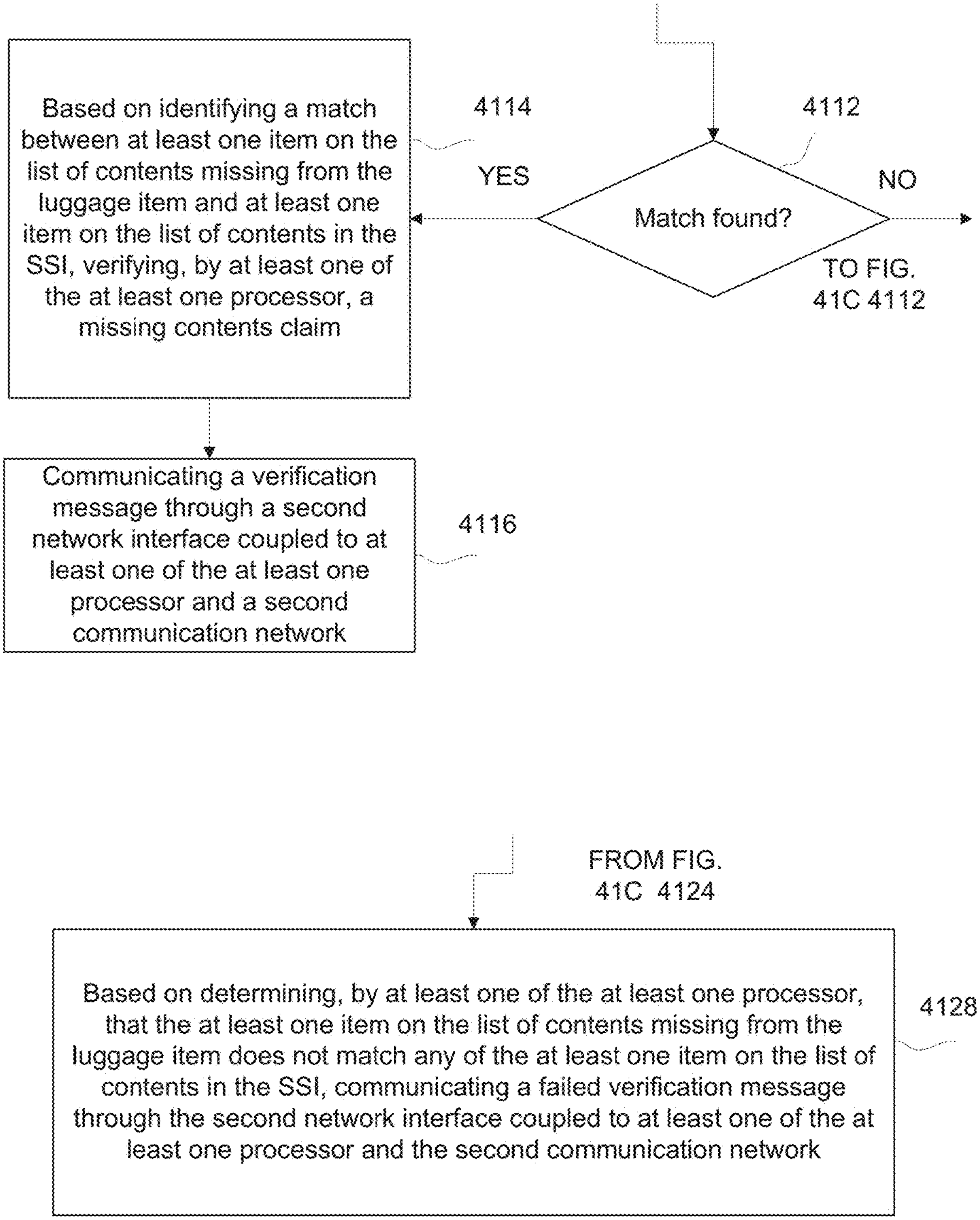
Figure 41C:
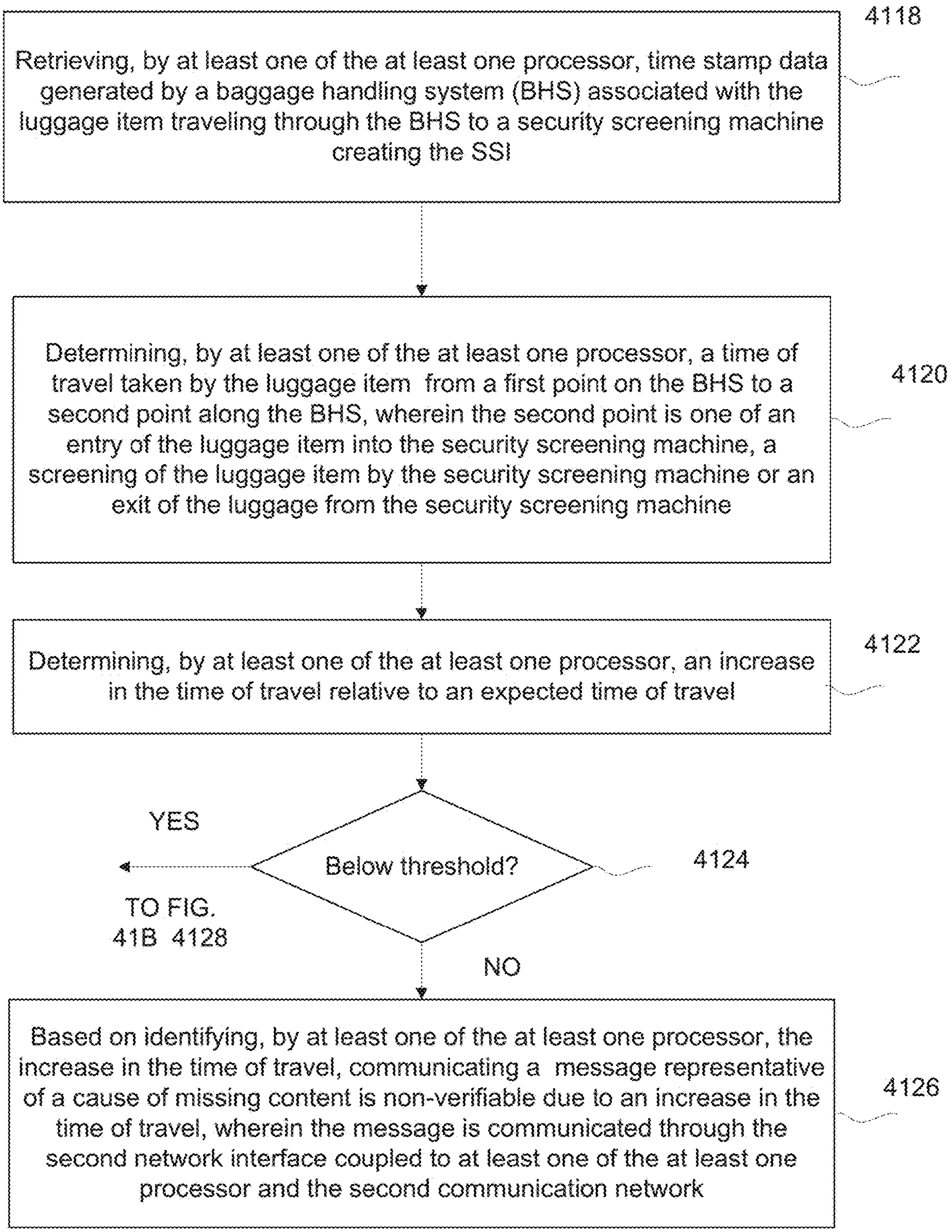

FIGS. 41A-41C illustrate a flowchart of a method 4100 for fraud detection and prevention in accordance with an embodiment. The method 4100 may include, at block 4102, linking, by at least one of at least one processor, a first unique baggage identifier to at least one of a second unique baggage identifier and a security screening image (SSI) of contents within a luggage item.

The method 4100 may include, at block 4104, based on receiving a message may include a list of contents missing from the luggage item, through a network interface coupled to the at least one of the at least one processor and a communication network, retrieving the SSI of the contents.

The method 4100 may include, at block 4106, inputting, by at least one of at least one processor, the SSI into a machine learning algorithm. The method 4100 may include, at block 4108, obtaining, by at least one of at least one processor, as an output of the machine learning algorithm a list of contents of the luggage item.

The method 4100 may include, at block 4110, comparing, by at least one of the at least one processor, the list of contents missing from the luggage item with the list of contents in the SSI. The method 4100 may include, at block 4112, a determination is made whether a match is found. If the determination, at block 4112, is "YES", the method may based on identifying a match between at least one item on the list of contents missing from the luggage item and at least one item on the list of contents in the SSI, verify, by at least one of the at least one processor, a missing contents claim, at block 4114. The method 4100 may include, at block 4116, communicating a verification message through a second network interface coupled to at least one of the at least one processor and a second communication network.

The message may include the first unique baggage identifier. The first unique baggage identifier may include an identifier originally printed on a bag tag affixed to the luggage item.

If the determination, at block 4112, is “NO”, the method may include, at block 4118 (FIG. 1C). In one or more embodiments, a picture of the luggage item may be used to verify the luggage item. The picture may be used in the linking process or to establish a link. The imaging device may be located in a security zone where the SSI is captured; at a scanning device location of the baggage handling system; or integrated in a communication device of a passenger.

The method 4100 may include, at block 4118, retrieving, by at least one of at least one processor, time stamping generated by a baggage handling system (BHS) of the luggage item traveling through the BHS to a security screening machine capturing the SSI. The method 4100 may include, at block 4120, determining, by at least one of at least one processor, a time of travel from entering the BHS to the security screening machine.

The method 4100 may include, at block 4122, determining, by at least one of at least one processor, a delay in the time of travel by the luggage item to the security screening machine. This may be performed using machine learning algorithms, used to estimate a time of travel between scanning devices of a particular baggage handling system. The scanning devices may be part of an airline system that feeds into the airports baggage handling system. The reason a luggage item is missing some or all items that are identified on the missing contents list is because someone may have removed the luggage item form the baggage handling system for 30 minutes, 1 hour, 2 hours, etc. to steal luggage items. This may take place before the luggage item actually arrives at the security screening machine. Calculating an expected time of arrival when expected missing items to be verified using the SSI contents list may provide a reason why the SSI does not have the missing contents. The missing contents may have been taken out of the luggage item, for example, prior to the SSI was taken.

The method 4100 may include, at block 4124, determining whether the expected time of arrival to the security screening machine is at or below the threshold for an expected time of arrival. If the determination, at block 4124, is “NO,” the method 4100 may in response to identifying, by at least one of at least one processor, a delay in the time of travel, communicating, through the second network interface coupled to the at least one of the at least one processor and the second communication network, a non-verifiable message, at block 4126.

If the determination, at block 4124, is “YES,” the method 4100 may based on determining, by at least one of the at least one processor, that the at least one item on the list of contents missing from the luggage item does not match any of the at least one item on the list of contents in the SSI, communicating a failed verification message through the second network interface coupled to at least one of the at least one processor and the second communication network, at block 4128 (FIG. 1B).

In one or more embodiments, if a missing link is missing, the missing link recovery process may be performed, as described in FIGS. 35A-35B, and 36A-36D.

Figure 42A:
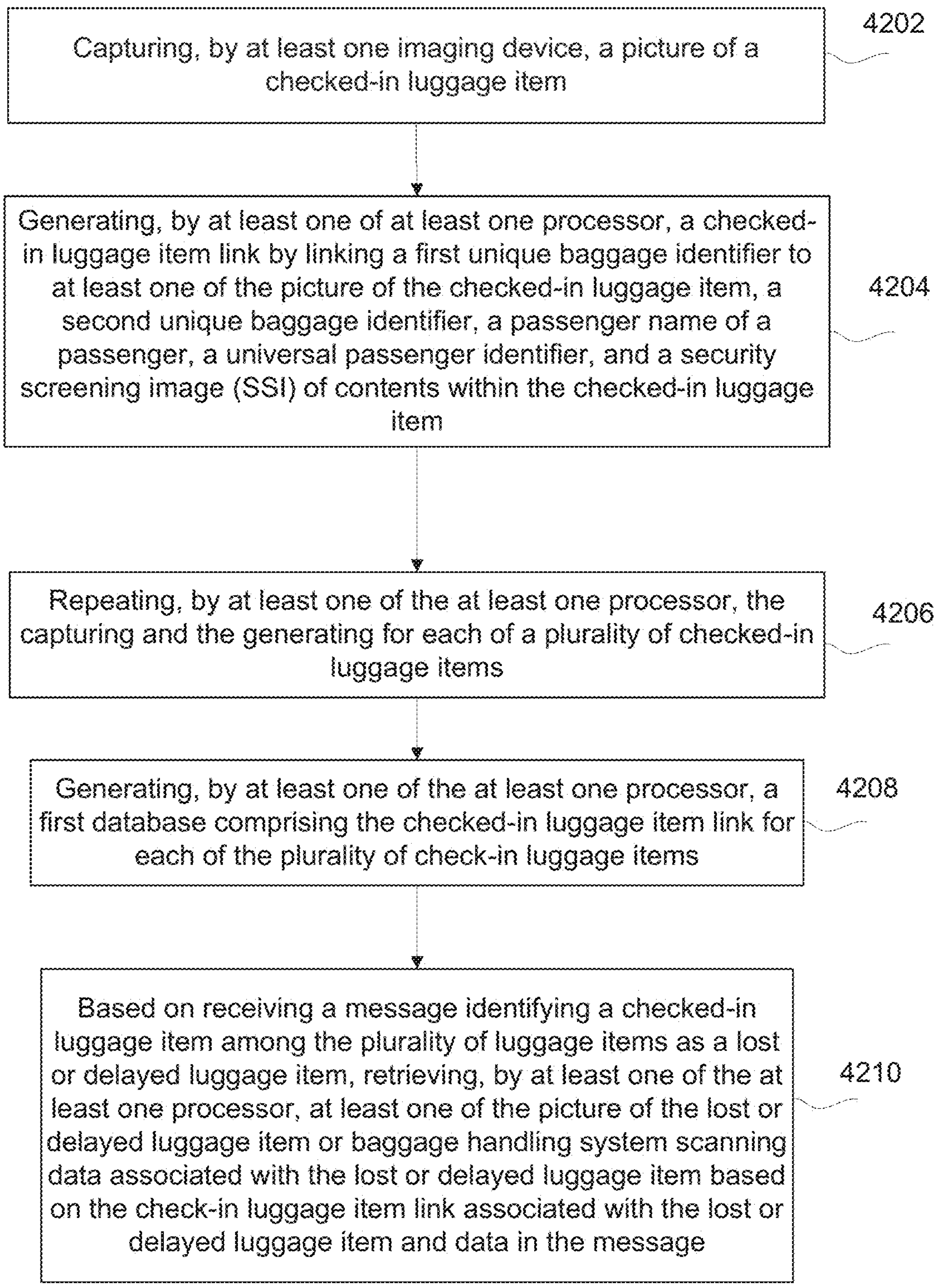
FIGS. 42A and 42B illustrate a flowchart for a method for passenger-to-luggage item linking for delayed or lost luggage item recovery.
Figure 42B:
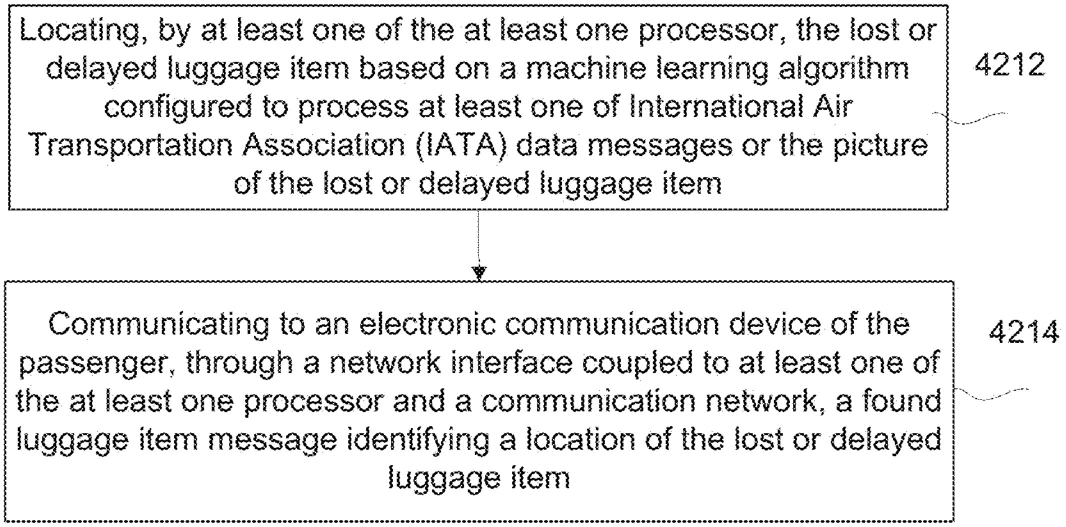

FIGS. 42A and 42B illustrate a flowchart for a method for passenger-to-luggage linking for delayed or lost luggage item recovery.

The method 4200 may include, at block 4202, capturing, by at least one imaging device, a picture of a checked-in luggage item; at block 4204, generating, by at least one of at least one processor, a checked-in luggage item link by linking a first unique baggage identifier to at least one of the picture of the checked-in luggage item, a second unique baggage identifier, a passenger name of a passenger, a universal passenger identifier, and a security screening image (SSI) of contents within the checked-in luggage item; and, at block 4206, repeating, by at least one of the at least one processor, the capturing and the generating for each of a plurality of checked-in luggage items.

The method 4200 may include, at block 4208, generating, by at least one of the at least one processor, a first database may include the checked-in luggage item link for each of the plurality of check-in luggage items; at block 4210, based on receiving a message identifying a checked-in luggage item among the plurality of luggage items as a lost or delayed luggage item, retrieving, by at least one of the at least one processor, at least one of the picture of the lost or delayed luggage item or baggage handling system scanning data associated with the lost or delayed luggage item based on the check-in luggage item link associated with the lost or delayed luggage item and data in the message; at block 4212, locating, by at least one of the at least one processor, the lost or delayed luggage item based on a machine learning algorithm configured to process at least one of International Air Transportation Association (IATA) data messages or the picture of the lost or delayed luggage item; and, at block 4214, communicating to an electronic communication device of the passenger, through a network interface coupled to at least one of the at least one processor and a communication network, a found luggage item message identifying a location of the lost or delayed luggage item.

In one or more embodiments, the message may include the first unique baggage identifier printed on a bag tag affixed to the luggage item, the passenger name of the passenger, or a picture of the lost or delayed luggage item provided by the passenger.

In one or more embodiments, time stamping, by the at least one imaging device, the time and date of the picture of the checked-in luggage item being captured may be performed during step 4202.

The at least one imaging device may be located in a security zone where the SSI is captured, at a scanning device location of a baggage handling system, or integrated in a communication device of a passenger.

The first unique baggage identifier may include an International Air Transportation Association (IATA) license plate, and the second unique baggage identifier may include a pseudo identifier generated by one of a baggage handling system or a security screening imaging machine capturing the SSI.

Figure 43:
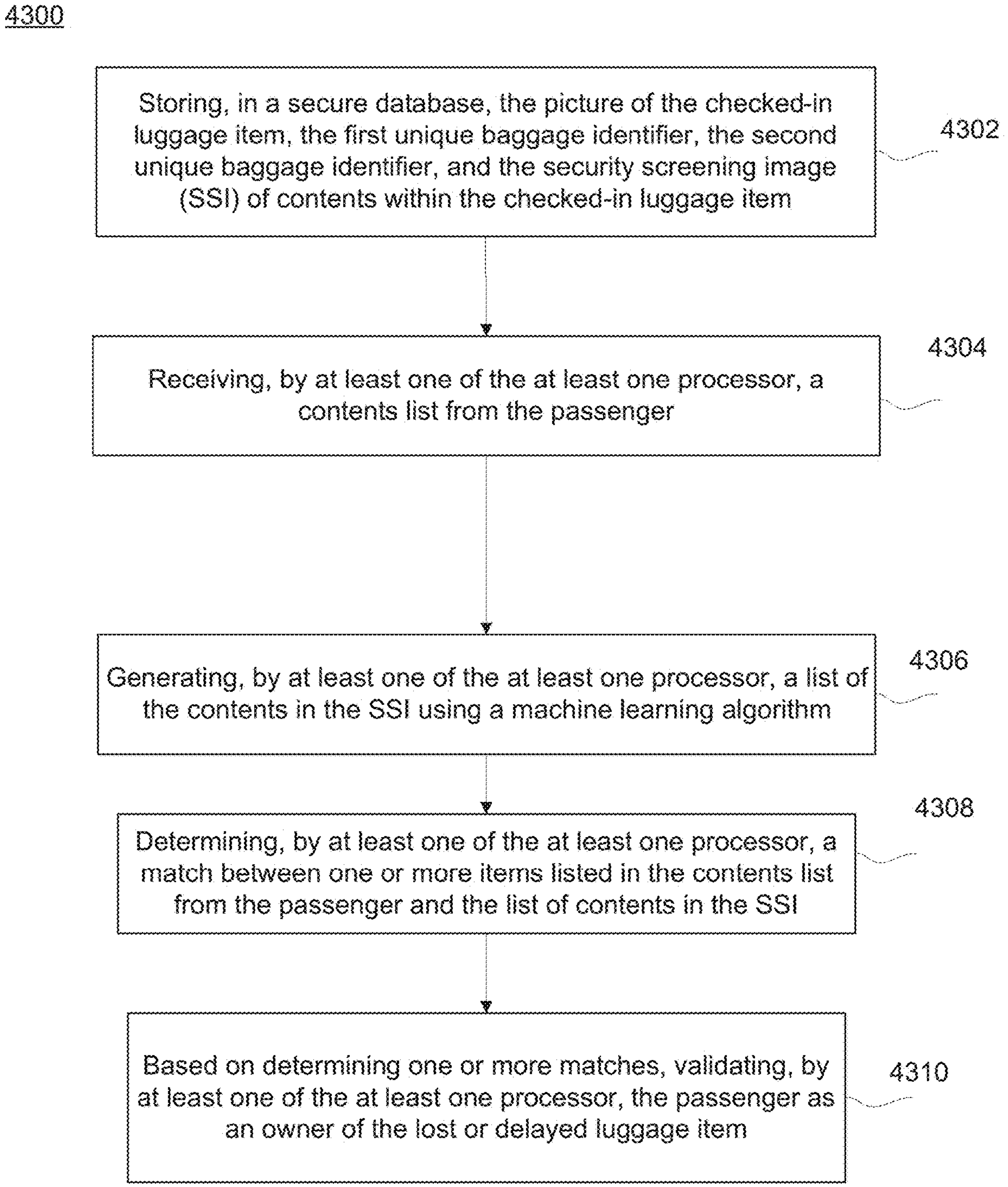
FIG. 43 illustrates a flowchart of a method for validating a passenger as an owner of a luggage item for use in the method of FIGS. 42A-42B, in accordance with an embodiment.

FIG. 43 illustrates a flowchart of a method 4300 for validating a passenger as an owner of a luggage item for use in the method 4200, in accordance with an embodiment.

The method 4300 may include, at block 4302, storing, in a secure database, the picture of the checked-in luggage item, the first unique baggage identifier, the second unique baggage identifier, and the security screening image (SSI) of contents within the checked-in luggage item. The method 4300 may include, at block 4304, receiving, by at least one of the at least one processor, a contents list from the passenger. The method 4300 may include, at block 4306, generating, by at least one of the at least one processor, a list of the contents in the SSI using a machine learning algorithm.

The method 4300 may include, at block 4308, determining, by at least one of the at least one processor, a match between one or more items listed in the contents list from the passenger and the list of contents in the SSI; and, at block 4310, based on determining one or more matches, validating, by at least one of the at least one processor, the passenger as an owner of the lost or delayed luggage item.

Figure 44A:
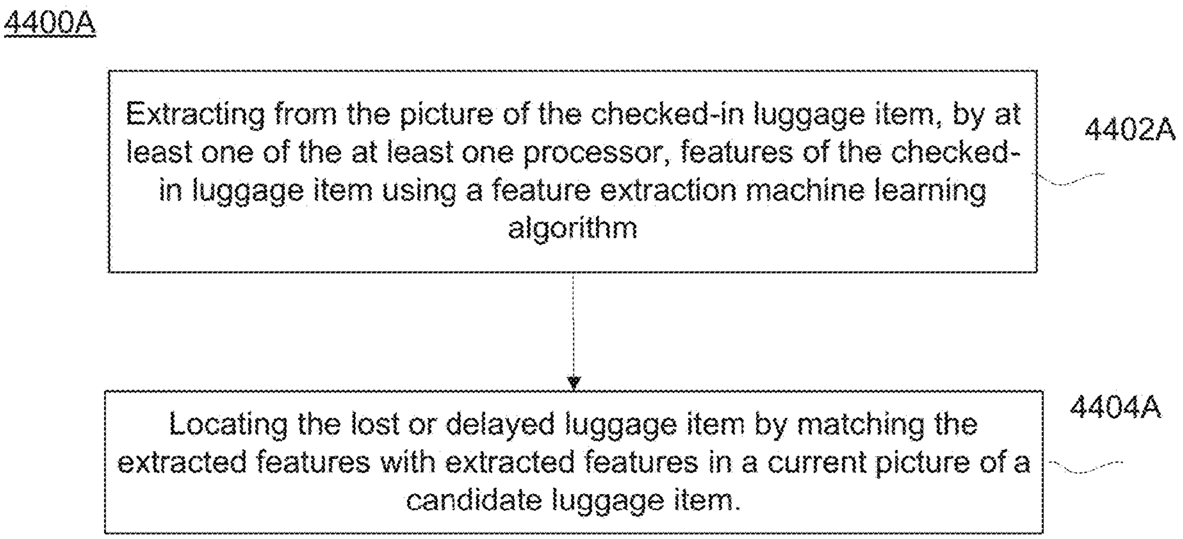
FIG. 44A illustrates a first method for locating a lost or delayed luggage item.
Figure 44B:
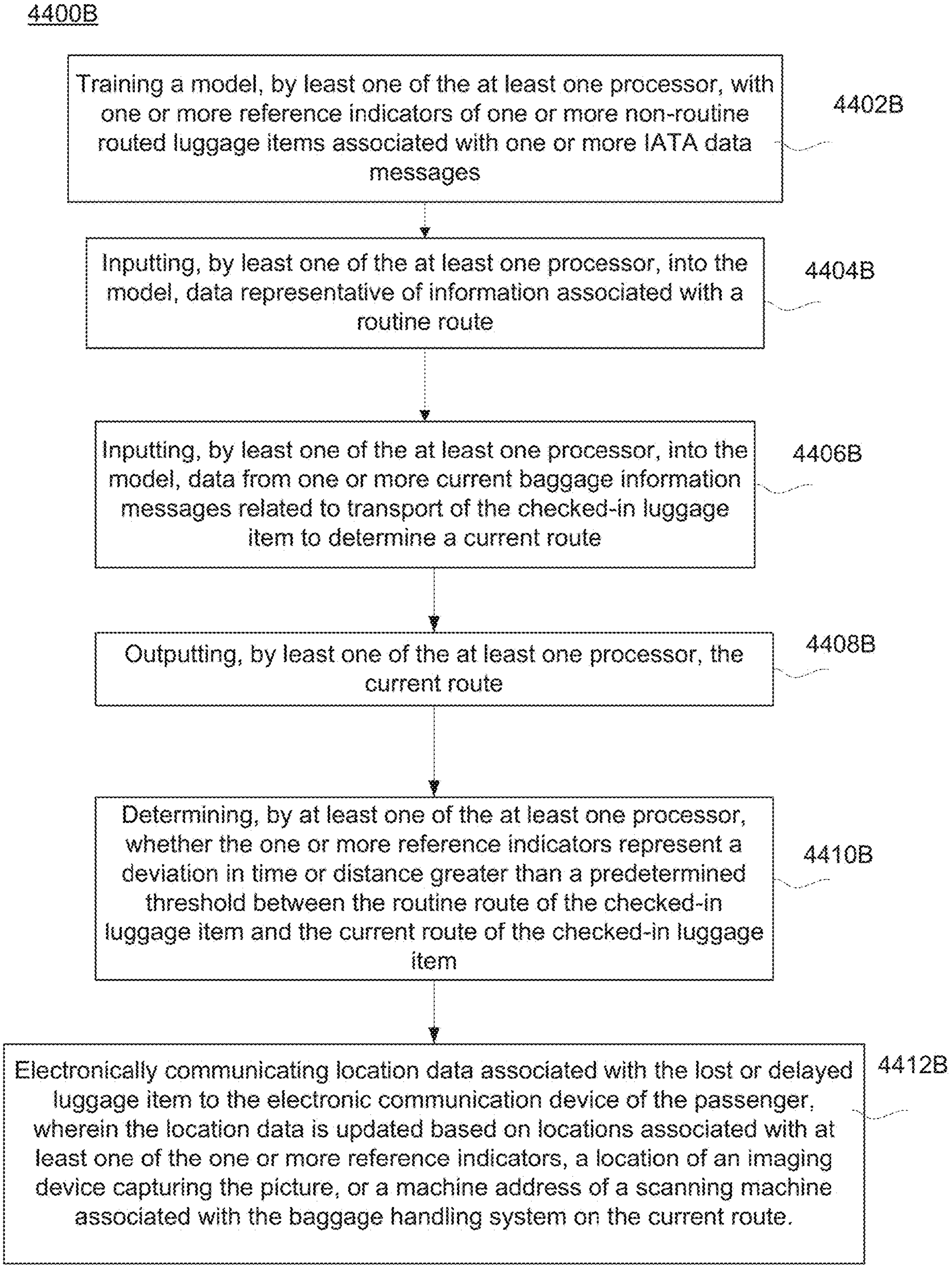
FIG. 44B illustrates a second method for locating a lost or delayed luggage item.
Figure 45:
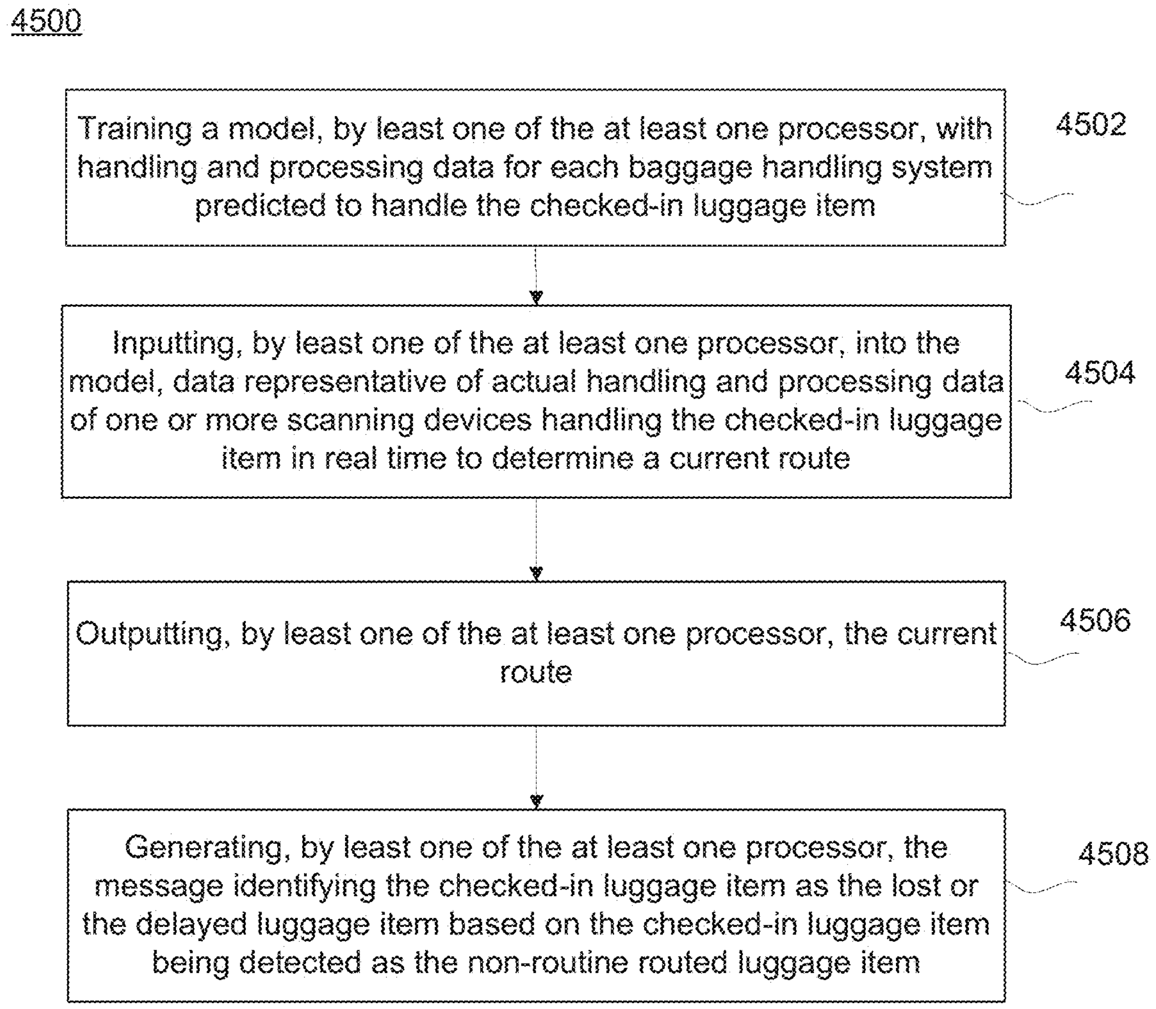
FIG. 45 illustrates a third method for locating a lost or delayed luggage item.

FIGS. 44A-44B and 45 are example methods for locating a lost or delayed luggage item.

FIG. 44A illustrates a first method 4400A for locating a lost or delayed luggage item. The method 4400A may include, at block 4402A, extracting from the picture of the checked-in luggage item, by at least one of the at least one processor, features of the checked-in luggage item using a feature extraction machine learning algorithm; and at block 4404A, locating the lost or delayed luggage item by matching the extracted features with extracted features in a current picture of a candidate luggage item. The extracted features may be detected using machine learning algorithms for feature extraction, background subtraction, etc.

FIG. 44B illustrates a second method 4400B for locating a lost or delayed luggage item. The method 4400B may include, at block 4402B, training a model, by least one of the at least one processor, with one or more reference indicators of one or more non-routine routed luggage items associated with one or more IATA data messages. The locating the lost or delayed luggage item may be described in blocks 4404B-4408B.

The method 4400B may include, at block 4404B inputting, by least one of the at least one processor, into the model, data representative of information associated with a routine route; at block 4406B, inputting, by least one of the at least one processor, into the model, data from one or more current baggage information messages related to transport of the checked-in luggage item to determine a current route; and at block 4408B, outputting, by least one of the at least one processor, the current route. The model may use the machine learning algorithm to detect that the checked-in luggage item is a non-routine routed luggage item based on a difference between the current route and the routine route being greater than a threshold.

The method 4400B may include generating, by least one of the at least one processor, the message identifying the checked-in luggage item as the lost or the delayed luggage item based on the checked-in luggage item being detected as the non-routine routed luggage item. This is shown in FIG. 3500 at block 3508.

The method 4400B may include, at block 4410B, determining, by at least one of the at least one processor, whether the one or more reference indicators represent a deviation in time or distance greater than a predetermined threshold between the routine route of the checked-in luggage item and the current route of the checked-in luggage item.

The method 4400B may include, at block 4412B, electronically communicating location data associated with the lost or delayed luggage item to the electronic communication device of the passenger. The location data may be updated based on locations associated with at least one of the one or more reference indicators, a location of an imaging device capturing the picture, or a machine address of a scanning machine associated with the baggage handling system on the current route.

FIG. 45 illustrates a third method 4500 for locating a lost or delayed luggage item. The method 4500 may include, at block 4502, training a model, by least one of the at least one processor, with handling and processing data for each baggage handling system predicted to handle the checked-in luggage item; at block 4504, inputting, by least one of the at least one processor, into the model, data representative of actual handling and processing data of one or more scanning devices handling the checked-in luggage item in real time to determine a current route; and at block 4506, outputting, by least one of the at least one processor, the current route. The model may use the machine learning algorithm to detect that the checked-in luggage item is a non-routine routed luggage item based on a difference between the current route and the routine route being greater than a threshold. The method 4500 may include, at block 4508, generating, by least one of the at least one processor, the message identifying the checked-in luggage item as the lost or the delayed luggage item based on the checked-in luggage item being detected as the non-routine routed luggage item.

The "step-by-step process" for performing the claimed functions herein is a specific algorithm, and may be shown as a mathematical formula, in the text of the specification as prose, and/or in a flowchart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

Computer Hardware

Referring now to FIG. 22, in a basic configuration, a computing device 2200 (i.e., computing device 122 or local computing device) may include any type of stationary computing device, server 148, personal computer (PC) or a mobile computing device. The computing device 2200 may be a processor 2450 or 2950.

The computing device 2200 may include one or more processing devices 2206 and system memory in a hard drive. Depending on the exact configuration and type of computing device 2200, system memory may be volatile (such as RAM 2202), non-volatile (such as read only memory (ROM 2204), flash memory, and the like) or some combination of the two. A system memory may store an operating system, and one or more applications 2224 and may include program data for performing at least one of the programming modules 149, described above in relation to FIGS. 1A and 1C.

The computing device 2200 may include programming instructions, which when executed carry out one or more blocks of the methods of FIGS. 4, 5A-5B, 6, 7, 8, 9A-9B, 10A-10B, 11A-11B, 13, 18A-18B, 19, 20, 23B, 256, 28, 30, 31A-31B, 32, 33, 34A-34C, 35A-35B, 36A-36D, 37A-37B, 38, 40, 41A-41C, 42A-42B, 43, 44A-44B and 45. The computing device 2200 may also have additional features or functionality. As a non-limiting example, the computing device 2200 may also include additional data storage media devices 2208 (removable and/or non-removable) such as, for example, magnetic disks, optical disks, or tape. The computer storage media devices 2208 may include volatile and non-volatile, non-transitory, removable, and non-removable media implemented in any method or technology for storage of data, such as computer readable instructions, data structures, program modules or other data. The system memory, removable storage and non-removable storage are all non-limiting examples of computer storage media. The computer storage media may include, but is not limited to, RAM 2202, ROM 2204, Electrically Erasable Programmable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device XX100. Any such computer storage media may be part of the device.

The computing device 2200 may include programming instructions, which when executed carry out the functions described in relation to the training of the artificial intelligence models in FIGS. 24 and 29 and filtering in FIG. 29. The computing device 2200 may include programming instructions, which when executed carry out the functions described in relation to the electronic passenger identifying signature (EPIS) forming unit 2430, the ML/AI algorithms 2433 and the statistical matching unit 2435.

The computing device 2200 may also include or have input/output (I/O) interfaces 2212 for input modules 2214 such as a keyboard, mouse, pen, voice input device, touch input device, etc. Input modules 2214 may include a video device, an imaging device 118, and/or a scanner 116 shown in FIG. 1B. The computing device may include or have I/O interfaces 2212 for connection to output device(s) such as a display, a presentation module 2216, speakers, etc. A graphical user interface (GUI) 2218 may be displayed on the presentation module 2216. The computing device 2200 may include a peripheral bus 2210 for connecting to peripherals. Computing device 2200 may contain communication connection(s) that allow the device to communicate with other computing devices, such as over a network or a wireless network.

By way of example, and not limitation, communication connection(s) may include wired media such as a wired network or direct-wired connection, and wireless media such as acoustic, radio frequency (RF), infrared and other wireless media. The computing device 2200 may include a network interface 2220, such as a network interface card to connect (wired or wireless) to a network or other communication conduits 2222.

In an embodiment, the computing device 2200 may also include accelerometers (ACC) 2235, gyroscopes, Global Positioning System (GPS) 2237 and/or Inertial Navigation Unit (INU) 2240 to determine a location of the computing device 2200 such as a mobile communication device, a scanning device, computing device, or other RF communication devices. The location data of the computing device 2200 used to acquire the OP-BTI includes location data of the luggage item and the time stamp associated with the location data.

Computer program code for carrying out operations described above may be written in a variety of programming languages, including but not limited to a high-level programming language, such as C or C++, Python, Java, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM, and a flash memory. Otherwise, the code can be stored in a tangible computer-readable storage medium such as a magnetic tape, a flexible disc, a hard disc, a compact disc, a photo-magnetic disc, and a digital versatile disc (DVD).

The embodiments may be configured for use in a computer or a data processing apparatus which includes a memory, such as a central processing unit (CPU), a RAM and a ROM as well as a storage medium such as a hard disc.

In one or more embodiments, where the computing device is a server, the server may be one or more servers and the servers may be a virtual server.

A general-purpose computer, or microprocessor, may be programmed to carry out the algorithm/steps for creating a new machine. The general-purpose computer becomes a special purpose computer once it is programmed to perform particular functions pursuant to instructions from program software of the embodiments described herein. The instructions of the software program that carry out the algorithm/steps electrically change the general-purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, infrared, and other wireless media. Combinations of any of the above are also included within the scope of computer readable medium.

Alternatively, or in addition, any of the functions and programming modules described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products, System-on-a-chip systems, Complex Programmable Logic Devices, and the like.

Terms such as "unit", "module", "member", "block" and "component" as used herein generally represent software, firmware, hardware, or combinations thereof. In the case of a software implementation, the module or component represents program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, wearable device, an Internet-of-Things (IoT) device, and the like). According to embodiments, a plurality of "unit", "module", "member", "block" and "component" may be implemented as a single component or a single "unit", "module", "member", "block" and "component" may include a plurality of components.

It will be understood that when an element is referred to as being "connected" with or to another element, it can be directly or indirectly connected to the other element, wherein the indirect connection includes "connection via a wireless communication network".

Throughout the description, when a member is "on" another member, this includes not only when the member is in contact with the other member, but also when there is another member between the two members.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms "first", "second", etc., do not denote any order or importance, but rather the terms "first", "second", etc., are used to distinguish one element from another. Likewise, identification codes or reference numbers are used for the convenience of the description but are not intended to illustrate the order of each step or block of the methods. Each step or block may be implemented in an order different from the illustrated order unless the context clearly indicates otherwise. One or more blocks may be performed contemporaneously or omitted in a certain iteration. One or more blocks may be added depending on a country's or an airline's rules.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phrascology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

Computer and Software Technology

One or more embodiments of the present disclosure may be embodied on various platforms. The following provides an antecedent basis for the information technology that may be utilized to enable the disclosure.

Embodiments of the present disclosure may be implemented in hardware, firmware, software, or any combination thereof. Embodiments of the present disclosure may also be implemented as instructions stored on a machine-readable medium, which may be read and executed by one or more processors. A machine-readable medium may include any mechanism for storing or transmitting information in a form that is readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present disclosure may be written in any combination of one or more programming languages, including an object-oriented programming language such as Java, C#, C++, Visual Basic or the like and conventional procedural programming languages, such as the “C” programming language or similar programming languages. Additional languages may include scripting languages such as PYTHON, LUA and PERL.

Aspects of the present disclosure are described throughout this disclosure with reference to flowchart illustrations and/or block diagrams of methods, apparatus (systems) and computer program products according one or more embodiments of the disclosure. It will be understood that each block of the flowchart illustrations and/or block diagrams, and combinations of blocks in the flowchart illustrations and/or block diagrams, can be implemented by machine-readable program instructions.

It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

As used herein, the singular forms “a”, “an” and “the” are intended to include the plural forms as well, unless the context clearly indicates otherwise. As used herein, the term “and/or” includes any and all combinations of one or more of the associated listed items and may be abbreviated as “/”.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present disclosure. In addition, in certain cases, even if a term is not described using “first,” “second,” etc., in the specification, it may still be referred to as “first” or “second” in a claim in order to distinguish different claimed elements from each other.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

Although the figures described herein may be referred to using language such as “one embodiment,” or “certain embodiments,” these figures, and their corresponding descriptions are not intended to be mutually exclusive from other figures or descriptions, unless the context so indicates. Therefore, certain aspects from certain figures may be the same as certain features in other figures, and/or certain figures may be different representations or different portions of a particular exemplary embodiment.

Glossary of Claim Terms

Airport Computing Infrastructure refers a distributed network of computing systems with controlled access to baggage handling systems that track and handle luggage items, systems that track passengers and systems that control flight reservations and more. The airport computing infrastructure is shared by airlines to deliver airplanes to gates for disembarking passengers and luggage items to carousels, for example. In some instances, an airline computing infrastructure and airport infrastructure may be used interchangeably.

Airline Computing Infrastructure refers a distributed network of computing systems with controlled access for booking reservations and checking in passengers and their luggage items. The airline computing infrastructure interfaces with the baggage handling systems that track luggage items and systems that track passengers. The airline computing infrastructure includes the Departure Control System (DCS) and a travel reservation booking system.

BTI means “bag tag identifier.” A bag tag identifier, also known as a baggage tag or baggage label, is a small tag or label attached to a passenger’s luggage that contains identifying information about the passenger and their flight. It is used by airlines to track and handle the passenger’s checked baggage. The tag usually includes the passenger’s name, flight information (flight number, departure and destination airports, and date of travel), and a unique identifier, such as a bag tag number or barcode. The bag tag identifier number is unique for each luggage, and it’s used as reference for the airlines to track the luggage through the baggage handling system, matching the luggage to the passenger’s flight and route, and also to identify the owner of the luggage in case of misplaced, lost or delayed luggage. The bag tag identifier is usually issued at check-in, and the passenger may attach it to their luggage before they drop it off at the baggage drop-off counter.

Database means an organized collection of data stored, updated and accessed electronically. Databases are typically designed to hold data, support efficient query and data manipulation, and manage the way that data is stored and retrieved.

First-mode travel carrier (FMTC) means the initial carrier that affixes a tangible, machine-scannable indicium to a passenger’s luggage which according to the present disclosure is used to retrieve the passenger PNR and then construct a passenger manifest for one or more return trips without having to manually reenter data.

International Air Transport Association (IATA) refers to the world-wide trade association of airlines (for both freight and passenger carriers) that regulates the aviation industry by promulgating standards, procedures, and practices.

License Plate means the ten-digit numeric code on a bag tag issued by a carrier to agent during check-in for a travel journey. The term “license plate” in this context is the official term used by IATA. The license plate is encoded in a machine-scannable bar code but also presented in human-readable form where it will have either a two-character or a three-digit IATA carrier code. For example, it may be either "CZ728359" or "784728359." "CZ" would be the two-character IATA code for China Southern Airlines, and "784" would be the three-digit IATA carrier code. For American Airlines®, the IATA Designator would be "AA" and the IATA code "001."

Lodging Entity means a business or operation providing residential hospitality services such as a hotel, resort or cruise ship as non-limiting examples. A lodging entity may be a mode of travel or a vehicle of travel.

Multi-Mode Travel means functionally using an IATA message, and expanding their use all the way to the lodging entity or other mode of travel. The IATA license plate, the PNR number, and the piece of paper becomes a bag tag for the entire trip and for any mode of travel.

Originating Hardcopy Bag Tag Identifier (OP-BTI) means a unique identifier associated with or printed on a luggage bag tag from the originating airline travel carrier. In general, every piece of luggage in airline travel is tagged with a unique identifier for tracking purposes. It is typically attached to the luggage at check-in and scanned at various points throughout the journey to ensure the luggage makes it to the correct destination.

Passenger/Airline Information on the originating hardcopy bag tag refers to information that links a passenger and an airline to specific IATA compatible passenger information. This information may include the PNR number for a passenger's itinerary, the IATA license plate printed on an originating hardcopy bag tag that is associated with a flight in the passenger's itinerary and/or the originating airline of the passenger's flight or associated with the itinerary. This information may include a passenger's name and the airline code or airline name. This information may include any information that when combined can be used to access the passenger's PNR data stored in a computer readable memory device coupled to a computing device associated with the airline carrier. The term "passenger/airline information" is sometimes referred to as "printed passenger information associated with an airline travel carrier" that is on an originating hardcopy bag tag.

Luggage Manifest means a digital record containing an array of data including data for pick-up of a luggage item departing a destination point, such as a terminating airport, and delivery to a lodging entity or another travel carrier and return flight check-in based on a digitized IATA license plate, passenger name record (PNR) number and/or text, all of which can be from an originating hardcopy bag tag of the originating first leg of travel. The luggage manifest may include a delivery location, which may include a home address, a government security screening location, temporary holding location, passenger delivery instructions, cabin room, lodging entity address, any intermediate travel carrier location, destination point, rental car location, first-mode travel carrier location, designated return flight air carrier location, and/or designated return travel carrier location. Since, the luggage item has an independent travel experience, its location at a destination point, such as DP 107 may be at a different location then the passenger at the same DP 107. For example, if the luggage item is screened for the next mode of travel, the luggage item can be transferred to a trusted custody handler.

Mode of Transportation: Transportation by an air carrier, motor vehicle, locomotive, and maritime vessel. A maritime vessel may include a ferry or a cruise ship. In one or more embodiments, a mode of transportation may be a rental vehicle including rental cars and recreational vehicles, for example.

Passenger Manifest means a record containing an array of data including data for check-in of a return leg of travel of a passenger with a designated return travel carrier. A passenger manifest may be a flight manifest. A passenger manifest may be a manifest of expected passenger for arrival for travel or a stay with a mode of travel.

PNR stands for "Passenger Name Record" and is a known term in the travel industry. It can be a record in the database of an airline or a travel agency that contains all the details of a passenger's itinerary and trip information. This information includes the passenger's name, contact information, flight details, seat preferences, and any special requests. PNR also may contain information about the booking, such as the booking date, fare, and ticketing status. It is used by the airlines and travel agencies to manage and keep track of the passenger's itinerary and travel plans. PNR number may be unique for each passenger, or a group of passengers and it's used as reference for the passengers, airlines and travel agencies. PNR is also used to check-in, check flight status, and make any changes to the reservation. The PNR number itself is typically 6 characters, often a combination of letters and numbers. While regulatory bodies like IATA (see above) do not dictate a universal format for PNRs, each PNR has five (5) mandatory fields including: (1) the phone for traveler or agent; (2) the last person who made changes in the PNR; (3) the itinerary which must include at least one segment of the journey; (4) the name of the passenger or passengers including full first and last names; and (5) specifying how and when a ticket is to be issued. Although the PNR number for airlines is currently 6 characters, the PNR number may increase in characters and should not be limited to the number of characters but to the current guidelines of the airline industry now and in the future. In other industries or travel carriers, the PNR number uses a different number sequence. Some systems may use a super PNR number that combines PNR numbers of a plurality of travel carriers and lodging entities, including rental cars, hotels, etc.

Radio-frequency identification (RFID) means a technology that uses electromagnetic fields to automatically identify, and track tags attached to objects.

Regulations refer to regulatory rules from a government agency commissioned by law to regulate the mode of travel or transportation provides regulations for screening luggage items to board an aircraft, mass transit of land-mode of travel or transportation and maritime vessel security.

Return travel carrier (RTC) means the carrier (e.g., airline) a takes at the conclusion of a stay at a lodging entity or other mode of travel. The RTC in the present disclosure is extracted in a process using the license plate printed by the FMTC to access the PNR of the passenger to build a passenger manifest for the return journey. Among other benefits, this reduces or eliminates data entry, particularly for the lodging entity checking in the passenger for the RTC.

Travel Data refers to data that can be extracted from an airline's IATA data message, a passenger's itinerary, and/or the data in a PNR database.

Type B (or B-Type) messages refer to a specific format of communication that airlines and other entities in the air travel industry use to transmit and receive critical operational data. These messages are standardized and utilized for a wide range of applications, including flight planning, passenger booking and check-in, luggage tracking, weather updates, and other crucial air transport operations. The Type B messaging standard is overseen by the International Air Transport Association (IATA). Compared to more modern data types and formats like XML (extensible markup language) and JSON (JavaScript Object Notation), which carry message payloads, Type B messages employ a stringent structure. Type B messages operate on a "store-and-forward" mechanism, whereby a message sender sends data via their service provider, which is then stored for a contracted period, often seven (7) days. The data is delivered directly to a chosen recipient or via a gateway provider if they exist on a different network. Should delivery fail, contractual agreements allow the data to be re-sent, a contingency reflected in the PDM (Possible Duplicate Message) header.

Rules refer to guidelines required by a company or entity owning the vehicle of travel, which may have additional rules for objects to be brought into or on board a vehicle of travel in a luggage item. The rules may be self-governance rules.

Rules and Regulations refer to the combined regulations and rules for both the government agency and the company or entity owning the vehicle of travel regarding types of objects and materials that can be brought into or on board a vehicle of travel in a luggage item.

Super PNR (Passenger Name Record) serves as an aggregated meta-record that encapsulates multiple discrete PNRs, thereby providing a unified identifier for complex travel itineraries. Characterized by its capacity for data aggregation, a Super PNR may incorporate flight information from multiple carriers—potentially cross-referencing partner airlines in code-share or alliance configurations—as well as multimodal transportation options such as rail or bus services. This amalgamated data structure facilitates streamlined itinerary management by offering a singular reference point, thereby ensuring data integrity through synchronized updates across all constituent records. Additionally, a Super PNR can encapsulate enriched data elements, including but not limited to, consolidated baggage information and special service requests, thus augmenting both customer experience and operational efficiency for service providers.

Trusted Custody Handler means persons allowed to transfer secure luggage, baggage, and packages from an air carrier cargo hold or other vehicles of travel without exposing the baggage that would require additional physical security scanning by a governing entity, such as CBP and the Coast Guard, or a private entity to enter a next vehicle of travel or country of travel.

Vehicle of Travel: A vehicle of travel includes a medium of travel. The medium of travel may include mass transit motor vehicles, locomotives, and maritime vessels. A maritime vessel may include a ferry or a cruise ship. The medium of travel may include a stationary building such as a lodging entity or resort. Ferries, cruise ships, and trains like lodging entities may have lodging accommodations as part of the passenger's reservations. Some modes of transportation may include lodging accommodations such as recreational vehicles.

The advantages set forth above, and those made apparent from the foregoing description, are efficiently attained. Since certain changes may be made in the above construction without departing from the scope of the disclosure, it is intended that all matters contained in the foregoing description or shown in the accompanying drawings shall be interpreted as illustrative and not in a limiting sense.

What is claimed is:

1. A method comprising:

linking, by at least one of at least one processor, a first unique baggage identifier to at least one of a second unique baggage identifier and a security screening image (SSI) of contents within a luggage item;

based on receiving a message comprising a list of contents missing from the luggage item, through a network interface coupled to the at least one of the at least one processor and a communication network, retrieving the SSI of the contents;

generating, by at least one of the at least one processor, a list of contents in the SSI using a machine learning algorithm;

comparing, by at least one of the at least one processor, the list of contents missing from the luggage item with the list of contents in the SSI;

based on identifying a match between at least one item on the list of contents missing from the luggage item and at least one item on the list of contents in the SSI, verifying, by at least one of the at least one processor, a missing contents claim; and communicating a verification message through a second network interface coupled to at least one of the at least one processor and a second communication network.

2. The method of claim 1, further comprising:

storing in a secure database, the first unique baggage identifier and at least one of the second unique baggage identifier and the SSI.

3. The method of claim 1, wherein the message further comprises the first unique baggage identifier, and wherein the first unique baggage identifier comprises an identifier originally printed on a bag tag affixed to the luggage item.

4. The method of claim 1, further comprising:

based on determining, by at least one of the at least one processor, that the at least one item on the list of contents missing from the luggage item do not match any of the at least one item on the list of contents in the SSI, communicating a failed verification message through the second network interface coupled to at least one of the at least one processor and the second communication network.

5. The method of claim 1, further comprising:

determining, by at least one of the at least one processor, a missing first unique baggage identifier; and extrapolating, by at least one of the at least one processor, the missing first unique baggage identifier, based on stored links between the first unique baggage identifier and the at least one of the second unique baggage identifier, and the security screening image (SSI) of contents within the luggage item and the picture.

6. The method of claim 1, further comprising:

capturing, by an imaging device, a picture of the luggage item, wherein the linking, by at least one of the at least one processor, the first unique baggage identifier further comprises linking, by at least one of the at least one processor, the first unique baggage identifier, to at least one of the picture of the luggage item, the second unique baggage identifier, and the security screening image (SSI) of contents within the luggage item.

7. The method of claim 6, wherein the imaging device is located in a security zone where the SSI is captured, is located at a location of a scanning device of a baggage handling system, or is integrated in a communication device of a passenger.

8. The method of claim 1, further comprising:

retrieving, by at least one of the at least one processor, time stamping generated by a baggage handling system (BHS) associated with the luggage item traveling through the BHS to a security screening machine capturing the SSI;

determining, by at least one of the at least one processor, a time of travel from entering the BHS to exiting the security screening machine; and determining, by at least one of the at least one processor, a delay of a traversal of the luggage item through the BHS based on the time of travel.

9. The method of claim 8, further comprising:

based on identifying, by at least one of the at least one processor, the delay of the traversal of the luggage item through the BHS, communicating a non-verifiable message through the second network interface coupled to at least one of the at least one processor and the second communication network.

10. A system comprising:

at least one memory storing one or more instructions; and at least one processor configured to execute the one or more instructions, wherein the one or more instructions, when executed by the at least one processor, cause the system to:

link a first unique baggage identifier to at least one of a second unique baggage identifier and a security screening image (SSI) of contents within a luggage item, based on receiving a message comprising a list of contents missing from the luggage item, through a network interface of the system coupled to the at least one of the at least one processor and a communication network, retrieve the SSI of the contents, generate a list of contents in the SSI using a machine learning algorithm, compare the list of contents missing from the luggage item with the list of contents in the SSI, based on identifying a match between at least one item on the list of contents missing from the luggage item and at least one item on the list of contents in the SSI, verify a missing contents claim, and communicate a verification message through a second network interface of the system coupled to at least one of the at least one processor and a second communication network.

11. The system of claim 10, wherein the one or more instructions, when executed by the at least one processor, cause the system to:

store, in a secure database, the first unique baggage identifier and at least one of the second unique baggage identifier and the SSI.

12. The system of claim 10, wherein the message further comprises the first unique baggage identifier, and wherein the first unique baggage identifier comprises an identifier originally printed on a bag tag affixed to the luggage item.

13. The system of claim 10, wherein the one or more instructions, when executed by the at least one processor, cause the system to:

based on determining that the at least one item on the list of contents missing from the luggage item do not match any of the at least one item on the list of contents in the SSI, communicate a failed verification message through the second network interface of the system coupled to at least one of the at least one processor and the second communication network.

14. The system of claim 10, wherein the one or more instructions, when executed by the at least one processor, cause the system to:

determine a missing first unique baggage identifier, and extrapolate the missing first unique baggage identifier based on stored links between the first unique baggage identifier and the at least one of the second unique baggage identifier, and the security screening image (SSI) of contents within the luggage item and the picture.

15. The system of claim 10, wherein the one or more instructions, when executed by the at least one processor, cause the system to:

cause an imaging device to capture a picture of the luggage item, and link the first unique baggage identifier by linking the first unique baggage identifier to at least one of the picture of the luggage item, the second unique baggage identifier, and the security screening image (SSI) of contents within the luggage item.

16. The system of claim 15, wherein the imaging device is located in a security zone where the SSI is captured, is located at a location of a scanning device of a baggage handling system, or is integrated in a communication device of a passenger.

17. The system of claim 10, wherein the one or more instructions, when executed by the at least one processor, cause the system to:

retrieve time stamping generated by a baggage handling system (BHS) associated with the luggage item traveling through the BHS to a security screening machine capturing the SSI, determine a time of travel from entering the BHS to exiting the security screening machine, and determine a delay of a traversal of the luggage item through the BHS based on the time of travel.

18. The system of claim 17, wherein the one or more instructions, when executed by the at least one processor, cause the system to:

based on identifying the delay of the traversal of the luggage item through the BHS, communicate a non-verifiable message through the second network interface of the system coupled to at least one of the at least one processor and the second communication network.

19. A non-transitory computer readable medium having instructions stored therein, which when executed by at least one processor, cause the at least one processor to execute a method comprising:

linking, by at least one of at least one processor, a first unique baggage identifier to at least one of a second unique baggage identifier and a security screening image (SSI) of contents within a luggage item;

based on receiving a message comprising a list of contents missing from the luggage item, through a network interface coupled to the at least one of the at least one processor and a communication network, retrieving the SSI of the contents;

generating, by at least one of the at least one processor, a list of contents in the SSI using a machine learning algorithm;

comparing, by at least one of the at least one processor, the list of contents missing from the luggage item with the list of contents in the SSI;

based on identifying a match between at least one item on the list of contents missing from the luggage item and at least one item on the list of contents in the SSI, verifying, by at least one of the at least one processor, a missing contents claim; and communicating a verification message through a second network interface coupled to at least one of the at least one processor and a second communication network.

20. The non-transitory computer readable medium of claim 19, wherein the method further comprises:

storing in a secure database, the first unique baggage identifier and at least one of the second unique baggage identifier and the SSI.

21. The non-transitory computer readable medium of claim 19, wherein the message further comprises the first unique baggage identifier, and wherein the first unique baggage identifier comprises an identifier originally printed on a bag tag affixed to the luggage item.

22. The non-transitory computer readable medium of claim 19, wherein the method further comprises:

based on determining, by at least one of the at least one processor, that the at least one item on the list of contents missing from the luggage item do not match any of the at least one item on the list of contents in the SSI, communicating a failed verification message through the second network interface coupled to at least one of the at least one processor and the second communication network.

23. The non-transitory computer readable medium of claim 19, wherein the method further comprises:

determining, by at least one of the at least one processor, a missing first unique baggage identifier; and extrapolating, by at least one of the at least one processor, the missing first unique baggage identifier, based on stored links between the first unique baggage identifier and the at least one of the second unique baggage identifier, and the security screening image (SSI) of contents within the luggage item and the picture.

24. The non-transitory computer readable medium of claim 19, wherein the method further comprises:

capturing, by an imaging device, a picture of the luggage item, wherein the linking, by at least one of the at least one processor, the first unique baggage identifier further comprises linking, by at least one of the at least one processor, the first unique baggage identifier, to at least one of the picture of the luggage item, the second unique baggage identifier, and the security screening image (SSI) of contents within the luggage item.

25. The non-transitory computer readable medium of claim 24, wherein the imaging device is located in a security zone where the SSI is captured, is located at a location of a scanning device of a baggage handling system, or is integrated in a communication device of a passenger.

26. The non-transitory computer readable medium of claim 19, wherein the method further comprises:

retrieving, by at least one of the at least one processor, time stamping generated by a baggage handling system (BHS) associated with the luggage item traveling through the BHS to a security screening machine capturing the SSI;

determining, by at least one of the at least one processor, a time of travel from entering the BHS to exiting the security screening machine; and determining, by at least one of the at least one processor, a delay of a traversal of the luggage item through the BHS based on the time of travel.

27. The non-transitory computer readable medium of claim 26, wherein the method further comprises:

based on identifying, by at least one of the at least one processor, the delay of the traversal of the luggage item through the BHS, communicating a non-verifiable message through the second network interface coupled to at least one of the at least one processor and the second communication network.

* * * * *